United States Patent [19]
Huston et al.

[11] Patent Number: 5,872,721
[45] Date of Patent: Feb. 16, 1999

[54] MONITOR-CONTROL SYSTEMS AND METHODS FOR MONITORING AND CONTROLLING ATMOSPHERES IN CONTAINERS FOR RESPIRING PERISHABLES

[75] Inventors: Clifford R. Huston, Saratoga; Karrie R. Finkel-Kernberg, San Francisco, both of Calif.; Samuel Harris, Northcote, New Zealand; James R. Lugg, Salinas, Calif.; Kevin J. Reeder, Columbus, Ohio; Robert H. Lashley, San Jose, Calif.; Daniel P. Garland, Los Gatos, Calif.; Gregory Justice, Sunnyvale, Calif.; Derek Orme, Portola Valley, Calif.; William F. Dresselhaus, Portland, Oreg.; Dennis P. Kerkhoff, Rio Del Mar, Calif.

[73] Assignee: Transfresh Corporation, Salinas, Calif.

[21] Appl. No.: 565,564

[22] Filed: Nov. 30, 1995

Related U.S. Application Data

[63] Continuation-in-part of Ser. No. 299,813, Sep. 1, 1994, abandoned, which is a continuation of Ser. No. 196,904, Feb. 15, 1994, abandoned, which is a continuation of Ser. No. 683,591, Apr. 9, 1994, abandoned, which is a continuation-in-part of Ser. No. 508,089, Apr. 11, 1990, abandoned.

[51] Int. Cl.⁶ ........................................................ A23L 3/00
[52] U.S. Cl. ............................................ 364/510; 62/150
[58] Field of Search .............................. 364/510; 165/21, 165/32, 62, 63; 62/150, 166, 176.1, 273

[56] References Cited

U.S. PATENT DOCUMENTS

| | | |
|---|---|---|
| 3,102,777 | 9/1963 | Bedrosian et al. . |
| 3,102,779 | 9/1963 | Brody et al. . |
| 3,102,780 | 9/1963 | Bedrosian et al. . |
| 3,239,360 | 3/1966 | Dixon . |
| 3,307,618 | 3/1967 | Hagenaur et al. . |

(List continued on next page.)

FOREIGN PATENT DOCUMENTS

| | | |
|---|---|---|
| 46025 | 7/1964 | Australia . |
| 46076 | 10/1964 | Australia . |
| 60963 | 11/1972 | Australia . |
| 60927 | 11/1973 | Australia . |
| 69006 | 12/1975 | Australia . |
| 69005 | 12/1976 | Australia . |
| 64203 | 1/1982 | Australia . |
| 84203 | 1/1982 | Australia . |
| 84195 | 5/1982 | Australia . |
| 3243184 | 3/1985 | Australia . |

(List continued on next page.)

OTHER PUBLICATIONS

Article entitled "$CO_2$ –Absorber zur Lagerung von Apfeln unter kontrollierter Atmosphere", by G. Schoerth/ published in Technische Tunschau Sulzer, 1966, 2.

NZ Patent 143880 was granted Aug. 29, 1969 but patent lapsed on Jan. 6, 1973 due to failure to pay renewal fee.

*Primary Examiner*—Ellis B. Ramirez
*Assistant Examiner*—Thomas Peezo

[57] ABSTRACT

A system adapted for removable placement in a security enclosure fitted into the wall of a refrigerated container for respiring perishables, and for monitoring and controlling, continuously and dynamically, over a programmed, desired time, the concentration of oxygen, and the concentration of dioxide, in such a container atmosphere where the concentrations of these gases vary over time as the perishables respire, includes devices for sensing, separately, the concentrations of oxygen and carbon dioxide in the container atmosphere, devices for establishing setpoints or desired values of oxygen and carbon dioxide atmospheric concentration within the container, and for changing those setpoints, over time, depending on the nature of the perishable and other variables, and for maintaining the atmospheric concentrations of oxygen and carbon dioxide at desired setpoints for desired programmed times by admitting outside air into the container, as a source of oxygen, and by scrubbing to remove carbon dioxide, as necessary.

27 Claims, 84 Drawing Sheets

U.S. PATENT DOCUMENTS

| | | |
|---|---|---|
| 3,360,380 | 12/1967 | Bedrosian et al. . |
| 3,368,873 | 2/1968 | Fuller et al. . |
| 3,421,336 | 1/1947 | Lichtenberger et al. . |
| 3,508,881 | 4/1970 | Hagenauer et al. . |
| 3,830,078 | 8/1974 | Read . |
| 3,913,661 | 10/1975 | Burg et al. . |
| 3,915,221 | 10/1975 | Francis ................................ 165/20 |
| 3,937,847 | 2/1976 | Elkins et al. . |
| 4,013,260 | 3/1977 | McClatchie et al. . |
| 4,142,372 | 3/1979 | Kato et al. . |
| 4,228,197 | 10/1980 | Means ................................ 426/419 |
| 4,243,456 | 1/1981 | Lashlee ................................ 99/468 |
| 4,333,520 | 6/1982 | Yanadori et al. . |
| 4,356,702 | 11/1982 | Kuttel . |
| 4,537,043 | 8/1985 | Volker et al. . |
| 4,566,282 | 1/1986 | Knoblauch et al. . |
| 4,642,996 | 2/1987 | Harris et al. . |
| 4,655,278 | 4/1987 | Seguin . |
| 4,669,534 | 6/1987 | Maeda et al. . |
| 4,678,025 | 7/1987 | Oberlander et al. . |
| 4,685,305 | 8/1987 | Burg . |
| 4,710,206 | 12/1987 | Allen et al. . |
| 4,716,739 | 1/1988 | Harris et al. . |
| 4,754,611 | 7/1988 | Hosaka et al. . |
| 4,817,391 | 4/1989 | Roe et al. . |
| 4,824,685 | 4/1989 | Bianco . |
| 4,829,774 | 5/1989 | Wassibauer et al. . |
| 4,833,892 | 5/1989 | Wassibauer et al. . |
| 4,843,956 | 7/1989 | Lashlee . |
| 4,894,997 | 1/1990 | Urushiazaki et al. . |
| 4,961,322 | 10/1990 | Oguma et al. . |
| 4,987,745 | 1/1991 | Harris et al. . |
| 5,063,753 | 11/1991 | Woodruff . |

FOREIGN PATENT DOCUMENTS

| | | |
|---|---|---|
| 96816 | 6/1987 | Australia . |
| 7939587 | 4/1988 | Australia . |
| 2287588 | 5/1989 | Australia . |
| 4457789 | 5/1990 | Australia . |
| 0136042 | 4/1985 | European Pat. Off. . |
| 0224469 | 6/1987 | European Pat. Off. . |
| 0235119 | 9/1987 | European Pat. Off. . |
| 0242592 | 10/1987 | European Pat. Off. . |
| 0315309 | 9/1988 | European Pat. Off. . |
| 0353021 | 1/1990 | European Pat. Off. . |
| 1058817 | 9/1952 | France . |
| 1140031 | 2/1957 | France . |
| 1403557 | 5/1965 | France . |
| 1435917 | 3/1966 | France . |
| 7921363 | 2/1981 | France . |
| 2520592 | 6/1983 | France . |
| 0363553 | 4/1990 | France . |
| 19549914 | 4/1970 | Germany . |
| 3140337 | 4/1983 | Germany . |
| 1296935 | 5/1988 | Japan . |
| 1296938 | 5/1988 | Japan . |
| 1296940 | 5/1988 | Japan . |
| 2200143 | 1/1989 | Japan . |
| 2200144 | 1/1989 | Japan . |
| 2200146 | 4/1989 | Japan . |
| 143880 | 8/1969 | New Zealand . |
| 419815 | 3/1967 | Switzerland . |
| PCT/GB87/00234 | 10/1987 | WIPO . |
| PCT/AU91/00049 | 8/1991 | WIPO . |

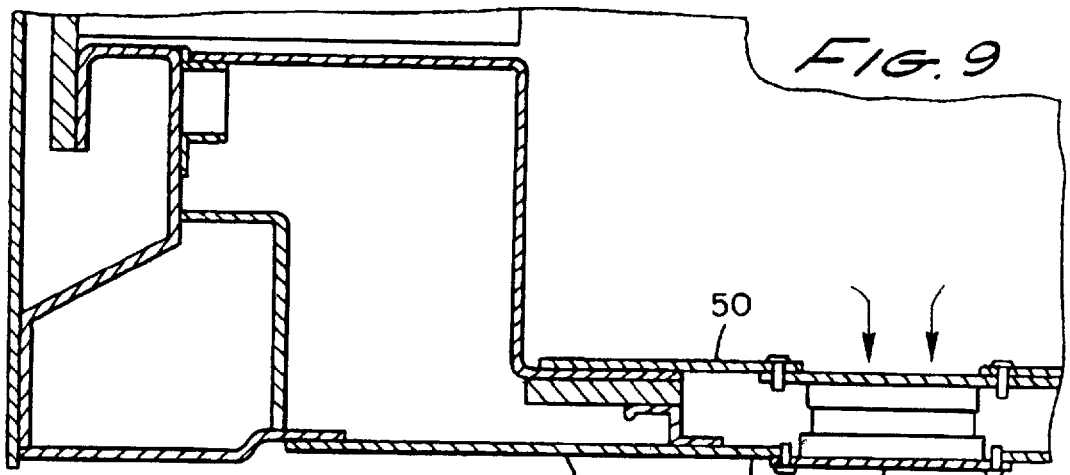
FIG. 9
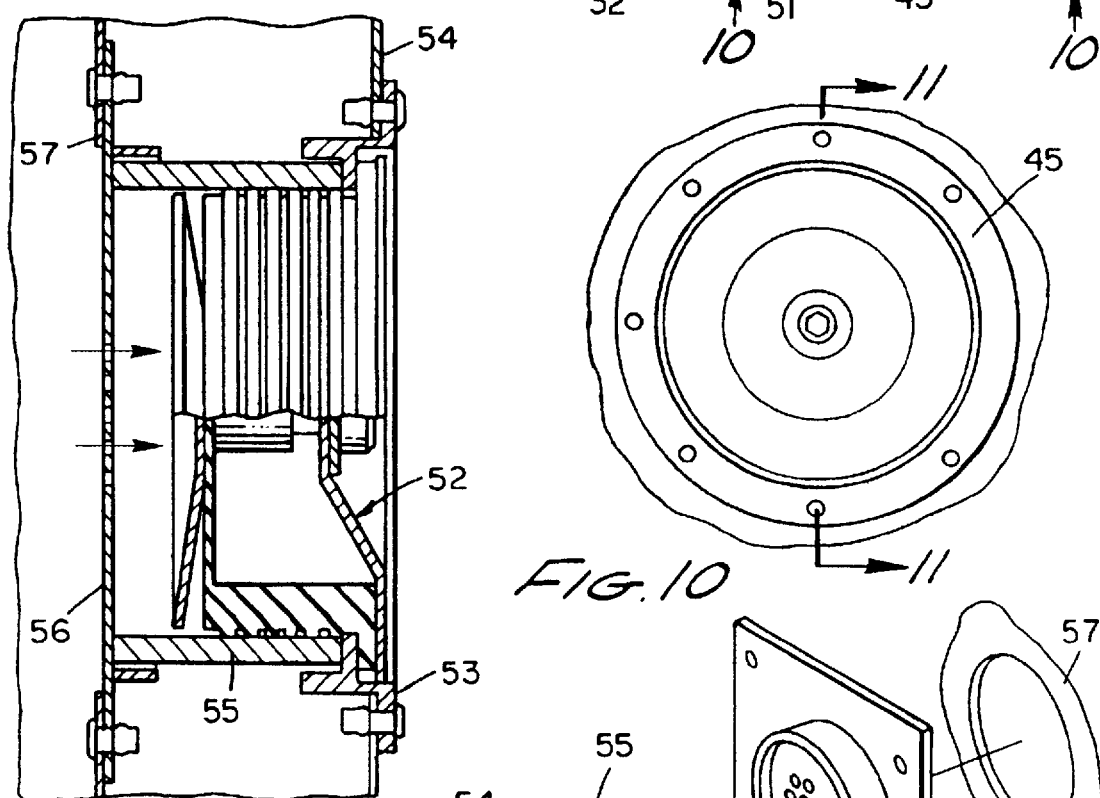
FIG. 10
FIG. 11
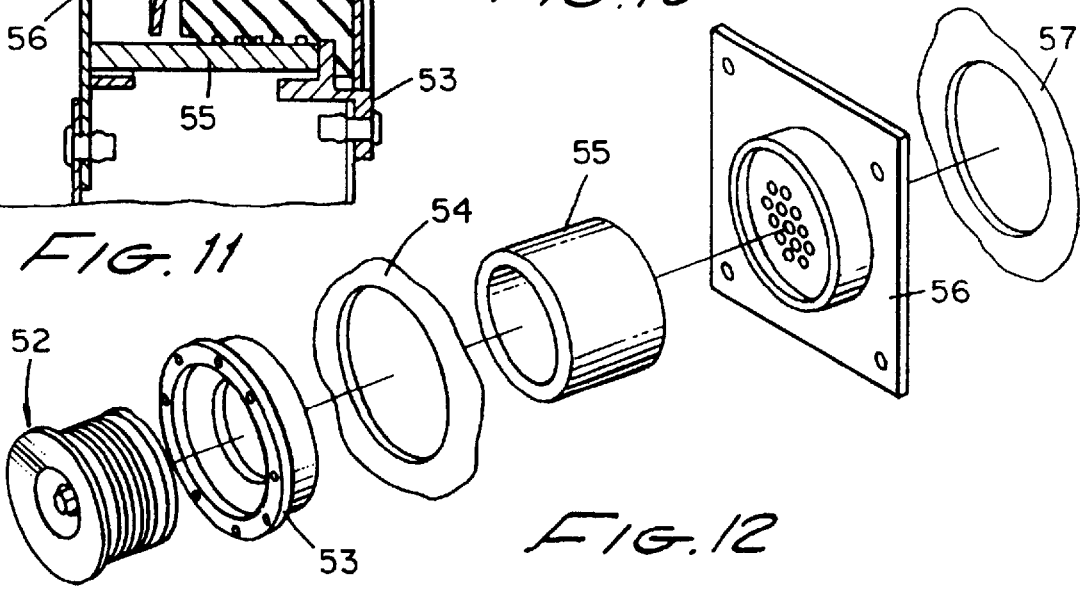
FIG. 12

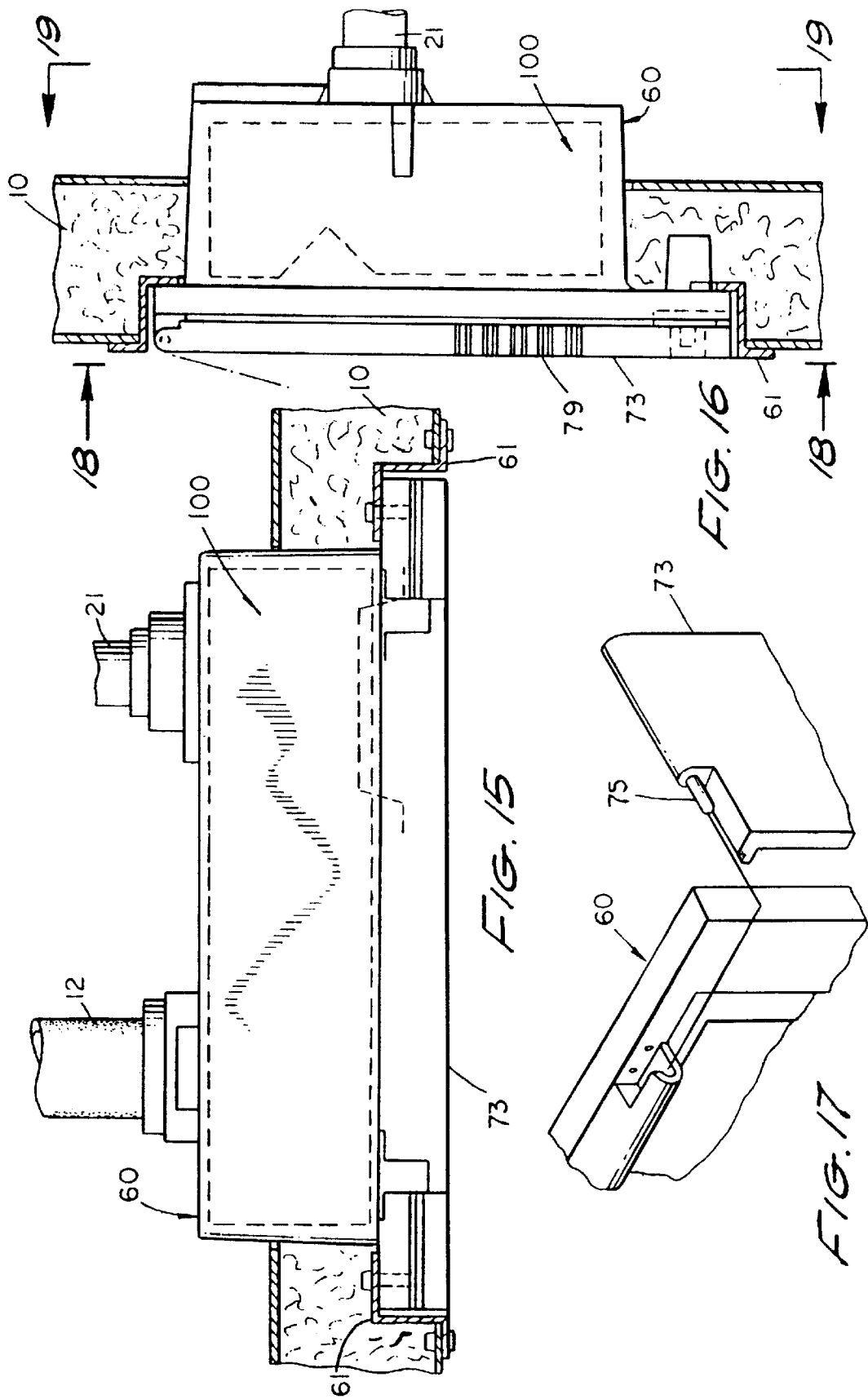

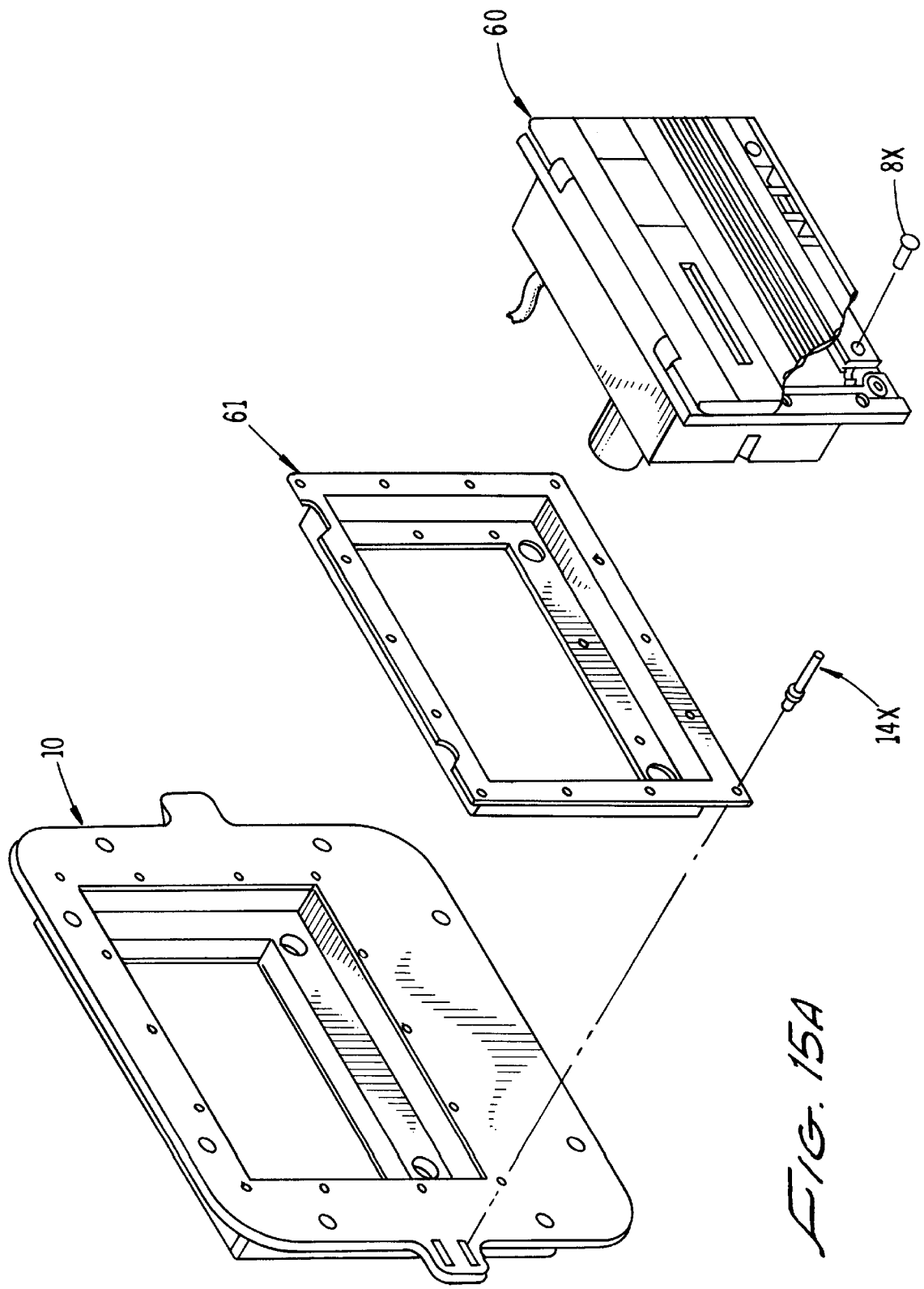

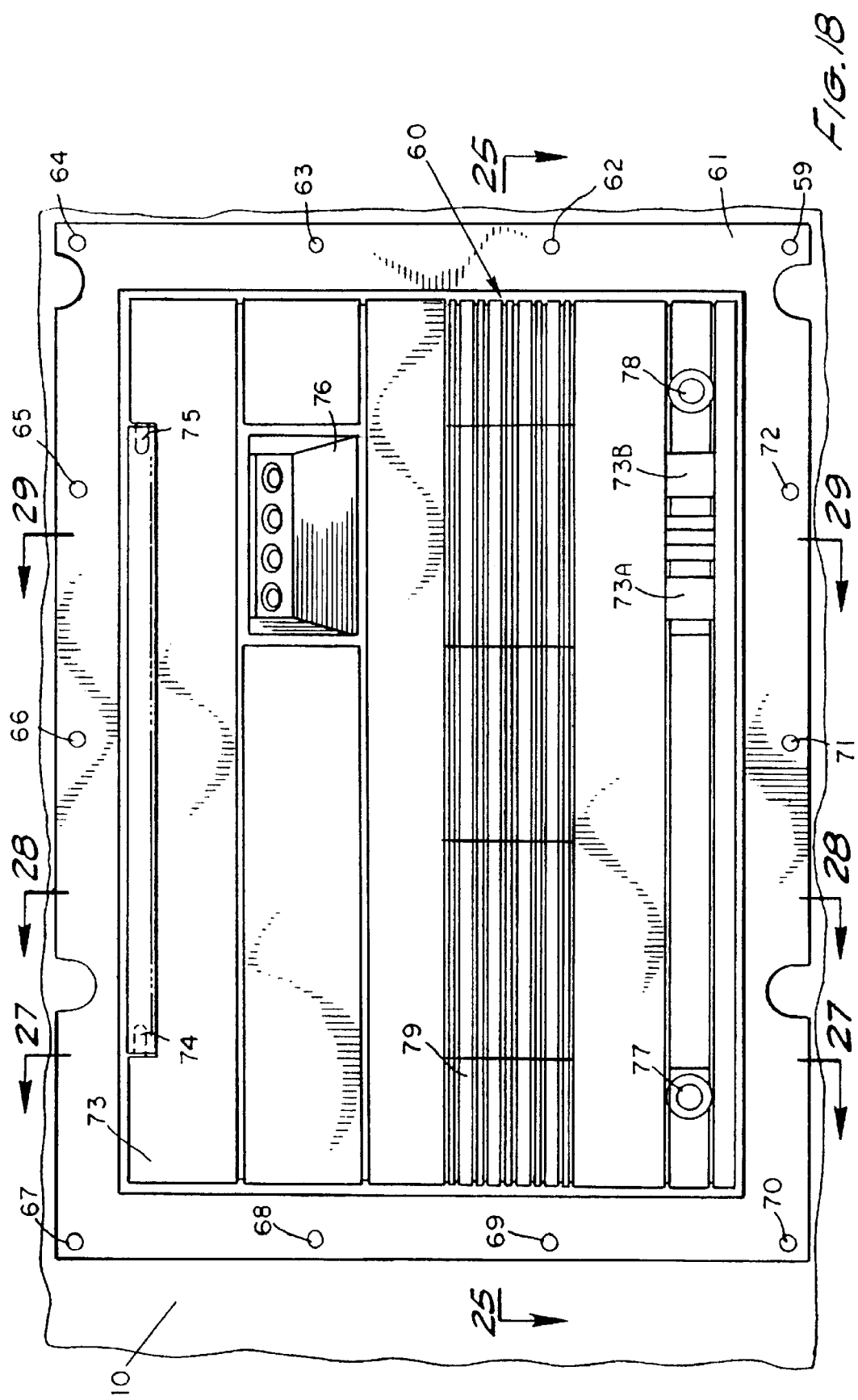

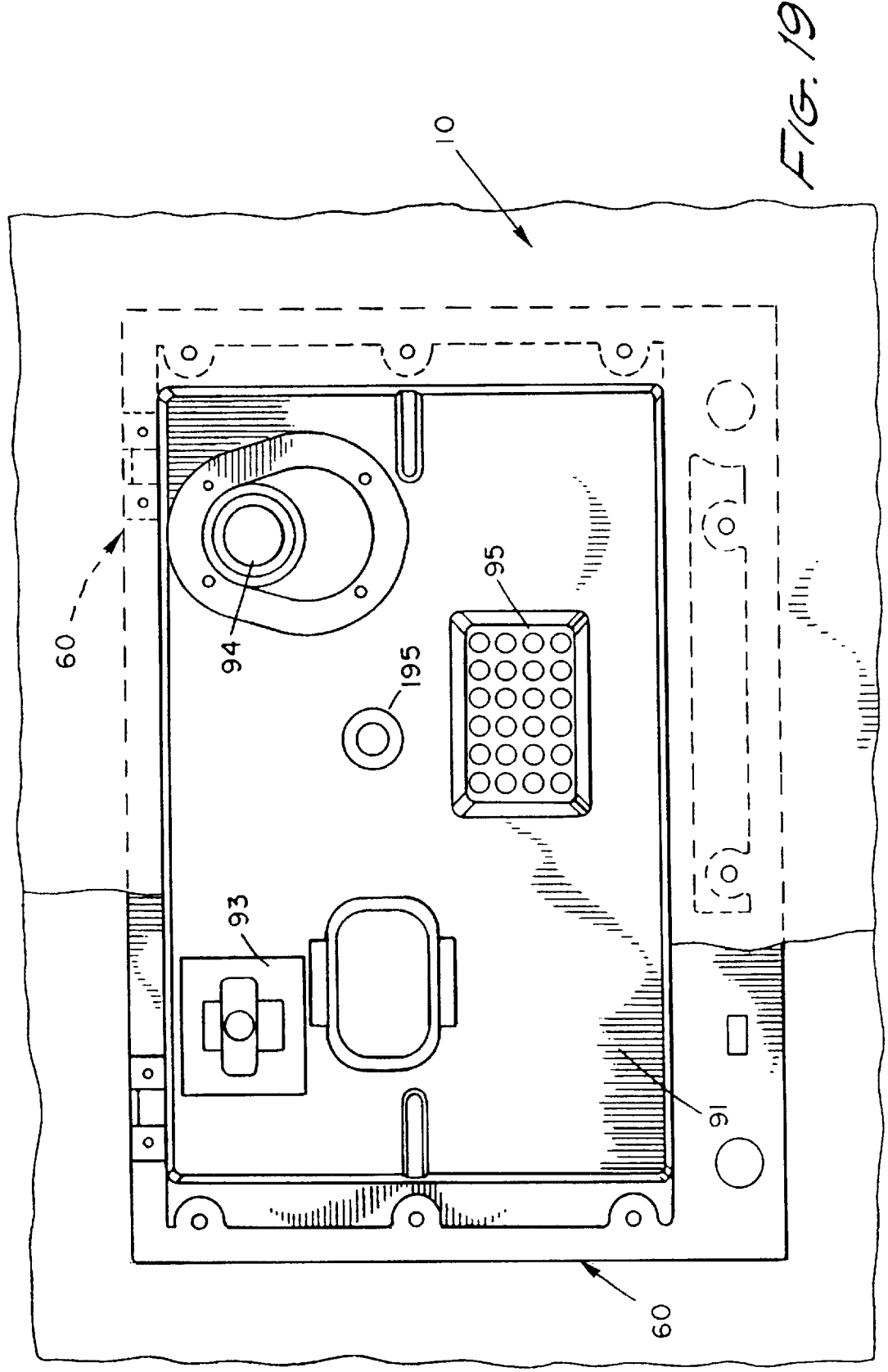

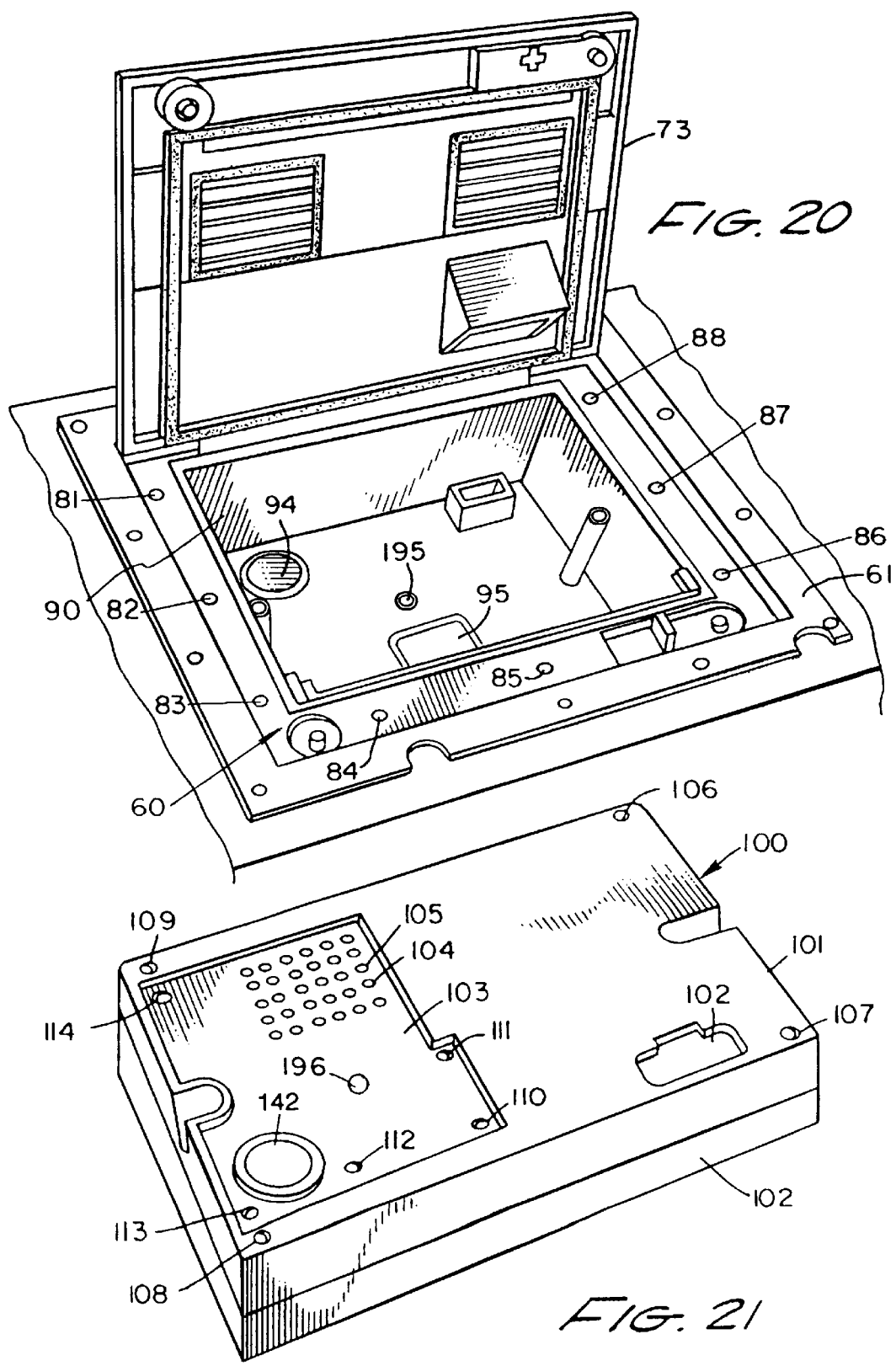

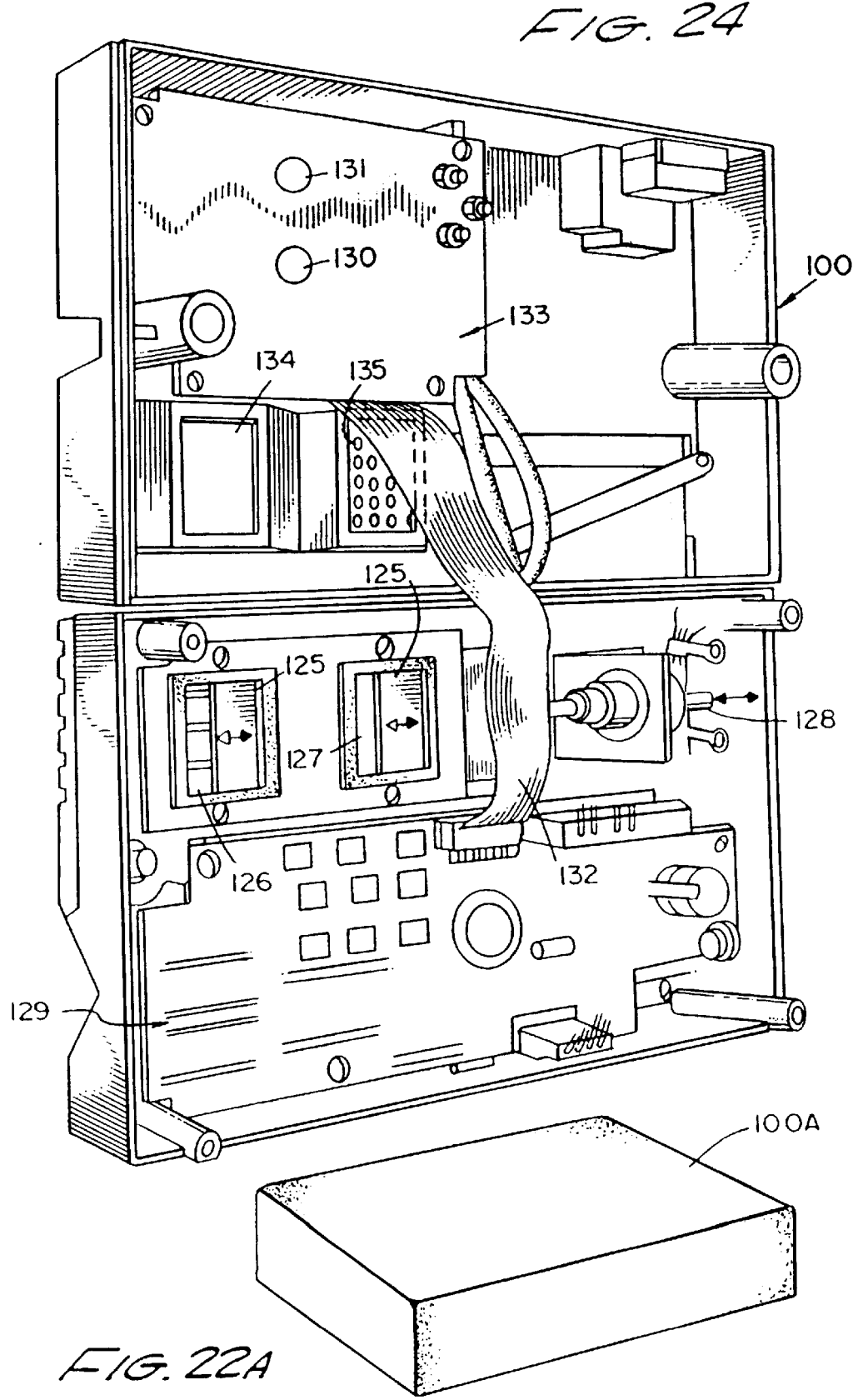

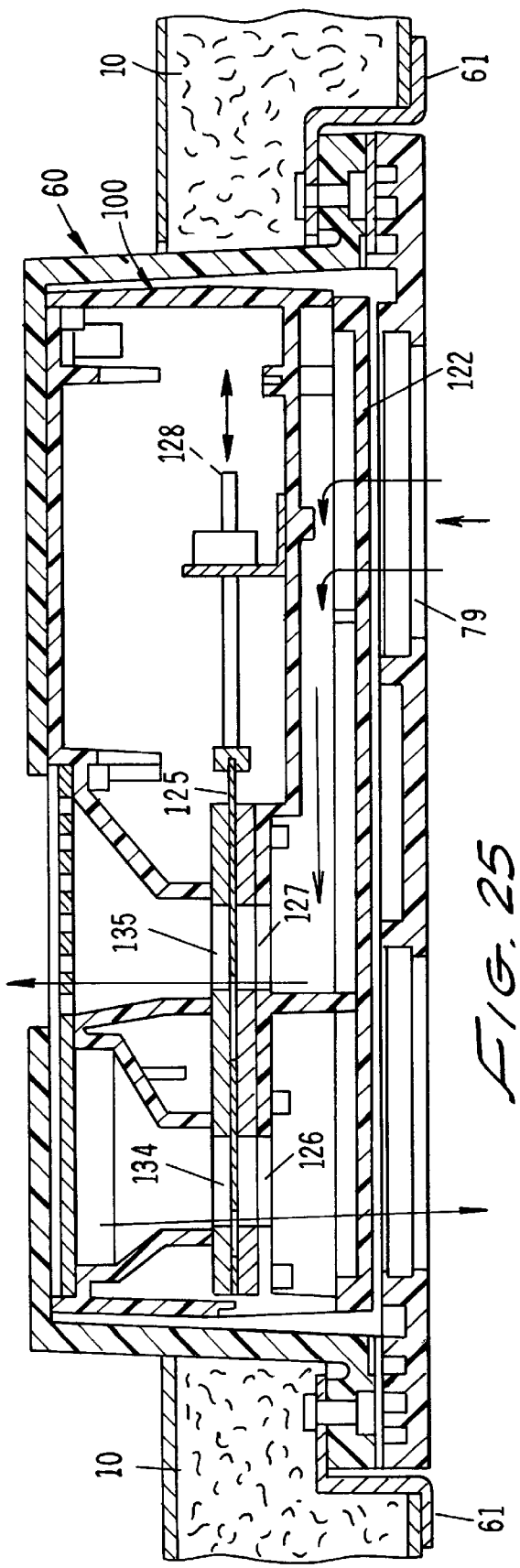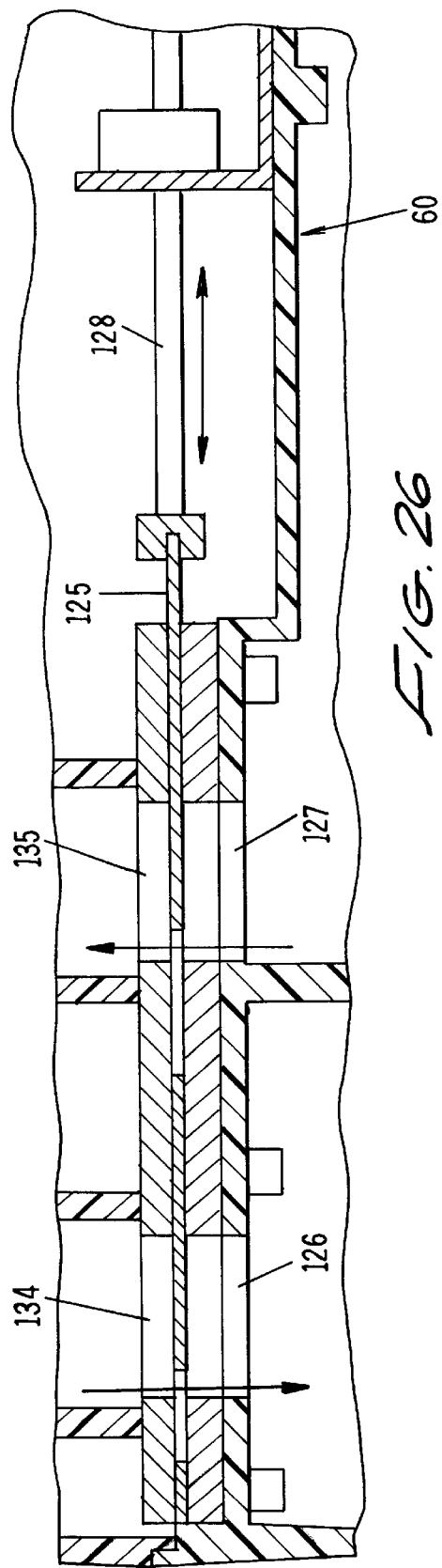

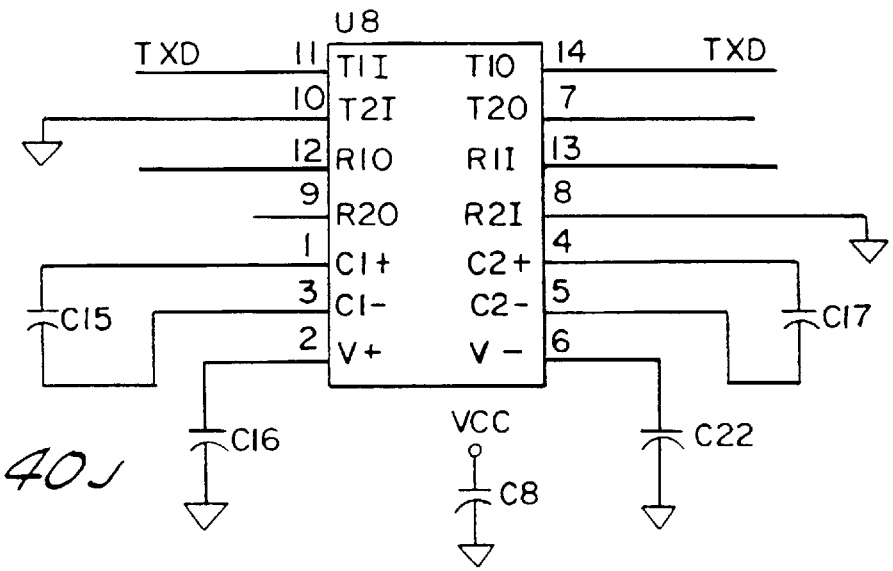
FIG. 40J
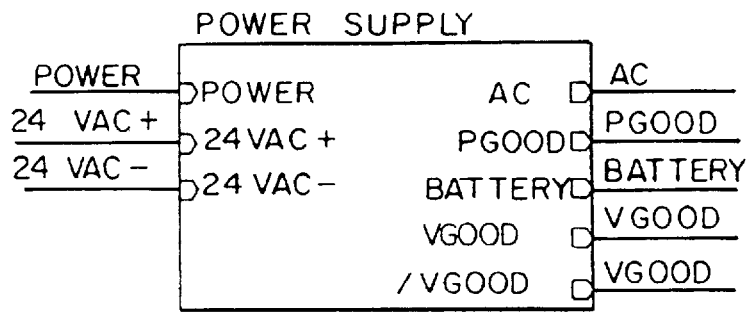
FIG. 40K
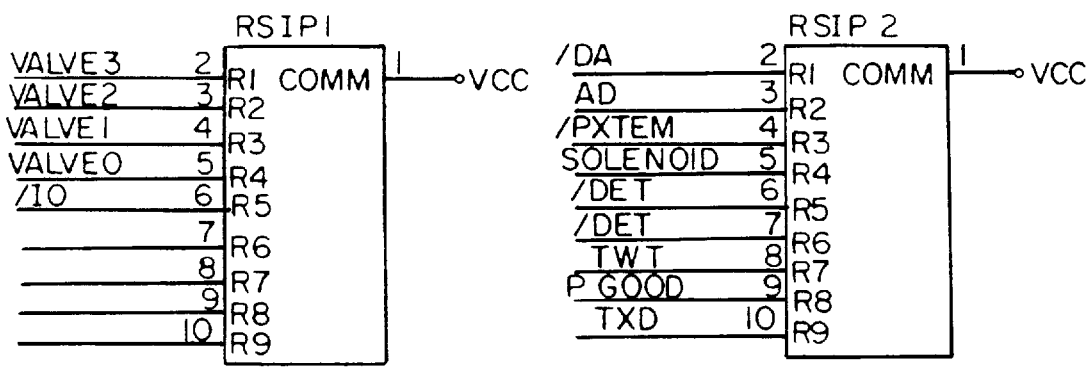
FIG. 40L
FIG. 40M
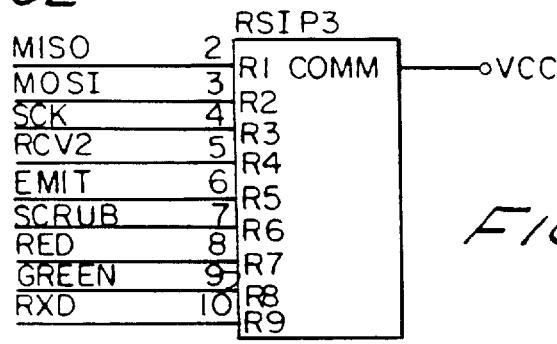
FIG. 40N

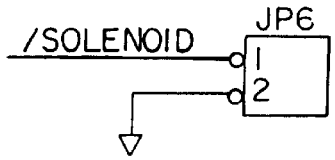
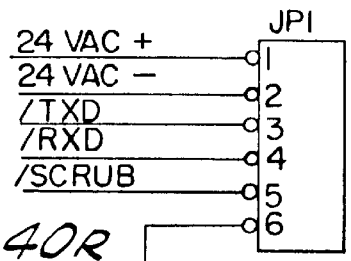
FIG. 40P
FIG. 40R
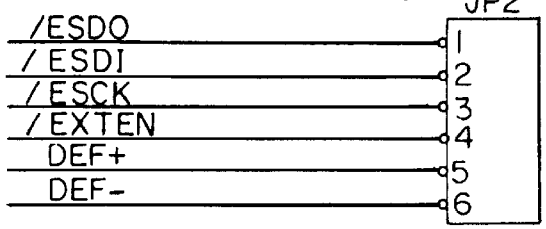
FIG. 40S
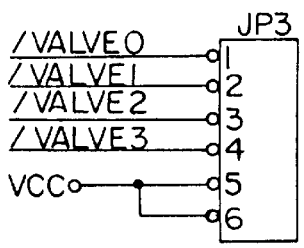
FIG. 40T
VALVE STEPPER MOTOR
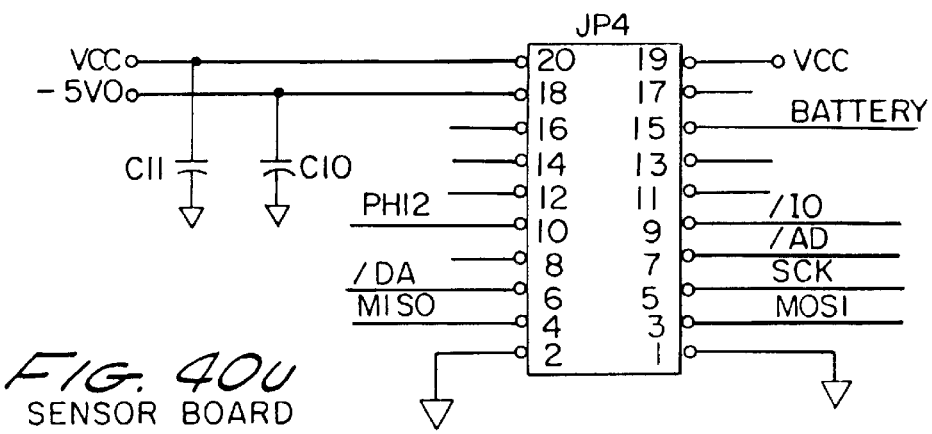
FIG. 40U
OXYGEN SENSOR BOARD
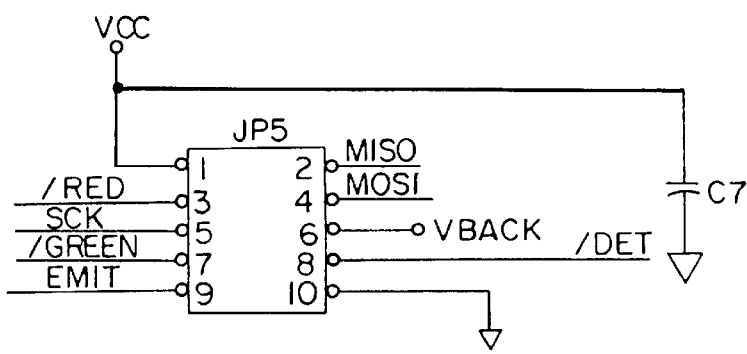
FIG. 40V
LED BOARD

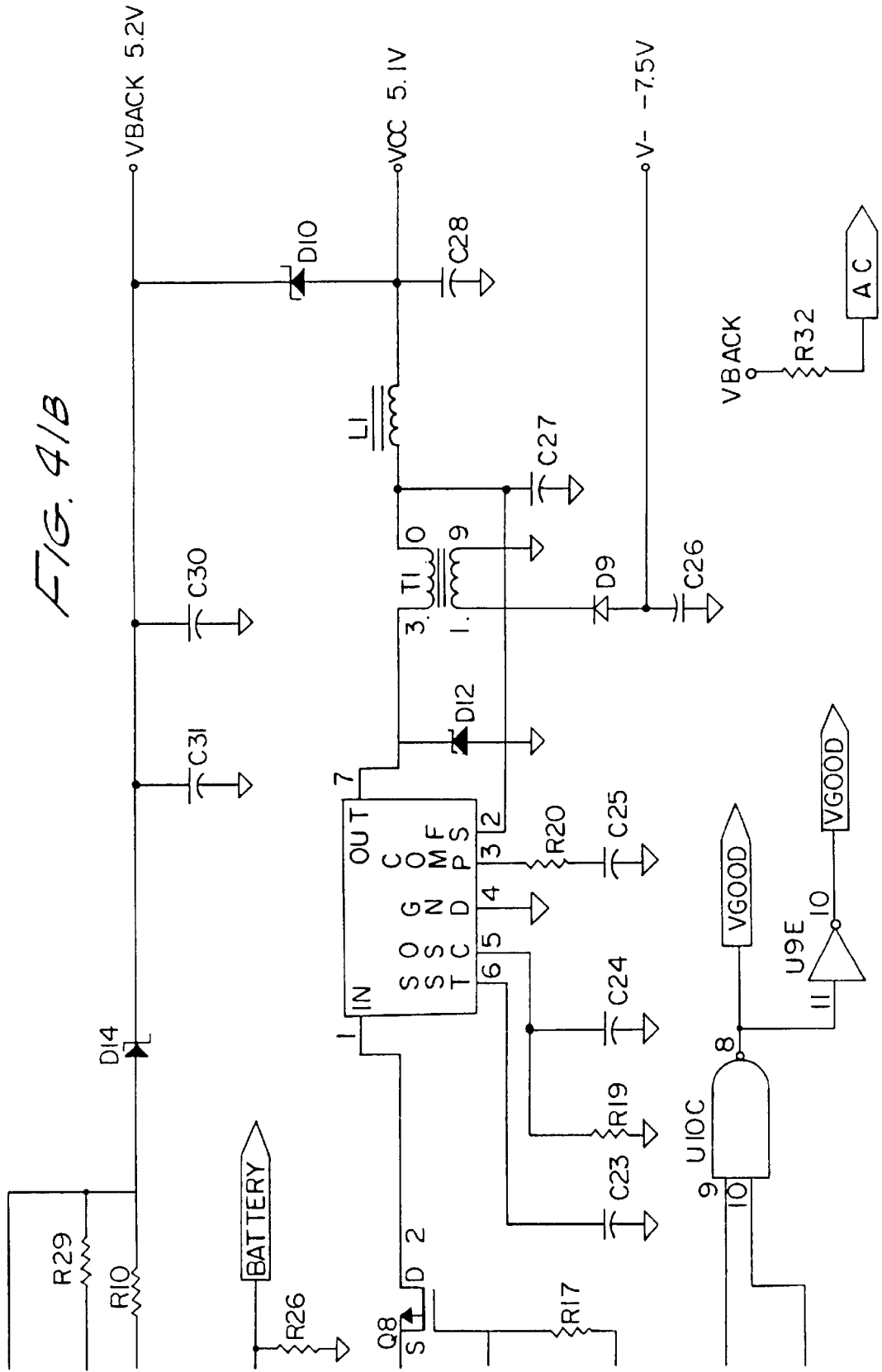
FIG. 4/B

GAS TEMP

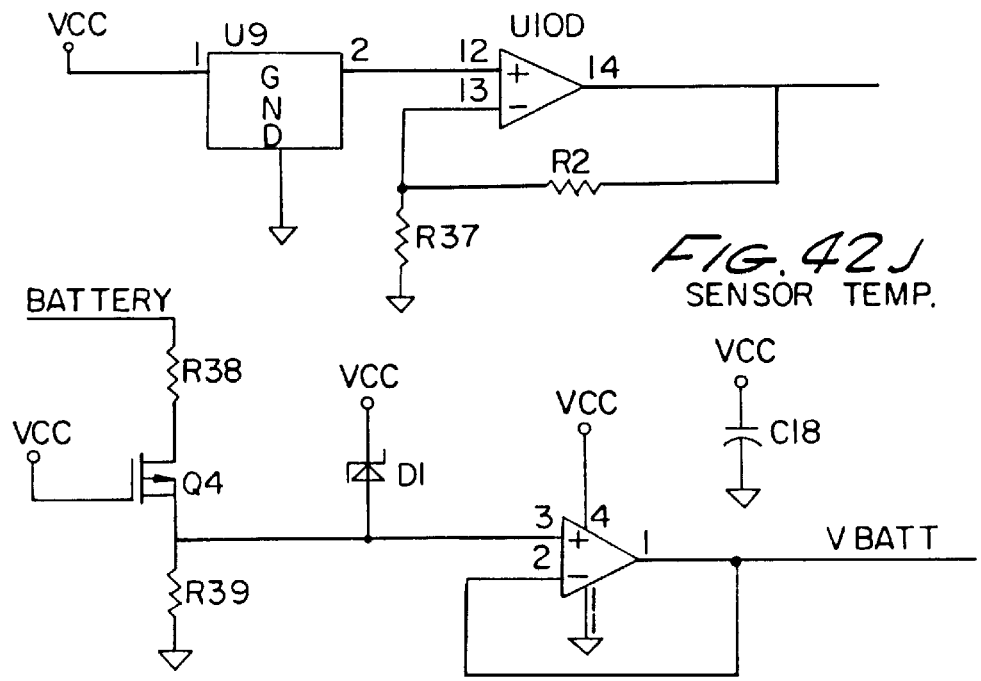
FIG. 42J SENSOR TEMP.
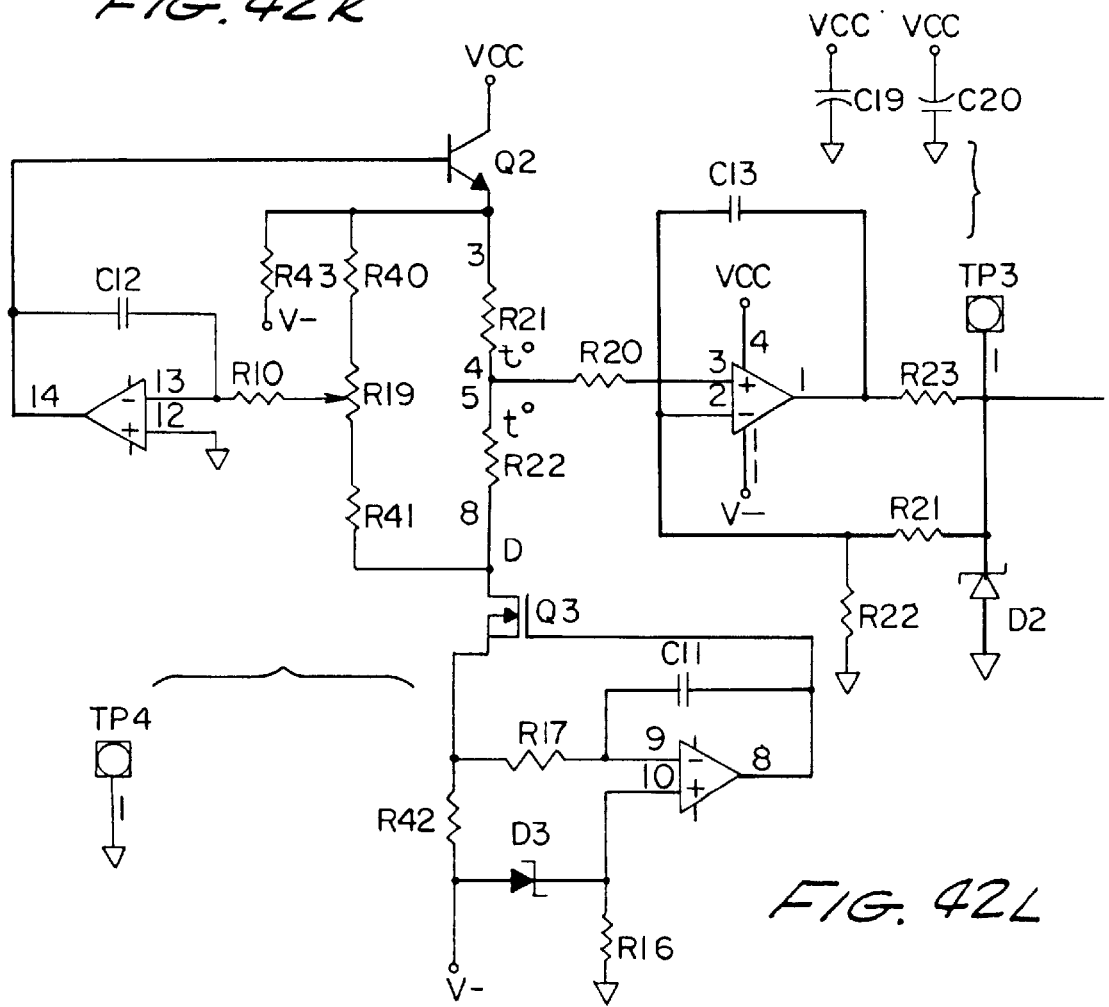
FIG. 42K
FIG. 42L

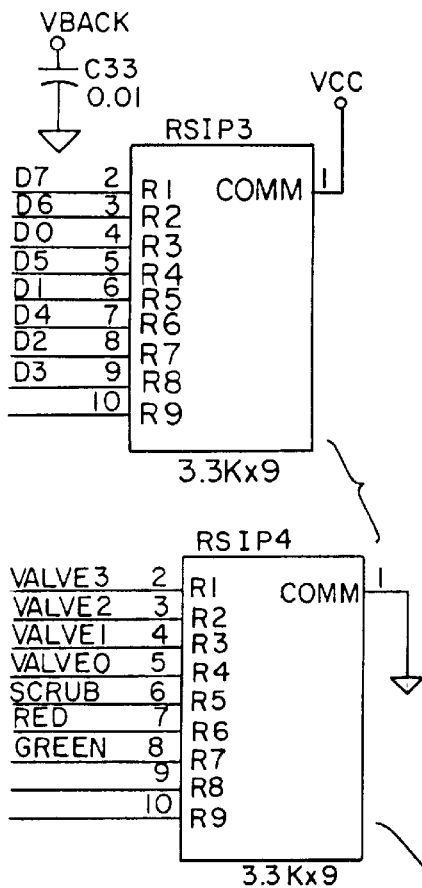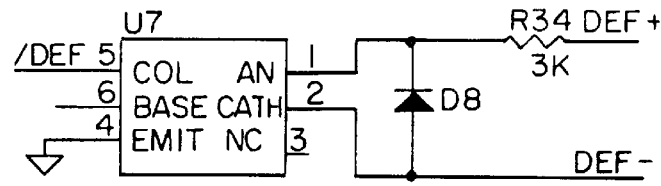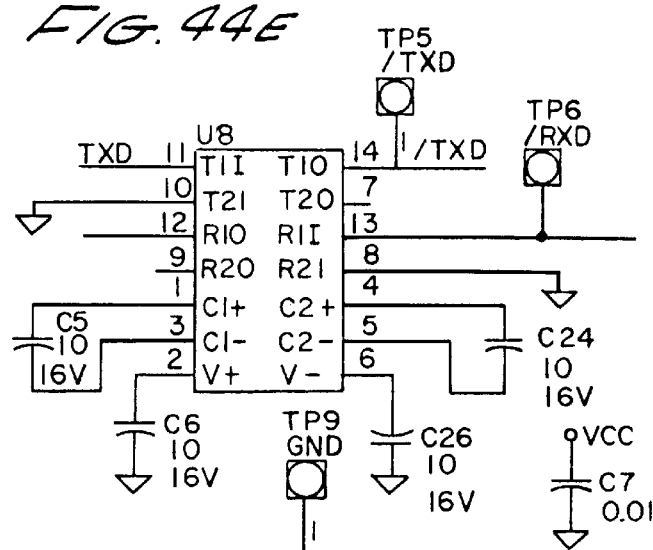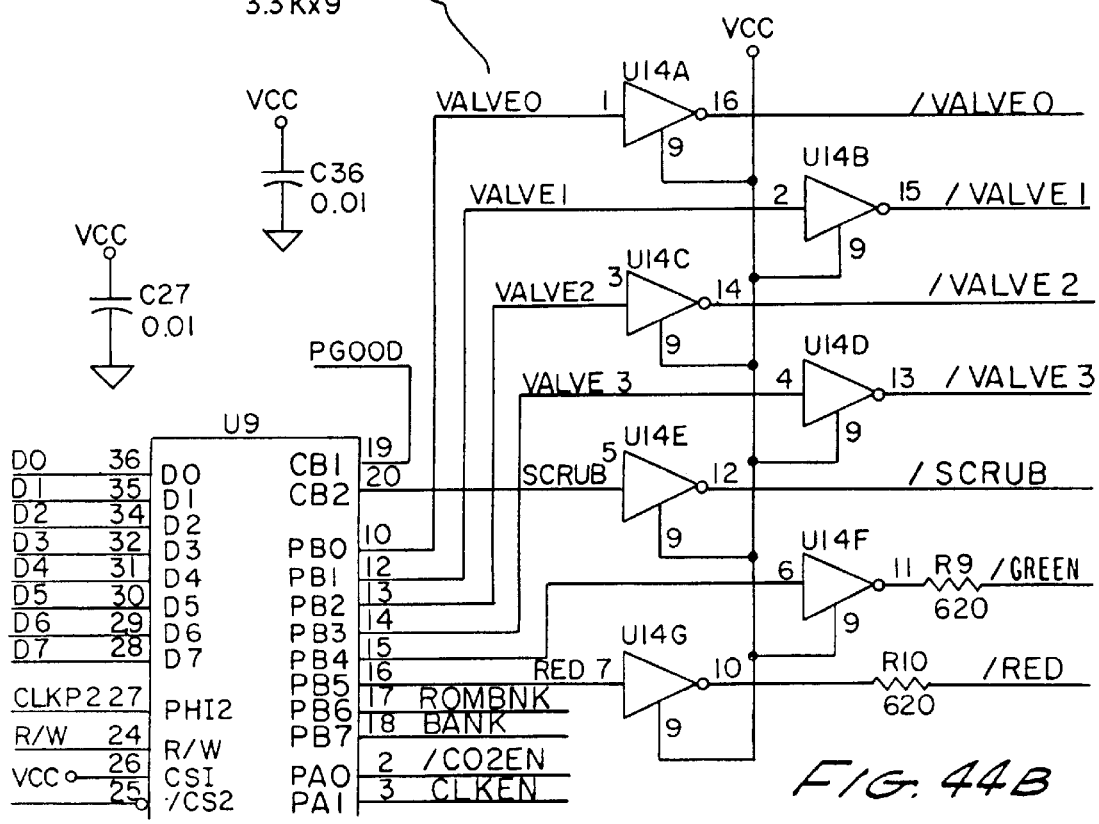

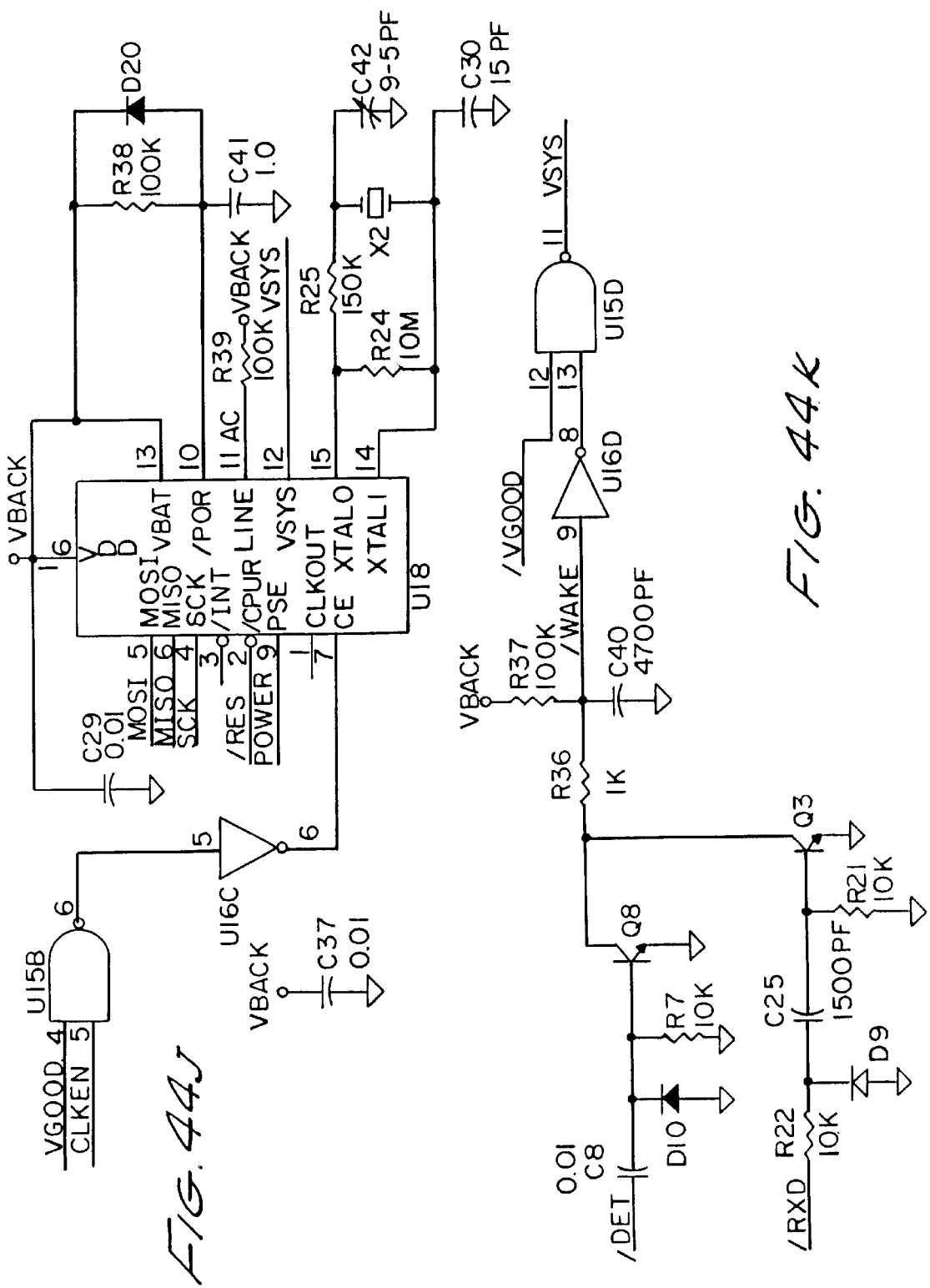

EXTERNAL WORLD

SENSOR BOARD

VALVE STEPPER MOTOR

LED BOARD

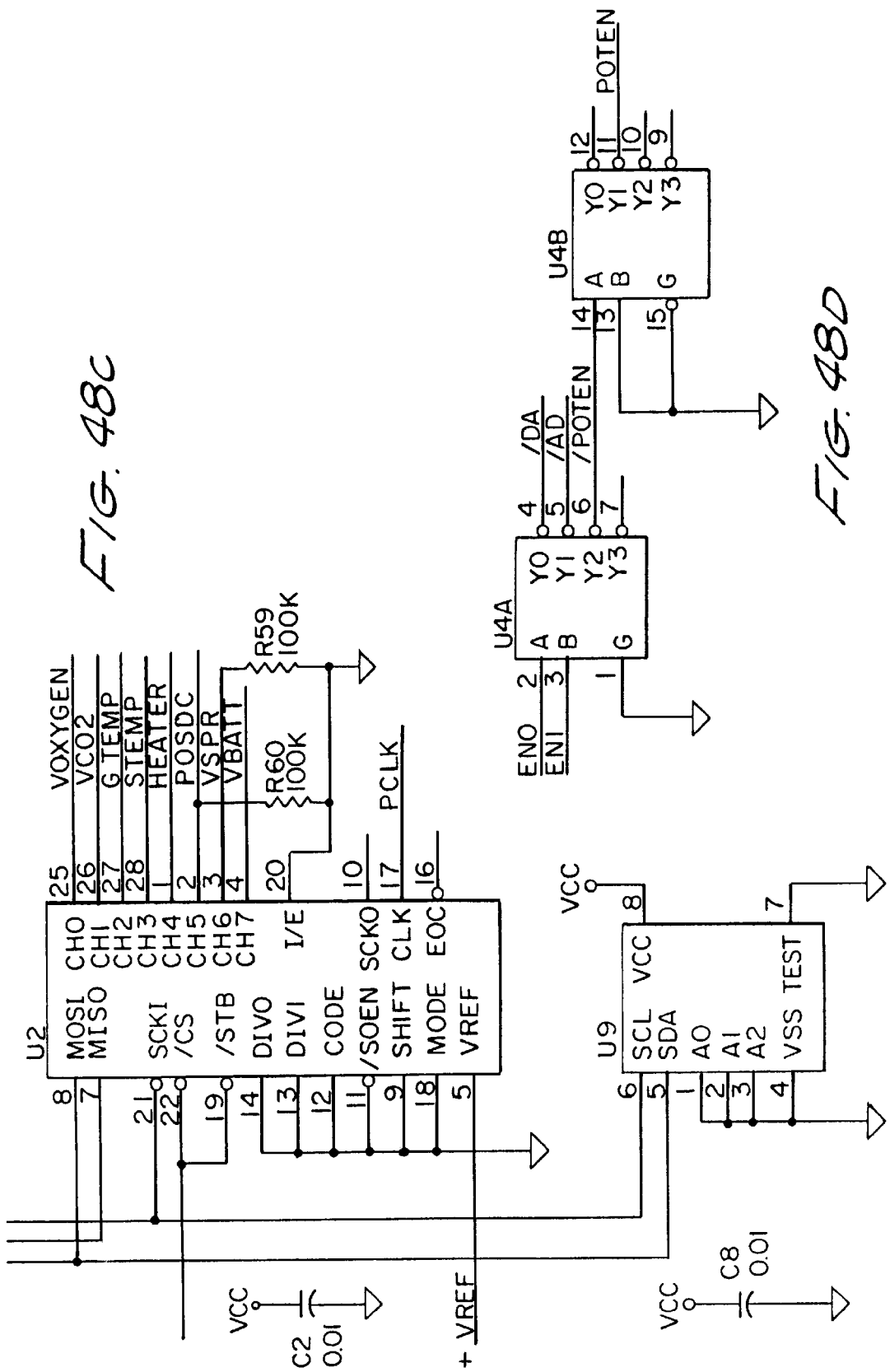

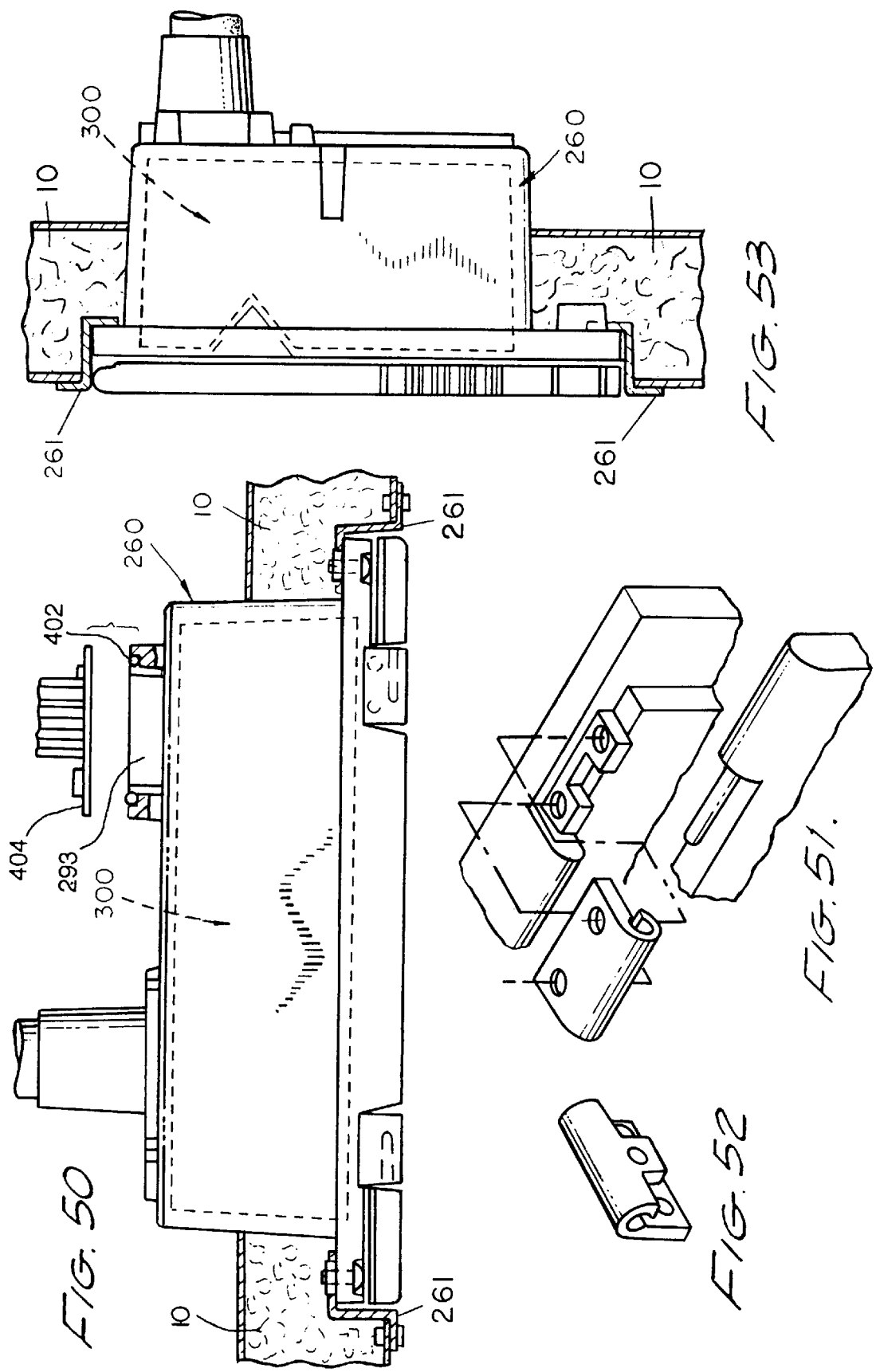

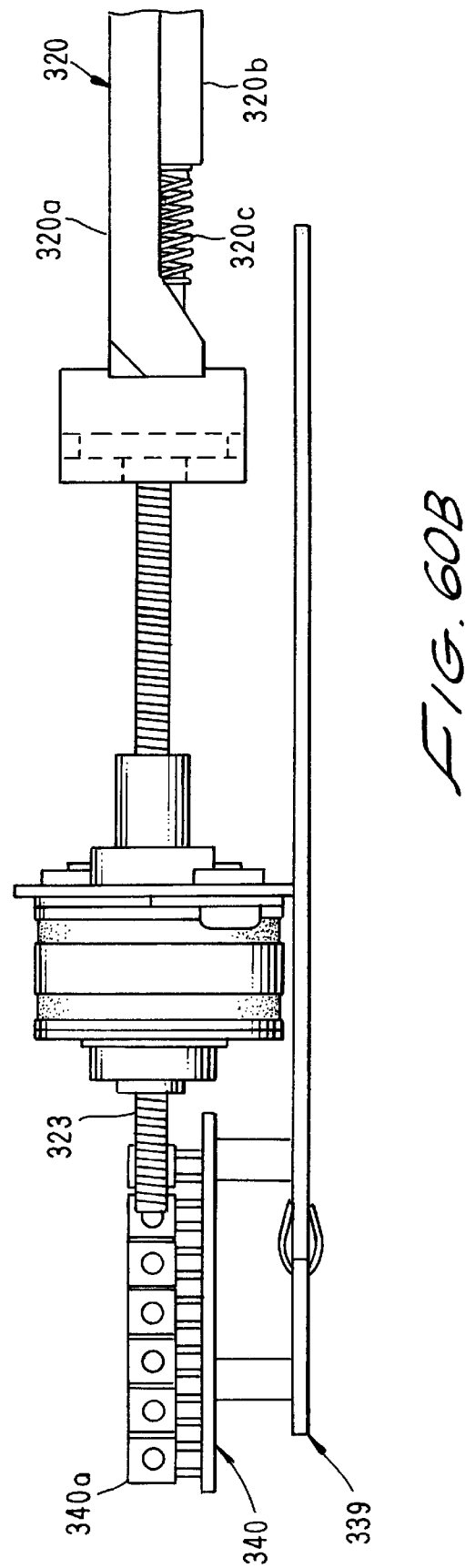

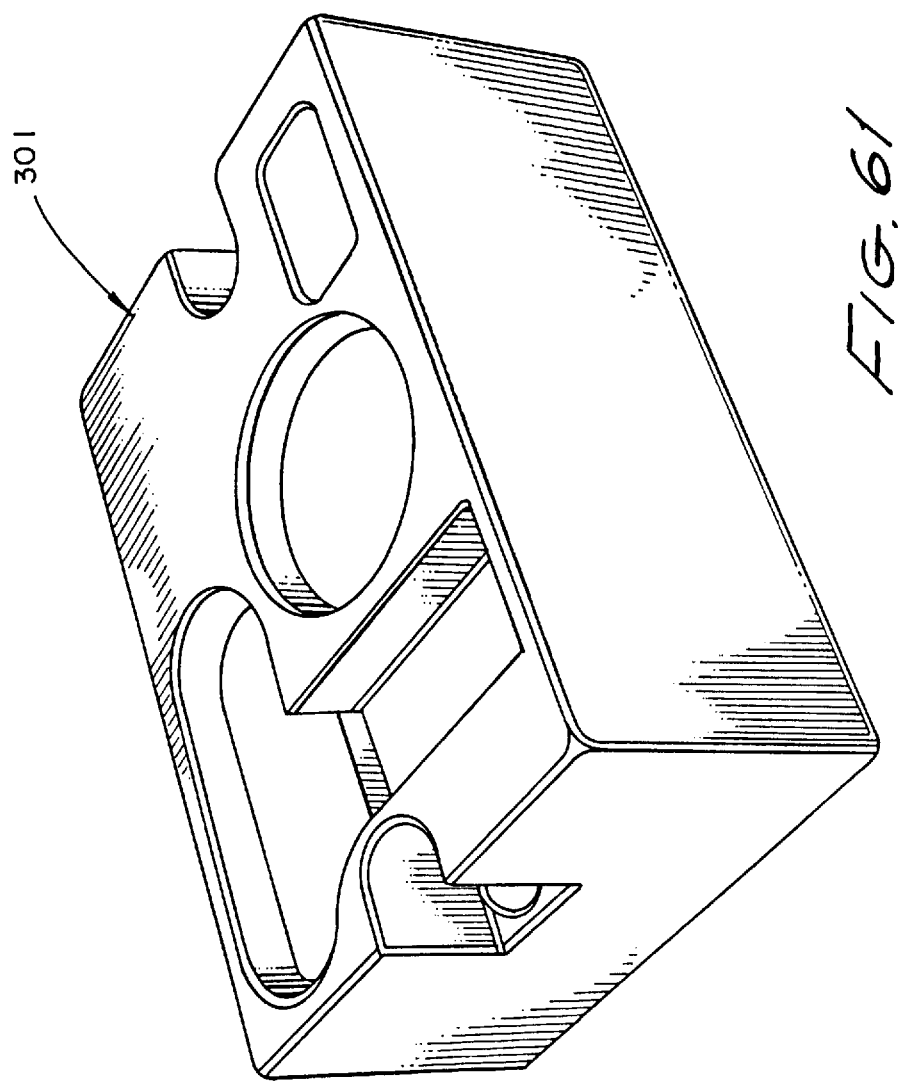

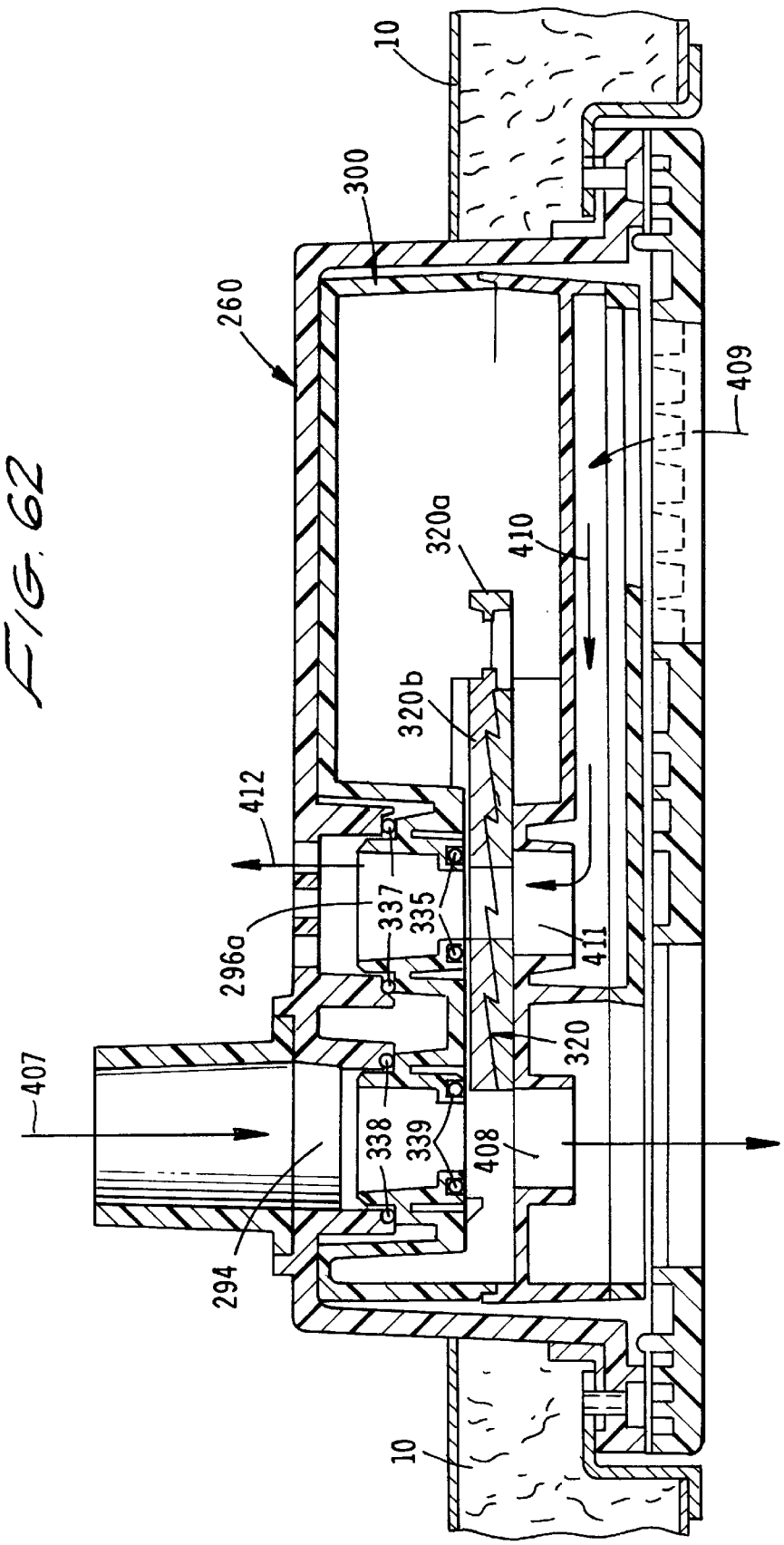

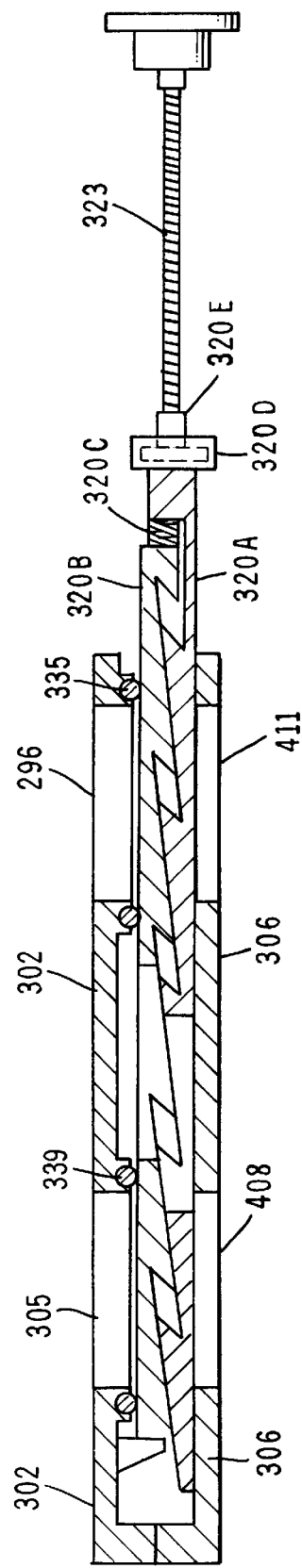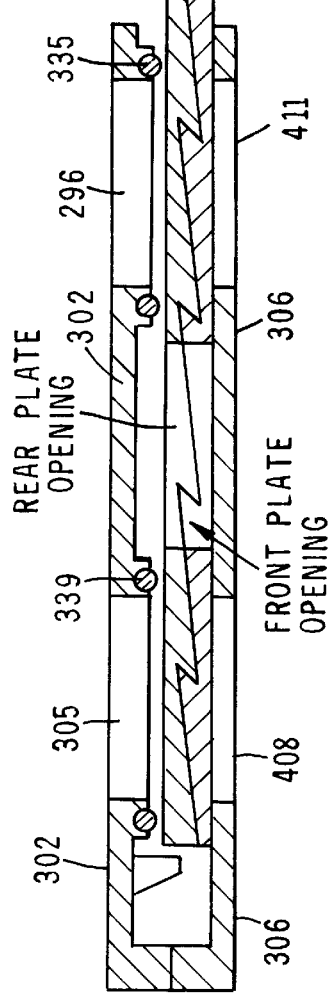
FIG. 62A
FIG. 62B

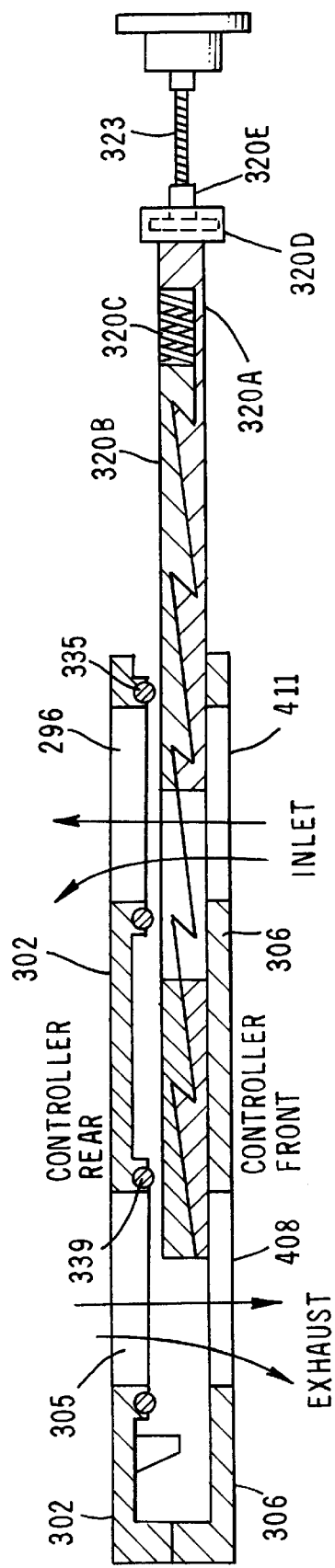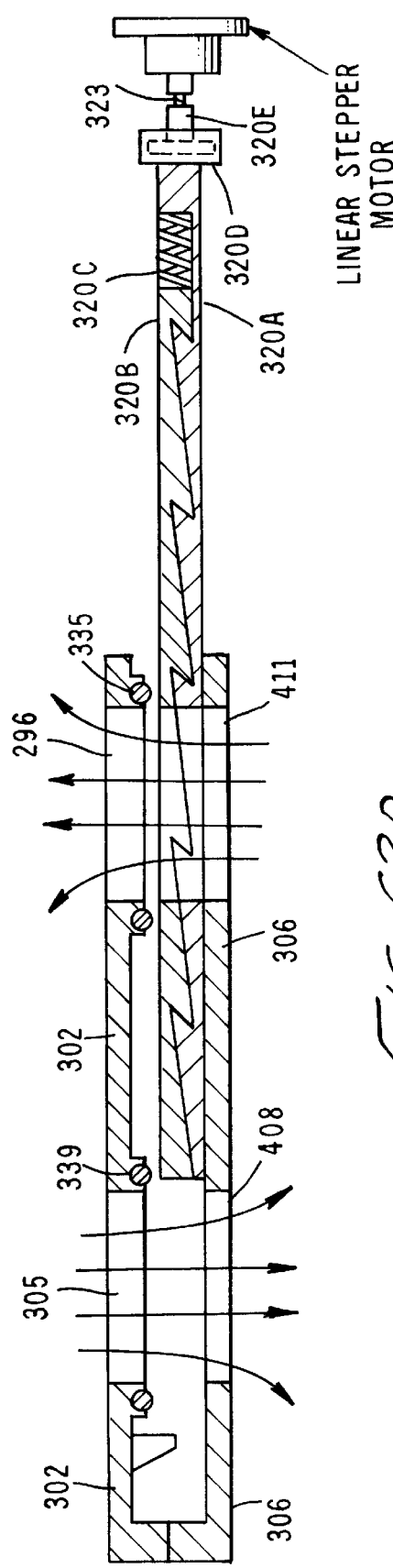
FIG.62C
FIG.62D

CA CONTROLLER SENSOR BOARD
CALIBRATION EQUIPMENT SET-UP

MONITOR-CONTROL SYSTEMS AND METHODS FOR MONITORING AND CONTROLLING ATMOSPHERES IN CONTAINERS FOR RESPIRING PERISHABLES

This application is a continuation-in-part of U.S. patent application Ser. No. 08/299,813 filed Sep. 1, 1994, abandoned, which is a continuation of U.S. patent application Ser. No. 08/196,904 filed Feb. 15, 1994, abandoned, which is a continuation of U.S. patent application Ser. No. 07/683,594 filed Apr. 9, 1991, abandoned, which is a continuation-in-part of U.S. patent application Ser. No. 07/508,089 filed Apr. 11, 1990, abandoned.

BACKGROUND OF THE INVENTION

1. Field of the Invention

This invention relates to systems and methods for controlling the oxygen concentration, and the carbon dioxide concentration, and for monitoring the temperature, in shipping and storage containers for fresh fruits and vegetables and other perishables.

2. Description of the Prior Art

Methods and apparatus using gas atmospheres to preserve the quality of refrigerated perishable fruits and vegetables are known, but have not been widely used. Some systems try to make transport containers sufficiently gastight to allow respiration of perishables to lower the oxygen level, in the containers or to maintain an injected gas atmosphere in the containers. In such systems, the respiration rate of the perishables is used to lower or maintain a desired oxygen level. Carbon dioxide concentration in such containers has been passively reduced using hydrated lime. Undesirable gases, such as ethylene, were removed by reaction with other substances to form new, harmless substances. Other systems used nitrogen in large quantities to flush excess oxygen and carbon dioxide from containers for perishable fruits and vegetables.

These systems failed to detect instantaneous concentrations of gases such as oxygen and carbon dioxide, and failed to take account of, and correct for fortuitous events such as unpredictably high or low respiration rates in perishables, transportation or storage equipment that was less gastight than desired, or poor circulation of the atmosphere surrounding the perishables.

Some systems and methods sought to maintain desired levels of oxygen and carbon dioxide in shipping containers, but these systems required elaborate, costly modifications to the container at the time of its manufacture. Such systems required specialized piping and methods for replenishing the gaseous atmosphere within the containers. Such systems obtained replenishing gases by vaporizing onboard, stored gases, or utilized sieves, membranes or other means to separate oxygen from air.

Some of these systems used removable controllers. However, because of the required piping, or because of the resulting need for enlarged electrical storage means in the containers, such systems were costly. These systems did not permit exposure of the gas concentration-sensing equipment directly to the atmospheres within the containers of the perishables. Rather, the systems required means for pumping gaseous atmospheres in the containers through piping to the controller. Such controllers also suffered from exposure to heat in the electrical control cabinet of the container. These systems were vulnerable to failures from any or all of their disadvantages.

All of the prior art systems, regardless of performance, required high capital costs, and imposed substantial penalties on the storage and transportation systems by increasing their weight, their size, and their energy consumption.

STATEMENT OF THE INVENTION

This invention relates to systems and methods for controlling the oxygen concentration, and the carbon dioxide concentration, and for monitoring the temperature in shipping and storage containers for fresh fruits and vegetables and other perishables. These monitor-control systems include means for monitoring and controlling oxygen concentration, means for monitoring and controlling carbon dioxide concentration, and means for monitoring temperature, dynamically and continuously. These systems include means for establishing and maintaining highly precise limits or ranges for each of these variables. These systems and methods operate over substantial time periods, continuously and precisely. Such time periods may be 60 to 100 or 150 days, or even longer.

These systems can readily be retrofitted to virtually any container that is equipped to receive and maintain a modified gaseous atmosphere. Preferred embodiments of this system are low in cost and occupy no cargo space whatever. Nor do such embodiments project substantially beyond the exterior wall surfaces of such containers. Such preferred embodiments weigh less than 10 pounds and consume no more electricity than is needed to illuminate a 25-watt incandescent light bulb. Preferred embodiments are connected to, but isolated from the electrical systems in refrigerated containers, minimizing their exposure to heat and to electromagnetic energy and such electrical systems.

Preferred embodiments of the systems and methods of this invention utilize the refrigerated air stream in shipping and storage containers to sense the oxygen and carbon dioxide concentrations in the container. In these embodiments, the refrigerated air stream contacts sensor means which permit the two gases, oxygen and carbon dioxide, to contact directly the sensors for oxygen and carbon dioxide, as by diffusion. In preferred embodiments, the temperature of the gases is also sensed in this way.

The sensors are connected to controlling means which are programmed to maintain desired concentrations of oxygen and carbon dioxide, and in some embodiments, other gases, depending upon such variables as the nature of the perishable material in the container. If the oxygen concentration is above or below a desired level, or the carbon dioxide concentration has become too high, the controller activates means for adjusting the concentrations of these gases to bring them to desired, programmed levels.

In preferred embodiments, the monitoring and controlling means include means for sensing the concentrations of each of the gases, oxygen and carbon dioxide, means for opening and closing valve means to admit fresh air, as a source of oxygen, into such containers, and to expel from such containers gases low in oxygen concentration and high in carbon dioxide concentration, and means for circulating the gas mixtures within these containers through means for removing carbon dioxide from these mixtures.

In preferred embodiments, these systems and methods include several parts. The first part is an enclosure means, preferably positioned to provide access to the refrigerated air stream inside the container, and to provide access from the exterior of the container. The most preferred location is the fan access panel. This panel includes a removable cover that provides access to the fan motor or motors that circulate refrigerated gases within the container. The enclosure means provides security for the controller, and includes means for introducing high pressure and low pressure air to the controller, means for attachment of electrical conductors, means for positioning the controller means in the container, and means for sealing the enclosure means with a device such as a customs seal.

The second part of the system is the monitoring and controlling means. In preferred embodiments, this device can be placed in, and removed from the security enclosure. In use, the controller is inserted in the security enclosure before a desired storage or shipment of perishables begins, and is removed at the end of the storage or shipment. The controller is, in preferred embodiments, an electromechanical device with memory means that can receive instructions and deliver data on commands, preferably by a signal that can be infrared, electronic or any other appropriate signal.

The system includes means for storing input data such as desired oxygen concentration and carbon dioxide concentration, means for storing gas concentrations and other data generated during storage or shipment, such as oxygen concentration and carbon dioxide concentration, means for comparing such data with desired concentrations of these gases and other desired setpoints, and means for outputting all such data from the system for display or storage.

In preferred embodiments, valve means in the monitoring and controlling means opens, when the oxygen concentration falls below the desired level, to permit interchange of atmospheric air with gases in the container so that the oxygen concentration in the container can be raised to a desired level. Where the carbon dioxide concentration rises above a desired level, means for removing excess carbon dioxide in the container atmosphere is activated to scrub or otherwise remove carbon dioxide from the atmosphere. The monitoring and controlling means can also include sensors for ethylene or other gases, and sensors for humidity, together with means for controlling the concentrations of these other gases, humidity or both.

A third part of the preferred embodiments of the monitoring and controlling systems of the invention are means for delivering electricity to the monitoring and controlling means from the refrigeration unit or other power sources in the container itself to the security enclosure and to a removable monitoring and controlling means within the enclosure. Such means also detects defrost cycles in the refrigeration system of the containers. Such detection is important because defrost cycles cause cessation of atmosphere flow inside the container. Other cabling provides power and desired electrical signals to the carbon dioxide scrubbing or other removal means. Additional cabling provides connection of the serial bus means, for extended sensing and control within the cargo area of the shipping container. For example, additional temperature sensors may be installed in the cargo area or in the perishables carried in the container.

Advantageously, the monitoring and controlling systems of this invention provide the capacity to change temperatures within the container during storage or shipment, to change concentrations of gases such as oxygen and carbon dioxide during storage or shipment to lengthen the useful life of the perishables, and to hasten or retard maturity of the perishables during storage or shipment. These systems also monitor and record temperatures for documenting and controlling certain kinds of pests. These systems also provide the capacity to transmit and receive data from a plurality of containers and to change, as and when desired, the desired concentrations of oxygen, carbon dioxide and other gases during shipment or storage.

These monitor-control systems (MCS), in preferred embodiments, are linked to remote communications systems (RCS) and shipment planning and reporting systems (SPRS).

In preferred embodiments, the monitor-control systems are installed in shipping or storage containers for perishables. These systems are adapted to monitor, separately, the concentration of oxygen and carbon dioxide within the container. These systems also monitor temperature. The data so monitored is periodically saved in memory, preferably non-volatile, battery-supported, random access memory (RAM) within the system. This monitored data is also capable of transfer to an RCS at the completion of, or during shipment and storage of perishables.

The MCS is adapted to use this stored data in controlling, separately, the concentrations of oxygen and carbon dioxide within the container. In preferred embodiments, the MCS controls inlet means to carbon dioxide scrubber means, and external air inlet means to the container, to vary the concentrations of oxygen and carbon dioxide, as desired and as necessary, to establish and maintain a desired shipping or storage environment for the preservation of perishables within the container.

In preferred embodiments, the monitor-control systems include a microprocessor, random access memory (RAM), read only memory (ROM), real-time clock means, input/output communications ports, light-emitting diodes (LED's), preferably of two or more different colors, means for reading and recording carbon dioxide concentrations and oxygen concentrations separately, means for sensing and recording gas temperature, means for sensing and recording the temperature of the carbon dioxide-sensing means, means for sensing and recording the voltage level of the battery-powered backup, means for sensing and recording the availability of AC power, means for monitoring and recording defrosting, means for turning on and off the controls for oxygen and carbon dioxide-sensing concentration sensors, means for turning on and off the main DC power supply, means for operating the oxygen intake valve controls, and means for controlling the carbon dioxide scrubber means.

The monitor-control systems also include means for diagnosing certain problems in the systems, means for communicating with the RCS and the SPRS, and means for establishing a carbon dioxide concentration setpoint and an oxygen concentration setpoint. Above or below these setpoints, or some range of values above and/or below these setpoints, the systems operate to reduce or increase the concentration of these gases, separately, as needed. The systems also provide means for changing, dynamically, the desired setpoints for the carbon dioxide concentration, and the oxygen concentration, depending upon changes and variations in the environments inside and outside the container, the time elapsed for storage or shipment in the container, and other factors.

The monitor-control systems include means for initializing or powering-up the system, and for diagnostically testing and reporting on components of the systems. In preferred embodiments, these means include random access memory, read-only memory, real-time clock, a power supply with battery backup, power status monitoring circuitry, valve position sensor and oxygen, carbon dioxide and temperature sensors. They may also include components for automatic self-calibration.

During initialization and operation, the status of the system is indicated by LED's visible to an observer. For example, continuous illumination of a colored LED, such as a green LED, may indicate that no errors are detected, and the system is operating normally, in accordance with input programming. Continuous LED flashing may indicate that no error is detected, but the system has not been programmed, i.e., that setpoints for carbon dioxide concentration and oxygen concentration have not been programmed into the container. Intermittent flashing of an LED of a different color such as red may indicate that an error is detected, and that there is low internal or external power, or, through continuous illumination, that power is on, but an error has been detected.

After all initialization diagnostics have been completed, setpoints and deadband values for both oxygen concentration and carbon dioxide concentration can be programmed into the system. In the absence of setpoint and deadband data from an RCS or SPRS, the MCS uses default setpoint and deadband data values. Thereafter, the system monitors and controls oxygen and carbon dioxide concentrations in accordance with these setpoint and deadband values. If errors are detected during the diagnostic testing, the system is adapted to control oxygen concentration and carbon dioxide concentration as well as practicable under the existing error conditions. Thus, the system continues to perform even when partially malfunctioning.

The monitoring function of the system takes place over a desired, programmed time. Under normal operating conditions, the oxygen concentration, carbon dioxide concentration and temperature are detected continuously, e.g., once every minute. The detected data is then averaged over a desired time interval, and used to control the oxygen concentration and carbon dioxide concentration controlling systems. Power, battery condition, defrost and time status are also monitored and taken into account in controlling the oxygen and carbon dioxide concentrations. If external power fails, frequency of sensor readings and control of oxygen and carbon dioxide is reduced to conserve battery power.

In preferred embodiments, detected data is periodically logged. The system can be programmed to vary the time periods between loggings.

Continuously, the systems undergo self-testing to determine if any sensor is malfunctioning. A sensor may be malfunctioning if its readings are wholly erroneous, or if they deviate substantially from expected or previous values. Further, the oxygen and carbon dioxide concentration sensors may be tested periodically by an infusion of air from outside the container. If the carbon dioxide concentration detected, the oxygen concentration detected, or both, is not within an expected range of values, the system recognizes that one or more sensors needs recalibrating or is malfunctioning.

In the event of power failure or other malfunctioning, the system maintains the oxygen inlet means and carbon dioxide scrubber means at specified, programmable levels throughout the remainder of the shipment or storage period.

The monitor-control systems also monitor external power and battery power. If external power fails, the monitor-control system reduces the activity of the oxygen and carbon dioxide sensors, or directs the oxygen inlet system and carbon dioxide scrubbing system to follow a specific pattern unrelated to detected oxygen concentration or carbon dioxide concentration. Alternatively, the carbon dioxide and oxygen concentration sensors and the temperature may have their duty cycles reduced to conserve battery power.

The system includes means for maintaining in memory (EEPROM) unique identifier data and calibration data for each sensor in the systems. Calibration tables in memory means in the systems can be used to provide information which facilitates the correction of gas concentration readings for differing temperature conditions and the effects of other gases such as oxygen.

The monitor-control system also controls the inflow of oxygen and the scrubbing of carbon dioxide from the gas mixture within the container. The oxygen inlet to the container and the carbon dioxide scrubbing system within the container are preferably updated frequently, e.g., once per minute, in accordance with the estimated, programmed, desired values for oxygen concentration and carbon dioxide concentration and in accordance with the setpoint and deadband values for each of these concentrations. Thus, the concentrations of these gases can be maintained within desired deadband limits around a programmed setpoint.

The external air inlet valve to the container housing the system is preferably under control of a drive motor. By controlling the drive motor with a microprocessor, the oxygen intake and carbon dioxide exhaust can be adjusted through a continuum of positions from fully opened to fully closed, thus allowing gas flows to be adjusted to an equilibrium point according to the rate of oxygen consumption and carbon dioxide generation within the container. The valve means is adjusted according to calculations based on current sensor readings, historical sensor readings, a valve-position-against-oxygen-concentration curve table in memory means, and the programmed setpoints for oxygen and carbon dioxide concentrations.

Preferably, carbon dioxide scrubbing is effected by turning on or off a fan that circulates the gases within the container through the scrubber. In preferred embodiments, the fan is connected to, and controlled by the monitor-control system. The fan is controlled in accordance with calculations based on current sensor readings, historical sensor readings, a valve-position-against-carbon dioxide-concentration curve table in memory means, and the programmed setpoints for oxygen and carbon dioxide concentrations.

The system is adapted to input setpoint and deadband values for carbon dioxide concentration and oxygen concentration as constants for an entire period, or to vary these values according to time or conditions. Thus, these values can be programmed to vary or change over time according to such factors as external power status, container temperature, the onset or end of a defrost cycle within the system, and the elapsed time from the beginning of storage or shipment. Whether the setpoint and deadband values remain constant or vary, and regardless of what conditions dictate changing these values, they can be programmed for a specific container for a specific period of time, or a specific shipping task, as desired.

The monitor-control unit also records and maintains logs, at programmed intervals, of the oxygen concentration, carbon dioxide concentration, temperature, power failure, timing and length of defrost cycles, and changing of setpoints and other events that occur while perishables are shipped or stored. Each of these values is separately logged. Additional means are provided for logging shipment information, such as the nature of the perishables, the estimated time of shipment, the date shipment begins, the source of a shipment, its destination, its route, the shipper, billing information, and the like. The logging means periodically provides average, minimum and maximum oxygen and carbon dioxide concentrations and temperature detected over time.

In preferred embodiments, the monitor-control system includes a microcomputer system comprising a microprocessor with associated random access memory, read only memory, control logic, power supply means, gas concentration sensing means, and communication ports for data exchange and expansion of the system's monitoring and control capabilities. In preferred embodiments, the microcomputer system and power supply reside on a single board means. The sensors and associated electronics reside on second board means. The LED's used as status indicators reside on a third board means. See FIG. 37.

The microcomputer system includes, in preferred embodiments, a single-chip microprocessor, RAM for program and data storage, EPROM for firmware storage, a real-time clock, peripheral drivers for control of various devices in the system, and serial line drivers and receivers for communications, power supply means such as means for power conversion, battery backup means with monitoring and recharging capabilities, and power switching means for components that do not require power at all times, gas concentration sensing means, and analog-to-digital and digital-to-analog converters to convert data to or from binary form for the microprocessor.

The real-time clock performs all time-keeping functions of the system. This chip monitors time of day and date information, includes an alarm function, and clocks the microprocessor. It also provides system watchdog and control functions.

The clock utilizes a crystal to provide an accurate time base. The clock communicates with the microprocessor via serial bus using prescribed signals. The clock furnishes the microprocessor with data such as seconds, minutes, hours, date, week, month and year, and with the phase zero clock.

The clock supplies a signal to the microprocessor based on a number of events relating to timing or communications monitoring. One event is an alarm. When set, if the alarm time registers match the time data registers, a signal is asserted. Another event is an interval timer. The interval timer can generate pulses over a wide range of frequencies. Yet another event is a signal from the communications monitoring input.

The clock has a monitoring input and a power control output. The power control output is the power supply ON/OFF switch POWER. The microprocessor can monitor the presence of AC power, and direct the clock to interrupt power to the systems by turning off power to the microprocessor, ROM, and sensor board. Thereafter, an external interrupt signal or an alarm signal internal to the clock causes the clock to supply power to the system again.

An interrupt can be generated from two sources. The first is the alarm function. If an alarm function occurs during power interruption, the clock again directs power into the systems. The second source is a transition at the serial communications port. If a transition is detected at this port, the clock again turns on the microprocessor, ROM and sensor board power. After power has resumed, the microprocessor resets and runs again.

There are two systems of AC power supplied by the refrigeration units. The first system has a distribution transformer output winding connected to the refrigeration unit ground. The other system provides an output which is isolated from the refrigeration unit ground. The power supply, in preferred embodiments, is adapted to include both power systems, by means of a jumper. See FIGS. 39 and 41A and 41B.

In preferred embodiments, the power supply rectifier operates in half-wave mode, when the input AC is referenced to the refrigeration unit ground, and includes a 24 VAC minus jumper (FIGS. 41A–41B R39) to ground. In the case of the isolated input AC, the power supply rectifier is adapted to operate with the bridge terminal jumpered to ground via R38 and employs full-wave rectification.

In preferred embodiments, the power supply is also protected by means of semiconductor devices from peak AC line input transient surges of up to plus or minus 350 volts. Such protection is divided into three stages. The first stage has a 0.5 Ohm resistor in series with the AC line and a metal oxide varistor shunting the line. Following the rectifier, a Zener transorb surge protector is the second stage. The third stage includes a series of 0.5 Ohm resistors, a shunt transorb, and a parallel 5600 microFarad capacitor.

The VCC and −V switching regulator output voltages are under microprocessor control by means of a P-channel FET transistor and a bipolar NPN transistor. The VCC output is adapted to supply current to a maximum of 2.5 amperes.

A positive logic level on the POWER input to the base of Q6 causes Q6 to conduct, turning on Q8. A Zener diode prevents the gate-to-source voltage specification of Q8 from being exceeded. Resistor R17 provides current limiting. Resistor R16 serves as a pull-up for the collector of Q6.

Both +5.1 and −8 volts are derived from an L4960 switching regulator ICU1. The L4960 regulator acts as a switch that periodically connects output 7 to input pin 1 for a time that is a function of the unregulated input voltage and the required load current. The voltage waveform at the output pin is a rectangular pulse with a height proportional to the unregulated DC input voltage and a width maintained by feedback control, necessary to produce an average voltage of 5.1 volts at the output of the L-C filter, T1.

The −8 volts (−V) is derived from a closely-coupled winding on the main filter choke. A peak rectifier, D9, conducts on the negative voltage excursions, thus charging the output storage capacitor, C26.

A V-BACK system is included to supply backup power to certain critical digital functions when most of the systems are without power. The V-BACK regulator circuit is a two-transistor series pass configuration. Transistor Q5 acts as an error amplifier comparing the Zener diode voltage with the emitter voltage of transistor Q4. The amplified difference voltage drives the base of Q4 to close the feedback loop. Resistor 37 in the collector of Q4 is used to provide current limiting. As the current into the load rises, the voltage across resistor 37 increases and eventually cuts off Q4. D14 is used to prevent positive voltage excursions on VCC from feeding into the V-BACK regulator. D10 prevents the V-BACK regulator from going lower in voltage than VCC while VCC is on. This prevents potential "latchup" in the CMOS integrated circuits that are fed by both V-BACK and VCC. High beta transistors and a low current Zener reference diode are provided to reduce battery drain.

The battery charger circuit is a constant current generator with a voltage compliance of 14.5 volts. The nominal charging current is about 60 milliamps at 25° C. and 24 volts AC line input. The charging current decreases at high line or high temperature.

The charging current is established by the voltage drop across resistor R24, plus the voltage drop across resister R23. When these two voltage drops equal VBE of Q7, the loop is satisfied, and the charging current flows through Q3, resistor 24 and D15 and into the battery. Voltage compliance is provided by D13 which limits the voltage range at the base of Q3. Line voltage changes modulate the charging current by changing the voltage drop across R23. At low temperatures, the charging current increases with an increase in VBE of Q7.

The input line frequency is sensed by the PGOOD circuit. The voltage divider R30 and R31 produces an AC signal regardless of the setting of the input rectifier ground return jumper. The AC signal is coupled to the input of LM2903, U15A comparator through capacitor C32. The LM2903 comparator compares the AC voltage on pin 3 with a reference voltage on pin 2 set by R34 and R35. The reference is set to equal an AC voltage input of 15 volts peak. An AC input below this voltage will no longer appear at the output of the comparator. The output drives an input to the microprocessor, and can be polled by the system's software.

FIGS. 43A through 43C show an alternative preferred embodiment of the power supply depicted in FIGS. 41A and 43B. In most respects, this power supply is similar to the power supply shown in FIGS. 41A and 41B. However, here, the jumpers for AC input type are moved to the security enclosure circuit board (FIG. 55, 404) and are shown in FIG. 49 as JMP2 for the isolated AC, full-wave configuration, and JMP3 for the ground referenced AC, half-wave configuration. Also the three-stage power supply protection includes a third stage that includes a parallel 4,700 micro Farad capacitor.

In FIGS. 43A, through 43C a positive logic level on the power INPUT to the base of Q1 causes Q1 to conduct, turning on Q5. A Zener diode prevents the gate-to-source voltage of Q5 from being exceeded. Resistor R16 provides current limiting. Resistor R15 serves as a pull-up for the collector of Q1.

Both +5.1 and −10 volts are derived from an L4960 switching regulator ICU1. The L4960 regulator acts as a switch that periodically connects output 7 to input pin 1 for a time that is a function of the unregulated input voltage and the required load current.

The −10 volts (−V) is derived from a closely-coupled winding on the main filter choke. A peak rectifier, D17, conducts on the negative voltage excursions, thus charging the output storage capacitor C32.

In FIGS. 43A through 43C, as in FIGS. 41A and 41B, the V-BACK system supplies backup power to certain critical digital functions when most of the systems are without power. Here, transistor Q6 acts as an error amplifier, comparing the Zener diode voltage with the emitter voltage of transistor Q7. The amplified difference voltage drives the base of Q7 to close the feedback loop. Resistor R29 in the circuit of Q7 is used to provide current limiting. As the current into the load rises, the voltage across resistor R29 increases, and eventually cuts off Q7. D5 is used to prevent positive voltage excursions on VCC from feeding into the V-BACK regulator. D6 prevents the V-BACK regulator from going lower in voltage than VCC while VCC is on. As in FIGS. 41A and 41B, this prevents potential "latch up" in the CMOS integrated circuits that are fed by both V-BACK and VCC.

As in FIGS. 41A and 41B, the battery charger circuit is a constant current generator with a voltage compliance of 14.5 volts. The charging current is established by the voltage drop across resistor R20 plus the voltage drop across resistor R19. When these two voltage drops equal VBE of Q2, the loop is satisfied, and the charging current flows through Q4, resistor R20, D7, and into the battery. Voltage compliance is provided by D16, which limits the voltage range of the base of Q4. Line voltage changes modulate the charging current by changing the voltage drop across resistor 19. At low temperatures, the charging current increases with an increase in VBE of Q2.

Input line frequency is sensed by the PGOOD circuit. Resistor R14 provides an AC signal regardless of the setting of the input rectifier ground return jumper. The AC signal is coupled to the input of LM2903, U2A comparator through capacitor C20. The LM2903 comparator compares the AC voltage on pin 3 with a reference voltage in pin 2 set by resistors R3 and R4. The reference is set to equal an AC voltage input of 15 volts peak. An AC input below this voltage will no longer appear at the output of the comparator. The output drives an input to the microprocessor, and can be polled by the system's software.

Preferably (see FIGS. 40A through 40B), the MCS includes a 6501Q single-chip microprocessor. This microprocessor is clocked at a rate of 1.04 MHz. The clock is generated by the real time clock, and uses two buses to communicate with the various bus devices built into the system. The first, a parallel bus, is 8 bits wide, and can address 64K bytes in normal 6502 fashion. The RAM and ROM in the system are located on this bus, and occupy nearly the full 64K of address space. The second, a serial bus, connects the real-time clock and the various input/output devices on the sensor board with the microprocessor. All other input/output devices interface with the microprocessor using dedicated input/output lines of the four ports of the microprocessor.

The first 256 bytes of the address space are internal to the microprocessor. The microprocessor has 192 bytes of internal RAM storage and 32 registers for dealing with the 32 dedicated input/output lines. The address maps specify where the input/output registers are located. The remainder of the first 256 bytes is reserved by the microprocessor. Power to the microprocessor is taken from the VCC supply. The internal RAM is therefore not maintained when power fails. All interrupt sources are internal to the microprocessor. The real-time clock generates transitions at port A bit 3 whenever a real-time clock interrupt occurs. Port A can be set up to generate processor interrupts on these transitions. The system stack is located in the RAM internal to the microprocessor.

The processor's input/output lines are bi-directional data lines. There are pull-up resistors on each pin, and a separate data path for the processor to read the level of each output. For use as an output, the processor writes the desired level to the bit, and the output reflects that level. For use as an input, the processor first writes a "one" to the bit. Thereafter, any external driver can force the pin low, and the processor will read this state via the separate read path. A processor RESET forces all input/output port bits to a "one."

The MCS includes 32K bytes of static RAM. Preferably, the RAM is a 58256, or equivalent, with access times as slow as 350 nanoseconds (ns). Power to the RAM is taken from the V BACK supply. The RAM sits on the microprocessor's parallel bus.

The ROM of the MCS of FIGS. 40A through 40D resides in the 32K bytes in certain specified addresses, and is implemented with a 27C256 EPROM having an access time of about 350 ns. The /RESET and /IRQ vectors are located in the ROM at specified addresses. The ROM is powered from the VCC supply, and sits on the microprocessor's parallel bus.

The MCS is adapted to control a valve to allow outside air to circulate within a container. In this way, oxygen can be added to the container by admitting outside air and releasing container atmosphere. The valve is a simple slide-shutter driven by a stepper motor. The stepper motor is preferably a four-phase motor operating from the VCC supply. Four input/output lines from the microprocessor are dedicated to driving the windings of the stepper. Preferably, a ULN2003A Darlington driver provides the current sinking ability to handle the 15-Ohm motor windings. The stepper motor is driven in one direction by phasing the four lines in a '0123' sequence and, in the opposite direction, by a '0321' sequence. The slide shutter is held at any desired position by the lead screw of the motor, and by the reduction rates of the gears.

Periodically, during usage, the sensors can be recalibrated. Outside air is used during calibration to assure that no errors have insinuated into the gas measurements. The concentrations of carbon dioxide and oxygen in the atmosphere are assumed to be 0% and 21%, respectively, for calibration purposes. To calibrate, the slide valve is fully closed, and the calibration solenoid is switched to allow outside air to be drawn into the sensor cavity. The calibration solenoid is controlled by port C, bit 0. When off, this solenoid permits container air to be drawn into the sensor cavity.

FIGS. 44A through 44S show an alternative, preferred embodiment of the MCS, here including the single chip microprocessor 65C02 with various supporting integrated circuits. The microprocessor, also denoted U10, communicates through an 8-bit wide data bus and a 16-bit wide address bus, plus an interrupt line. The microprocessor also supports a read/write strobe and a clock output.

The principal supporting devices for microprocessor U10 are a real time clock U18, a versatile interface adapter U9, also denoted 65C22, and a custom AS integrated circuit U3. U3 is a programmable device which provides microprocessor U10 with a clock signal. U3 also recognizes and selects incoming data from the RS232C receiver, a remote communications port, if any, the defrost signal detector, and the detector which signals insertion of a controller into a security enclosure. All of these signals are transmitted to U10 via the data bus on lines D0 through D3, in response to instructions from microprocessor U10. Similarly, outgoing data is transmitted from microprocessor U10 to U3 on data lines D0 to D3 for distribution to various peripheral devices. These peripheral devices include the RS232C transmitter and the remote communications transmitter, if any. In response to communications from microprocessor U10, U3 furnishes device select signals for the versatile interface adapter U9, the watchdog timer U19, random access memory (RAM) and read-only memory (ROM).

Real time clock U18 utilizes a 32.768 KHz crystal to generate a time base suitable for the timing of operational sequences of long duration, e.g. up to several years. The time is recorded in one-minute intervals for operational purposes. Real time clock U18 also monitors the output of the wake-up circuit, through signal VSYS, and provides for restoration of power when a shut down command is negated by the receipt of signals /DET or /RXD, generated in response to remote communications or RS232C inputs. Additionally, the reset line is held low by this device during power up, to ensure that conditions have stabilized before microprocessor U10 becomes active. Control of real time clock U18 is effected by the serial bus comprising lines MOSI, MISO, and SCK, and the clock enable line, CLKEN.

The Master Out Slave In (MOSI), Master In Slave Out (MISO), and Serial Clock (SCK) signals, originate from a versatile interface adapter U9, together with many other control signals. U9 is enabled by the /VIA signal from U3 and receives data, address, read/write and clock signals from microprocessor U10. In response, U9 performs various transmit and receive functions via its two 8-bit wide input/output ports, PA and PB, and four additional input/output lines, CA1, CA2, CB1, and CB2. A fourth serial bus data line, MSI/O, is bi-directional. There are also lines for ROM control (ROMBNK), RAM control (BANK), slide valve control (VALVE0 through VALVE3), carbon dioxide scrubber control (SCRUB), light-emitting-diode (LED) control (GREEN and RED), carbon dioxide measurement circuit control (/CO2EN), real-time clock control (CLKEN), sensor board device select (EN0 and EN1), and RS232C and remote receive-interrupt control (RXD, /DET and /IRQ). A line denoted PGOOD from the power supply indicates that the incoming AC supply voltage, nominally 24 volts AC, meets or exceeds a set minimum value.

To prevent unpredictable operation caused by the microprocessor being forced into an unwanted state by power line transients or other uncontrollable events, watchdog timer U19 monitors the simultaneous presence of two signals, R/W from the microprocessor U10, and /DEV1 from U3. If either of these signals is absent during certain preset time intervals, U19 activates the reset line for a minimum of time, e.g. 250 milliseconds, forcing microprocessor U10 to reset and restart.

The RAM, designated NVRAM (non-volatile RAM), is preferably implemented as a 32-kilobyte or 64-kilobyte memory. In this embodiment, RAM integrated circuits U12 and U13, and power control integrated circuits U5 and U6 are active in the circuit. Power to these RAM IC's is maintained even when the AC supply and main battery fail. This power arises from lithium battery BT1 and controllers U5 and U6, which sense a declining voltage on the VCC input line and switch over to a battery BT1. See FIGS. 45A and 45B. Controllers U5 and U6 also provide write protection when a power loss condition is in effect, thus maintaining data integrity and memory. U5 and U6 do so by preventing data from being written into RAM during these power loss conditions. Data can be maintained in this way for several years.

In normal operation, battery BT1 is trickle-charged through resistor R12 and diode D12. When all of the memory integrated circuits and power controllers are installed, only one memory circuit can be selected at a time, and the selection is determined by the state of the BANK signal. If only U12 and U5 are in place, as shown in FIGS. 45A and 45B, these devices are permanently selected by the installation of jumper conductor JMP1.

In most other respects, the MCS is as described in FIGS. 40A through 40V and 42A through 42C. Thus, the MCS is adapted to control a valve to allow outside air to circulate within a container. The valve is a simple slide-shutter driven by a stepper motor. The stepper motor is, preferably, a 4-phase motor operating from the VCC supply. Four input/output lines from the microprocessor are dedicated to driving the windings of the stepper. Preferably, in FIGS. 44A through 44S, a ULN2003AV Darlington driver provides the current sinking ability to handle the 15-ohm motor windings.

In the alternative embodiment, as shown in FIGS. 46A and 46B, an optical sensor array is used to sense the position of the "back" end of the stepper motor shaft. An array of seven infrared emitter 340$a$ and sensor pairs 340$b$ is arranged such that eight discrete locations of the valve assembly's travel may be detected. When the valve is fully closed, none of the sensors are blocked, and when fully open, all of the sensors are blocked. The infrared sensors are ICs that have Schmitt triggers and produce a fast change in output in response to a slow change in light, when that slow change crosses a pre-defined threshold. The output, of the seven sensors, is detected by a serial to parallel device 340c, which is in turn read by the microprocessor using the internal serial bus and the I²C protocol. The serial to parallel device is an eight bit I/O port, of which the seven low order bits are configured as inputs for sensing the valve position. The eighth bit is used as an output to switch the power supply to the stepper motor from the normal 5 Volt supply to an 8 Volt supply, which is derived from the 12 Volt back-up battery supply. Temporally switching to the higher voltage increases the torque in the stepper motor to clear valve stickage caused by dirt, ice, etc. The switch is controlled by software, when the optical sensor indicates that the valve has not moved as commanded by the processor. Refer to FIGS. 47A through 47C for details of circuit operation.

Two LED's are preferably utilized for visible status indicators, showing the current state of the MCS. Preferably, the two colors used are green and red, and are intended to indicate normal operation, service required, and error conditions. The LED's are preferably high intensity output LED's with diffused lenses, and are biased with 10 milliamps of current each. Neither LED is lit when the system is in a standby state.

The refrigeration system in a container maintains the temperature of a container at a desired level, such as between 1° C. and 20° C. during shipment. The refrigeration system occasionally must defrost its coils. During a defrost cycle, air circulation within the container ceases, and the temperature of the air presented to the MCS is raised by a heater in the refrigeration system. The MCS does not utilize readings from its gas concentration sensors during a defrost cycle. The defrost condition is sensed by U7 of FIGS. 40A through 40V and 44A through 44S, and may be an A.C. or D.C. signal between 2V and 24V.

An external serial interface to MCS, preferably compatible with RS232C requirement, provides a means for inputting asynchronous start/stop communications, such as the upload or download of data and setpoints for the MCS, or clearing the controller for data regarding temperature cycles and status of the container.

In the preferred embodiment of FIGS. 40A through 40V, the serial data bus used internally is also provided externally. This bus permits expansion of MCS's monitoring capabilities. The data signals MOSI (master out, slave in) and clock SCK are buffered to create external data signal ESDO and clock ESCK. The data signal MISO (master in, slave out) is common to all internal devices and appears unbuffered at the external connector. The ESDO signal can operate as a bi-directional data line for handling additional serial bus protocols. Data sent to the MCS on this circuit appears on the RCV2 input to the microprocessor. The /EXTEN signal determines when an outside device is being addressed.

In the alternative embodiment, of FIGS. 44A and 44S, the data signal MOSI and clock SCK are buffered with open drain devices and fed back to input bits on U9 and U3, to create bi-directional signals MSI/O and SCKI/O. These signals extend the internal serial bus to include a full implementation of the I²C protocol. MSI/O and SCKI/O are used to communicate, using the I²C protocol, with the optical valve position board and an additional serial to parallel device located on the security enclosure board (FIGS. 55, 404). The device on the security enclosure board, along with appropriate software, is used to create a separate isolated external multi-protocol serial bus. This external serial bus may be used to monitor and control accessory devices located in the cargo area of the container. Refer to FIGS. 49A and 49B for details.

The MCS also controls the carbon dioxide scrubber via the /SCRUB output. When this signal is true, an external scrubbing device is commanded to remove carbon dioxide from the container atmosphere. When the signal is false, the scrubber is instructed not to remove carbon dioxide from the container atmosphere.

The analog-to-digital convertor in the MCS is preferably a UPD 7004C, 10 bit, successive approximation convertor. This convertor has an eight-channel analog multiplexer at the input to the ADC, and can digitize eight different signals. The channel assignments are as follows, in the preferred embodiment of FIGS. 42A through 42C: Channel 0, oxygen sensor; channel 1, carbon dioxide sensor; channel 2, gas temperature; channel 3, carbon dioxide sensor; channel 4–6, reserved, and channel 7, battery voltage. The ADC interfaces with the microprocessor via a serial bus using four signals: MISO, MOSI, the serial clock SCK, and the ADC select/AD.

In the embodiment shown in FIGS. 48A through 48K, the channel assignments are as follows: Channel 0, oxygen sensor; Channel 1, carbon dioxide sensor; Channel 2, gas temperature; Channel 3, carbon dioxide sensor temperature; Channel 4, oxygen sensor heater voltage; Channel 5, reserve; Channel 6, reserve; and Channel 7, battery voltage. The ADC interfaces with the microprocessor via a serial bus using four signals: MISO, MSI/O, serial clock SCKI/O, and ADC SELECT/AD.

The successive approximation converter requires a conversion clock. This is the system phase zero clock. The ADC is adapted for serial mode, binary output data, one-to-one conversion frequency ratio, and most significant bit shifted first.

The digital-to-analog convertor, an 8-bit, single channel device with an internal voltage reference, interfaces to the microprocessor via a serial bus using four signals: MISO, MOSI, the serial clock SCK, and the DAC select/DA. The DAC is adapted for serial operation with most significant bit shifted first.

In the preferred embodiment the DAC is used to supply the voltage reference for the oxygen sensor heater. The complementary output from the DAC is used to drive the heater voltage supply circuits U11B, U11C, and Q1. Adjustable voltage gain, provided by R30, permits setting the heater voltage, with the DAC at full scale output, to the appropriate level for each sensor.

The ceramic substrate of the sensor can be damaged by thermal shock if full heater voltage is applied to the sensor terminals. Therefore, the voltage is initialized to zero and, under computer control, by means of a digital-to-analog converter, is slowly increased to its full value.

The oxygen sensor is a zirconium oxide membrane sensor that produces a current through the membrane proportional to oxygen concentration at the surface of the membrane, and to the voltage applied across the membrane. A small orifice above the membrane enclosure admits gases from the container into the enclosure. This orifice reduces the gas flow into the enclosure, producing a bend in the characteristic voltage/amperage curve of the sensor. The current past the bend remains constant over a small range of biased voltages, and in this range is proportional to oxygen concentration alone.

In practice, the membrane is held at a temperature above about 350° C. The sensor includes an internal heater that is used to establish and maintain this temperature. The sensor includes precisely specified heater voltages that vary with each individual part. The typical heater voltage is in the range between about 1.7 and about 2.7 volts. Upon application of current to the heater inputs, the voltage ramps to the operating current at a rate of about 20millivolts per second.

This ramping voltage is attained by using a DAC as the bias ramp control. Since heater voltage and current are directly controlled by the DAC, the oxygen sensor itself can be turned off by writing an appropriate address to the DAC, reducing the power consumed by the system.

In the alternative preferred embodiment of FIGS. 48A through 48K, the Digital to Analog Converter (DAC), U6, is a 12 bit, single channel device with an internal voltage reference. It interfaces to the microprocessor via a serial bus using three signals: data MSI/O, the serial clock SCKI/O, and the DAC select/DA. It is configured for serial operation with the most significant bit shifted first.

The DAC is used to supply the voltage reference for the Oxygen Sensor Heater. The ceramic substrate of the sensor can be damaged by thermal shock if the full heater voltage is applied to the sensor terminals. Instead, the voltage is ramped up to full voltage at a slow rate. The current output from the DAC is converted to a voltage by the op amp U8C and an internal feed back resistor (pin 16). The resulting voltage will be 0V when the DAC is reset or loaded with all zeros and −4V when the DAC is loaded with all ones. This output is buffered by U8D, configured as a voltage follower, and is used to provide the reference for the oxygen heater power supply.

Oxygen sensor heater voltage is provided by a switching DC. to DC. step-down converter circuit. The converter is controlled by U1 which contains a voltage reference, controlled duty cycle oscillator with current limit, a comparator and output driver. The voltage output of the converter is controlled by comparing the output voltage with the controller's internal voltage reference to modify the oscillator duty cycle. The output of the oscillator switches the output driver, which in turn switches, thru Q1, +5V to output filter L1 and C4. The output is fed back by R5 and summed with the output of the DAC thru R30 and a +2.5V offset thru R31. The internal voltage reference is 1.25V, and when the output of the converter (positive value) equals the output of the DAC (negative value) the sum of the voltages at the junction of the summing resistors will equal 1.25V. If the sum is less than 1.25V the oscillator duty cycle will be increased which will increase the output of the converter and if the sum is more than 1.25V the duty cycle will be decreased which will decrease the output.

The basic oscillator frequency is set by C3 to about 10 kHz. Current limiting is set by R9 such that short circuit current will be 3A max. D2 is used to clamp the collector of Q1 to prevent large current spikes, caused by the inductor, during turn off.

In this embodiment, the information, required by the DAC to set the heater voltage to the correct value for the $O_2$ sensor installed in a particular sensor board, is stored in the electrically-erasable PROM (EEPROM) installed on that sensor board.

The output signal from the sensor arises when the membrane is biased, preferably with a voltage in the range of about 1.1 to 2 volts. The output current for 21% oxygen varies with each unit, but usually is less than 100 microamps and typically is closer to about 65 microamps.

The current through the membrane is converted to an output voltage using a current-to-voltage converter. The converter is an inverting amplifier and the resulting voltage is again inverted with unity gain for presenting to the multiplexing inputs of the ADC. The ADC range, in terms of the sensor output, is from zero microamperes to 100 microamperes in 0.098 microamp steps. This range corresponds to 0% to just over 21% oxygen.

In preferred embodiments, the carbon dioxide sensor is a thermal conductivity cell including a thermistor bridge, in which the current is maintained constant, and accompanying operational amplifiers. In the preferred embodiment shown in FIG. 42K, the bridge supply is bipolar and the zero adjustment is effected by means of a manual potentiometer R19. In the alternative embodiment of FIGS. 48A through 48K, the zero adjustment is effected by means of a digital potentiometer, U6, operated from the serial bus. See U6 in FIG. 48j. The thermistors are preferably resistance matched to about plus or minus 2%. A constant current supply insures that the total current in the bridge network remains constant, and causes the thermistors to operate at substantially the same current. The thermal conductivity cell, which contains the sensing thermistor, i.e., the thermistor exposed to the gases whose concentrations are being measured, and the reference thermistor, contained in a sealed compartment with the reference gas mixture, is strongly influenced by the temperature of the case containing the thermistors, which in turn is effected by the temperature of the gas stream being measured. It is therefore necessary to measure the temperature of this case, and use the resulting temperature data to modify the data obtained from the output voltage reading from the thermistor bridge.

In preferred embodiments, a semiconductor temperature sensor is inserted through the base of the housing, which contains the thermal conductivity cell, and is attached to the case of the cell using a thermal epoxy. This temperature sensor can then be used to determine the temperature of the case of the thermal conductivity cell. See FIGS. 33 through 35.

Temperature sensing, in preferred embodiments, is effected with semiconductor temperature sensors. These sensors are voltage regulators whose outputs are linearly proportional to temperature, in degrees C., with a slope of 10 millivolts per degree C. There are two sensor channels. The gas temperature sensor, which monitors the ambient temperature of the container atmosphere, produces an output which is level-shifted to provide temperature readings below 0° C. The shifted output is then scaled to provide a zero to 2.5 volt output corresponding to −100 to +400 millivolts from the sensor. This corresponds to a temperature range of −10° C. to +40° C. in 0.05° C. steps.

As shown in FIG. 55, sensor 401 is located on printed wiring board 404 mounted of the rear of the security enclosure 291, and is positioned so that there are no obstructions between the sensor and the gas stream. Board 404 also contains an electrically-erasable PROM U2 (403) which carries calibration data for the particular temperature sensor U1 (see FIGS. 49A and 49B). EEPROM U2 (see FIGS. 49A and 49B) may also contain other useful data specific to a particular container such as an identification number. Board 404 carrying this sensor also seals off the rear of security enclosure 291 from the interior of the container. Board 404, through which connector wires pass into area 239 via gas-tight joints, preferably solder joints, presses and seals against a gas-tight o-ring seal 402.

The second temperature sensor channel detects the temperature of the carbon dioxide sensor elements for use in correcting carbon dioxide readings. This sensor output is not level-shifted, and provides temperature readings above 0° C. only. The shifted output is then scaled to provide 0 to 2.5 volt output corresponding to 0 to 1275 millivolts from the sensor. This corresponds to a temperature range of 0° C. to 128° C. in 0.125° C. steps. The temperature sensors receive power from the VCC supply.

To obtain correct carbon dioxide concentration measurements, an additional correction is required because of the influence of oxygen on the temperature of the sensing thermistor. The correction factor is calculated using data from the oxygen concentration measuring system and data stored in the EPROM calibration (or EEPROM) described below.

Each individual sensor board is unique. To minimize calibration and reading errors in normal usage, calibration curves are generated for each sensor when made. The calibration data is incorporated into each sensor board for correcting measurements made by that sensor. The calibration data is stored in the EPROM (or EEPROM) on the sensor board, and is accessible to the microprocessor via the serial data bus.

In preferred embodiments, the first step in sensor board calibration comprises entering basic set-up information such as oxygen sensor voltage, sensor serial number, sensor board serial number, etc. into a computer such as a Macintosh computer loaded with appropriate calibration software. The calibration software adjusts the temperature in the chamber containing the sensor boards to 0° C., flows nitrogen into the chamber, and automatically finds the zero output adjustment of the carbon dioxide bridge circuit. The software then flows the next gas mixture into the chamber, waits until the output stabilizes, records the sensor outputs, and repeats this procedure until all gas mixtures are characterized at that temperature. The temperature is then changed by the software to the next temperature in the suite, and the software flows and records the sensor outputs of all mixtures in the suite at that temperature until all mixtures are characterized at all temperatures in the suite. The software analyzes the data recorded in a characterization matrix, and separates various air components including offset air, temperature air, carbon dioxide effects on the oxygen sensor, oxygen effects on the carbon dioxide sensor, and the like. The software then plots the data, and an operator reviews the data for reasonableness. Thereafter, the software generates calibration tables, and loads these tables into an EEPROM on the sensor board that generated the data that was used to create the table. When the controller is initialized, the calibration table is loaded from the EEPROM on the sensor board into the controller RAM where it is used by routines in the ROM to correct the raw data read from various sensors on the sensor board.

This calibration apparatus is shown in FIGS. 66A and 66B. Its major components include calibration software designed for use with an Apple Macintosh computer. This software uses one of the Macintosh communication ports to communicate with a controller main board (MCU), and the other communication port to communicate with an environmental control chamber. The software provides a user interface, controls the environmental chamber, controls the gas selection valves through the MCU, controls the serial bus multiplex on the calibration circuit board, initializes the MCU for data collection, stores collected data on its hard disk drive, and displays the data collected from all boards as collected. The software also determines when the data is stable and when to proceed to the next step in the gas mixture/temperature matrix. Once the data collection process is complete, the software analyzes the data, and produces a graphical display of the data for operator review. After operator acceptance, the software generates calibration tables, passes these tables to the MCU and instructs the MCU to write the data to the selected sensor board EEPROM.

The Macintosh computer is preferably a model SE or greater, with a minimum of 4 megabytes of RAM, a 20-megabyte or larger hard disk drive, and running System 6.8 or later.

Certified gas mixtures are used for the calibration process. Such mixtures include 100% nitrogen, 95% oxygen/5% oxygen, 85% oxygen/5% oxygen/10% carbon dioxide, 75% nitrogen/5% oxygen/20% carbon dioxide, and 85% nitrogen/10% oxygen/5% carbon dioxide. The cylinders are fitted with pressure regulators, gauges and needle valves to set the flow.

The gas selection valves are controlled by a serial device connected to the MCU serial bus. The MCU sends commands to the device at the request of the software running on the Macintosh computer. The various gas mixtures are delivered to the various gas selection valves using high pressure tubing and pressure is applied by each of the connected cylinders. The valves are connected to a common manifold which in turn is connected, via tubing, to the calibration fixture sensor cups.

The environmental control chamber used to control the temperature of both the gas mixture being measured and the entire sensor board that is making the measurement has its temperature setpoint established by the software running on the computer via a RS-232 connection to the chamber, and is controlled locally by the chamber's own controller. The computer periodically requests the current temperature measurement from the chamber controller, and alerts the operator if the correct temperature is not being maintained.

The calibration fixture includes a base plate to which the MCU, a calibration circuit board, and sensor cups are mounted. The calibration fixture is installed into the environmental control chamber with a selected gas line, exhaust gas line, power supply cable, MCU serial bus cable, and RS-232 cable fed through the chamber's access ports to appropriate components outside the chamber. Two calibration fixtures can be connected, allowing up to 16 sensor boards to be calibrated at once. A second calibration fixture need not have an MCU, but may instead use the services of the MCU attached to the first fixture.

The MCU board is a modified CA controller main board. The power supply lines to the sensor board connector are disconnected and the ROM on the board is replaced with a special version that includes the command set used by the software to transfer commands and data to and from the MCU. The MCU is connected to the computer via the RS-232 communication port. The MCU connections to the calibration board include a serial bus via the sensor board connector and the stepper motor phase lines via the stepper/battery harness connector.

The sensor cups are simple cups with appropriate inside diameter and depth to accommodate the sensor board sensor assembly. The cup seals to the O-ring of the sensor assembly, and is fitted with gas inlet and outlet nipples. Four cups are connected in chain-like fashion with tubing, and are connected with two "T"-type fittings to a second series of cups. The third leg of the "T"-type fittings is connected to the selected gas line in the first case and to the gas exhaust line in the second.

The calibration circuit board provides a serial bus multiplexed connection for an external power supply, multiplexed connections for eight sensor boards, reference voltage sources for air temperature, battery, and spare ADC channels, and provides for connection of a second calibration fixture. The serial bus multiplexer uses the four stepper motor phase signals from the MCU to select one of the 16 sensor boards. The sensor board selected by the multiplexer is presented to the MCU as the only sensor board attached and, as such, the standard ROM routines can deal with the sensor board selected without firmware modification. The reference voltages are used to characterize the ADC channels and associated circuits in the absence of devices normally attached to those circuits.

An exhaust bubbler is used to give a visual indication to an operator that gas is flowing and to act as a seal against outside air diffusing into the system when gas is not flowing.

An external power supply is needed because the MCU power supply provides current to only one sensor board. The external power supply provides power to the calibration circuit board which, in turn, provides power to the sensor board connectors.

In the preferred embodiment of FIGS. 42A through 42C, the EPROM used is preferably a 2716, 2K by 8-bit EPROM with access time requirements faster than one microsecond. The EPROM is accessed via two 8-bit parallel input/output ports that interface to the microprocessor via the serial data bus.

In the embodiment of FIGS. 40A through 40V and 42A through 42C, parallel input/output ports are used to access the calibration data storage means in the EPROM on the sensor board. Each port consists of three internal registers and an input/output buffer. Each bit in an input/output port can be programmed as an input or an output. The port protocol uses two bytes for each transfer, and requires a control byte written to the device before a data byte can be written or read. The second data byte can also be a mask to set or clear individual bits in the port.

During transfer of the control byte to the input/output port via the MOSI line, the input/output port returns data to the master on the MISO line. The second byte is the data to be read or written, most significant bit first. If the slave device is not deselected after the second byte has been transferred, a multiple byte transfer is requested. This data in subsequent bytes is either written again to the same input/output port register, or is continuously read from that register.

In the alternative embodiment shown in FIGS. 48A through 48K, the EEPROM U9 is preferably a 512-bit by 8-bit EEPROM which is accessed via serial data bus lines MSI/O and SCKI/O.

In the embodiment shown in FIGS. 44A through 44S, 47A through 47C, 48A through 48K, and 49A and 49B, the multi-protocol serial data bus is a serial interface to several serial devices. Some of these devices use the Serial Peripheral Interface (SPI) protocol. Others use the I²C protocol. By basing communications on the I²C protocol, with a serial bus clock line (SCK) high for the inactive state, both types of devices can co-exist on the bus without conflict. Microprocessor U10 communicates with the bus through U9 and U3, and U10 is the serial bus master. These lines on U9 are MISO, MSI/O, MOSI, SCK, Device Enable/Selects (EN0, EN1), and CLOCK enable/select (CLKEN). The serial bus clock input (SCKI/O) line is the only serial bus line connected directly to U3.

The I²C protocol devices require only two lines, clock (SCKI/O) and the bi-directional serial data line MSI/O. However, the U9 pins can be programmed for only input or output functions. Therefore, the MSI/O line requires additional circuitry to facilitate bi-directional function. Output data originates at pin 7 of U9 on the MOSI line, passes through the two open drain inverters, U17C and U17D, and emerges as the MSI/O signal. If the MOSI line is held high, the output of U17D is in the high impedance state. Under these circumstances, the MSI/O line can be driven low from other sources such as slave devices. The MSI/O line is directly connected to U9, pin 8, which is programmed as an input, allowing U9 to receive data or acknowledgment from an I²C protocol peripheral device.

The SCKI/O line is read by U10 to detect slave devices not ready for bus transaction. When talking to the I²C protocol peripheral devices, all serial peripheral interface protocol devices are de-selected, thus assuring no conflict with them. The I²C protocol-compatible devices within the controller are the EEPROM U2 on the sensor board and the serial to parallel device U1 on the optical valve position sensor board. The circuit board connected to the security enclosure contains both the EEPROM and serial to parallel I²C protocol devices.

There are four serial bus lines to each serial peripheral interface compatible protocol device. These lines are SCK, MOSI (MSI/O is used for this), MISO, and a device select line unique to each device. When communicating with the serial peripheral interface protocol devices, the I²C protocol start-bit sequence is not output to the bus, i.e. the MOSI line must not be low when the SCK line is high, to avoid conflict with the I²C protocol devices on the serial bus. There are four serial protocol interface compatible devices in the controller: the real time clock U18, the A to D converter U2 (see FIG. 48), the 8-bit D to A converter U1 (see FIGS. 48A through 48K), and the digital potentiometer U6 (see FIGS. 48A through 48K). On U6, as shown in FIGS. 48A through 48K, the SCKI/O, MSI/O, and POTEN lines are connected to CLK, DQ, and RST, respectively.

The protocol used by each slave device in the embodiment of FIGS. 40A through 40V and 42A through 42L differs. The real-time clock protocol uses a minimum of two bytes for each transfer, and requires an address/control byte written to the device before an actual data byte can be written or read. If a slave device is not deselected after the second byte has been transferred, a multiple byte transfer is requested. The address automatically increments in the device, selecting subsequent locations for read or write. If the last address for the RAM or clock access is reached, the address counter reverts to the first address for the RAM or clock and continues. The subsequent data bytes are shifted, most significant byte first, until the master deselects the device.

The analog-to-digital convertor protocol uses bi-directional communication for each transaction. The microprocessor selects the device, and cycles the shift clock for 10 cycles. All but the last of three bits of the data transmitted to the ADC is ignored. Bits 8–10 represent an ADC mux address for next conversion with bit 10 as the least significant bit. Meanwhile, the 10 bits representing the previous conversion are transmitted to the microprocessor during the same 10 clock cycles. The shift clock is preferably high when the device is selected. There-after, data is clocked out of the ADC on the falling edge of the clock, and data is clocked into the ADC on the rising edge of the clock. The addresses sent to the ADC must be stable on the MOSI line for 150 ns before the low-to-high transition of the SCK clock. The hold time for these addresses after the SCK transition is 100 ns. Data from the ADC on the MISO signal is not valid until 250 ns after the falling edge of the SCK. The SCK minimum high and low times for this device are 400 ns. The data transactions preferably occur more than 200 microseconds apart to allow adequate time for conversions.

The digital-to-analog convertor serial protocol calls for transfer of a single byte to the convertor from the master via the MOSI line. This byte is latched into the convertor's data latch, and the corresponding output voltage appears within three microseconds. The SCK minimum high and low times for this device are 300 ns.

The carbon dioxide scrubber removes carbon dioxide from the interior of a container without resorting to air exchange with outside air. Preferably, this scrubber is a box containing a carbon dioxide-absorbing material such as lime, equipped with a fan and fan drive circuitry for circulating container air through the box. The fan can be turned on and off under the control of the MCS by activation of the /SCRUB line. The box and fan are mounted in the cargo area of the container, and are attached to the MCS using connectors mounted in the air grill.

This invention also relates to security container means for the monitor-control system. The security container means includes means for installing the security container means in the wall of a container for respiring perishables; cover means for providing access to the interior of the security container means; openings of appropriate size and shape for accommodating the monitor-control system; and means for connecting the monitor-control system to a power source, refrigeration system defrost status signals, extended serial bus means, remote communications system means connection, $CO_2$ scrubber means connection, high and low pressure container atmosphere for air exchange means, and to the interior of a container for perishables.

The remote communications system (RCS) is a portable, preferably hand-held device adapted to communicate with the monitor-control system (MCS) and with the shipment planning and reporting system (SPRS). The RCS is adapted to transfer programming and desired oxygen concentration, carbon dioxide concentration and temperature limits or setpoints to, and receive logged data of oxygen concentration, carbon dioxide concentration and temperature from the monitor-control units.

The shipment planning and reporting system (SPRS) is a computerized system adapted to formulate and communicate setpoint and programming information to the remote communications system, to the monitor-control system, or both. The SPRS is also adapted to receive and display or print logged carbon dioxide concentration, oxygen concentration and temperature data from the remote communications system, the monitor-control system, or both. The SPRS also provides a data base for programmed oxygen concentration, carbon dioxide concentration and temperatures for specific kinds of perishables, and entry of shipment information.

These systems include means for communicating between the MCS, the RCS and the SPRS. In communications between the MCS and the RCS, the MCS is the slave system. Thus, the MCS only responds to requests made by the RCS or the SPRS. The MCS continuously checks for incoming commands while continuously carrying out monitoring and control functions. All commands that the MCS receives are acknowledged by communication to the RCS or SPRS, and, in preferred embodiments, by a pattern of flashing LED's. The MCS successively flashes each LED during a command response sequence, and maintains the flashing pattern for a fixed time, e.g., five seconds after the last communication, showing the operator of the RCS which MCS is receiving the communication. If the MCS receives an unrecognized command or encounters any other error when receiving data from RCS or SPRS, the MCS does not transmit any error status message, but, in preferred embodiments, responds by flashing all LED's simultaneously. Thus, in preferred embodiments, the RCS or SPRS can ask the MCS for its identification, for shipment information, for reports of diagnostics, and for sensor status.

The RCS and SPRS can also dictate, via program, desired setpoint and deadbands for oxygen and carbon dioxide concentration, and transmit tables specifying characteristics of the perishable and control conditions to be maintained. The RCS and SPRS can also request logged data, require initialization of the entire system or of the logging, dictate cargo information, shut down the system, set the time clock, and/or directly control oxygen inlet, carbon dioxide scrubbing, or both. In response, the MCS can transmit its identifying information or other requested information to the SPRS or RCS, and acknowledge and execute instructions from the RCS or SPRS.

The RCS, in preferred embodiments, is a hand-held device, adapted to communicate with the MCS and the SPRS. In preferred embodiments, the RCS includes a keypad and display interface. The RCS is adapted to transmit, through a user interface, the oxygen concentration setpoint and carbon dioxide concentration setpoint, and other programming of the MCS for a particular container. Programming for the MCS is, customarily, transmitted from the SPRS into the RCS for transfer to the MCS. The RCS is also adapted to read logged data from the MCS at any time, and is adapted for displaying the current state of, and readings by the MCS. The RCS is also adapted to transfer logged data from the MCS to the SPRS. The RCS, in preferred embodiments, has an LED display capable of displaying command and status information that the user may require when testing or transferring programming to the MCS. In preferred embodiments, the communication from the RCS to the MCS and from the RCS to the SPRS is via infrared, electronic or other desired kinds of signals.

In communication between RCS and MCS, the RCS is the master system. When the RCS is communicating with the SPRS, the SPRS is the master and the RCS the slave, meaning that the RCS only responds to requests from the SPRS. The RCS will poll for incoming commands from SPRS only when activated by a signal from a user. Most of the commands that the SPRS gives to the RCS are the same commands that RCS gives to the MCS, although the RCS handles these commands differently. The RCS retains programming and data, in memory means, for transmission to an appropriate MCS unit. Thus, the SPRS can also send commands directly to an MCS unit, since the commands that the SPRS sends to the RCS are the same commands that the RCS sends to the MCS.

In preferred embodiments, the SPRS can send commands for identification of the RCS or MCS, for diagnostic status, for sensor status, for programming data, particularly current setpoints and deadbands for oxygen and carbon dioxide concentration, and for a report of software routine numbers for alternate programming for a specific MCS unit, can transmit desired values of setpoints and deadbands for a specific MCS, or additional programming for a specific MCS unit, and can call for logged data and for shipment log information data for a specific MCS. Further, the SPRS can also initialize any specific MCS unit, initialize the logging of a specific MCS unit, thus clearing the unit for incoming new information, dictate specific identifying information for a given MCS unit, transmit RCS RAM contents that call for the transmission of RAM contents from an RCS, load information into a specified RAM, or terminate transmission from an RCS.

The SPRS is, in preferred embodiments, a computer system adapted to formulate and download MCS setpoints and programming information, for different perishables and containers, to an RCS or directly to an MCS. The SPRS is also adapted to receive shipment log data from an RCS or MCS unit, and to utilize logged shipment data to display or print a report of oxygen concentration, carbon dioxide concentration and temperature data for a given container. The logged information from each MCS can also be retained in SPRS memory, and correlated with previous logged data from the same or a different MCS unit, for example, to determine if replacement of sensors or other maintenance is required on any container or MCS in use.

In preferred embodiments, an IBM PC or other compatible equipment can be used with a hard disk drive to accommodate a large data base, together with a serial communications port. A second serial communications port or modem permits telephone transfer of shipment information from one SPRS to another, and alternate communication with RCS's and MCS's. The SPRS also includes programming systems for providing memory to monitor a plurality of MCS's, and to maintain records of shipment control information for each container and for each perishable in each container, as well as to display and print shipment log information. The SPRS also transfers data from a data base management system to an MCS or an RCS, and receives data from RCS's and MCS's.

The data base in the SPRS is adapted to store all information associated with each MCS unit and the container associated with each MCS. The data base system permits the user to plan an MCS-controlled shipment or storage in a container. This planning utilizes records containing the programming needed for each type of perishable. The planning for each container requires the user to select an available MCS unit, select the perishable to be stored or shipped, specify the shipping container, the date, time, place of origin and shipper for each container and all other pertinent data, to transmit MCS programming modifications, to link the MCS or RCS to the SPRS, and to issue commands to transmit shipment information and programming to the RCS, MCS, or both. After shipment or storage of a specific container is complete, the SPRS is adapted for receiving shipment logs in its data base. The data base is also adapted to maintain, display and print shipment description and shipment log information. The SPRS system user can display or print logged data in table form or graphically.

To retrieve shipment data, a user connects the MCS or RCS to SPRS and commands the MCS to transmit shipment data. After this transmission, the operational status of an MCS unit is automatically updated. Thus, if an MCS transmits no hardware error to the SPRS, the data base identifies the MCS unit as available for a new shipment or storage task.

DESCRIPTION OF THE DRAWINGS

The invention can better be understood by reference to the attached drawings, in which:

FIG. 9 shows a top plan view, taken on line 9—9, of a portion of the side wall of the container shown in FIG. 6;

FIG. 10 shows a side elevation view, taken on line 10—10, of one of the ports shown in FIG. 9;

FIG. 11 shows a side elevation view, in cross-section, taken on line 11—11, of the port shown in FIGS. 9 and 10;

FIG. 12 shows, in exploded detail, the components of the port shown in FIGS. 9–11;

FIG. 15 shows a top plan view of the preferred embodiment of the security container for the preferred embodiment of the monitor control system of this invention; FIG. 15a shows a perspective view of the security container, mounting frame, and prepared container panel;

FIG. 16 shows a side elevation view, in cross-section, of the security container/monitor-control system shown in FIG. 15;

FIG. 17 shows a perspective view of the hinge construction of the security container shown in FIGS. 15 and 16;

FIG. 18 shows a front elevation view of the security container shown in FIGS. 15 and 16;

FIG. 19 shows a rear elevation view of the security container shown in FIGS. 15, 16 and 18;

FIG. 20 shows a perspective view of the security container shown in FIGS. 15, 16 and 18 with the front cover open to expose the interior of the container;

FIG. 21 provides a perspective view of the rear panel of the preferred embodiment of the monitor-control system of this invention;

FIG. 22A shows a perspective view of the insulator plug, for use in the preferred embodiment of the security container, when the preferred embodiment of the monitor-control system is not in place;

FIG. 24 shows a perspective view of the internal construction of the preferred embodiment of the monitor-control system shown in FIGS. 21 and 23;

FIG. 25 shows a top plan view, in cross-section, taken on line 25—25, of FIG. 18, of the preferred embodiment of the security container with the preferred embodiment of the monitor-control system inside the security container;

FIG. 26 is an enlarged view of a portion of the top plan view seen in FIG. 25;

FIGS. 41A and 41B is a schematic wiring diagram for the preferred embodiment of the power supply systems shown in block function form in FIG. 39;

FIGS. 42A through 42L show schematic wiring diagrams for the gas sensor board in the preferred embodiment of the monitor-control system;

FIGS. 48A through 48K show schematic wiring diagram for the gas sensor board in the alternative preferred embodiment of FIGS. 43A–43C, 44A–44S and 45A–45B;

FIGS. 50–53 show a front top plan view, in cross section, of an alternative preferred embodiment of the security container for an alternative preferred embodiment of the monitor-control system of this invention, including a side elevation view, in cross section, of the security container/monitor-control system, and a perspective view of the hinge construction for the security container embodiment;

FIGS. 60, 60A and 60B are a top plan view and side view, respectively, showing the preferred embodiment of the position sensor for the slider in the slider valve assembly of the preferred embodiments of the monitor-control system;

FIG. 61 shows a perspective view of the insert for use in the alternative preferred embodiment of the security container when the alternative preferred embodiment of the monitor-control system is not in place;

FIG. 62 shows a top elevation view, in cross-section of the alternative embodiment of the security enclosure and the alternative embodiment of the monitor-control system, and the flow of gases through the container and system;

FIGS. 62A through 62D show diagrammatic views of the expanding slide valve in various stages of operation;

DESCRIPTION OF THE PREFERRED EMBODIMENTS

Figure 1:
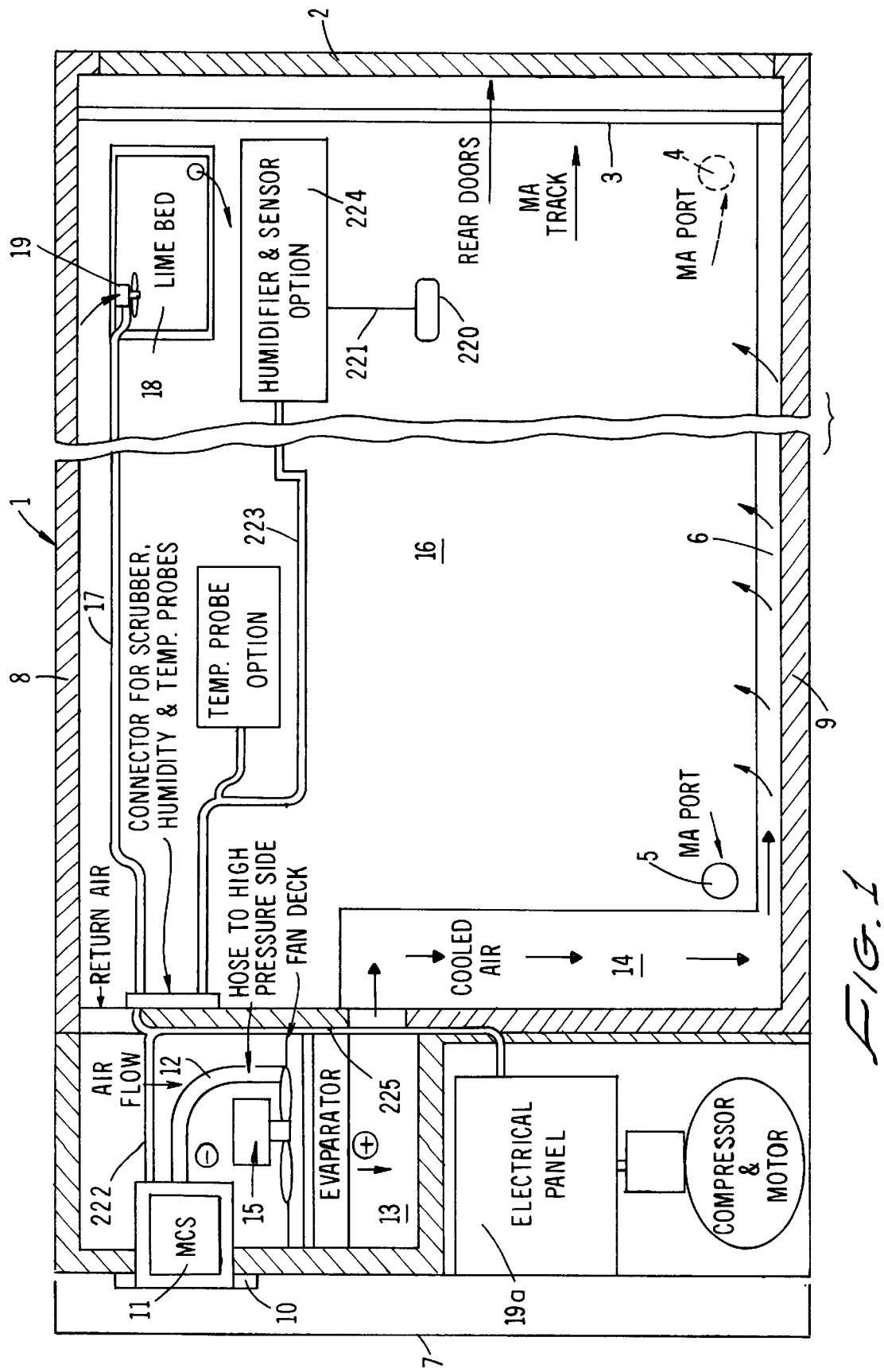
FIG. 1 shows a diagrammatic view of a container equipped with a preferred embodiment of the monitor control system, called the MCS.

FIG. 1 shows a diagrammatic view, in cross-section, of container 1 adapted to carry respiring perishables such as fresh fruit and produce. Container 1 includes rear door 2, modified atmosphere track 3, gaseous atmosphere inlet and outlet ports 4 and 5, slotted floor structure 6 to permit circulation of gas mixtures throughout the container, refrigeration unit 7, insulated upper wall 8, insulated lower wall 9, and front panel 10.

Front panel 10 includes the preferred embodiment of monitor control system 11, denoted the "MCS." MCS 11 is connected through gas-transmitting hose 12 to interior passages 13 and 14 for passage of air into and out of container 1. MCS 11 is linked to fan 15, which propels gases into, and withdraws gases from interior 16 of container 1. MCS 11 is also connected, via electrical connector 17, to carbon dioxide scrubber box 18, which contains electrical fan 19.

MCS 11 includes means for sensing the concentration of carbon dioxide, means for sensing the concentration of oxygen, and means for sensing the temperature inside container 1. MCS 11 also includes means for controlling the carbon dioxide and oxygen concentration, continuously, so that these concentrations remain at or near set values, or within a band of values above the set values.

MCS 11 may also include humidity sensor 220, which passes electrical signals representative of the humidity of the airflow to MCS 11 on paths 221 and 223 and 222. If the humidity in the container atmosphere falls below a desired level, MCS 11 delivers a signal on paths 222 and 223 to humidifier 224, which releases moisture into the container atmosphere, raising its relative humidity.

MCS 11 may also include means for modifying the temperature of the air in container space 16. If the temperature inside container 1 rises about a predetermined, desired level, MCS 11 generates a signal representing the desired temperature, and delivers that signal to electrical panel 19 on paths 222 and 225. Electrical panel 19 then increases the level of refrigeration, and lowers the temperature to the desired level. Alternatively, if the temperature falls too low, MCS 11 delivers a signal on paths 222 and 225 to electrical panel 19 to turn off or to turn down the refrigeration apparatus to permit the temperature in container space 16 to rise to the desired level.

Figure 2:
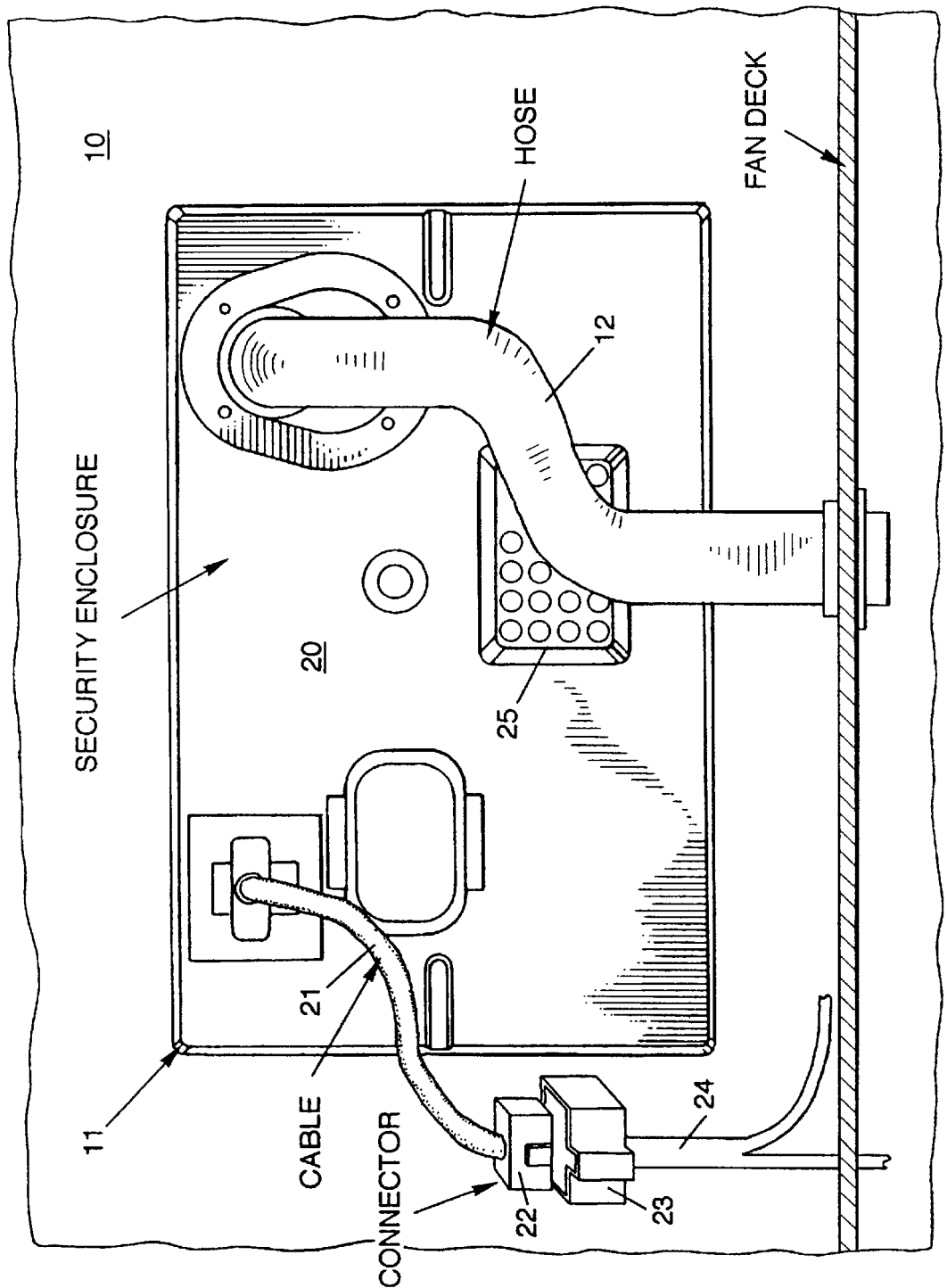
FIG. 2 shows the connections of the preferred embodiment of the monitor control system shown in FIG. 1 to the refrigeration system in the container shown in FIG. 1.

FIG. 2 shows rear panel 20 of MCS 11. MCS 11 is connected via outlet hose 12 and inlet 25 to interior 16 of container 1 and via cable 21, connectors 22 and 23, and cable 24 to electrical panel 19 in refrigeration unit 7.

Figure 3:
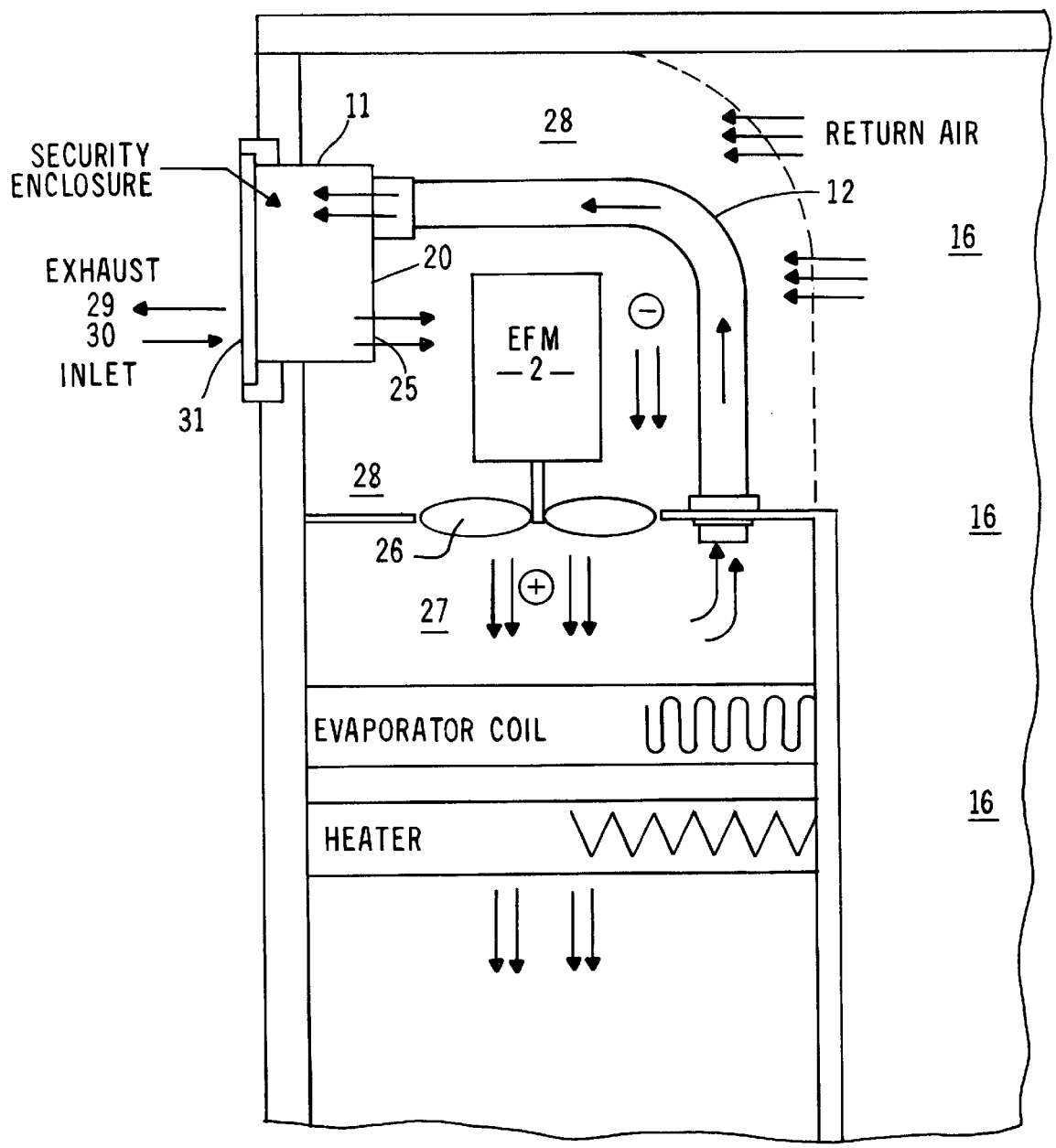
FIG. 3 shows the flow of gas mixtures including nitrogen and oxygen into, and carbon dioxide and nitrogen out of, the container shown in FIG. 1 under the control of the preferred embodiment of the monitor control system.

FIG. 3 shows the flow of air into and out of the container interior 16 through MCS 11 via outlet hose 12 and inlet 25. Motor-driven fan 15 has blades 26, which propel gases positively through zone 27 and draw gases from zone 28. Gases from the container interior space 27 pass through hose 12, and MCS 11, to the outside of container 1 via path 29. Gases flowing into the container on path 30 flow through inlets 31 and 25 in MCS 11.

Figure 4:
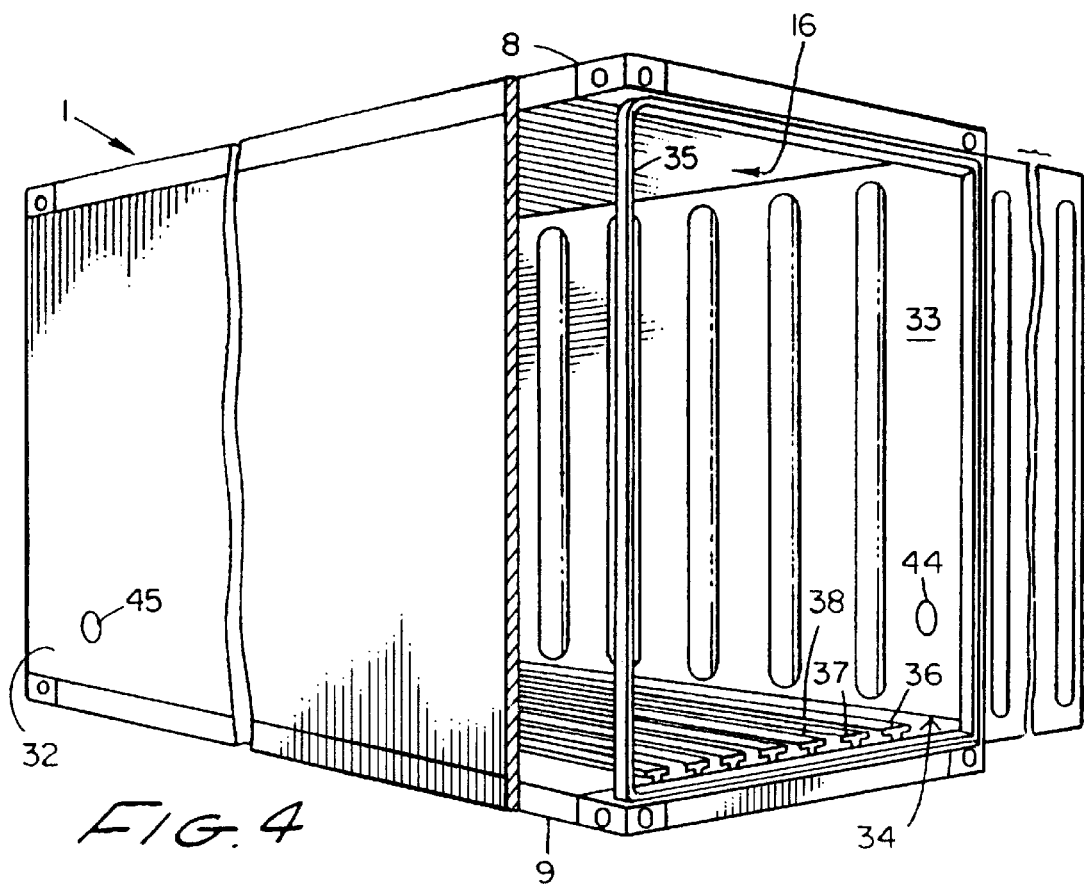
FIG. 4 shows the construction, in perspective, of a container adapted for use with the monitor control system shown in FIG. 1.

FIG. 4 shows the configuration of a preferred embodiment of a container adapted to receive and cooperate with MCS 11. This container includes insulated bottom wall 9, insulated side wall 32, insulated upper wall 8 and insulated side wall 33. Mounted inside opening 34 of container 1 is track 35. This track is secured to the inner surfaces of each of insulated double walls 8, 32, 9 and 33. Track 35 is adapted to receive a curtain made of plastic or other gas impermeable material to prevent gases from passing into or out of interior space 16 of container 1. Bottom floor 9 of container 1 includes a plurality of T-shaped, flat-surfaced strips 36, 37, 38, and so on. Between these T-shaped strips are passageways through which gases flow from MCS 11 and the refrigeration unit along the length of the interior of floor 9 and then upwardly between the T-shaped panels for diffusion into interior space 16, and then return to the refrigeration unit.

Figure 5:
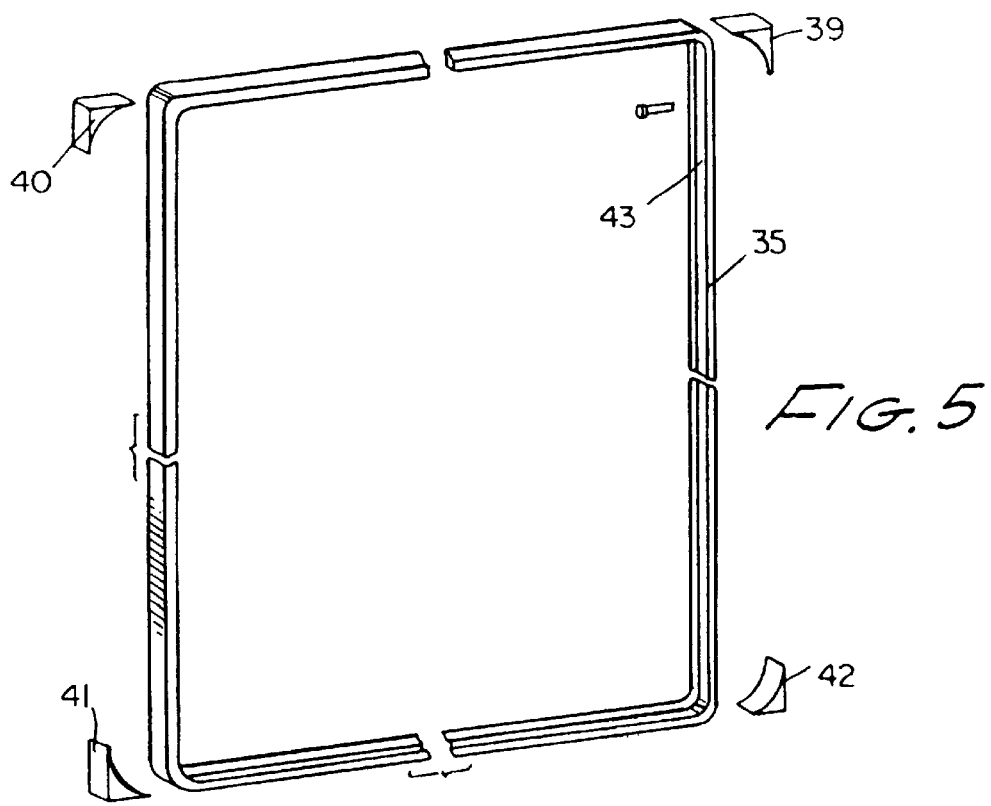
FIG. 5 shows, in perspective, the track installed in the container means shown in FIG. 4 used for sealing the container from the atmosphere outside the container.

FIG. 5 shows the construction of track 35 in greater detail, including corner-sealing means 39, 40, 41 and 42. Track 35 includes a groove 43 extending along the entire inner periphery of track 35 for sealingly receiving and engaging a plastic or other gas-impermeable film.

Figure 6:
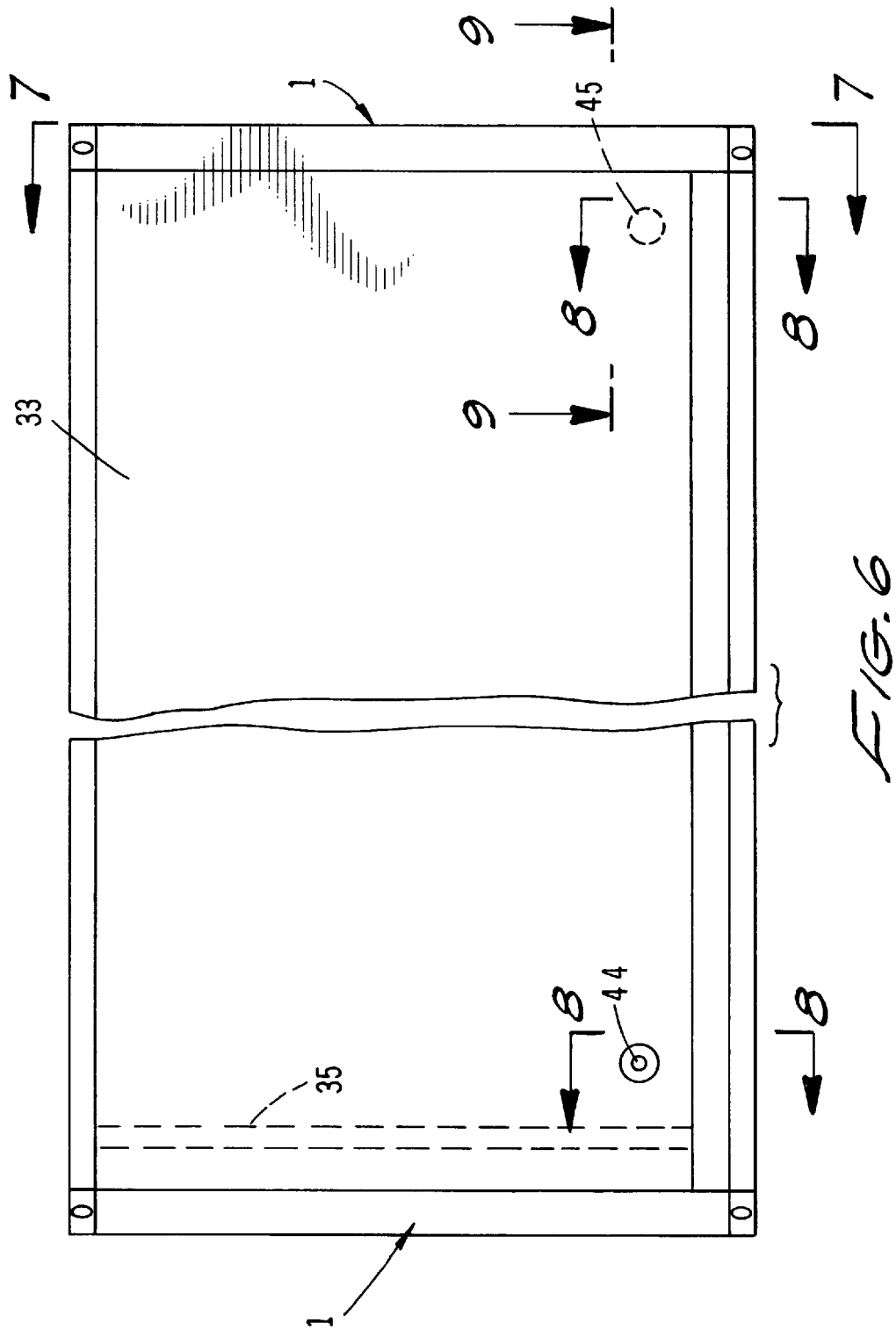
FIG. 6 shows an elevation view of an exterior side wall of the container shown in FIG. 4.

FIG. 6 shows a side elevation exterior view of one side wall 33 of container 1. This figure shows the location of gas inlet and outlet ports 44 and 45. Gases are pumped into the container interior space 16 through port 44, and are flushed from interior space 16 through port 45.

Figure 7:
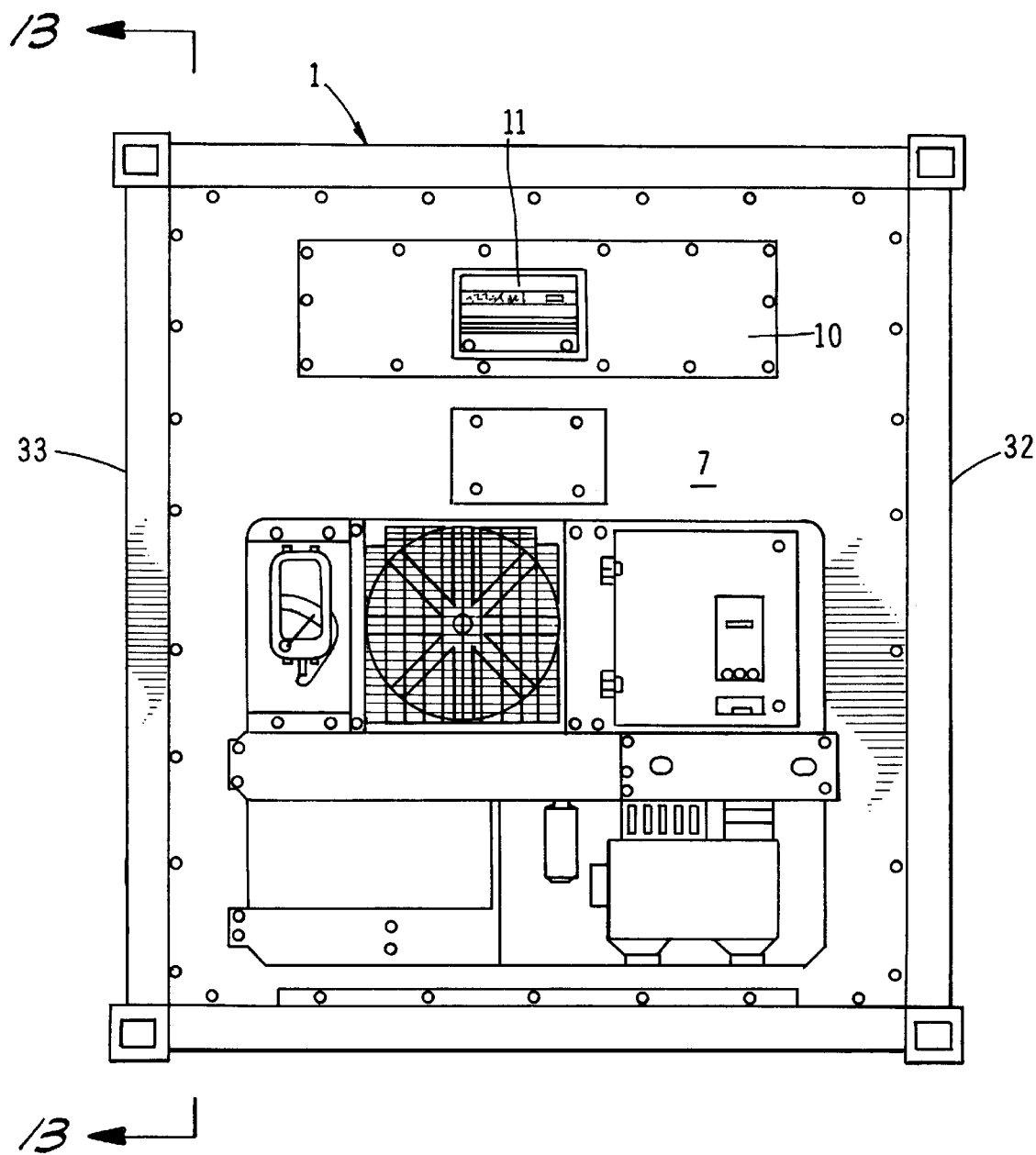
FIG. 7 shows an end elevation view, taken on line 7—7, of the container shown in FIG. 6.

FIG. 7 shows an end elevation view, taken on line 7—7 of FIG. 6, from the end of the container adapted to receive MCS 11.

Figure 8:
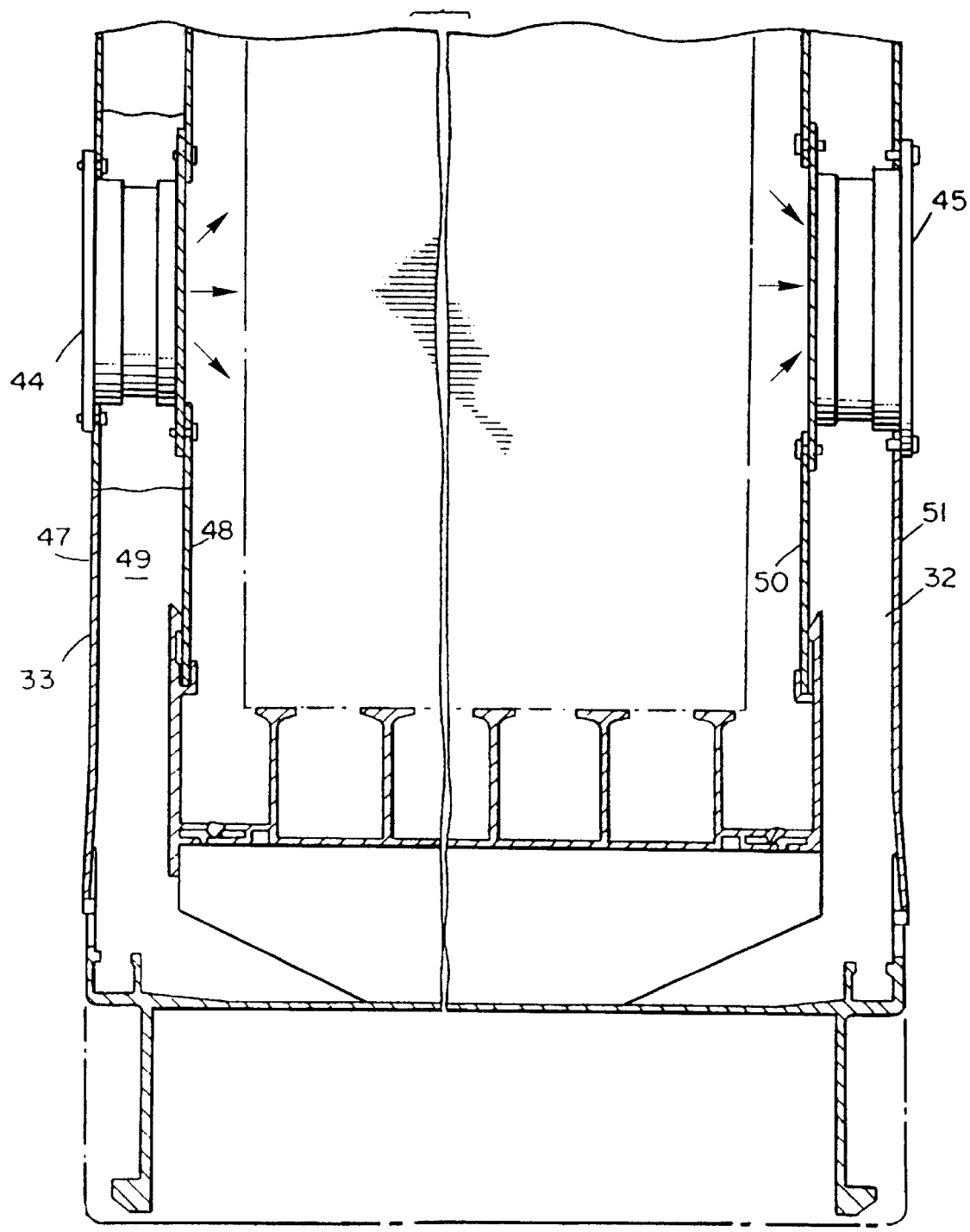
FIG. 8 shows a side elevation view, in cross-section, taken on line 8—8, of the container shown in FIG. 6, showing the inlet and outlet ports for gases.

FIG. 8 shows an end elevation view, in cross-section, taken on lines 8—8 of FIG. 6, showing inlet ports 44 and 45 located within container side walls 33 and 32. As FIG. 8 shows, insulated side walls 32 and 33 are double wall construction with, for example, wall 33 consisting of exterior wall 47 and internal, interior wall 48 with insulating gap 49 between them.

FIG. 9 shows an enlarged detail view, taken on lines 9—9, of FIG. 6 of inlet port 45 in side wall 32. FIG. 9 shows that inlet port 45 is mounted between inner and outer wall members 50 and 51 shown in FIG. 8.

FIG. 10 shows a side elevation view of port 45, and FIG. 11 shows a side elevation view, in cross-section, of the components of port 45. FIG. 12 shows the components of port 45, separated in perspective, including stopper 52, stopper-receiving ring 53, outer wall member section 54, cylindrical tube member 55, porous plate 56, and inner wall member section 57. These components are shown in assembled form in FIG. 11.

Figure 13:
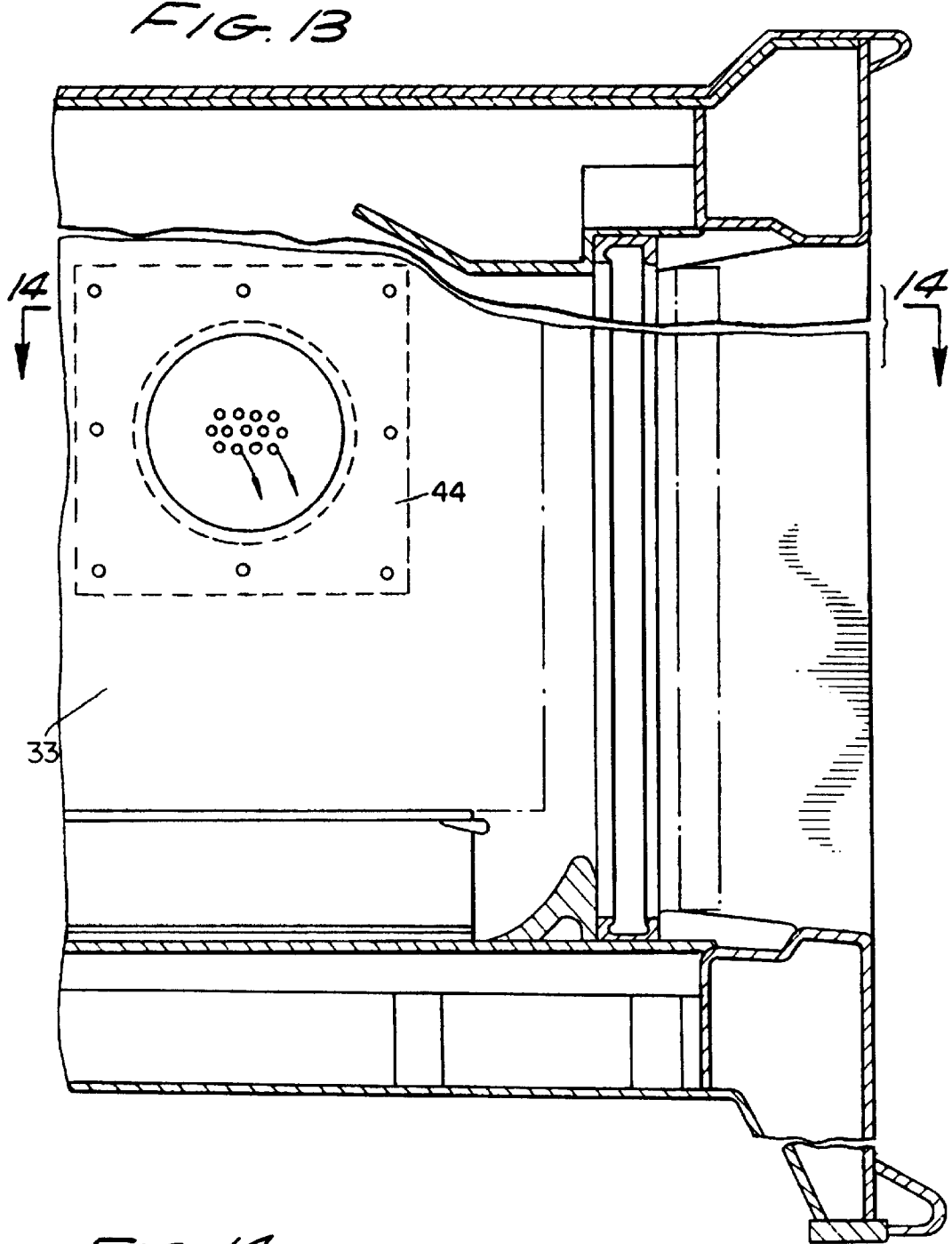
FIG. 13 shows a side elevation view, in cross-section, taken on line 13—13 of FIG. 7, of a portion of the container depicted in FIGS. 4–11.

FIG. 13 shows a side elevation view, in cross-section, taken on lines 13—13 of FIG. 7, showing the placement of port member 44 in side wall 33.

Figure 14:
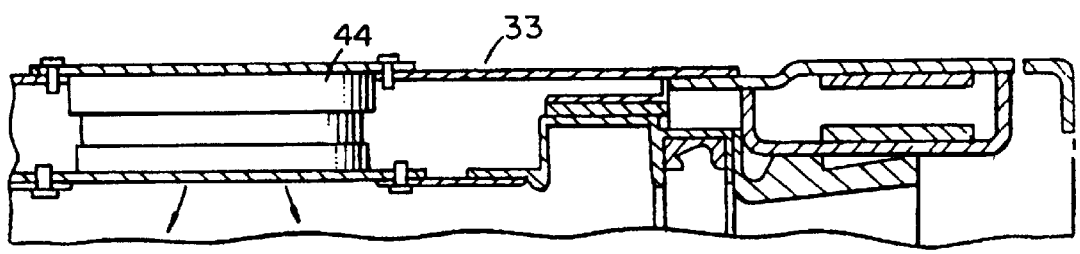
FIG. 14 shows a top plan view, in cross-section, taken on line 14—14, of one side wall of the container shown in FIG. 13.

FIG. 14 shows, in cross-section, taken on lines 14—14 of FIG. 13, the configuration and placement of port 44 side wall 33.

FIGS. 15–17 show the preferred embodiment of the security container 60 with the preferred embodiment of the monitor-control system 80 removably placed inside container 60. The security container is fastened within insulated container panel 10 by means of flange 61. As FIGS. 15–18 show, the security container monitor-control system can be retrofitted to existing containers by simply forming an opening in front panel 10 of container 1, attaching flange 61 to container panel 10 and mounting security container 60 with its monitor control system 100 inside, in that opening.

Figure 23:
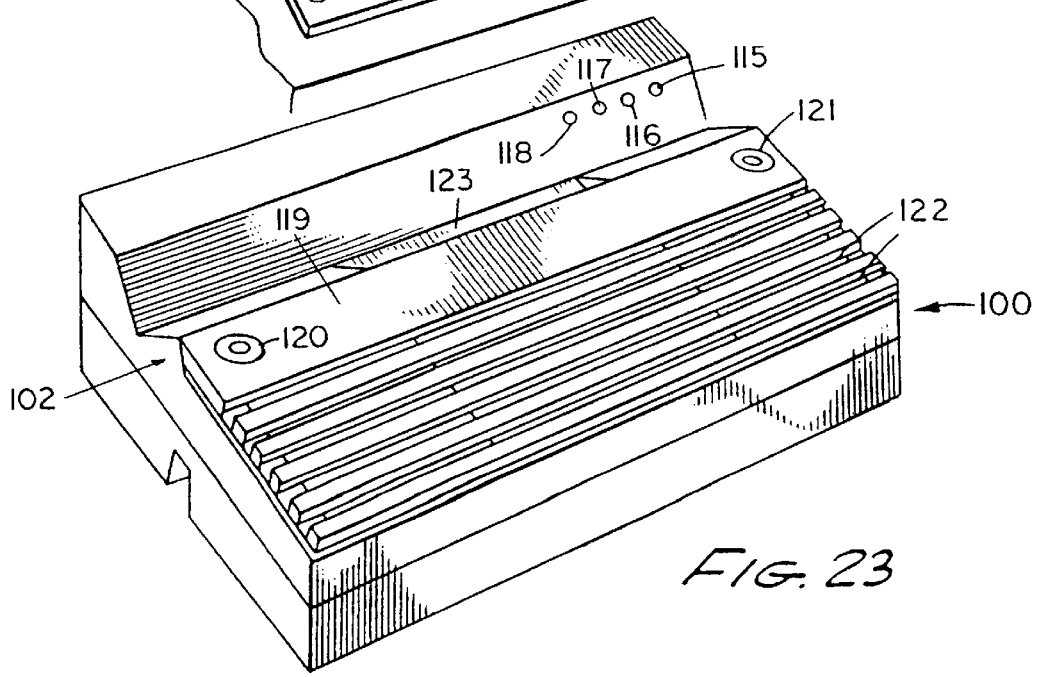
FIG. 23 shows a perspective view of the front panel of the preferred embodiment of the monitor-control system.

FIG. 18 shows, in front elevation view, security container 60, adapted to receive the preferred embodiment of the monitor control system of this invention. The monitor control system security container 60 has a flange 61 for securing the security container over an opening in panel 10 of container 1 shown in FIG. 1. Screws or rivets inserted through openings 59, 62, 63, 64, 65, 66, 67, 68, 69, 70, 71, and 72, fasten security container flange 61 to wall panel 10. Cover 73, hinged at pins 74 and 75, permits cover 73 to open and close on security container 60. Indentation 76 on cover 73 permits a user to view LED openings 115, 116, 117, and 118 of monitor-control system 100 (FIG. 23). Indentation 73A and 73B on cover 73 permits a user to pull cover 73 outwardly and upwardly, providing access to the interior of container 60. Screw fasteners 77 and 78 permit the secure fastening of cover 73 over the interior of security container 60. Cover 73 includes slotted plate 79 for passage of gas mixtures through cover 73 and into security container 60.

FIG. 19 shows a rear elevation view of security container 60. Rear panel 91 includes opening 93 for electrical connections, opening 94 for connection of gas passage hose 12, and panel 95 for inflow of outside air through openings provided in panel 95. Container atmosphere exits the container through opening 94. Container atmosphere passes through the wall of container 60, through opening 195, and pass by diffusion through opening 196 (see FIGS. 21 and 28) into the monitor-control system 100.

FIG. 20 shows security container 60 with cover 73 open to expose interior space 90 of the container. The security container is attached to the flange 61 by screws inserted through openings 81, 82, 83, 84, 85, 86, 87 and 88.

Figure 22:
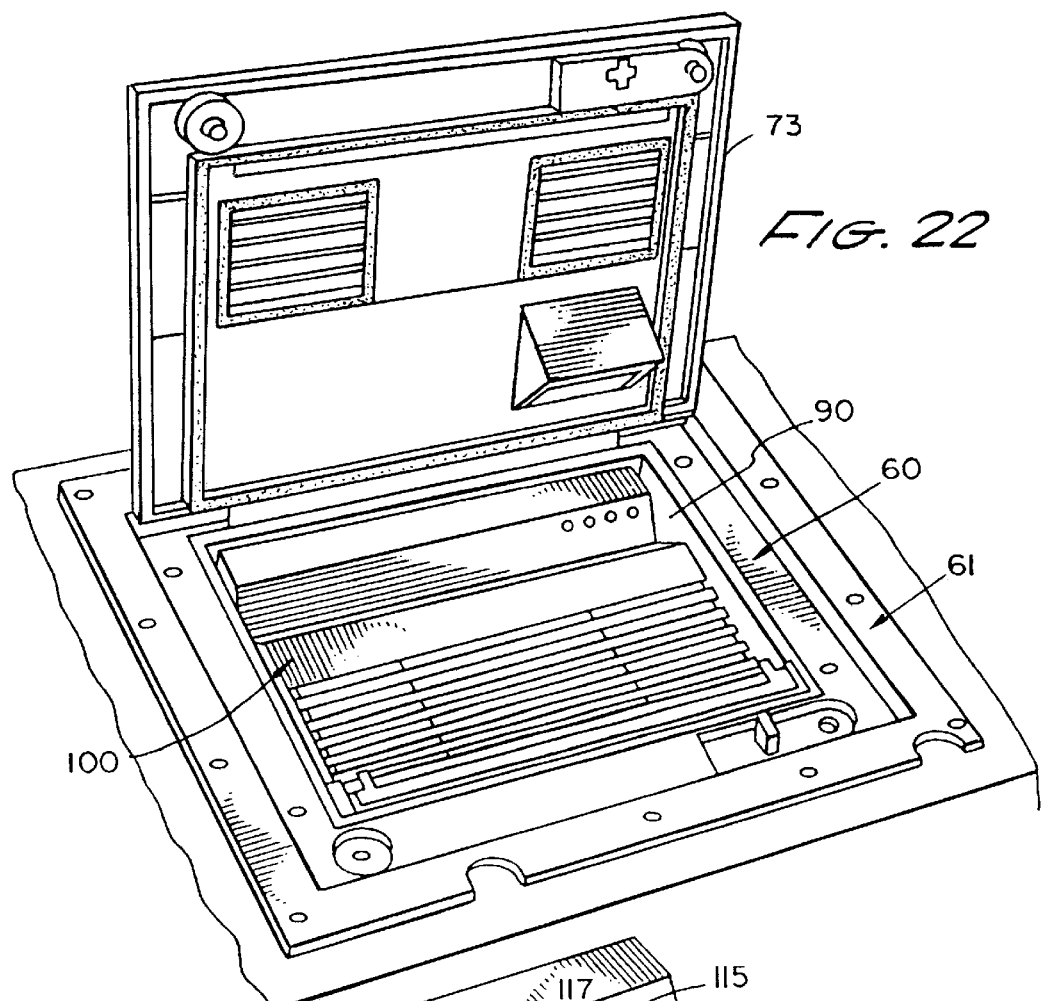
FIG. 22 shows a perspective view of the preferred embodiment of the security container with the preferred embodiment of the monitor-control system in place inside the security container.

FIG. 22 shows the same view of security container 60 as FIG. 20 with monitor-control system 100 inserted in container space 90. When monitor control system 100 is absent from container 60, insulator plug 100A may be inserted into container 60 in its place. Plug 100A (see FIG. 22A) is a block of insulating foam having substantially the same size and shape as system 100, and acts to seal all openings between container 60 and container space 16.

FIGS. 21 and 23 show the rear and front panels of monitor-control system 100, respectively. Rear panel 101 includes opening 102 for electrical cable connection, and panel 103 with a plurality of openings 104, 105, and so on, to permit gases to pass into and out of the monitor-control system. Rear panel 101 is held to front panel 102 of monitor-control system 100 by means of screws 106, 107, 108 and 109. Panel 103 is held in place on rear panel 101 by means of screws 110, 111, 112, 113 and 114.

Front panel 102 of monitor-control system 100 includes LED openings 115, 116, 117, and 118. Panel 102 is tilted outwardly and downwardly around openings 115–118 for easy observation from below system 100. Front panel 102 also includes attached panel 119, which with the indention 123 in panel 102, forms a handle that is used to insert the control system 100 into, and remove system 100 from, security container 60. Fasteners 120 and 121 are used to secure control system 100 to security container 60. Panel 119 includes slotted openings 122 to permit passage of gas mixtures into and out of monitor-control system 100.

FIG. 24 shows the internal configuration of the preferred embodiment of monitor-control system 100. Inside monitor-control system 100 is slider valve 125 which slides to the left to cover, and to the right to uncover openings 126 and 127 to permit gases to pass into and out of the monitor-control system, and thus into and out of interior space 16 of container 1. Slider valve 125 is attached to stepper-motor shaft 128, and is adapted to move left and right from the fully closed position to the fully open position in small incremental steps, depending upon the desired inflow and outflow of air into the container, or gases from the container to the outside.

Sensor board 133 includes oxygen sensor 130 and carbon dioxide sensor 131. Sensor board 133 is electrically linked via cable connector 132 to microprocessor board 129. Microprocessor board 129 carries a microprocessor and associated electronics for programming desired carbon dioxide and oxygen concentration setpoints, deadband values around those setpoints; for receiving signals from carbon dioxide concentration sensor 131 and oxygen sensor 130; and for comparing those sensed values with the desired values and generating signals appropriate to maintaining oxygen and carbon dioxide concentrations at desired setpoints or within desired deadband values around such setpoints. Openings 126 and 127, when the monitor-control system is assembled, mate with openings 134 and 135. Opening 135 permits outside air to pass through opening 95 and enter container 60. Opening 134 is the duct through which container gases exit the container interior space, and connects to opening 94, of the security container, for this purpose.

Figure 32:
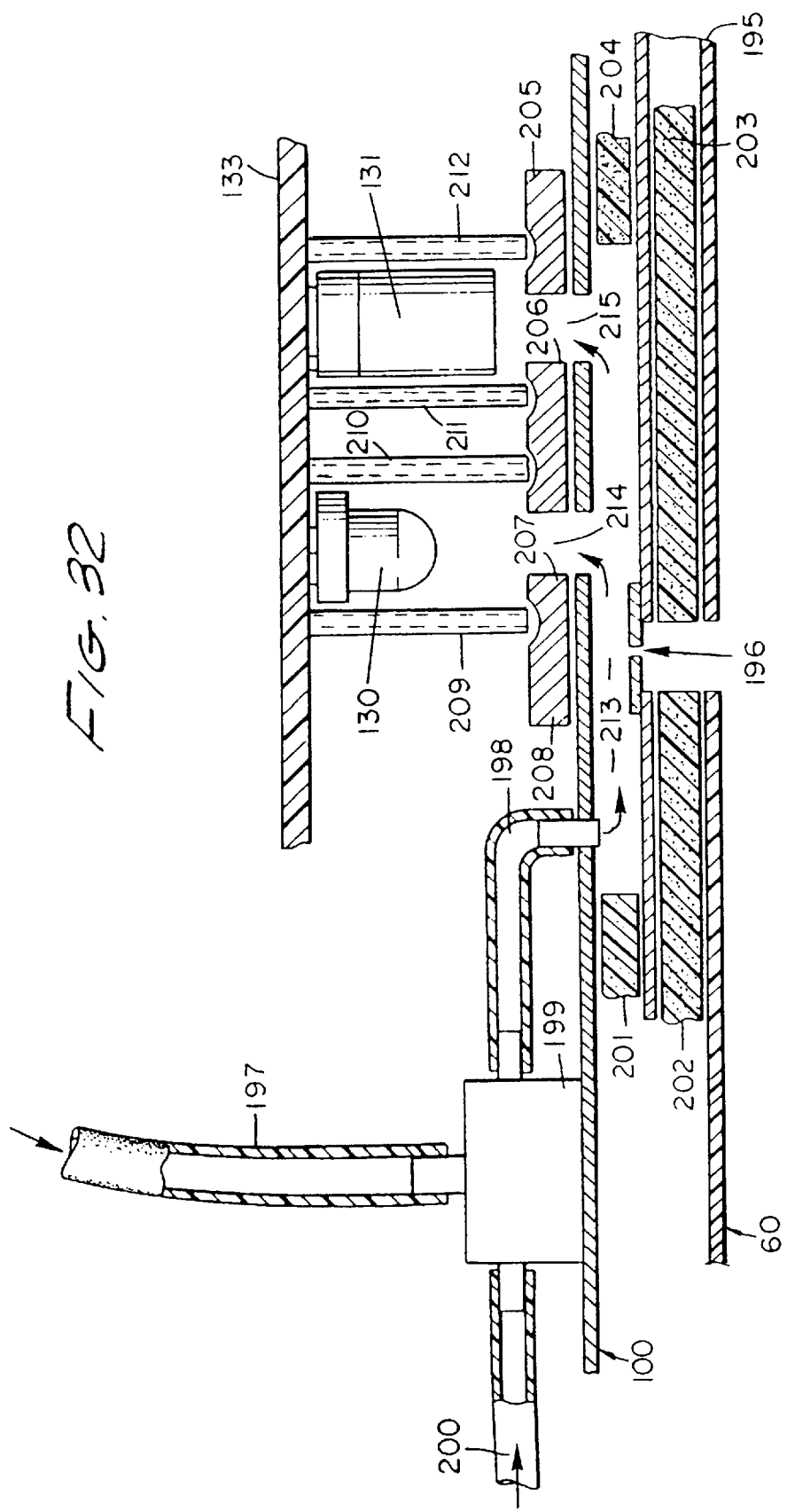
FIG. 32 is a schematic diagram for the construction and operation of the self-calibrating mechanism in a preferred embodiment of the monitor control system of this invention.

FIG. 32 shows the construction and operation of the self-calibrating mechanism in the monitor-control system 100. Attached to the interior wall of system 100 is three-way solenoid valve 199. Container atmosphere flows to valve 199 through tubing 200. Outside air, for calibration, flows to valve 199 through tubing 197. Gases exit valve 199 through tubing 198 and flow through paths 213, 214 and 215 to the oxygen and carbon dioxide sensors, respectively. During self-calibration, outside air only flows to carbon dioxide sensor 131 and oxygen sensor 130, and the signals from these sensors determine whether the sensors are accurately detecting the concentration of these gases. If they are not, the sensors may be replaced or recalibrated until they do accurately reflect the concentration of these gases in air. Thereupon, valve 199 shuts off the flow of outside air, and admits container atmosphere to enter the valve through tubing 200 and to leave the valve through tubing path 198. Gaskets 201, 202, 203, 204, 205, 206, 207 and 208 and sensors chamber walls 209, 210, 211 and 212 prevent unwanted gases from entering either sensor chamber or the passages leading to the sensor chambers.

FIGS. 25 and 26 show top plan, cross-sectional views of security container 60 with monitor-control system 100 inside container 60. These views show the flow of container atmosphere and outside air through passages 134 and 135, respectively, when slider valve 125 is opened.

Figure 27:
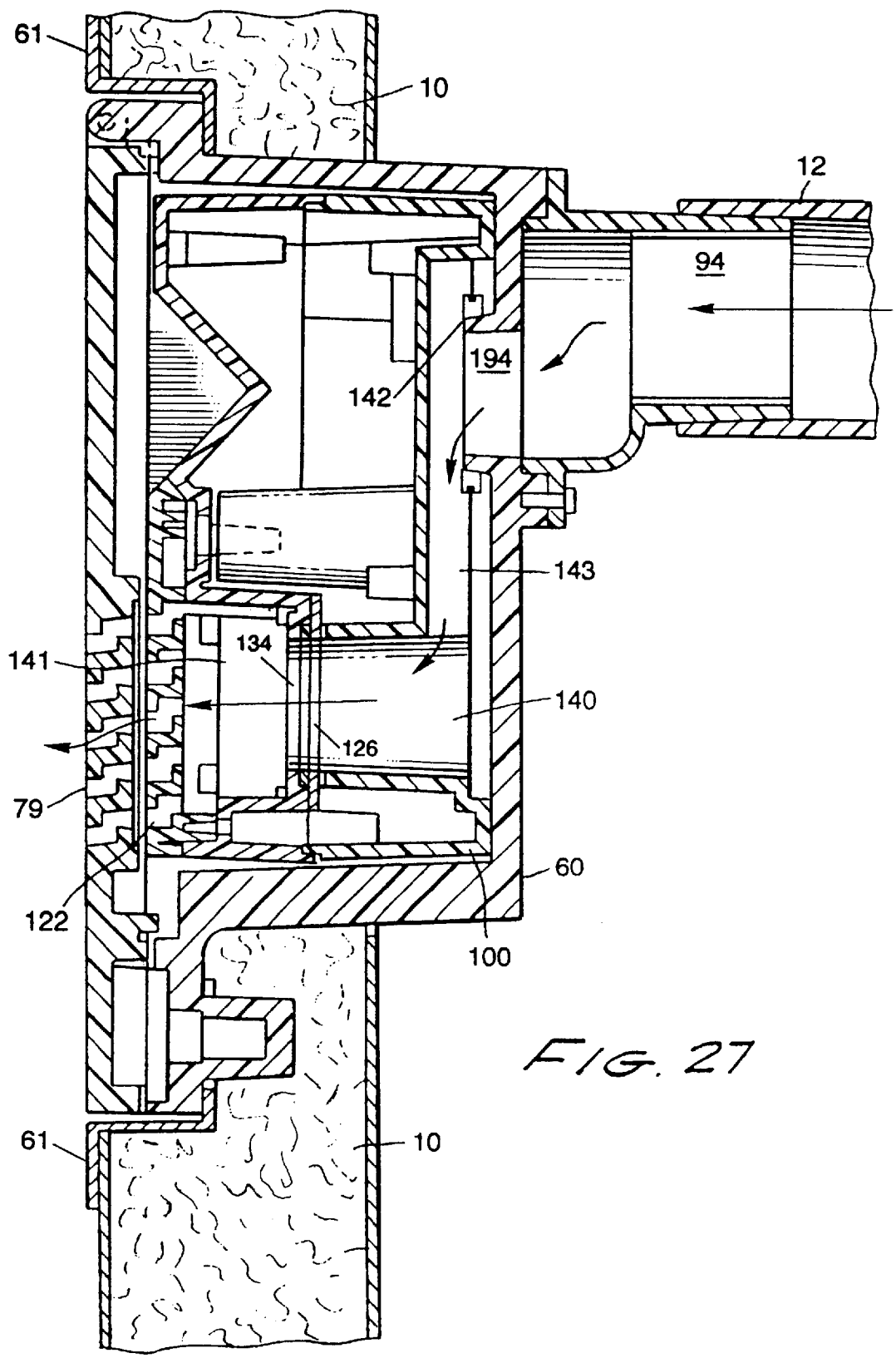
FIG. 27 is a side elevation view, in cross-section, taken on line 27—27, of FIG. 18, showing the preferred embodiment of the security container and the preferred embodiment of the monitor-control system inside the security container.
Figure 28:
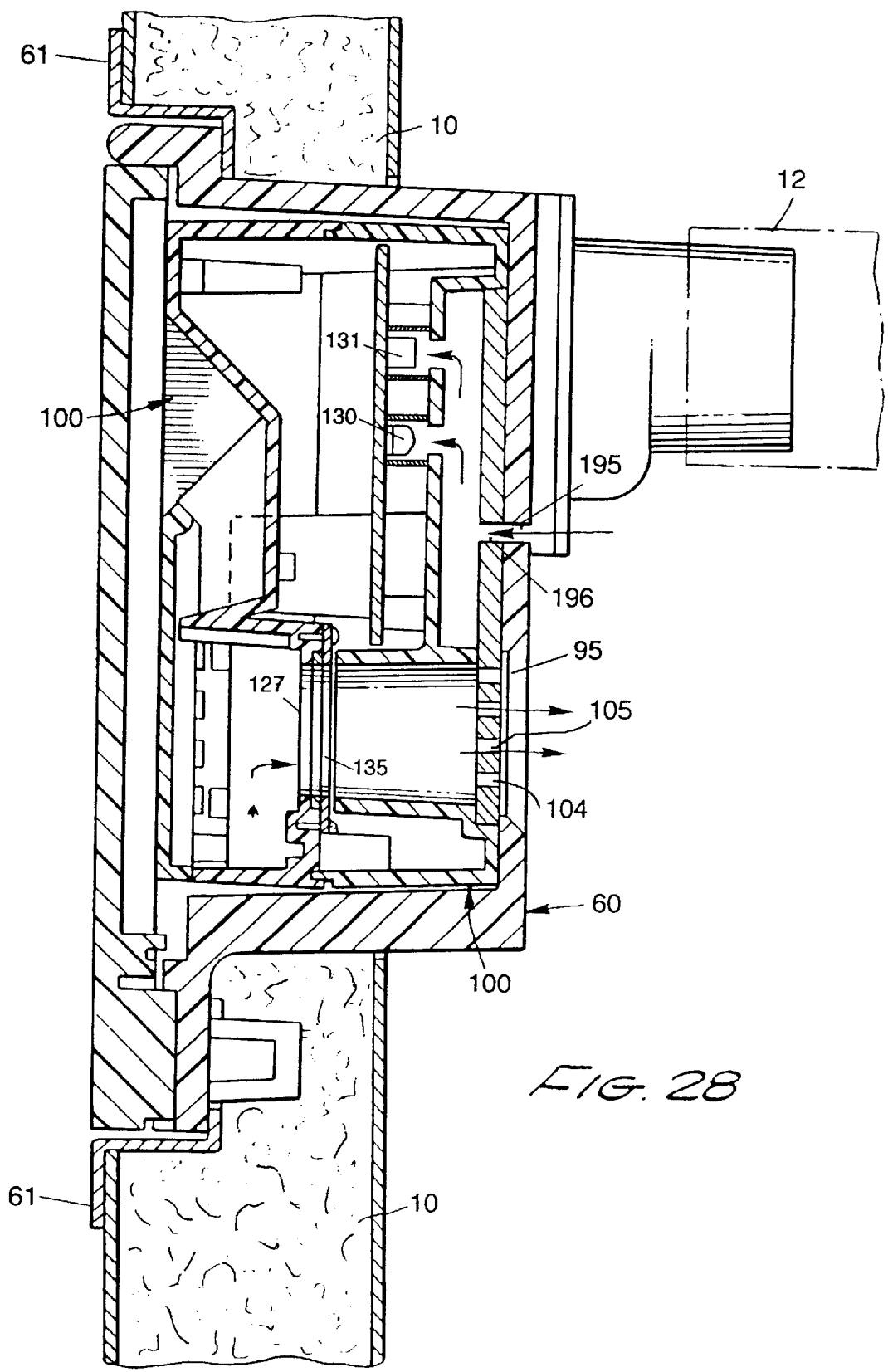
FIG. 28 is a second side elevation view, in cross-section, taken on line 28—28, of FIG. 18, of the preferred embodiment of the security container with the preferred embodiment of the monitor-control system inside the security container.
Figure 29:
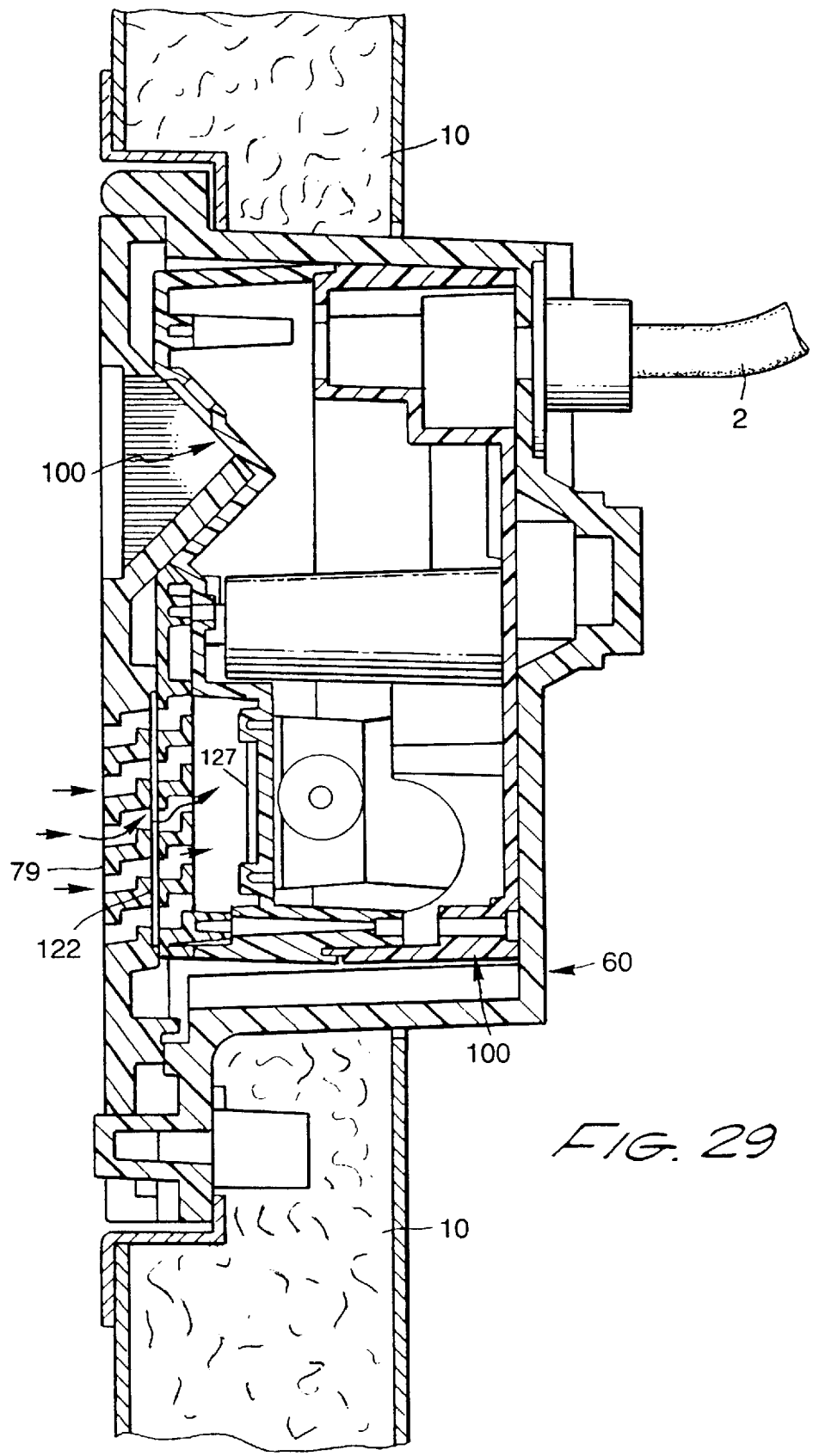
FIG. 29 is a side elevation view, in cross-section, taken on line 29—29, of FIG. 18, and showing another view of the preferred embodiment of the monitor-control system inside the preferred embodiment of the security container.

FIGS. 27–29 show the flow of gases through hose 12 and the back wall of security container 60, and through opening 142 in monitor-control system 100. Gases then flow through passages 143, 140, and 141 to exit the monitor-control system through slotted openings 122 in monitor-control system 100 and slotted opening 79 in security container 60. FIG. 29 shows passages for atmosphere to enter through slotted opening 79 in security container 60, through slotted openings 122 in monitor-control system 100, through valve openings 127 and in FIG. 28 through valve openings 127 and 135 to opening 95 in security container 60 rear panel 91 and into container 1 interior space 16. FIG. 28 also shows passages for container gasses to enter monitor-control system 100 through opening 195 of security container 60 to opening 196 of monitor-control system 100, for continuous sensing of oxygen and carbon dioxide concentrations by sensors 130 and 131.

Figure 30:
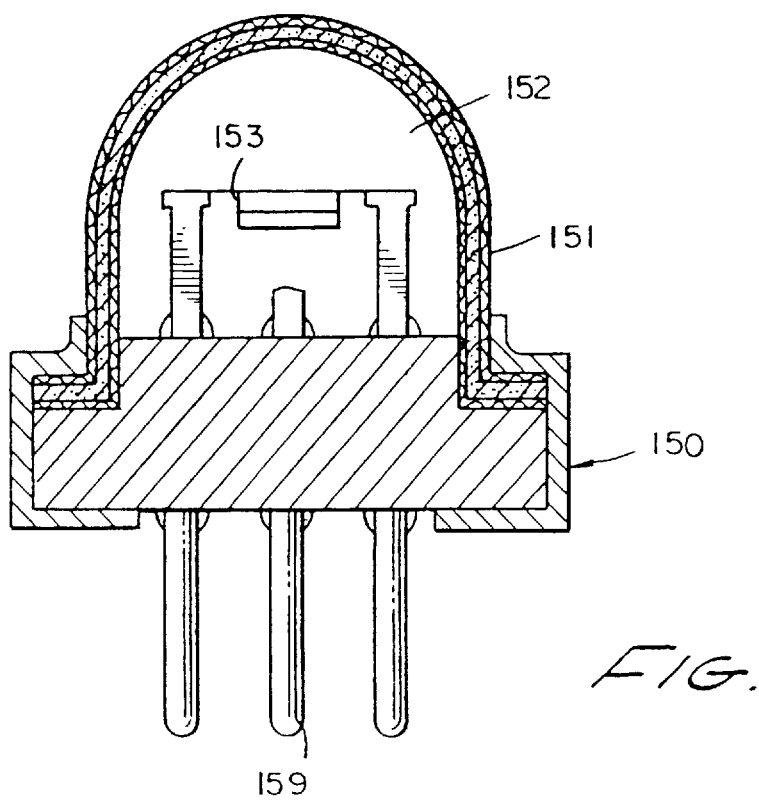
FIG. 30 is a side elevation view, in cross-section, of the preferred embodiment of the oxygen sensor of this invention.
Figure 31:
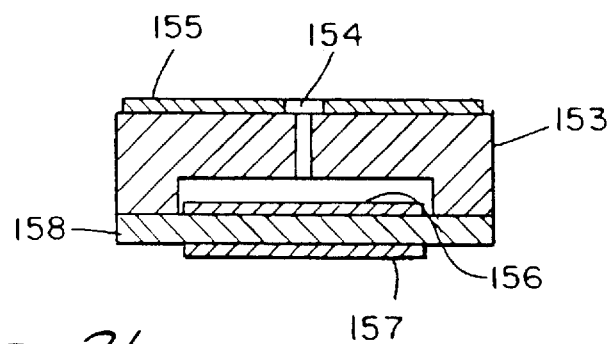
FIG. 31 is an enlarged side elevation view of a portion of the oxygen sensor shown in FIG. 30.

FIGS. 30 and 31 show the configuration of the preferred embodiment of the oxygen sensor, generally designated 150.

Gases from interior 16 of container 1 pass into monitor-control system 100, and then through gas-permeable membrane 151 into interior 152 of sensor 150. These gases then pass through small opening 154 in element 153. Element 153 includes heater 155, and electrodes 156 and 157, which lie on either side of stabilized zirconia element 158. Zirconia element 158 is permeable to oxygen, but not to other gases. A voltage is applied to each of elements 156 and 157, and the voltage difference arising when oxygen passes through element 158 is proportional to the oxygen concentration at the surface of membrane 158. The resulting voltage difference signal appears across two pins, one of which is pin 159, the signal is processed by the circuits of the sensor board and, in digital form, passes to the microprocessor via cable connector 132 (see FIG. 24).

Figure 33:
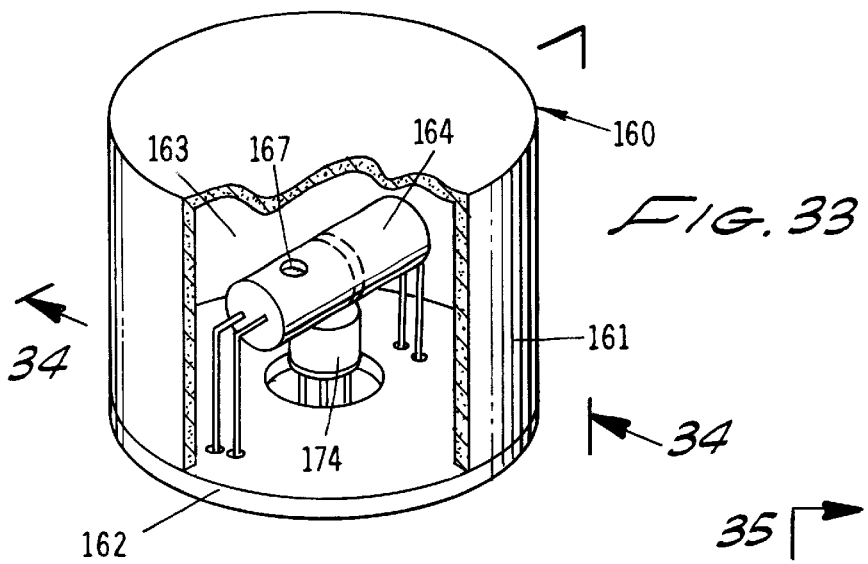
FIG. 33 shows a perspective view, in partial cross-section, of the preferred embodiment of the carbon dioxide concentration sensor used in the preferred embodiment of the monitor control system.
Figure 34:
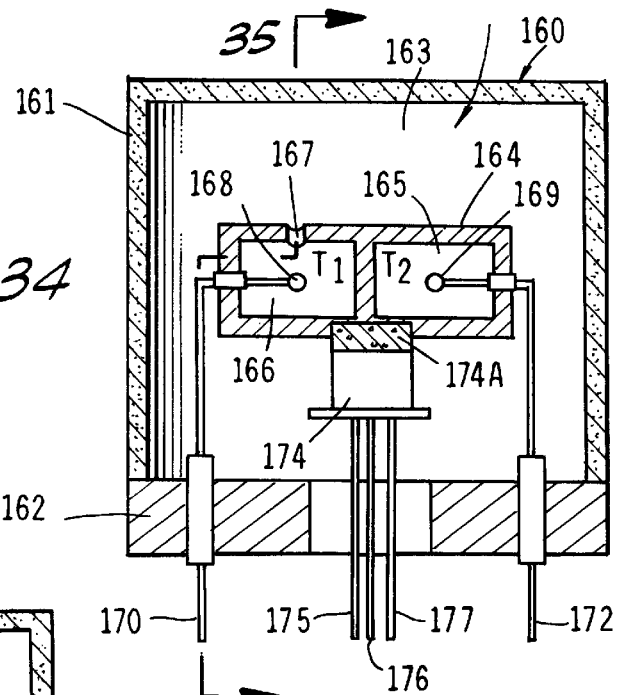
FIG. 34 shows a front elevation view, in cross-section, on line 34—34, of FIG. 33, showing the internal construction of the carbon dioxide concentration sensor shown in FIG. 33.
Figure 35:
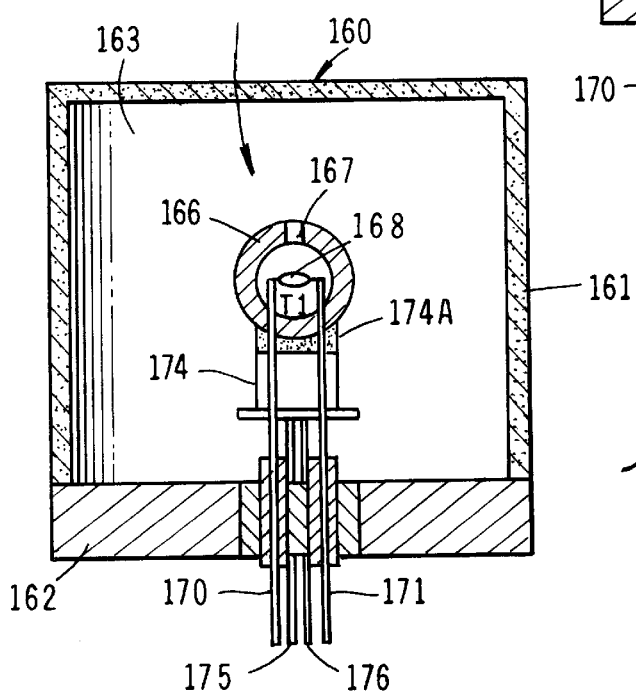
FIG. 35 shows a side elevation view, in cross-section, taken on line 35—35, of FIG. 34, of a portion of the carbon dioxide concentration sensor.

FIGS. 33–35 show a preferred embodiment of the carbon dioxide concentration sensor 160. This sensor includes gas-permeable membrane 161 attached to plate 162, which is gas impermeable, forming interior space 163. Within interior space 163 is metal container 164 divided into two chambers 165 and 166. Chamber 166 has opening 167 to admit gases from the container. Within chamber 166 is thermistor 168. Inside chamber 165 is reference thermistor 169. Thermistor 168 is attached to electrical leads 170 and 171. Thermistor 169 is attached to leads 172 and 173.

Each of thermistors 168 and 169 has the same applied current. Thus, if thermistor 168 is operating in a gas mixture similar to that in the sealed reference chamber 165, both thermistors will operate at substantially the same temperature and will therefore have approximately the same electrical resistance. The bridge circuit will be balanced under these conditions. If the gas mixture in chamber 166 contains carbon dioxide, the temperature of thermistor 168 will change, causing a change in the resistance of thermistor 168. The unbalancing of the bridge circuit which results from this resistance change provides an output voltage change which is a measure of the carbon dioxide concentration.

The temperatures of thermistors 168 and 169 are influenced by the temperature of the metal container 164. Therefore, the data obtained from the output of the bridge circuit is temperature-corrected to obtain accurate carbon temperature sensor temperature sensor 174, coupled to the metal container 164 by thermally conductive epoxy 174A, provides a temperature-proportional voltage output which is used to derive the required correction factor.

Oxygen concentration also influences the temperature of thermistor 168, and therefore the data obtained from the oxygen sensor is also used to derive a correction factor for the determination of carbon dioxide concentration.

Figure 36:
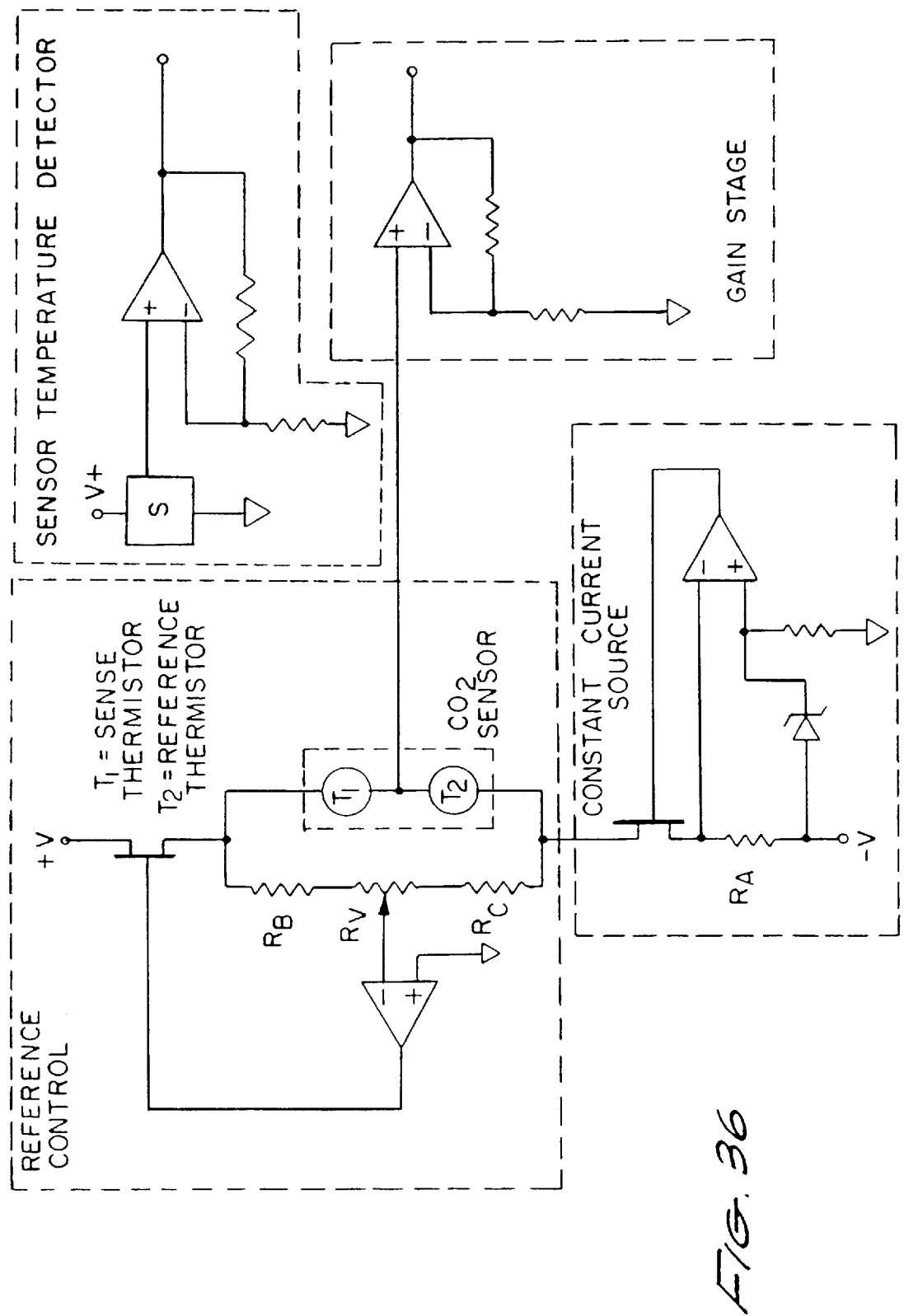
FIG. 36 shows a schematic wiring diagram for the circuitry that controls the preferred embodiment of the carbon dioxide concentration sensor shown in FIGS. 33–35.
Figure 37A:
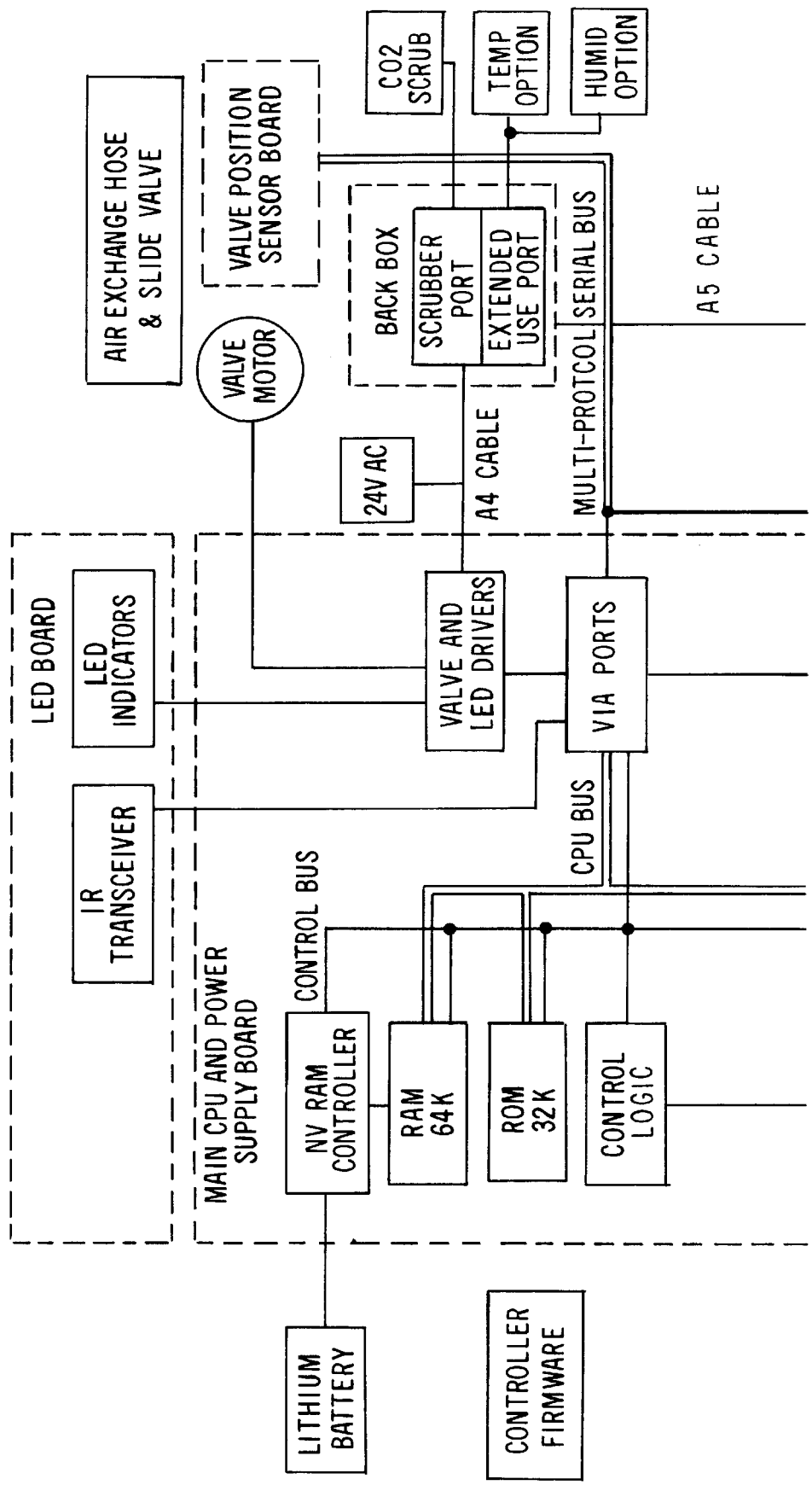
FIGS. 37A and 37B show in block diagram form, the microprocessor system, the sensors and the power supply.
Figure 37B:
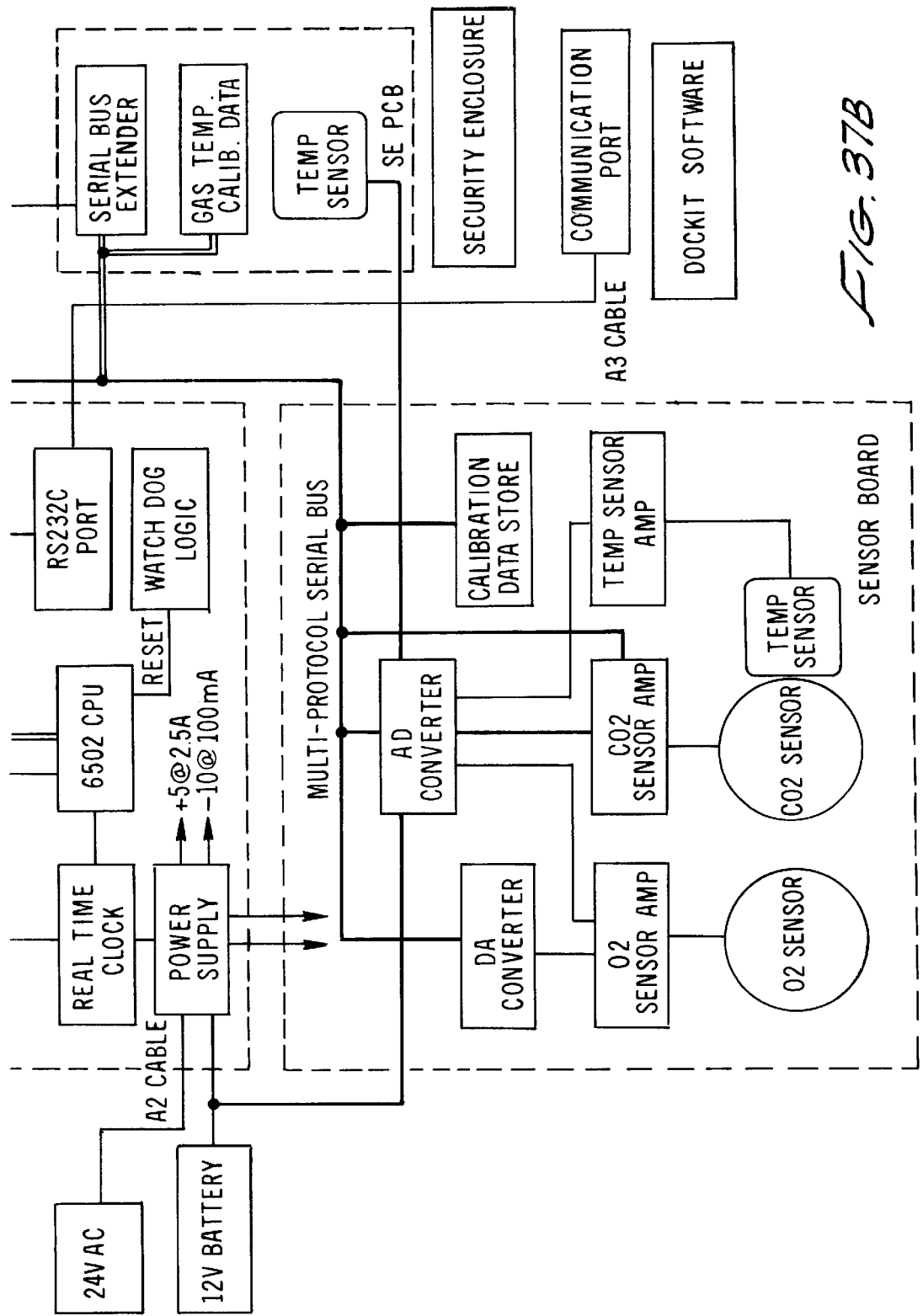
Figure 38:
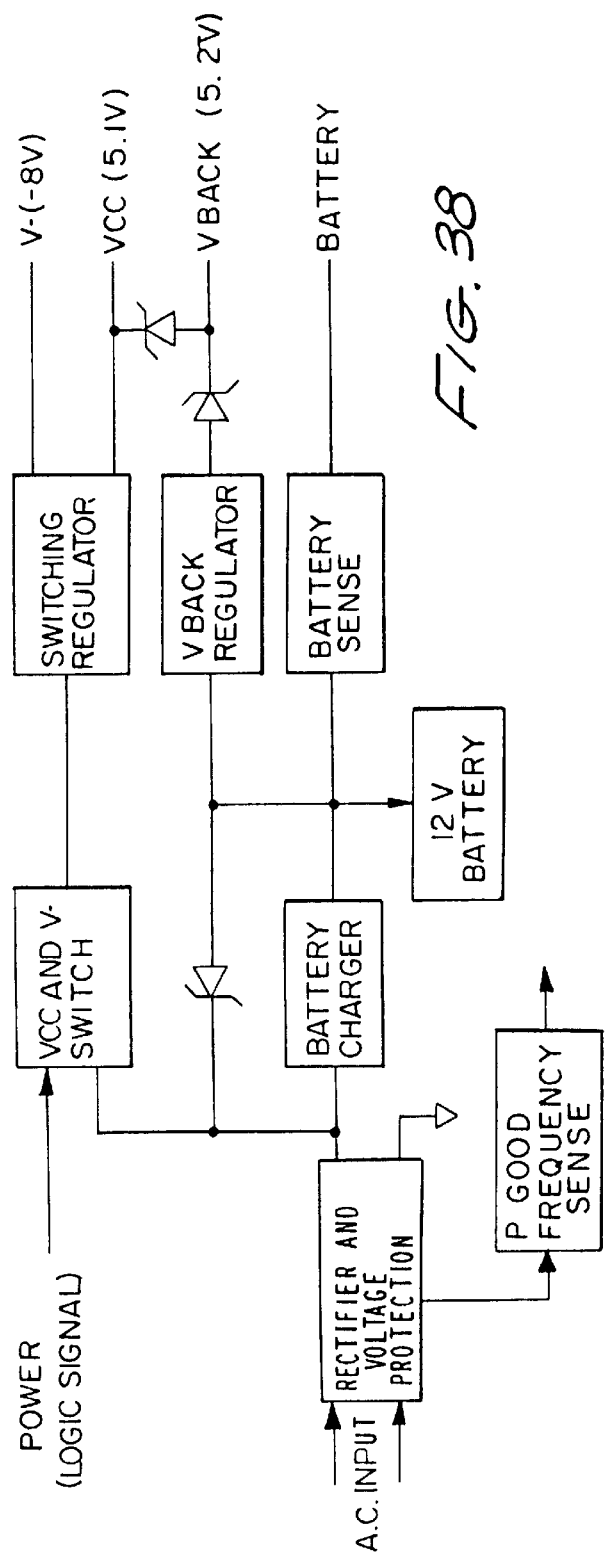
FIG. 38 shows a block function diagram of the power supply system including battery circuits, a regulator for back-up power (V BACK), switching regulator, and associated ON-OFF switch and input protection rectification circuits.
Figure 39:
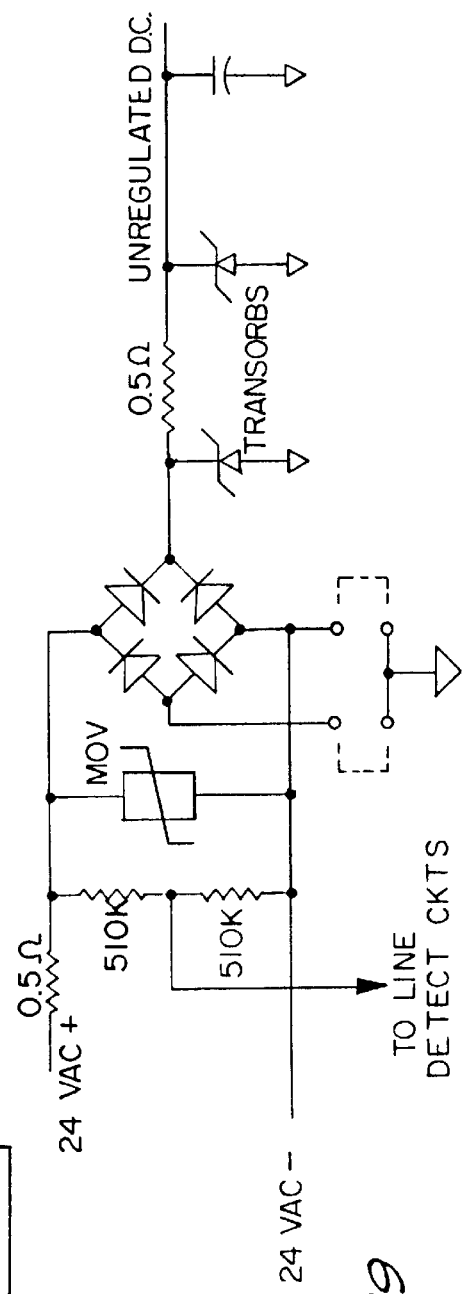
FIG. 39 shows a schematic diagram of a rectifier and voltage-protection circuitry in the preferred embodiment of the monitor control system.
Figure 40A:
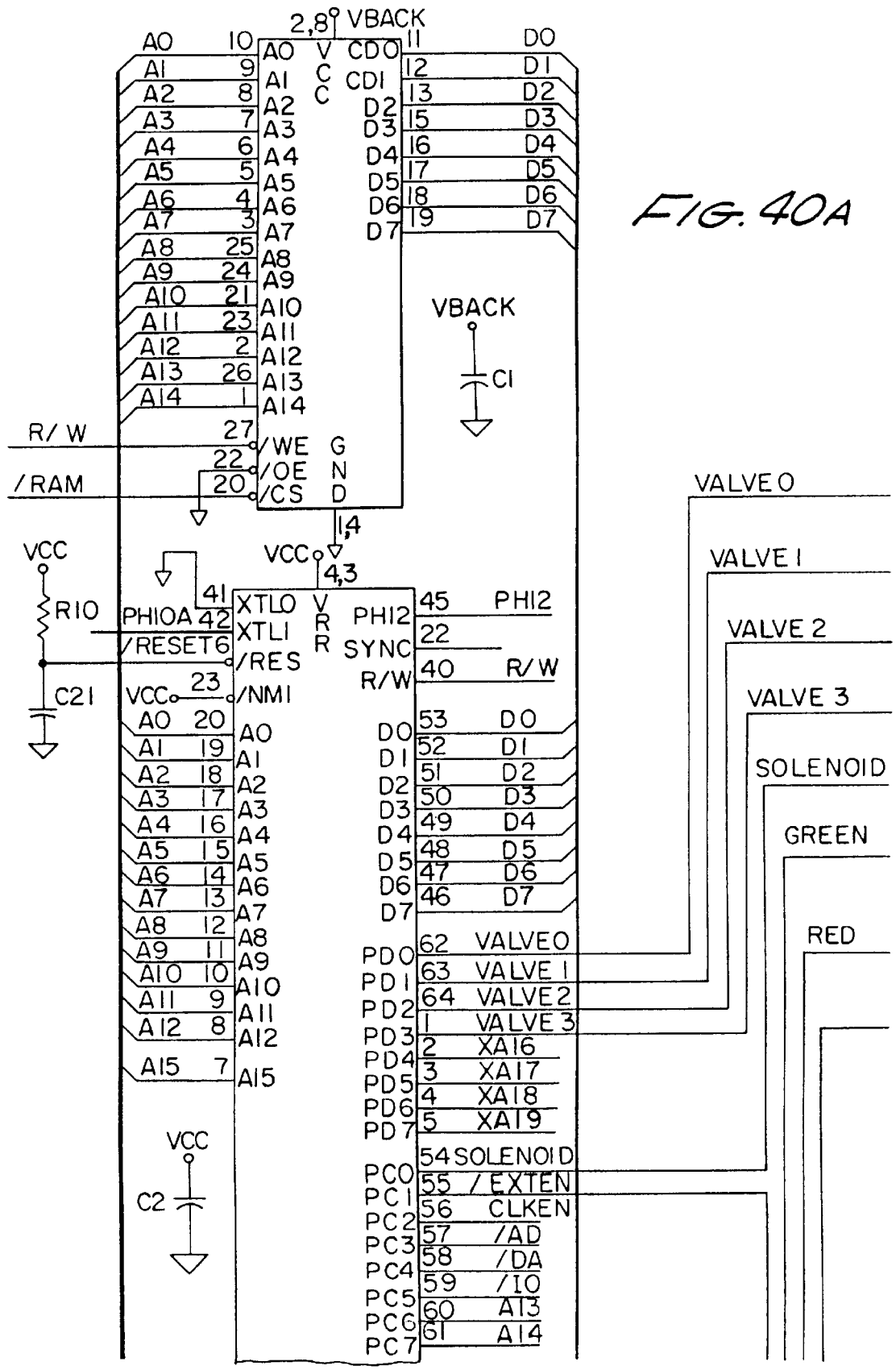
FIGS. 40A through 40V show a schematic wiring diagram for the connections on the board in the preferred embodiment of the monitor-control system's microprocessor system.
Figure 40E:
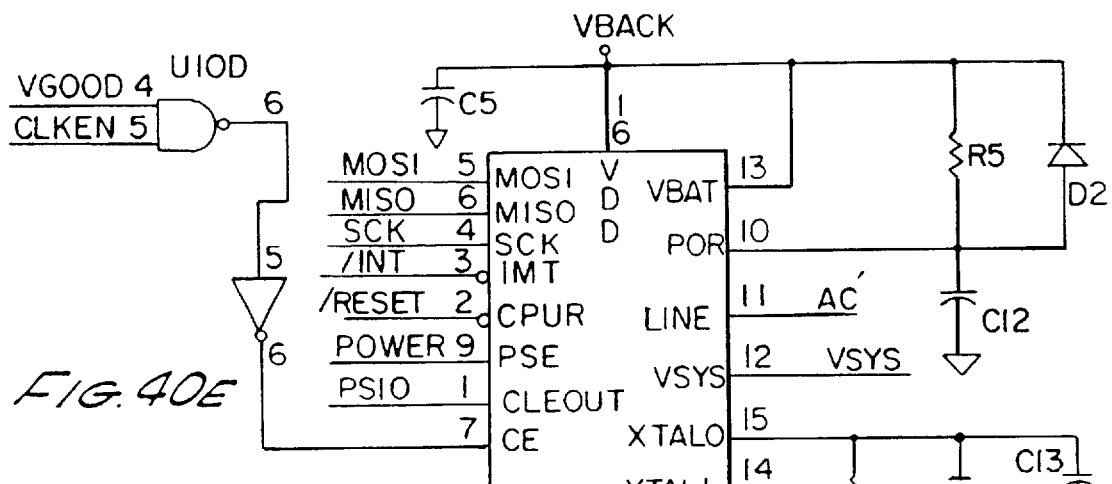
Figure 40B:
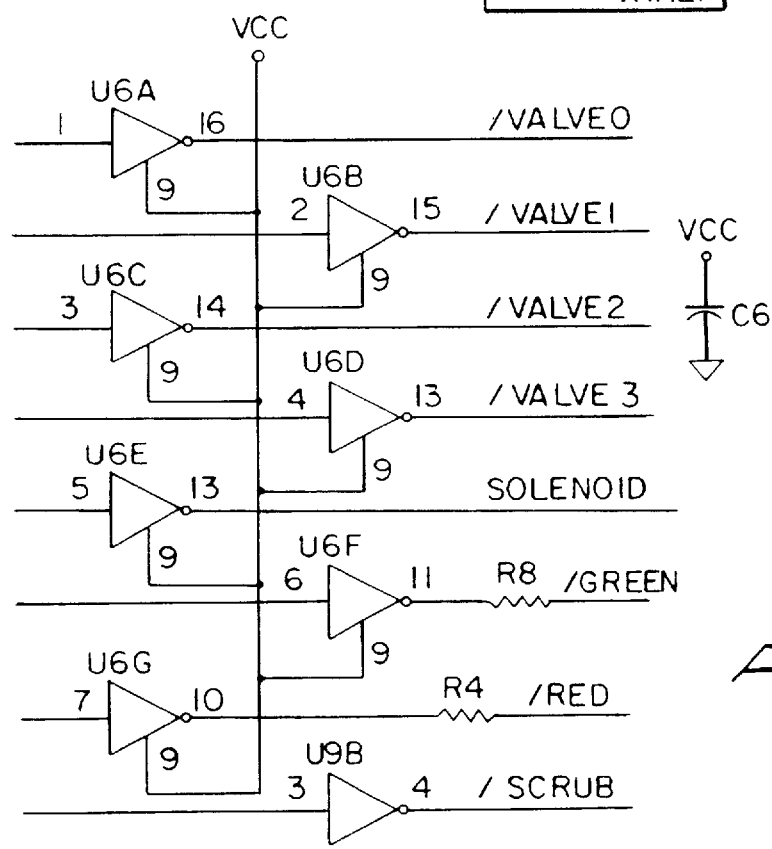
Figure 40F:
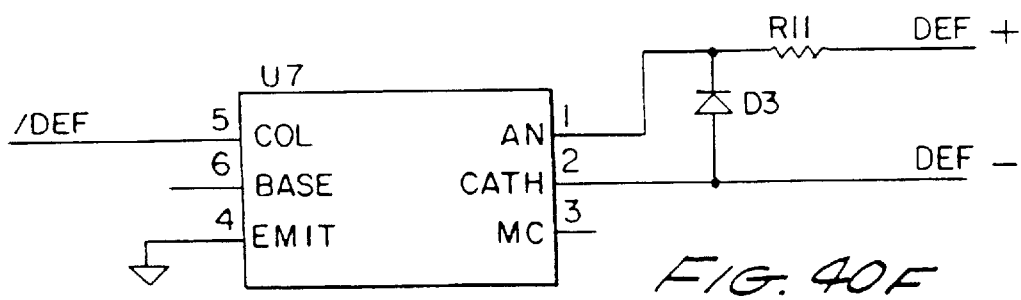
Figure 40C:
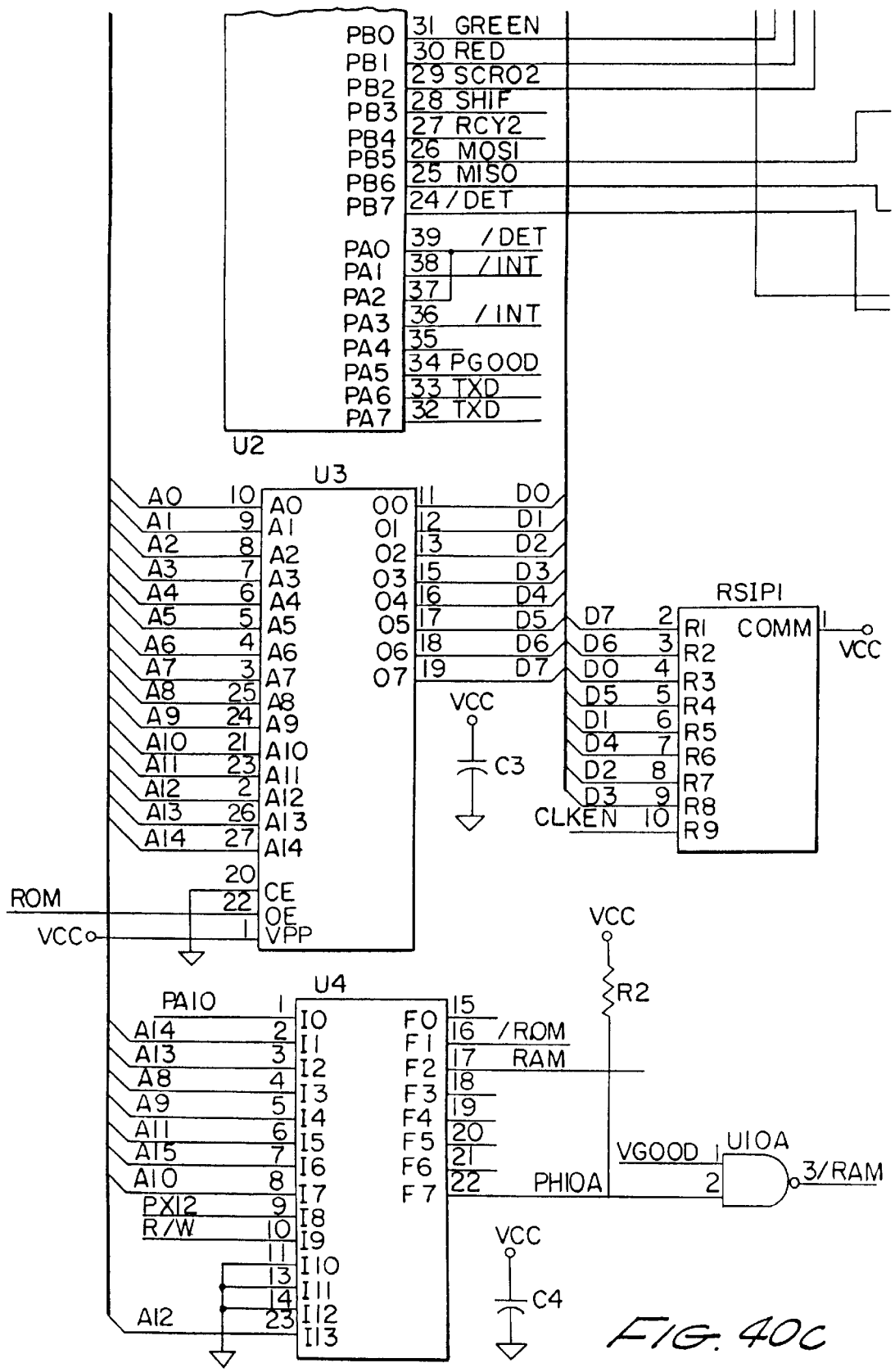
Figure 40D:
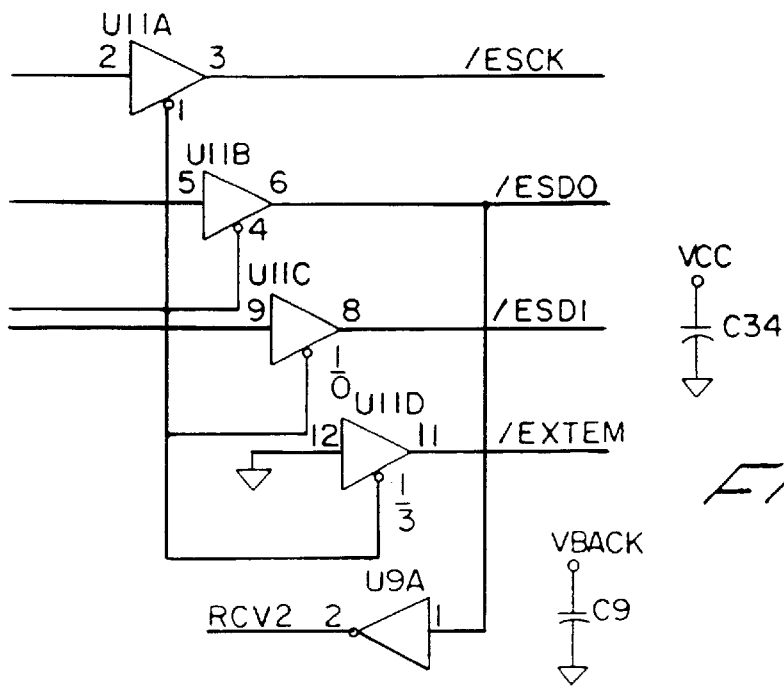
Figure 40G:
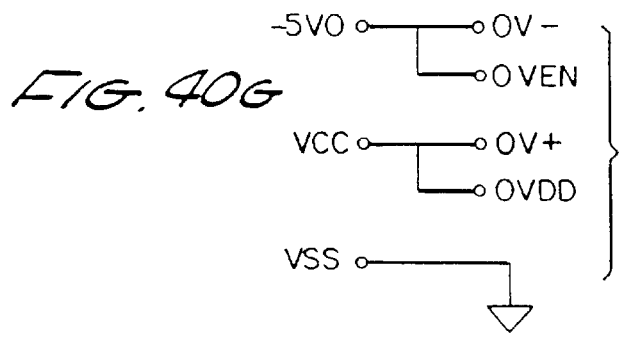
Figure 40H:
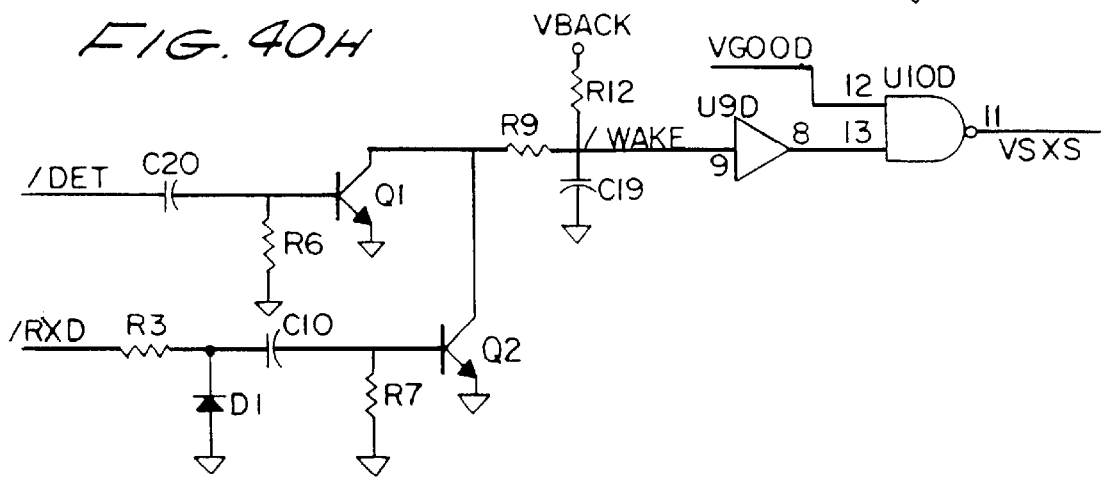
Figure 41A:
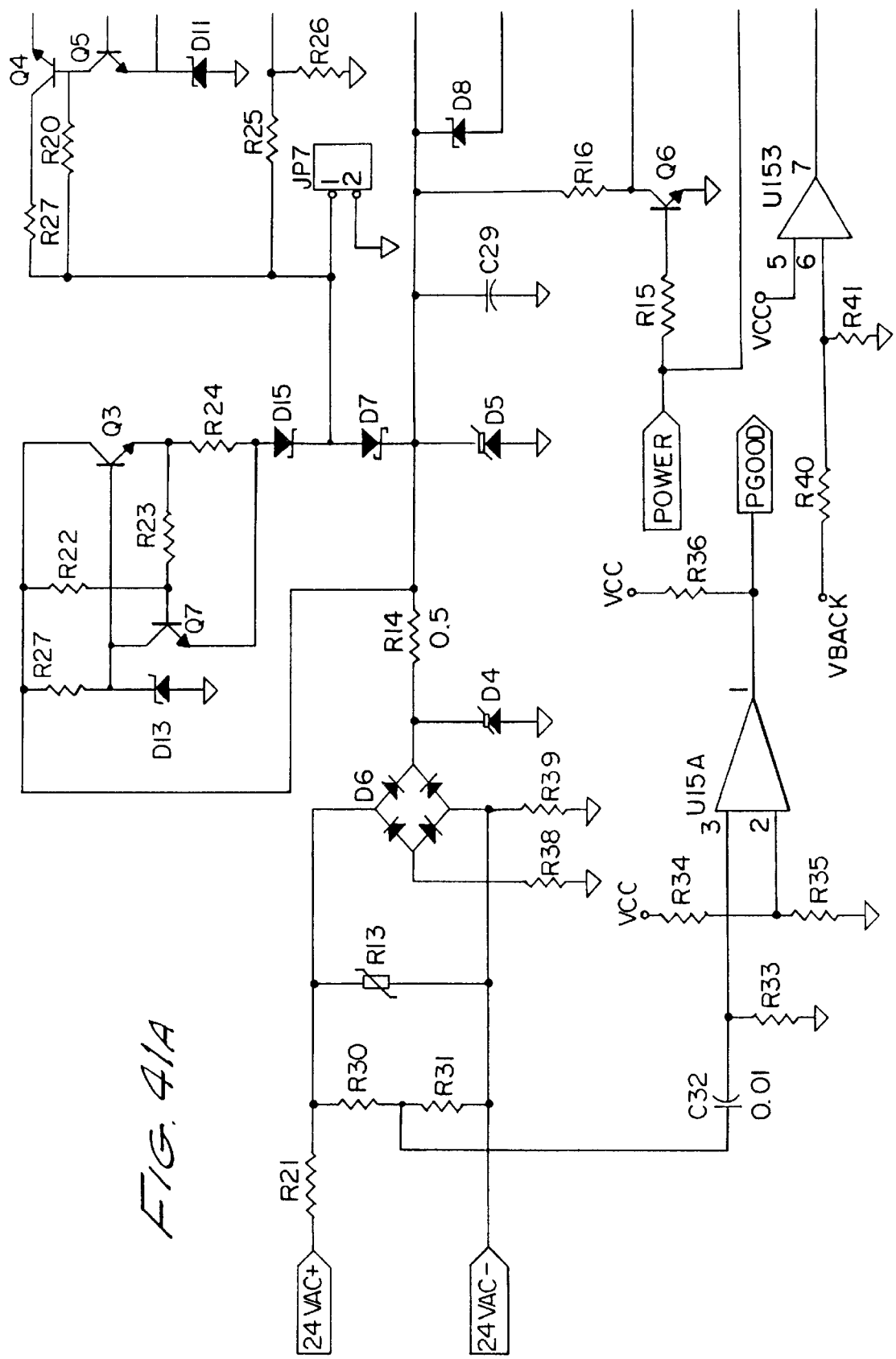
Figure 42A:
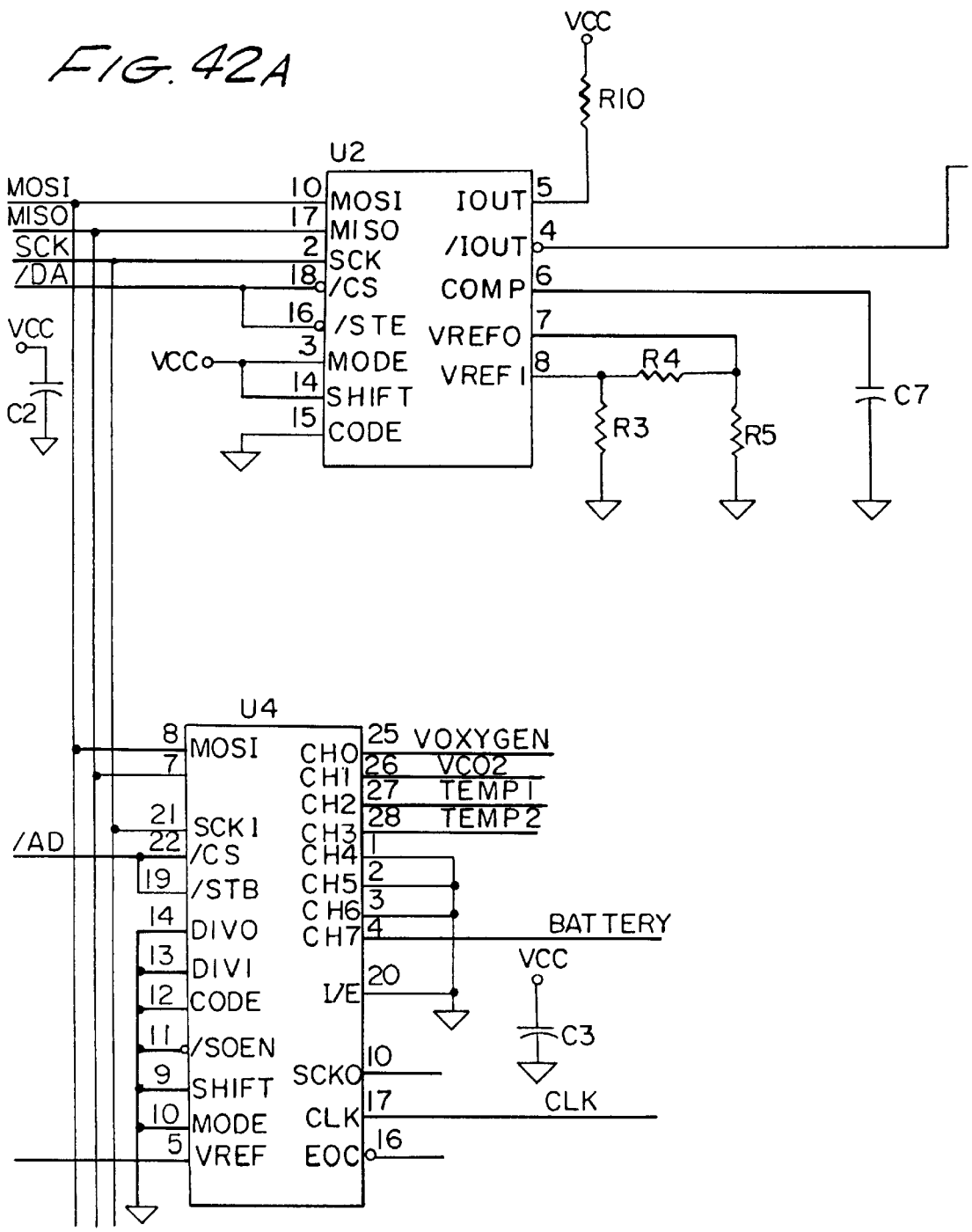
Figure 42B:
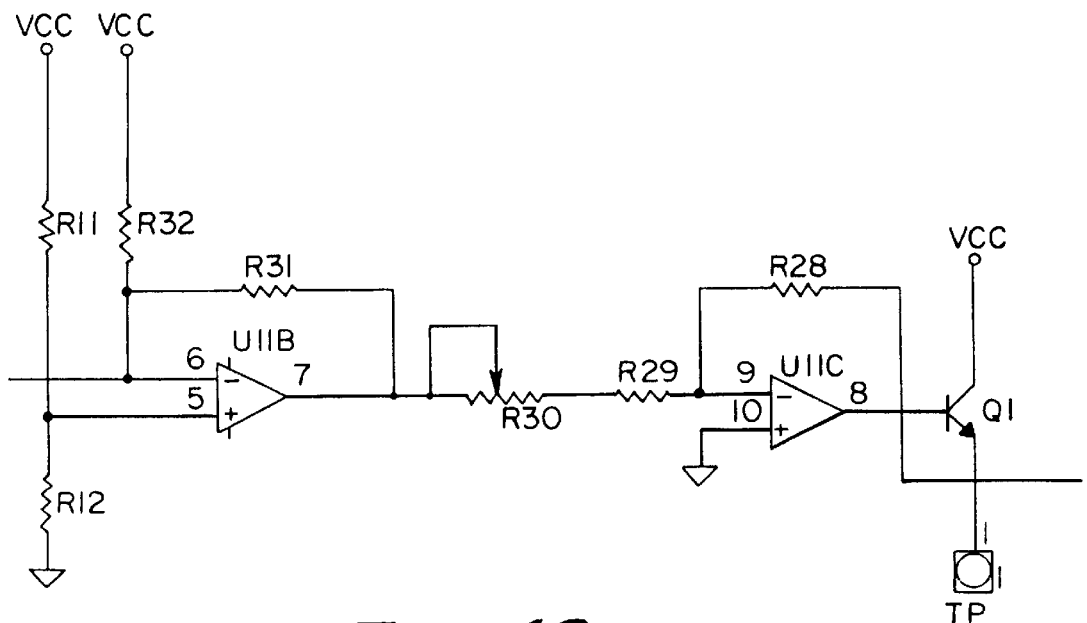
Figure 42E:
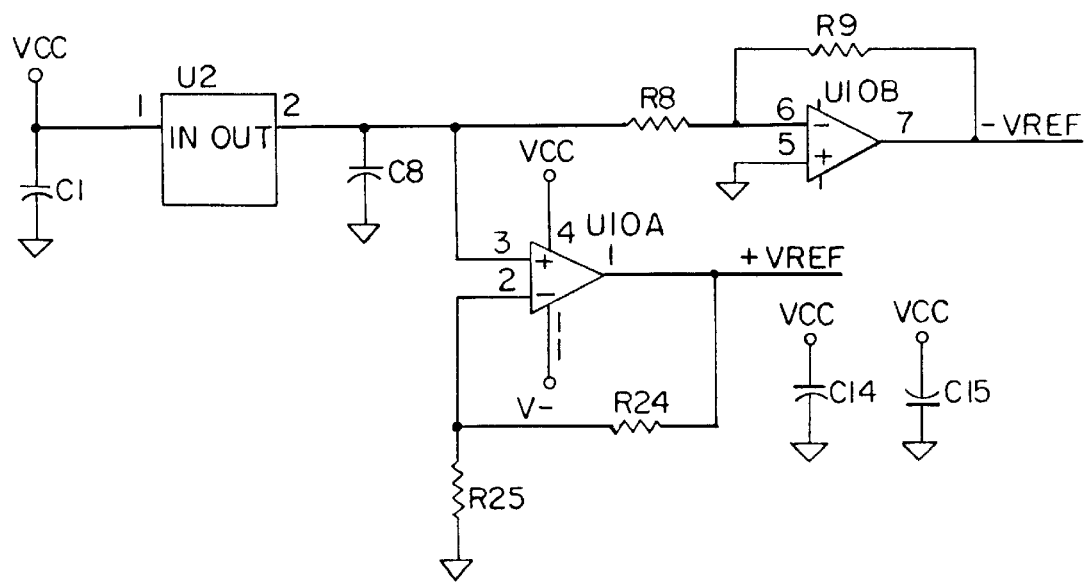
Figure 42C:
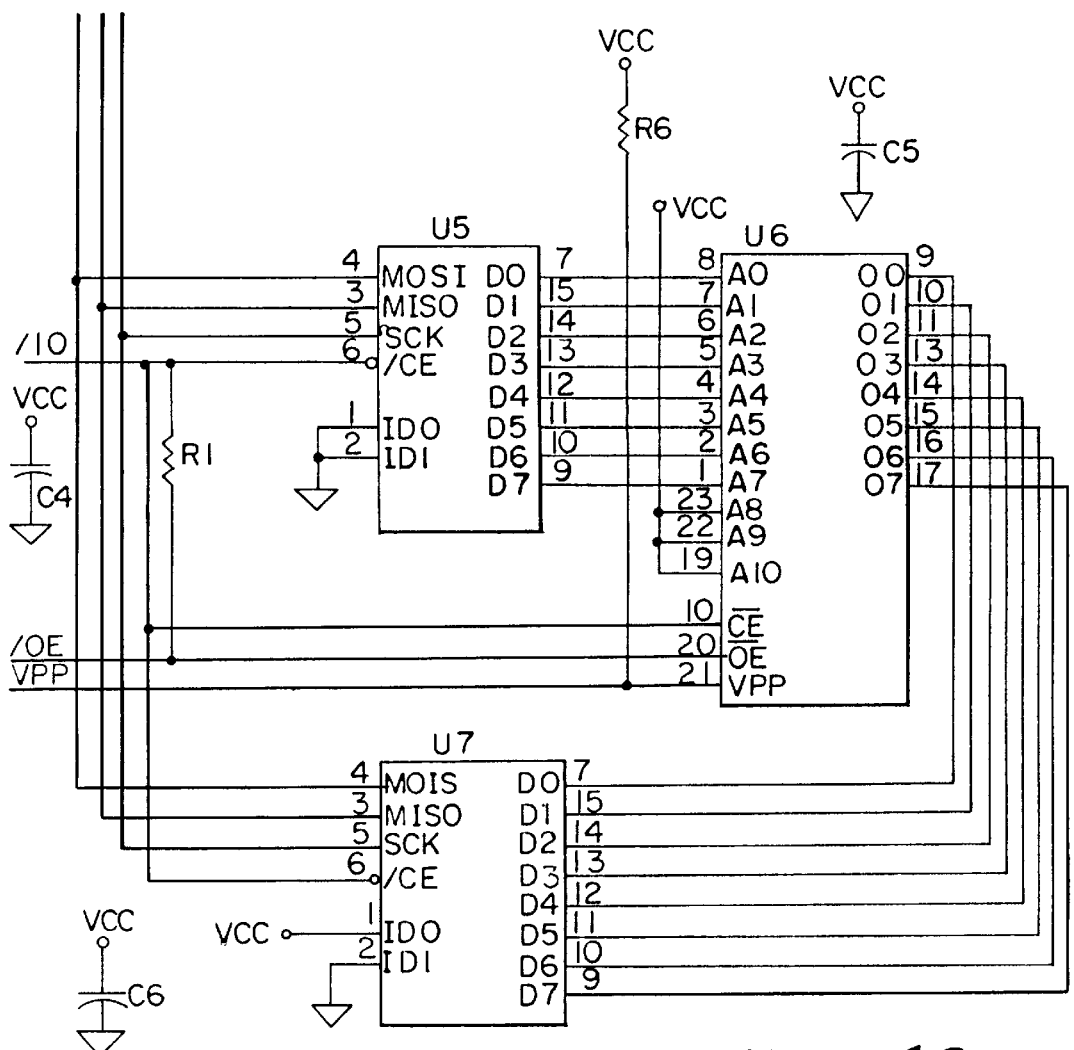
Figure 42D:
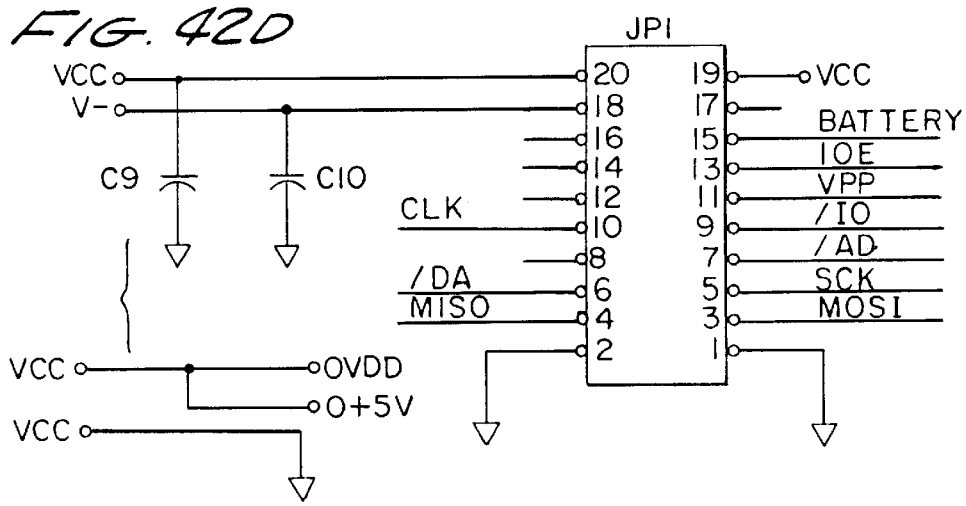
Figure 42F:
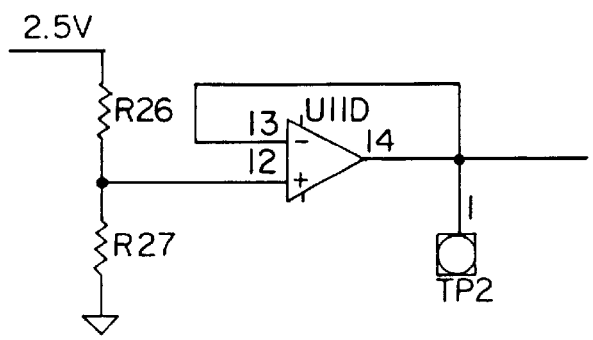
Figure 42G:
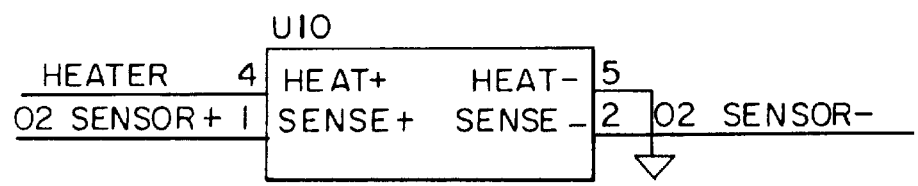
Figure 42H:
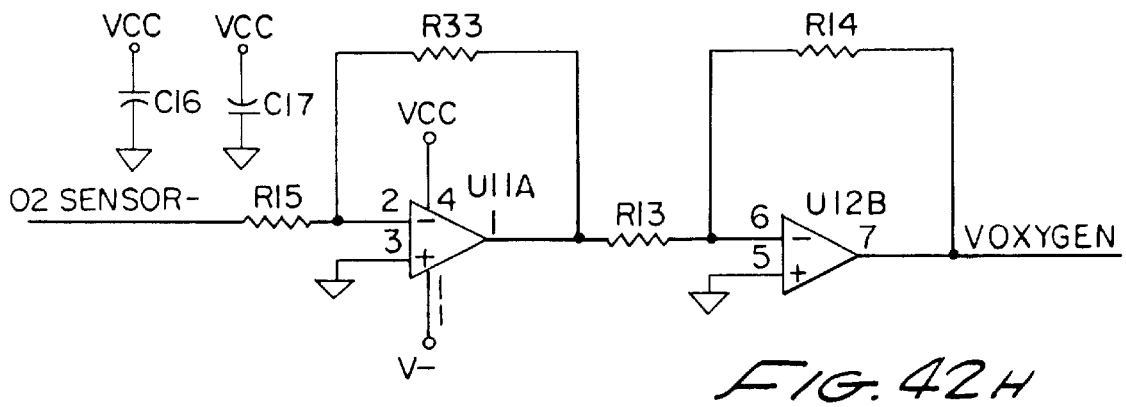
Figure 42I:
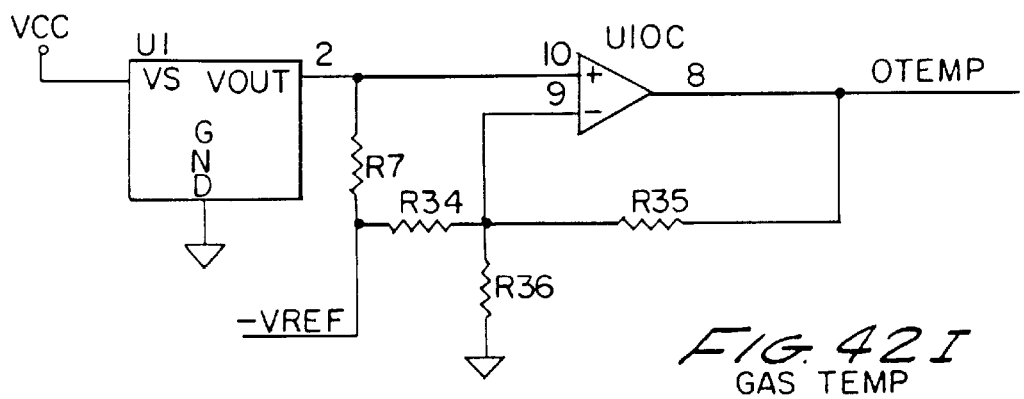
Figure 43A:
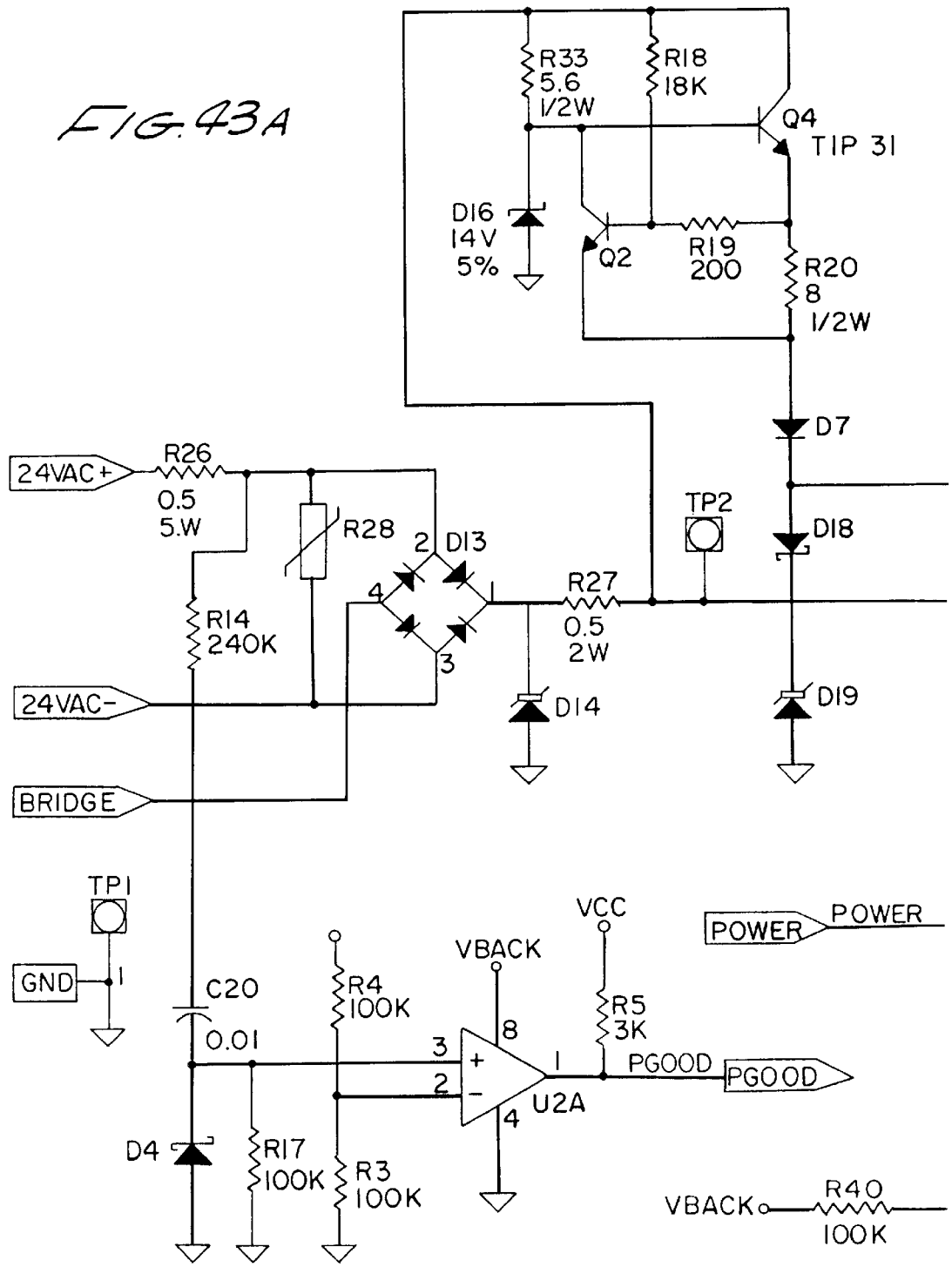
FIGS. 43A through 43C show a schematic diagram for an alternative preferred embodiment of the power supply system shown in block function form in FIG. 39 and in schematic wiring diagram form in FIGS. 41A and 41B.
Figure 43B:
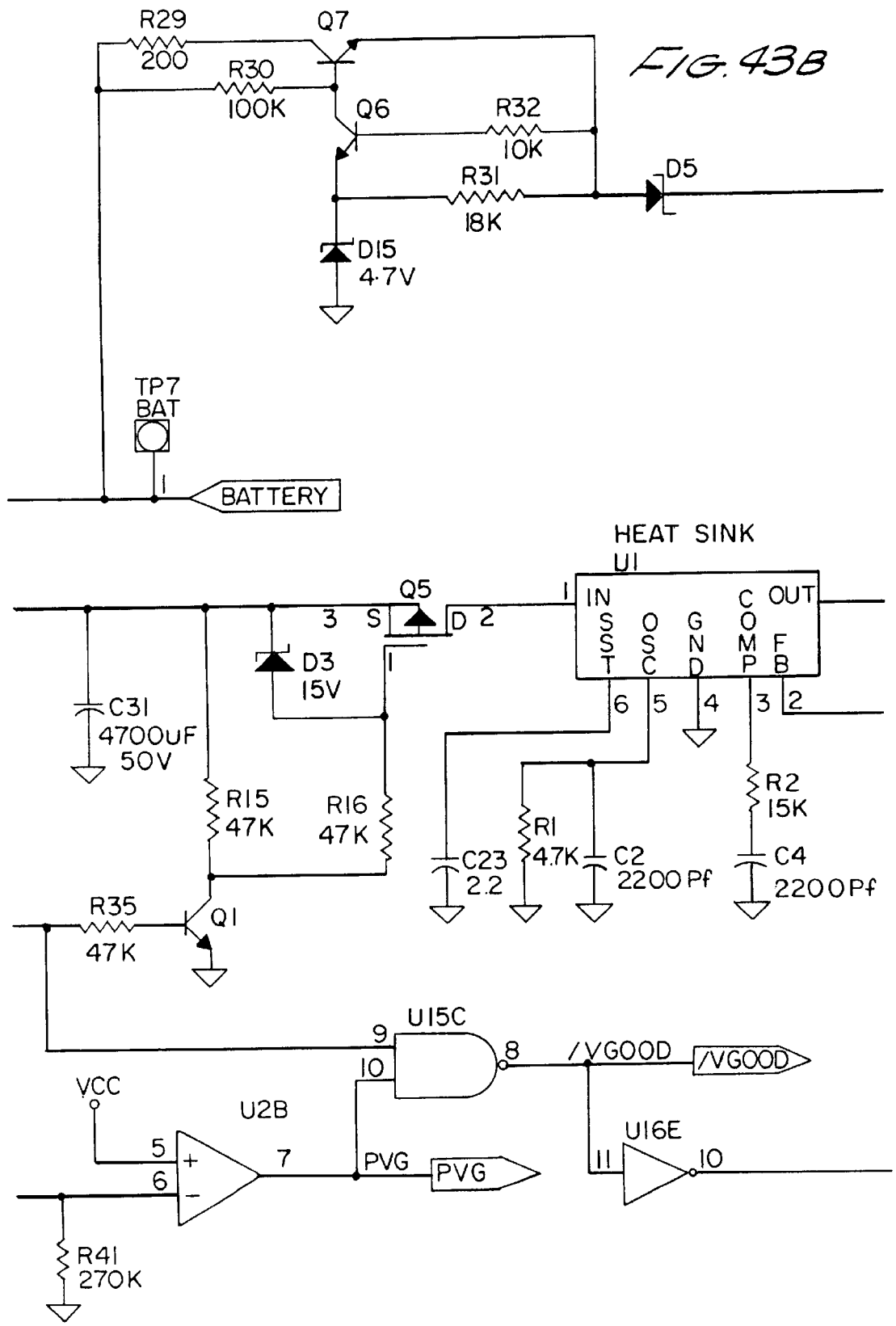
Figure 43C:
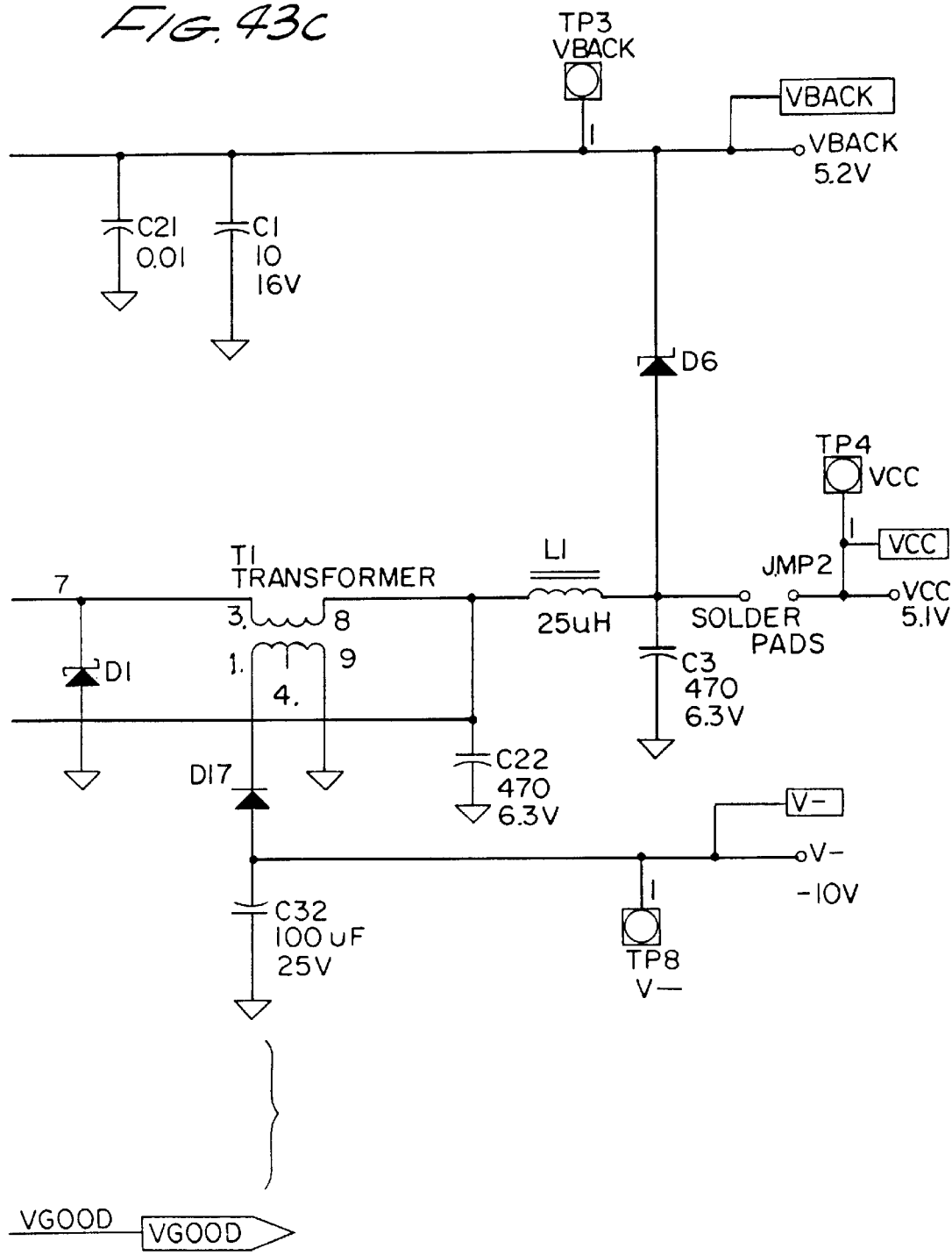
Figure 44A:
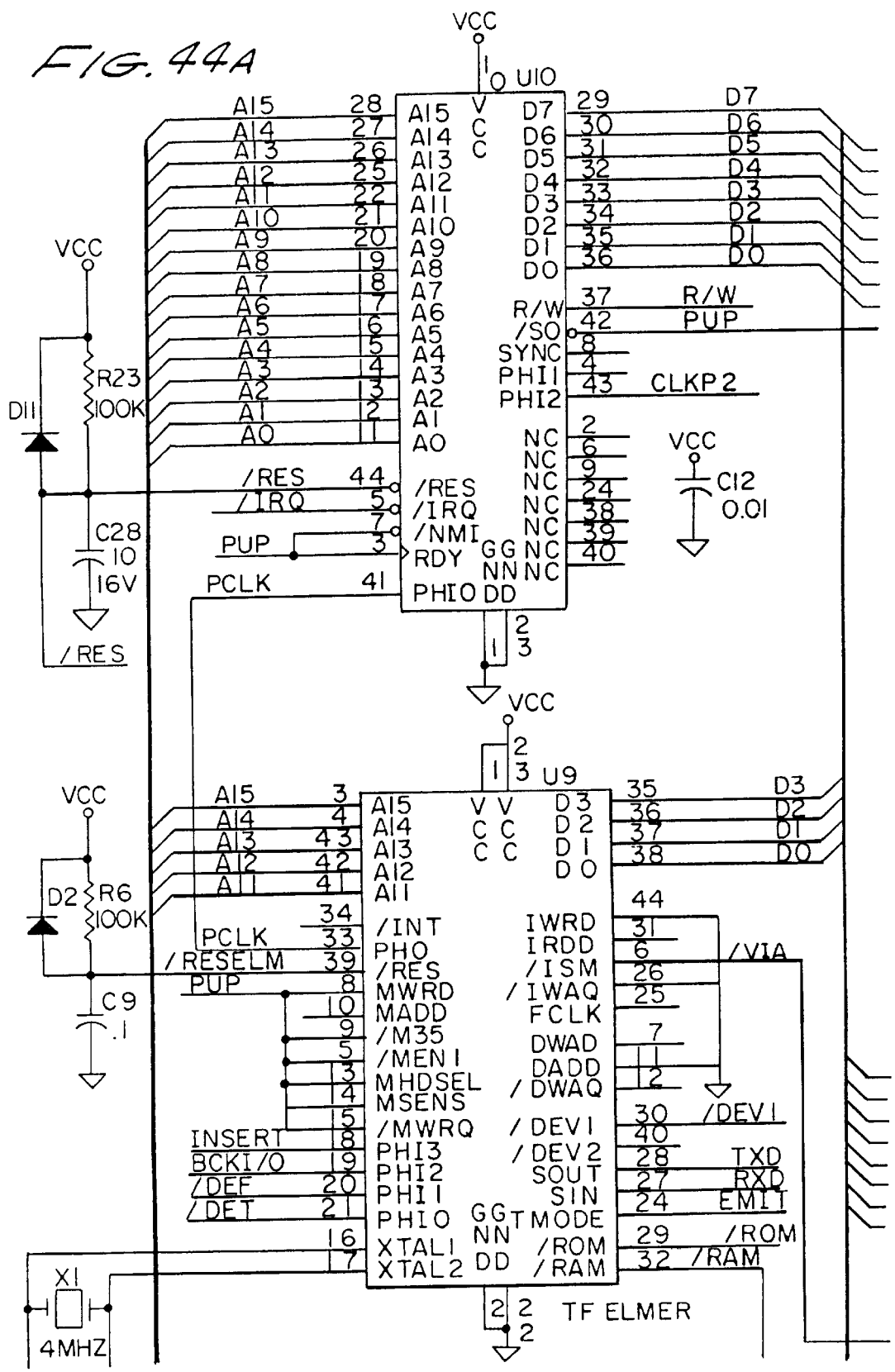
FIG. 44A through 44S show a schematic wiring diagram for the connections on the microprocessor board in the alternative preferred embodiment of FIG. 40A and through 40V.
Figure 44C:
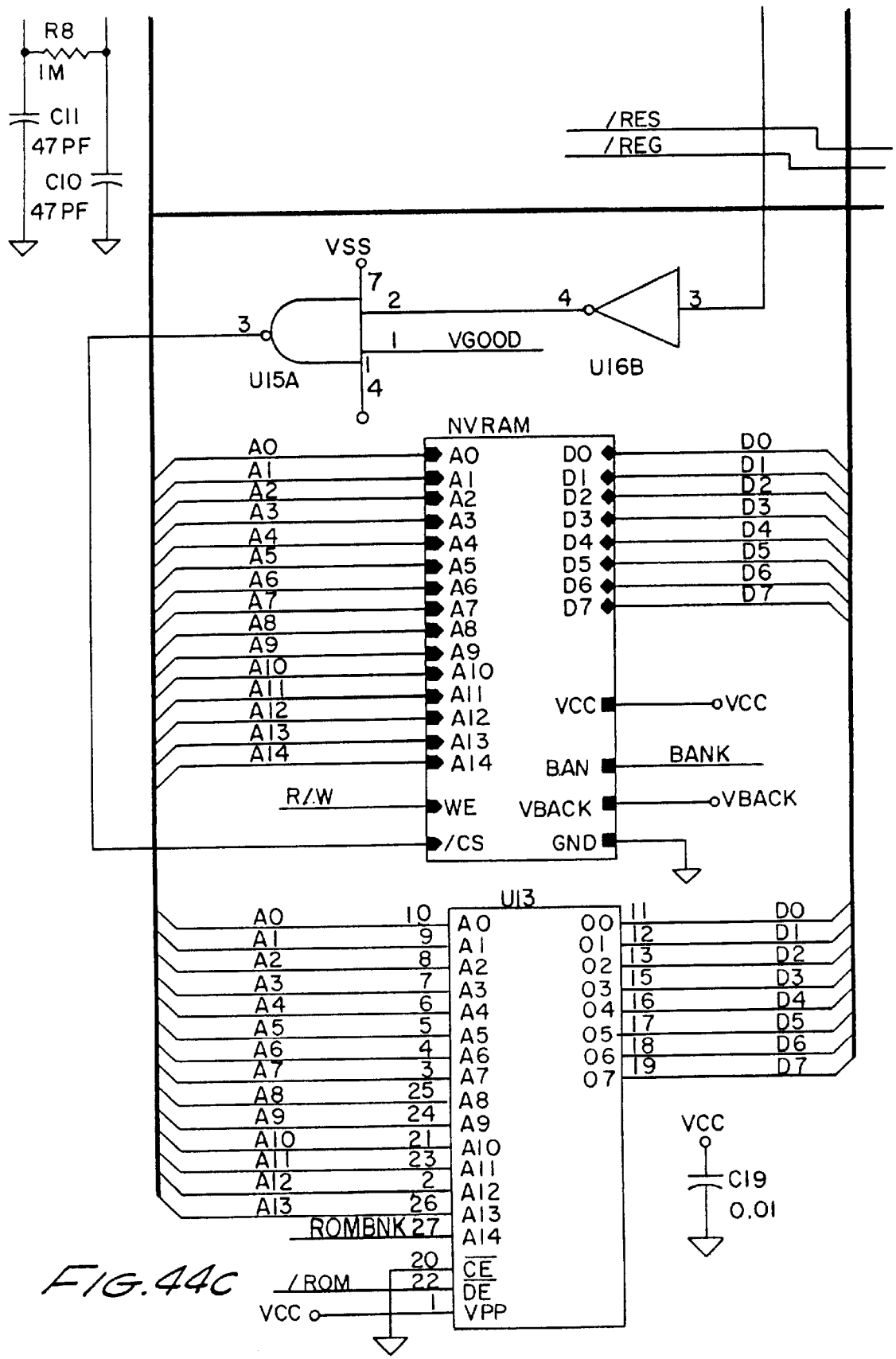
Figure 44D:
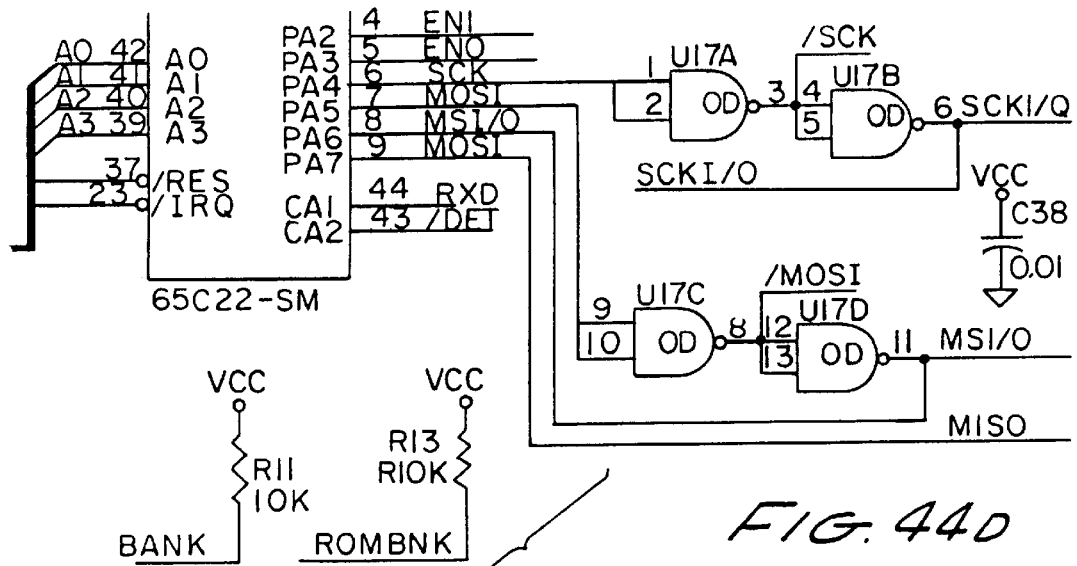
Figure 44G:
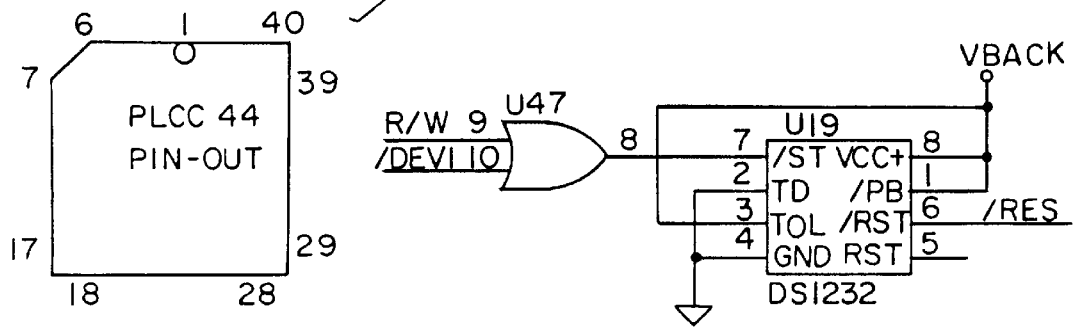
Figure 44H:
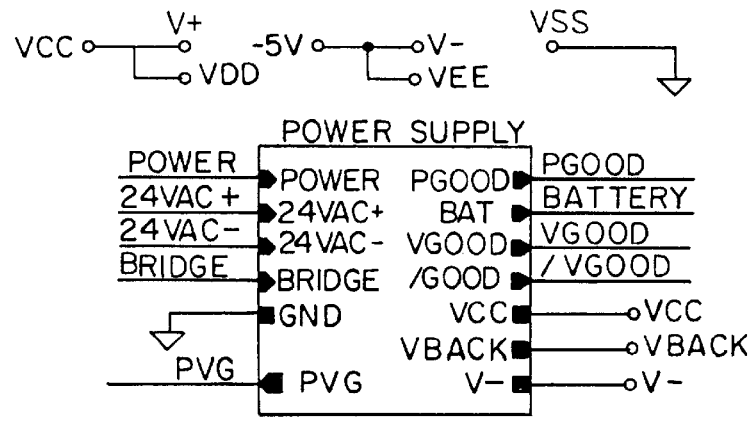
Figure 44L:
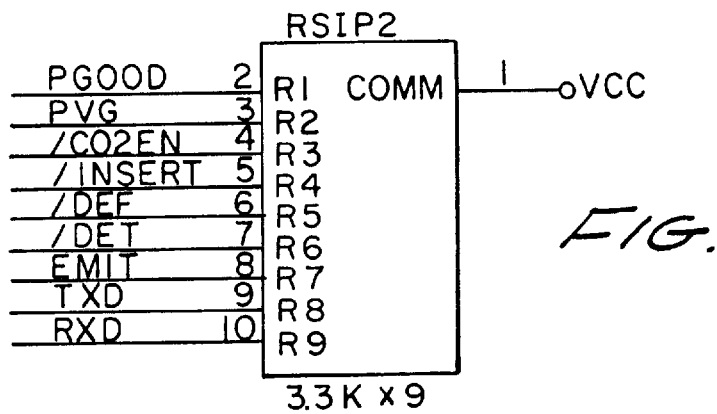
Figure 44M:
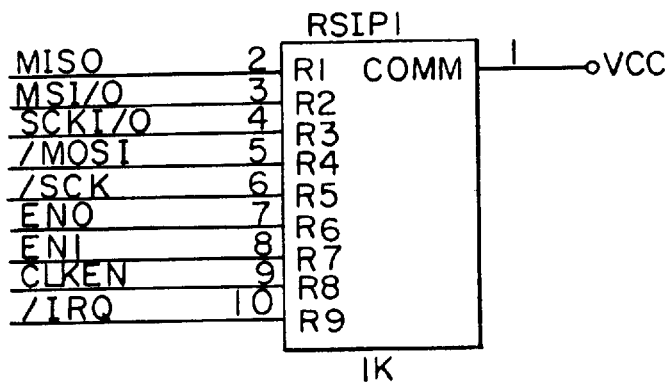
Figure 44N:
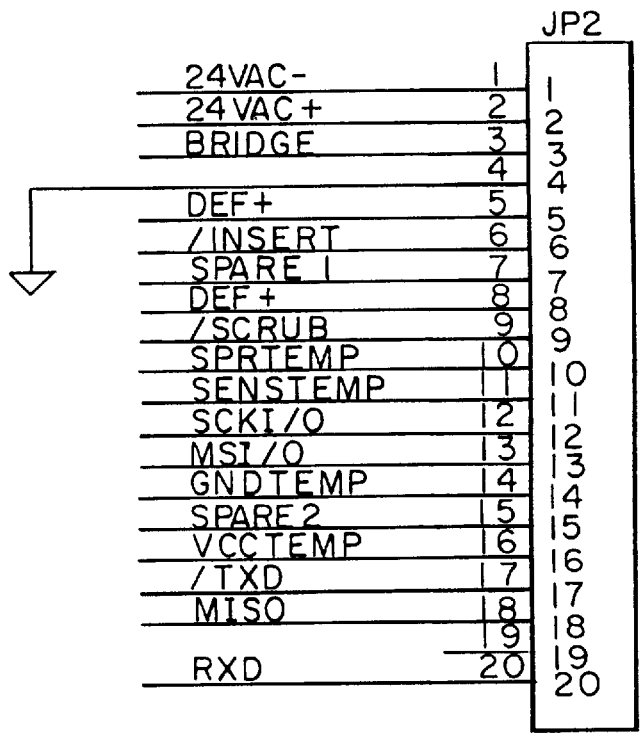
Figure 44P:
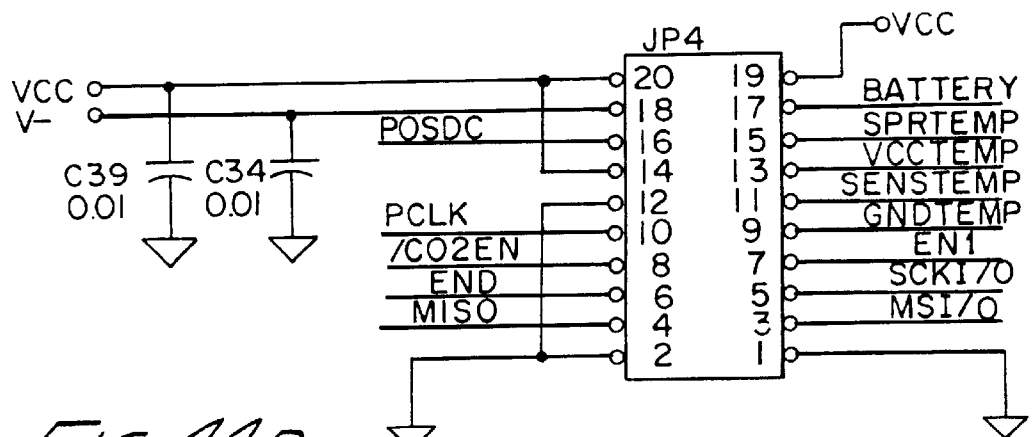
Figure 44R:
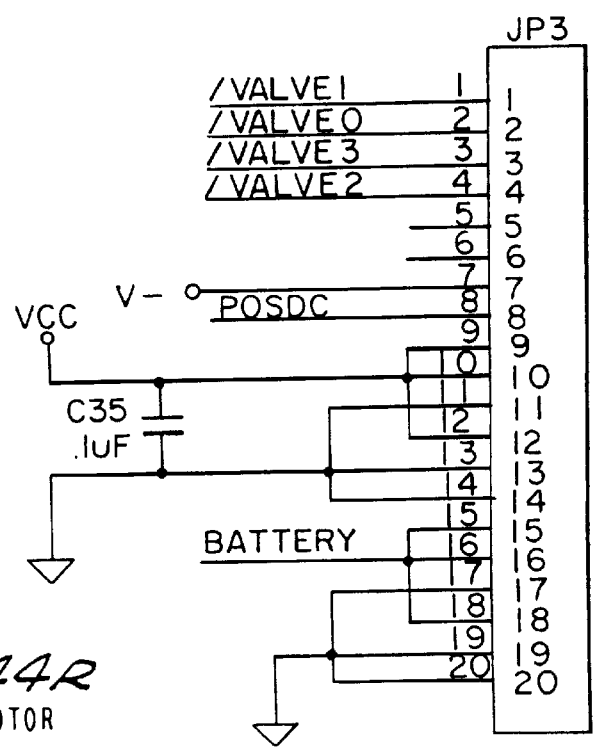
Figure 44S:
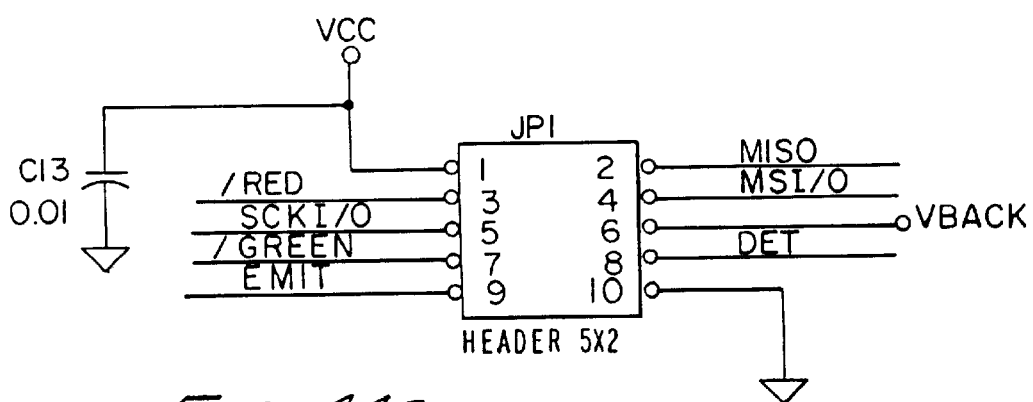
Figure 45A:
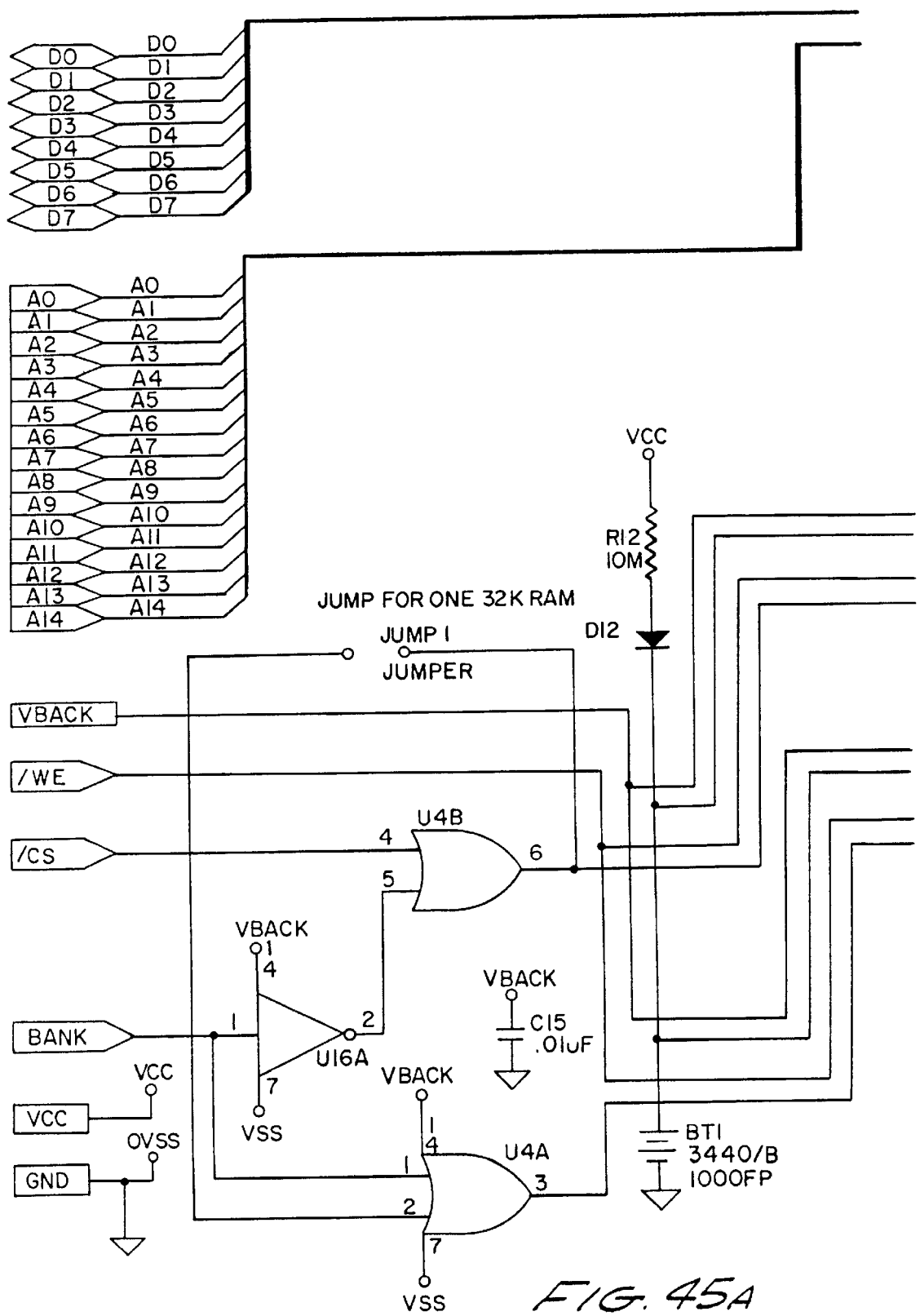
FIGS. 45A and 45B show a schematic wiring diagram of the non-volatile random access memory and associated controllers in the alternative preferred embodiment of FIGS. 43A through 43C and 44A through 44S.
Figure 45B:
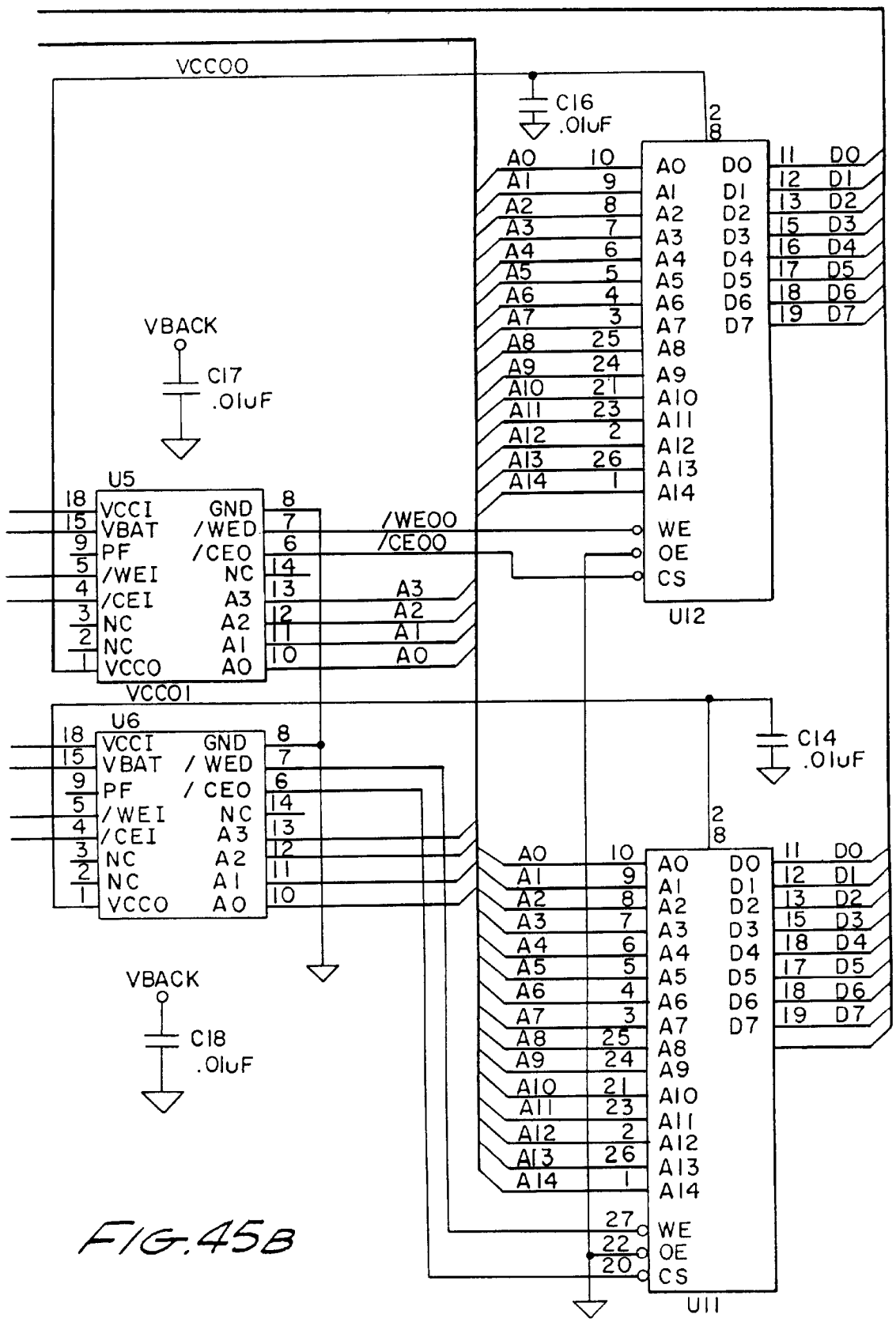
Figure 46A:
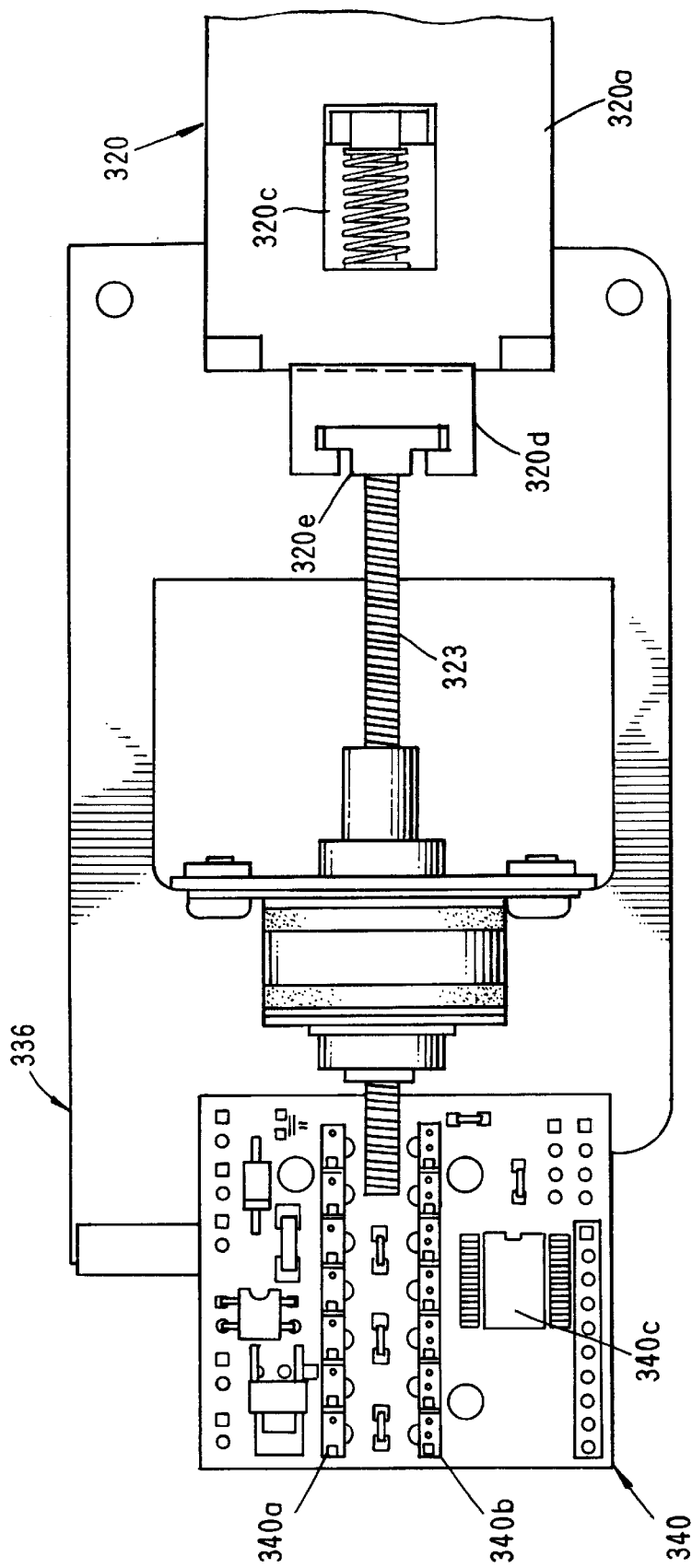
FIGS. 46A and 46B are a top plan view and side view, respectively, showing the position sensor for the slider in the slider valve assembly of the preferred embodiments of the monitor-control system.
Figure 46B:
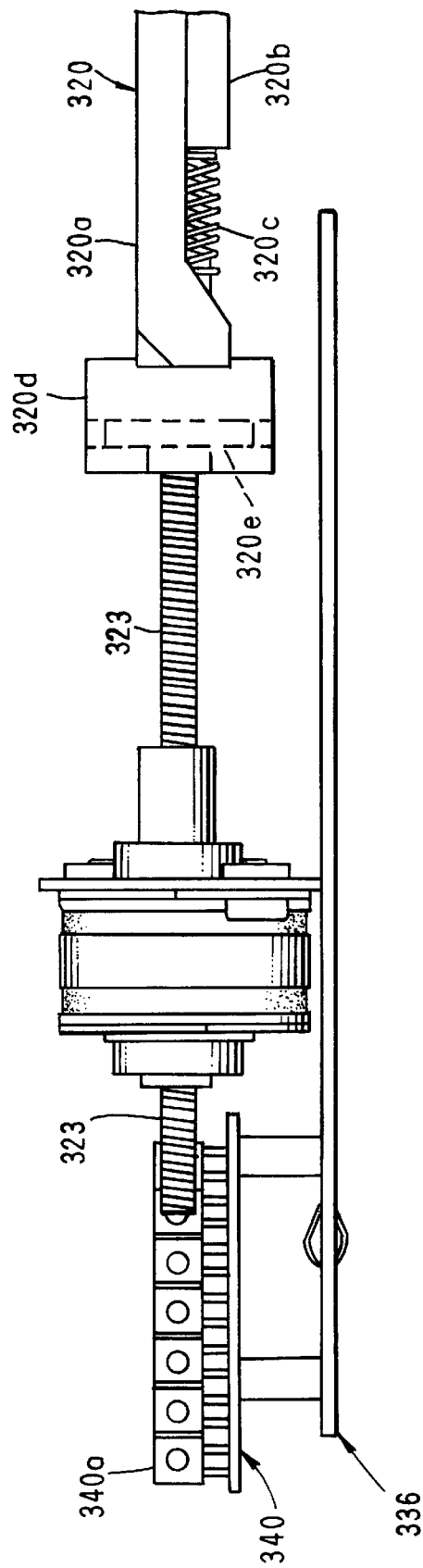
Figure 47A:
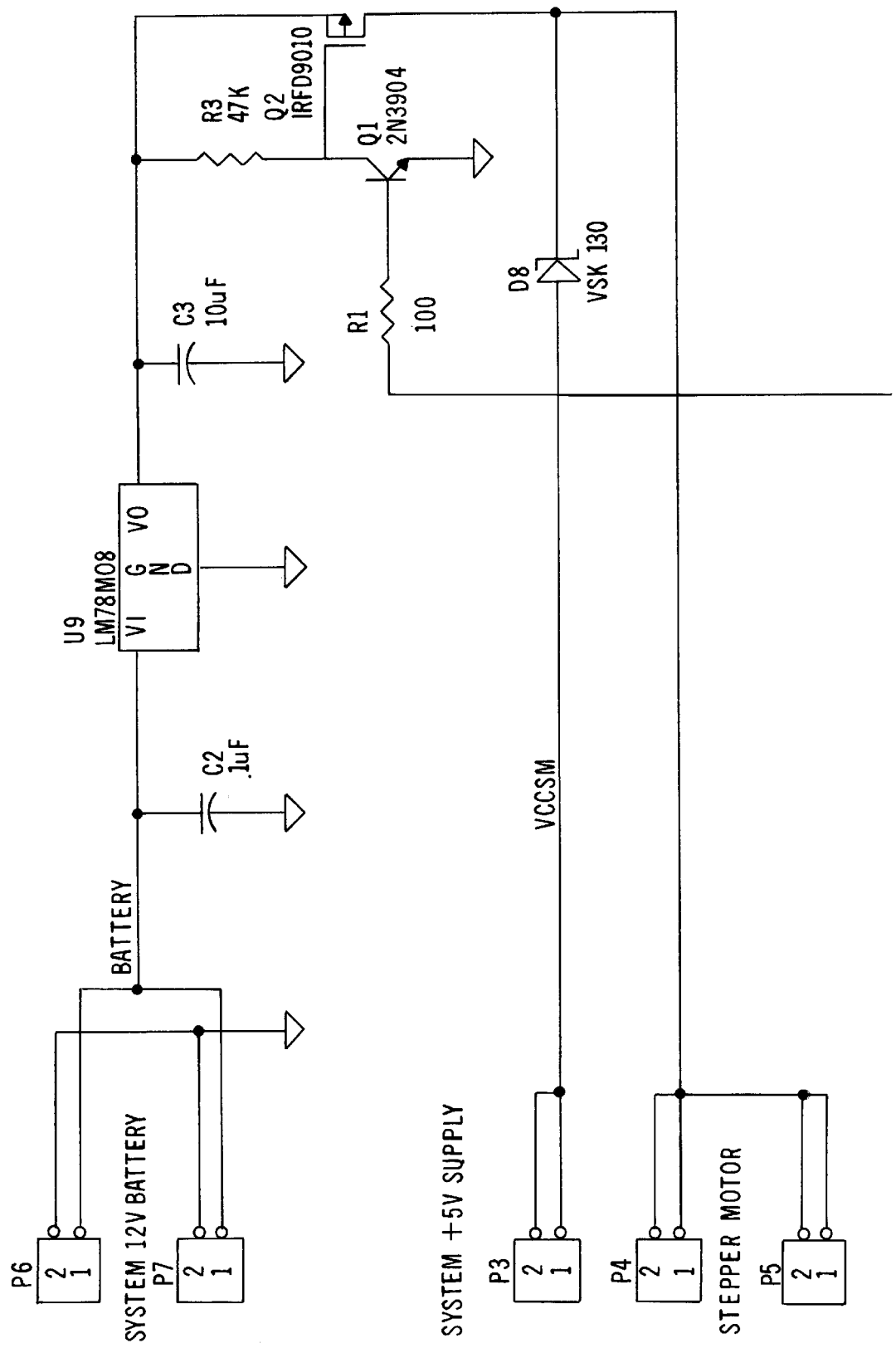
FIGS. 47A through 47C shows a schematic wiring diagram for the position sensor depicted in FIGS. 46A and 46B.
Figure 47B:
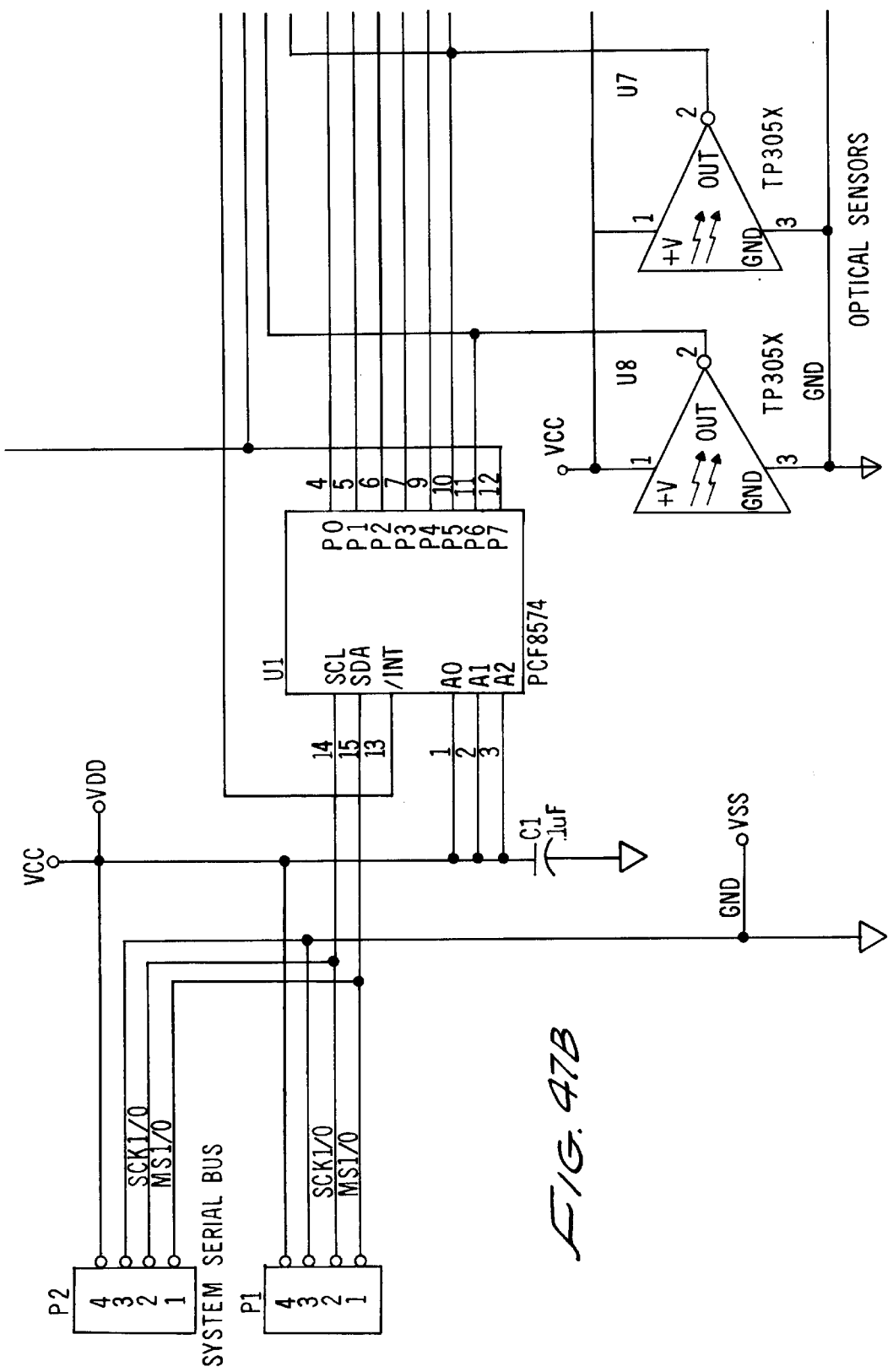
Figure 47C:
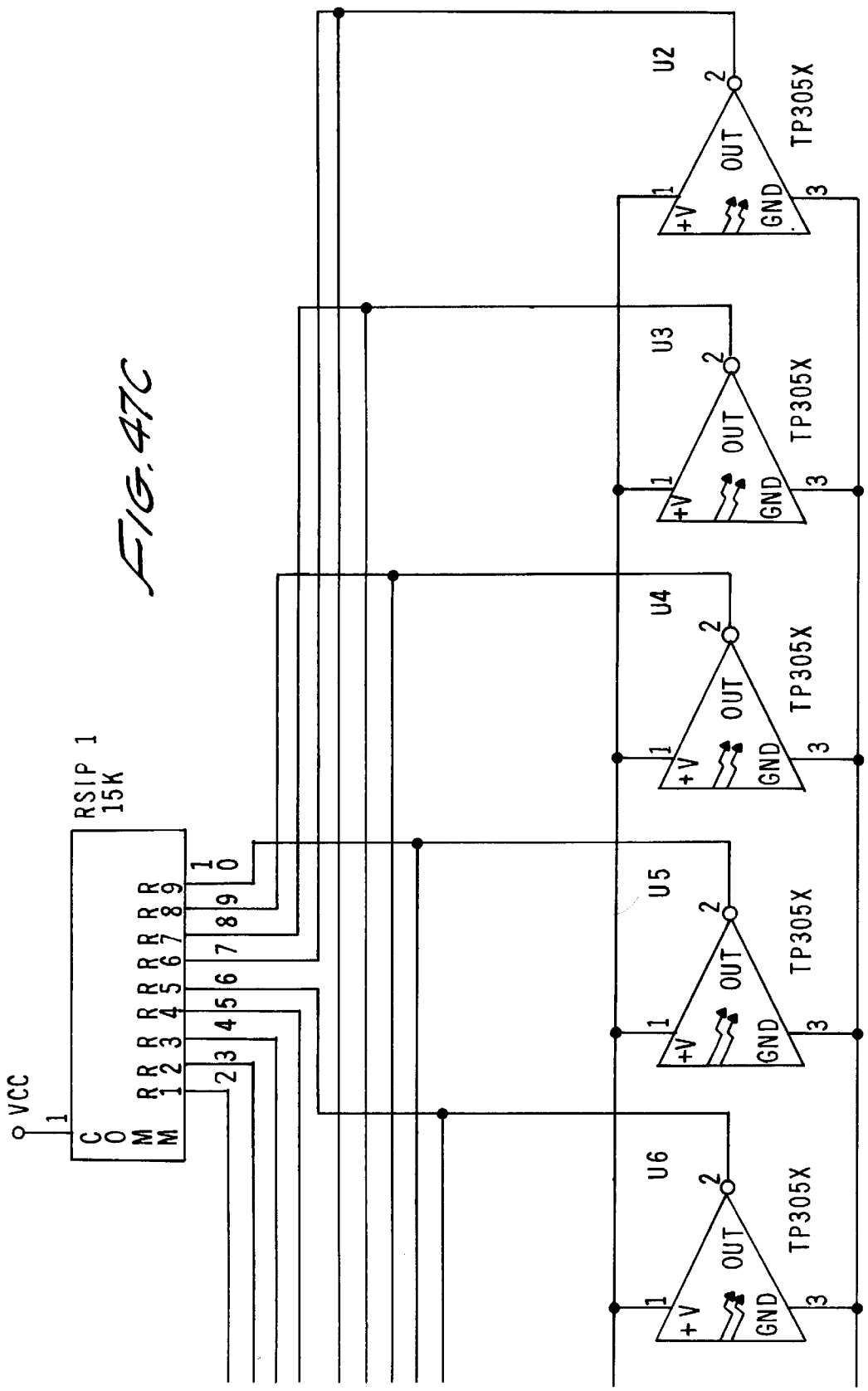
Figure 47D:
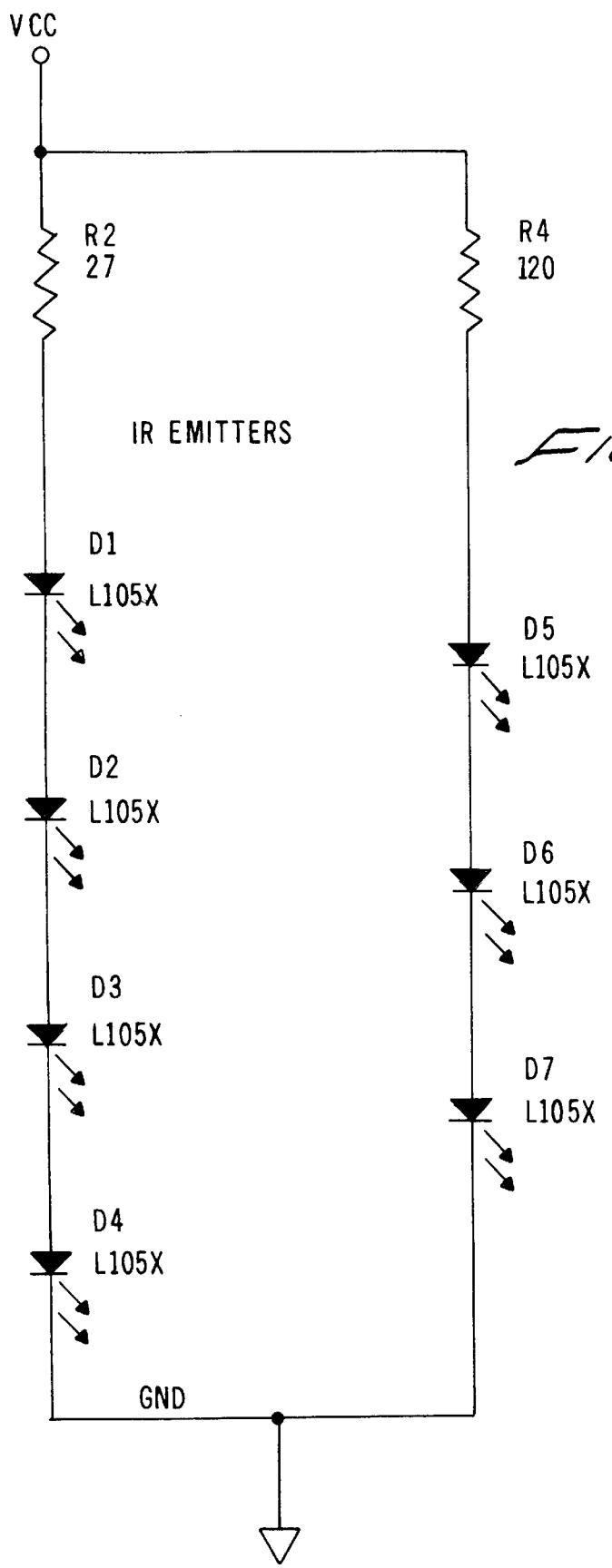
Figure 48A:
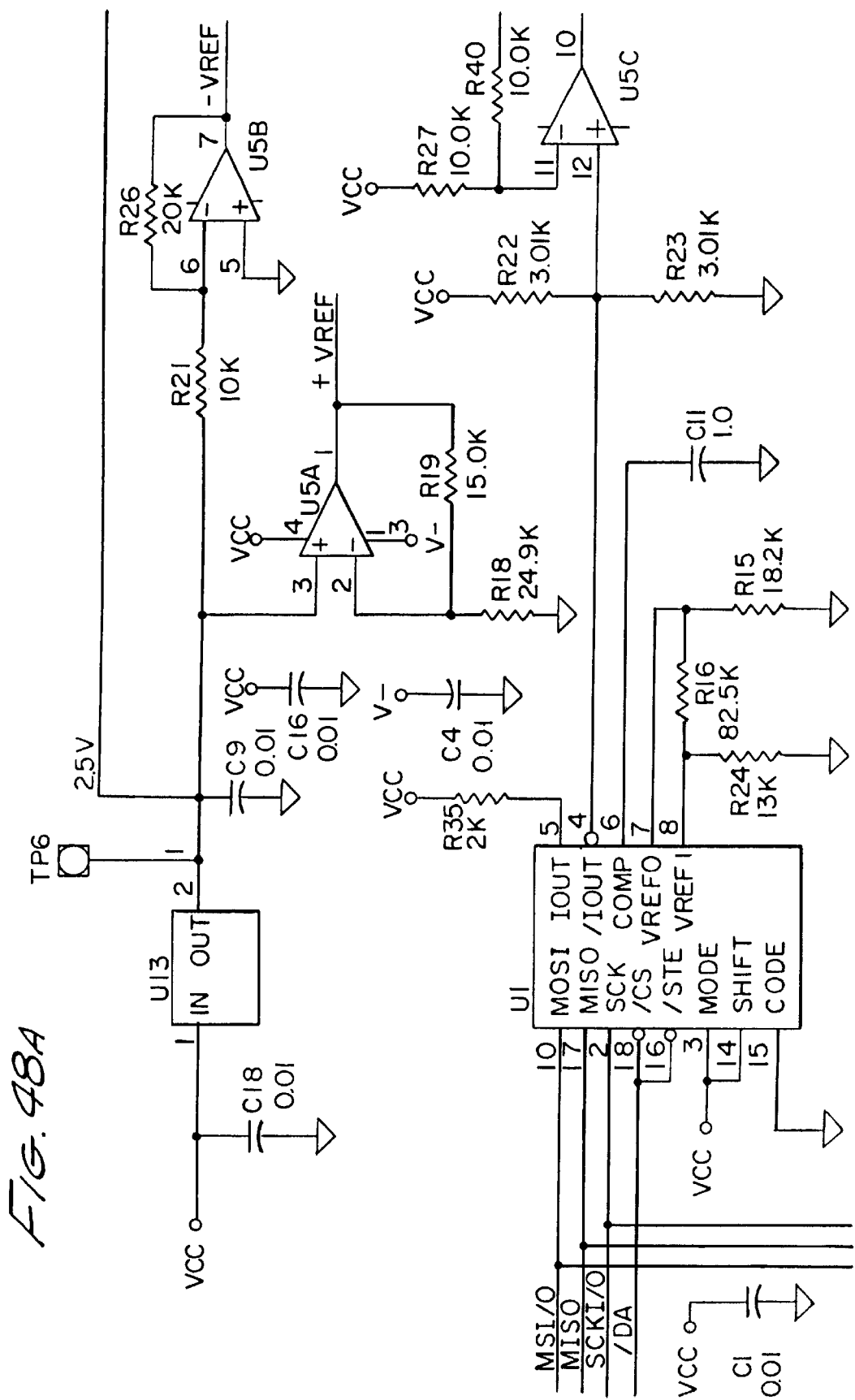
Figure 48B:
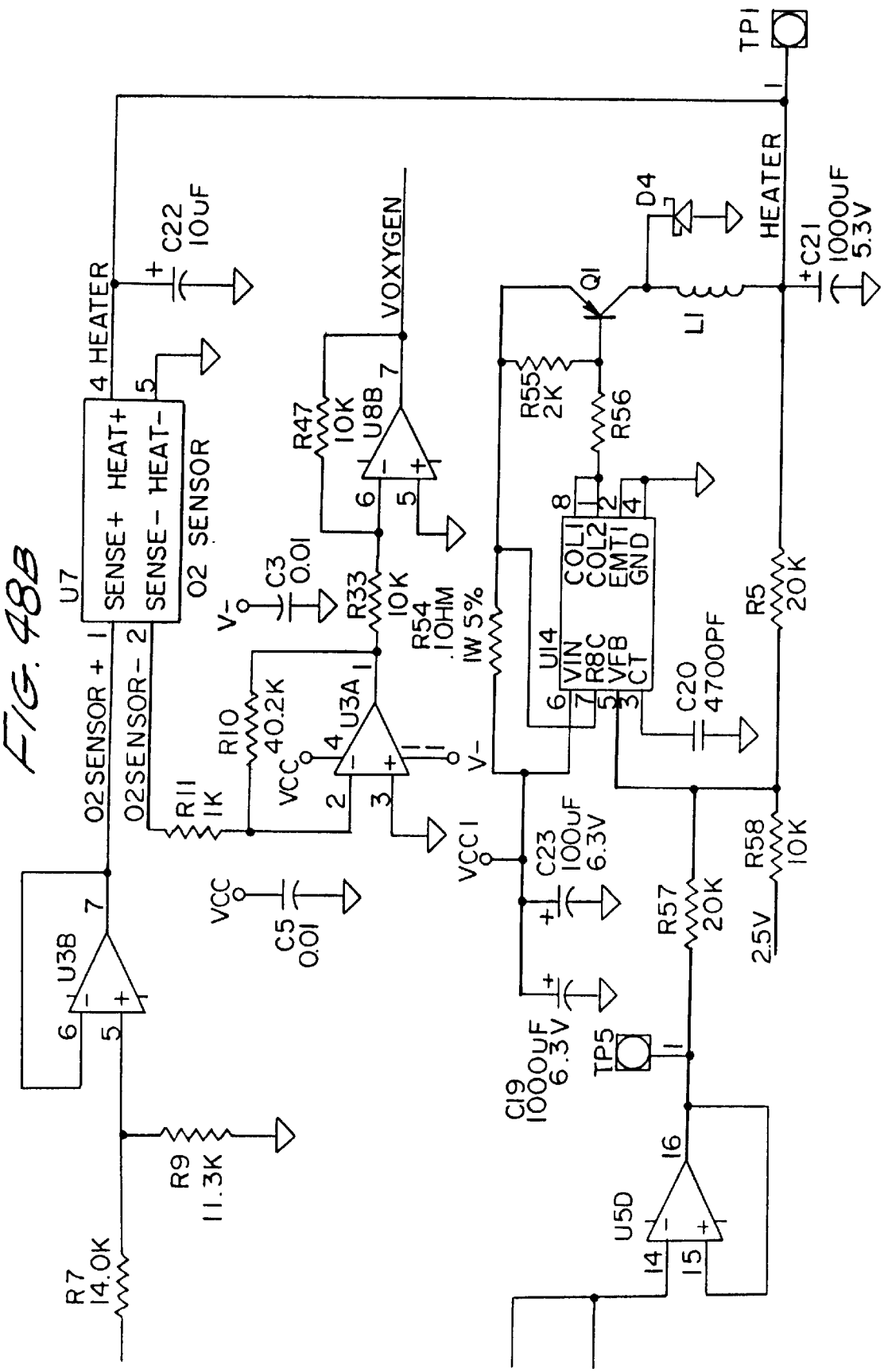
Figure 48E:
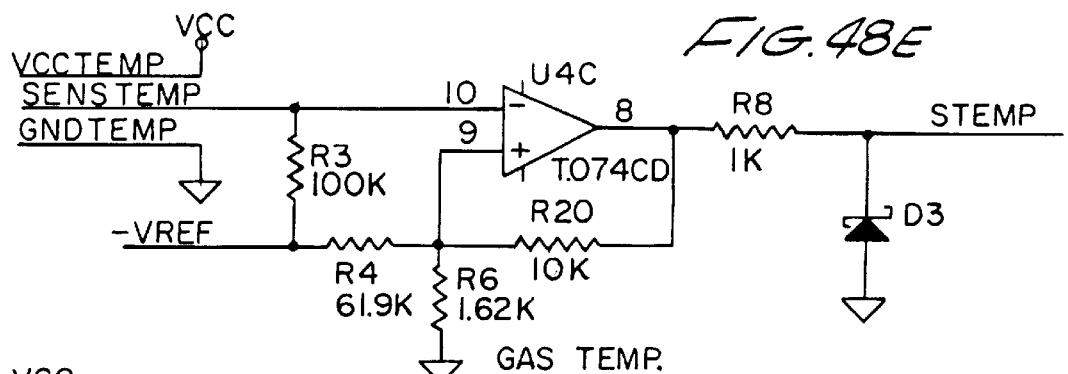
Figure 48F:
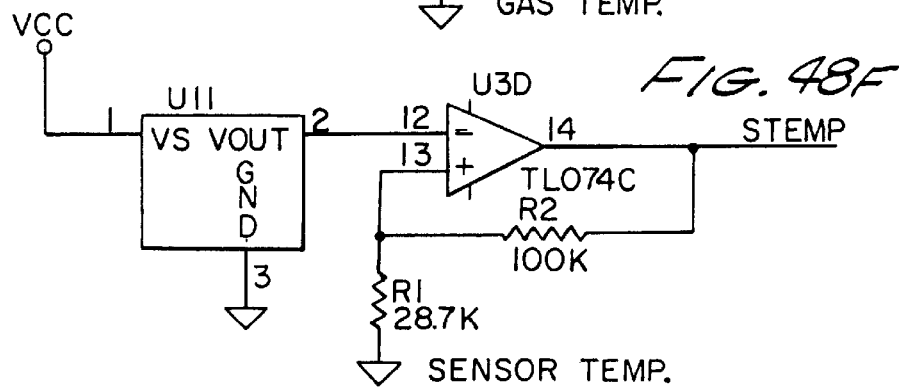
Figure 48G:
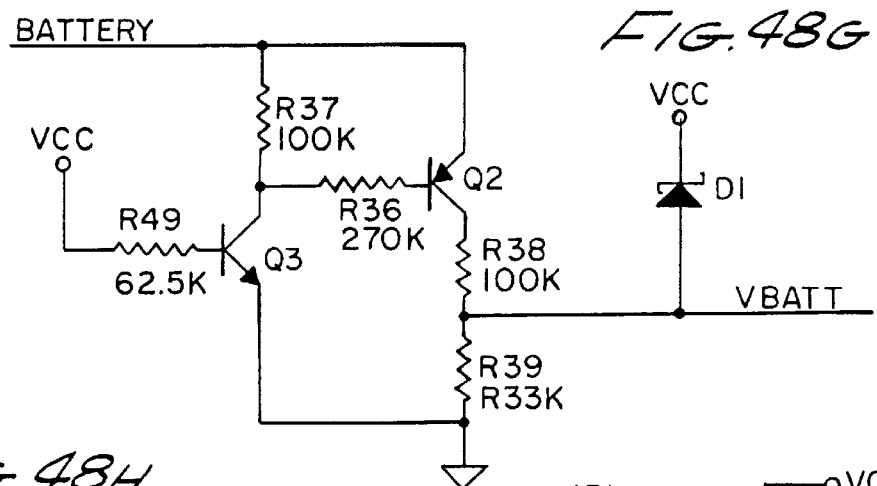
Figure 48H:
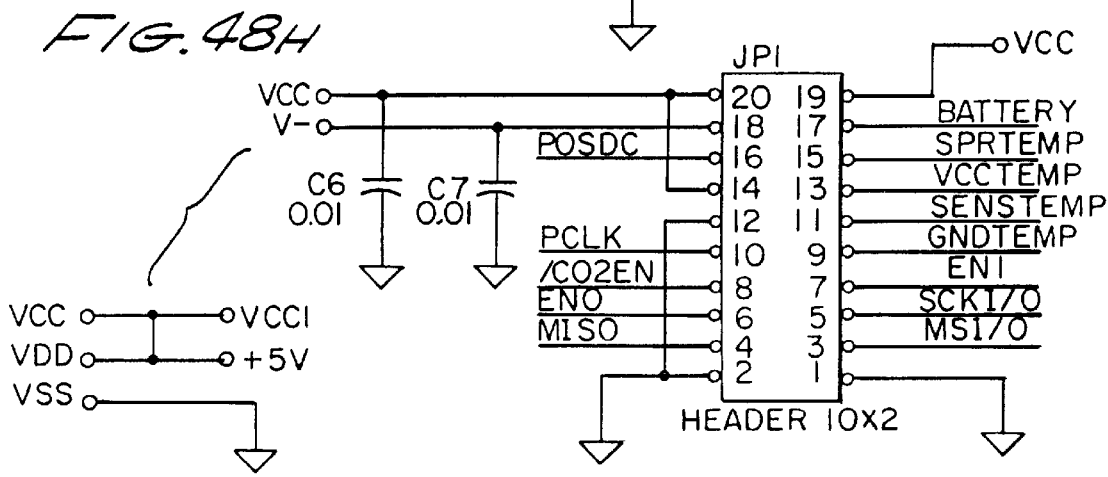
Figure 48J:
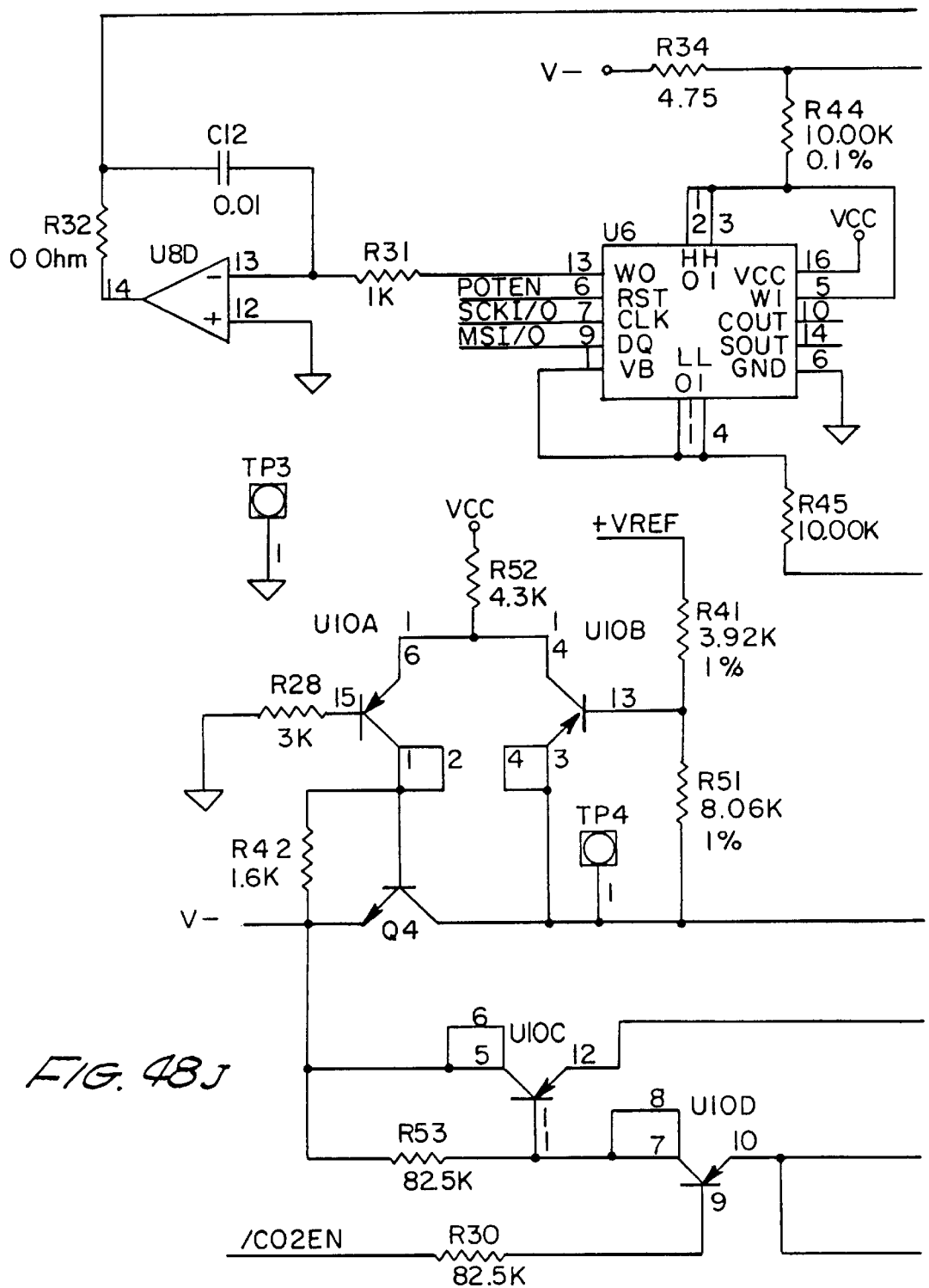
Figure 48K:
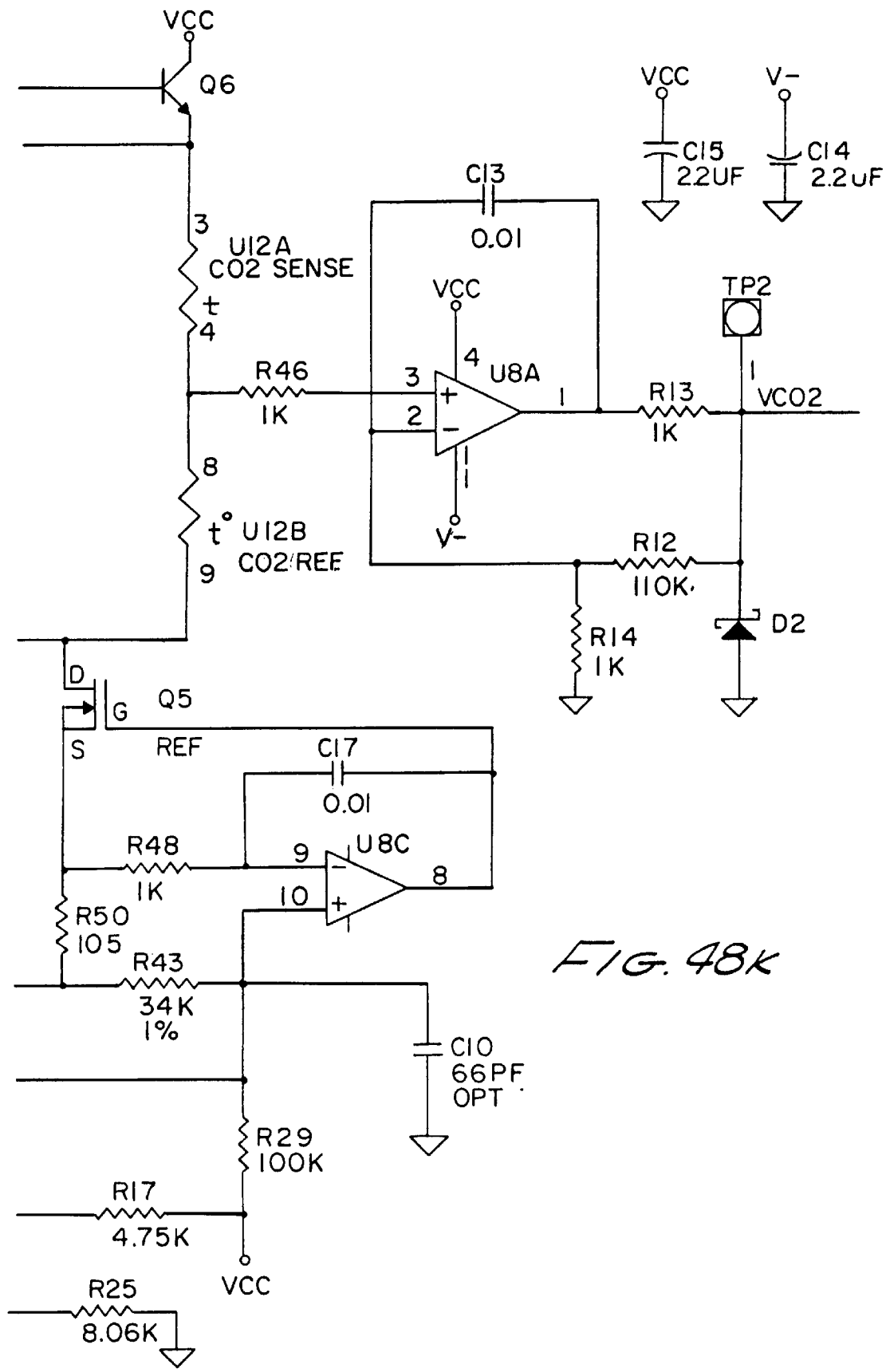
Figure 49A:
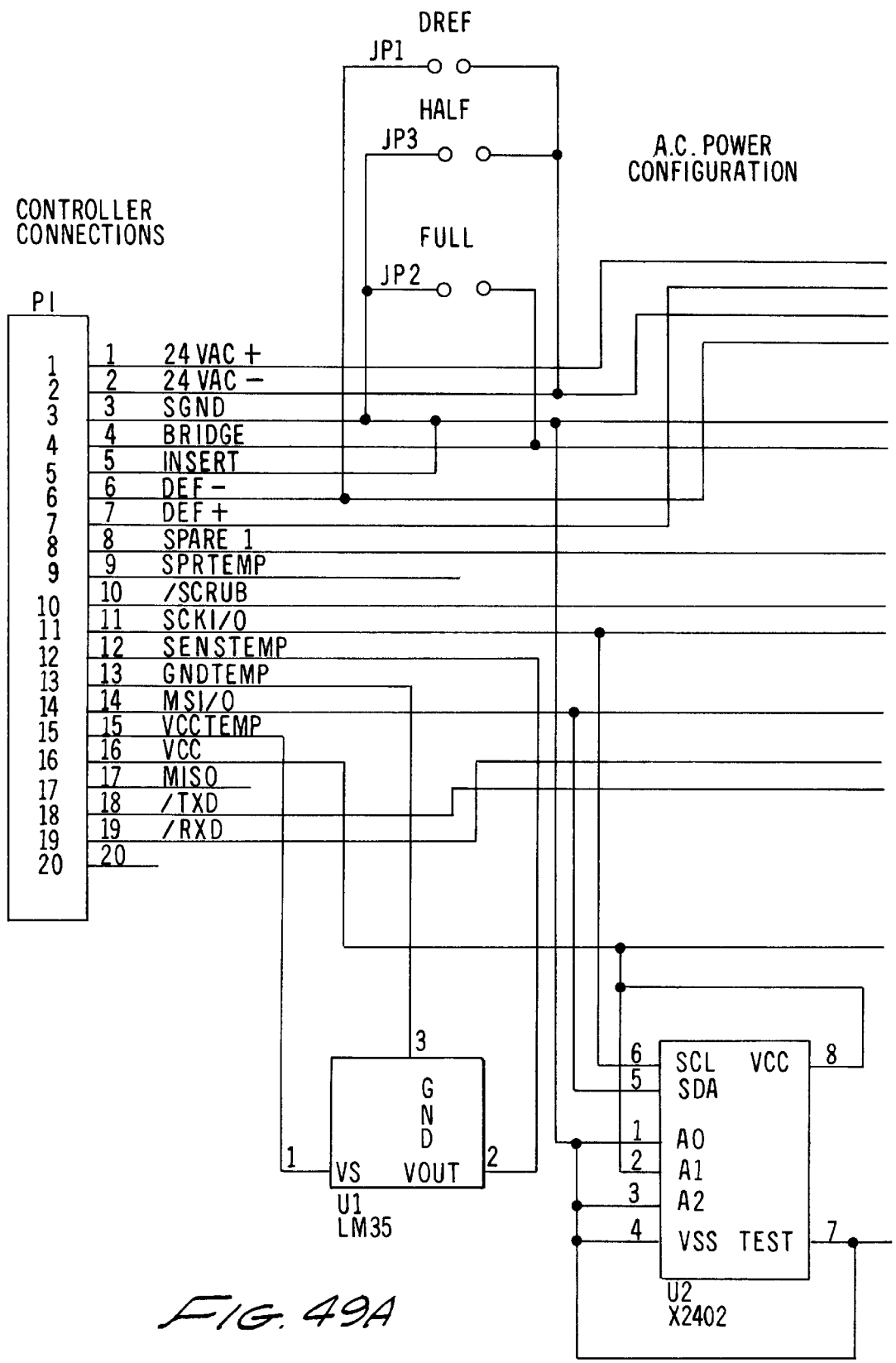
FIGS. 49A and 49B show schematic wiring diagram for the alternative preferred embodiment of the security enclosure board, including gas temperature sensor, EEPROM, and extended serial bus elements, of FIGS. 43A–43C, 44A–44S and 45A–45B.
Figure 49B:
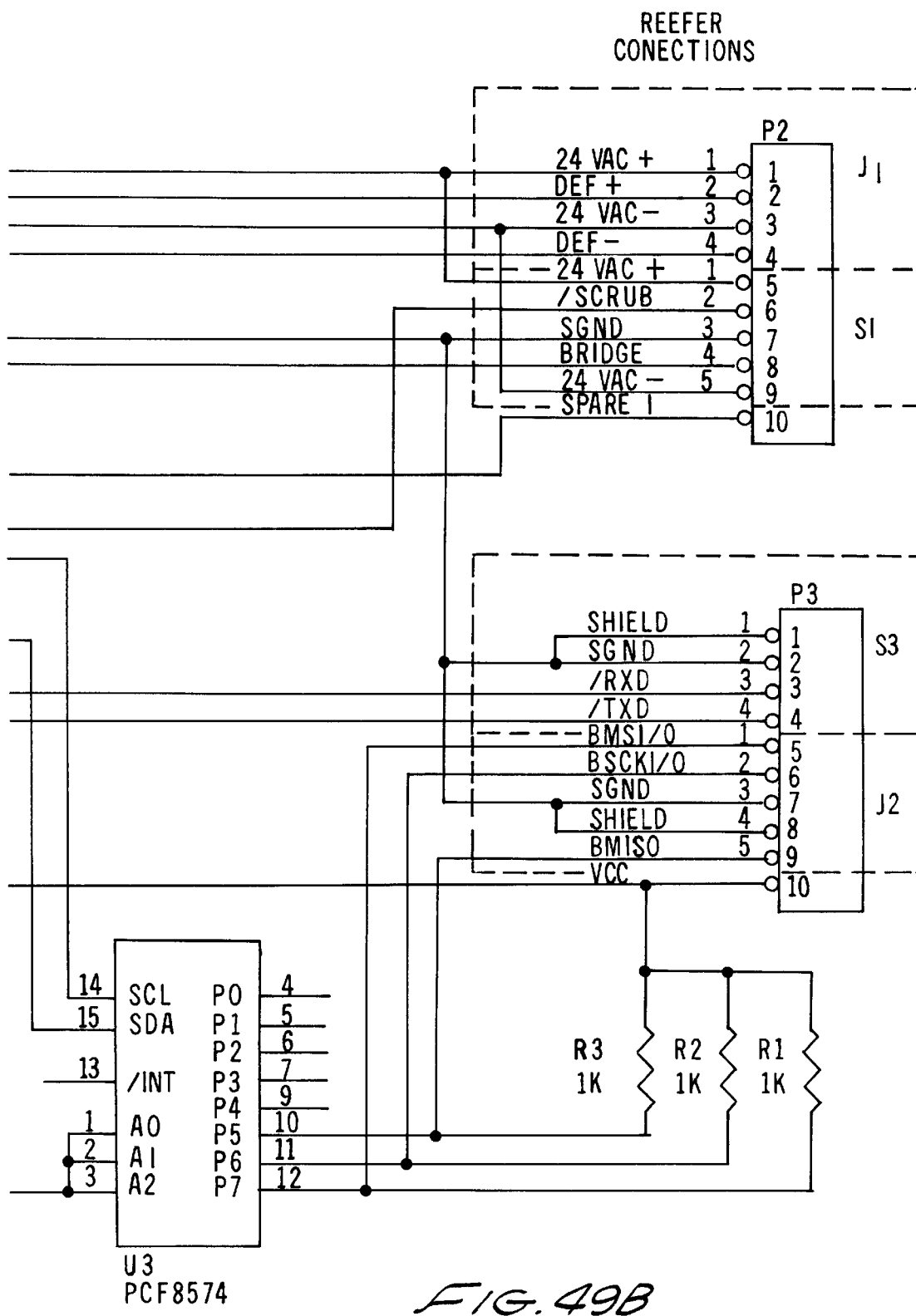
Figure 50A:
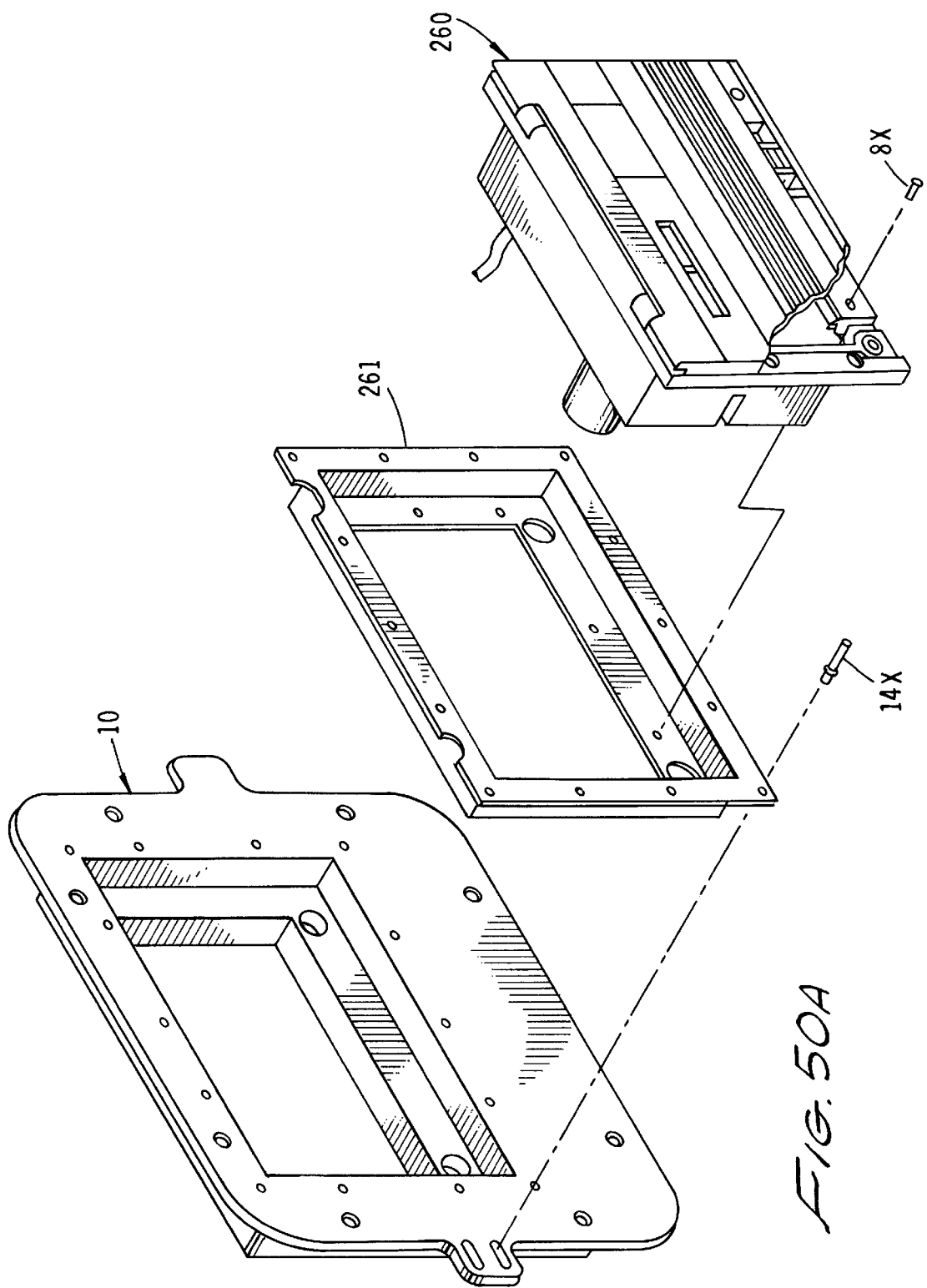
FIG. 50a shows a perspective view of the alternative preferred embodiment of the security container, mounting frame, and prepared container panel.

FIG. 36 shows the circuitry for providing constant current of desired amount to thermistors 168 and 169 and the reference control and gain stages for this sensor.

Gases from interior space 16 of container 1 pass into chamber 166 through opening 167, and, depending on their carbon dioxide concentration, vary the output from thermistor 168. This variation is related to carbon dioxide concentration. The signals generated by thermistors 168 and 169 are transmitted on leads 170, 171, 172 and 173, and the signals from semiconductor temperature-sensing device 174 are transmitted on leads 175, 176 and 177 to sensor board 133 where the signal is processed by the circuits of the sensor board and, in digital form, passes to the microprocessor via cable connector 132. See FIGS. 33–35 and FIG. 24.

FIGS. 50–53 show an alternative preferred embodiment of the security container 260 with an alternative preferred embodiment of the monitor-control system 300 removably placed inside security container 260. The security container is fastened within insulated container panel 10 by means of flange 261. As FIGS. 50–53 show, the security container monitor-control system can be retrofitted to existing containers by simply forming an opening in front panel 10 of container 1, attaching flange 261 to container panel 10 and mounting security container 260 with its monitor control system 300 inside, in that opening.

Figure 54:
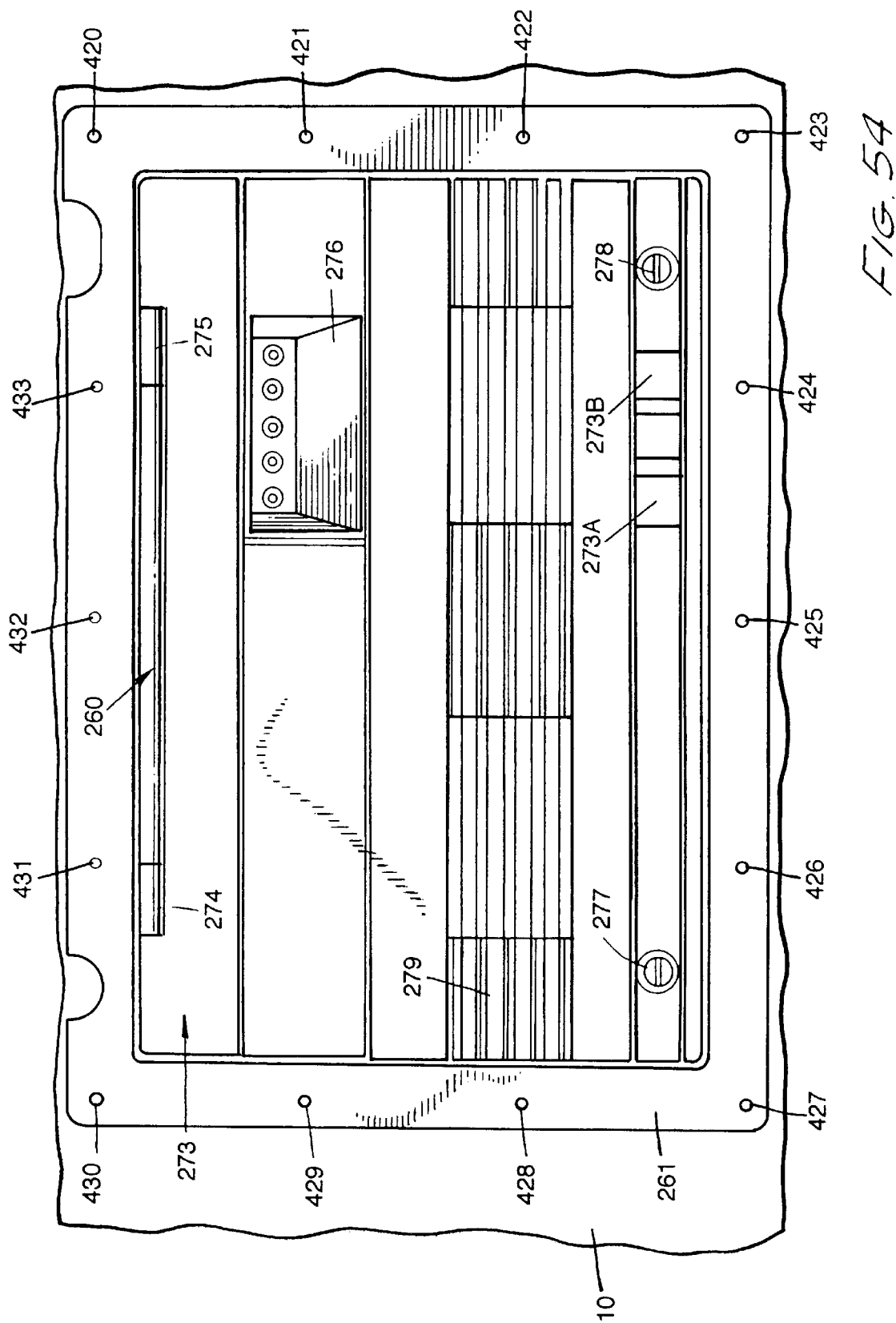
FIG. 54 shows a front elevation view of the security container shown in FIGS. 51–53.
Figure 59:
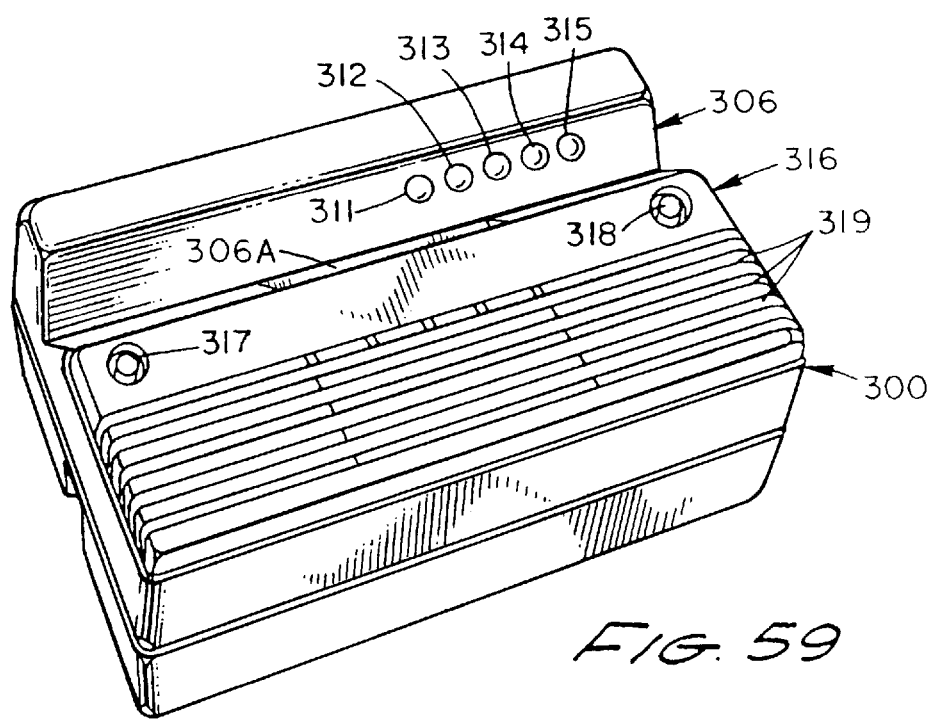
FIG. 59 shows a perspective view of the front panel of the alternative preferred embodiment of the monitor-control system shown in FIGS. 50–58.

FIG. 54 shows, in front elevation view, security container 260, adapted to receive the alternative preferred embodiment of the monitor-control system of this invention. The monitor-control system of security container 260 has a flange 261 for securing the security container over an opening in panel 10 of container 1 as shown in FIG. 1. Screws or rivets inserted through openings 420, 421, 422, 423, 424, 425, 426, 427, 428, 429, 430, 431, 432, and 433, fasten security container flange 261 to panel 10. Cover 273, hinged at pins 274 and 275, permits cover 273 to open and close on security container 260. Indentation 276 on cover 273 permits a user to view LED openings 311, 312, 313, 314 and 315 of monitor-control system 300 (FIG. 59). Indentation 273A and 273B on cover 273 permits a user to pull cover 273 outwardly and upwardly, providing access to the interior of container 260. Screw fasteners 277 and 278 permit the secure fastening of cover 273 over the interior of security container 260. Cover 273 includes slotted plate 279 for passage of gas mixtures through cover 273 and into security container 260.

Figure 55:
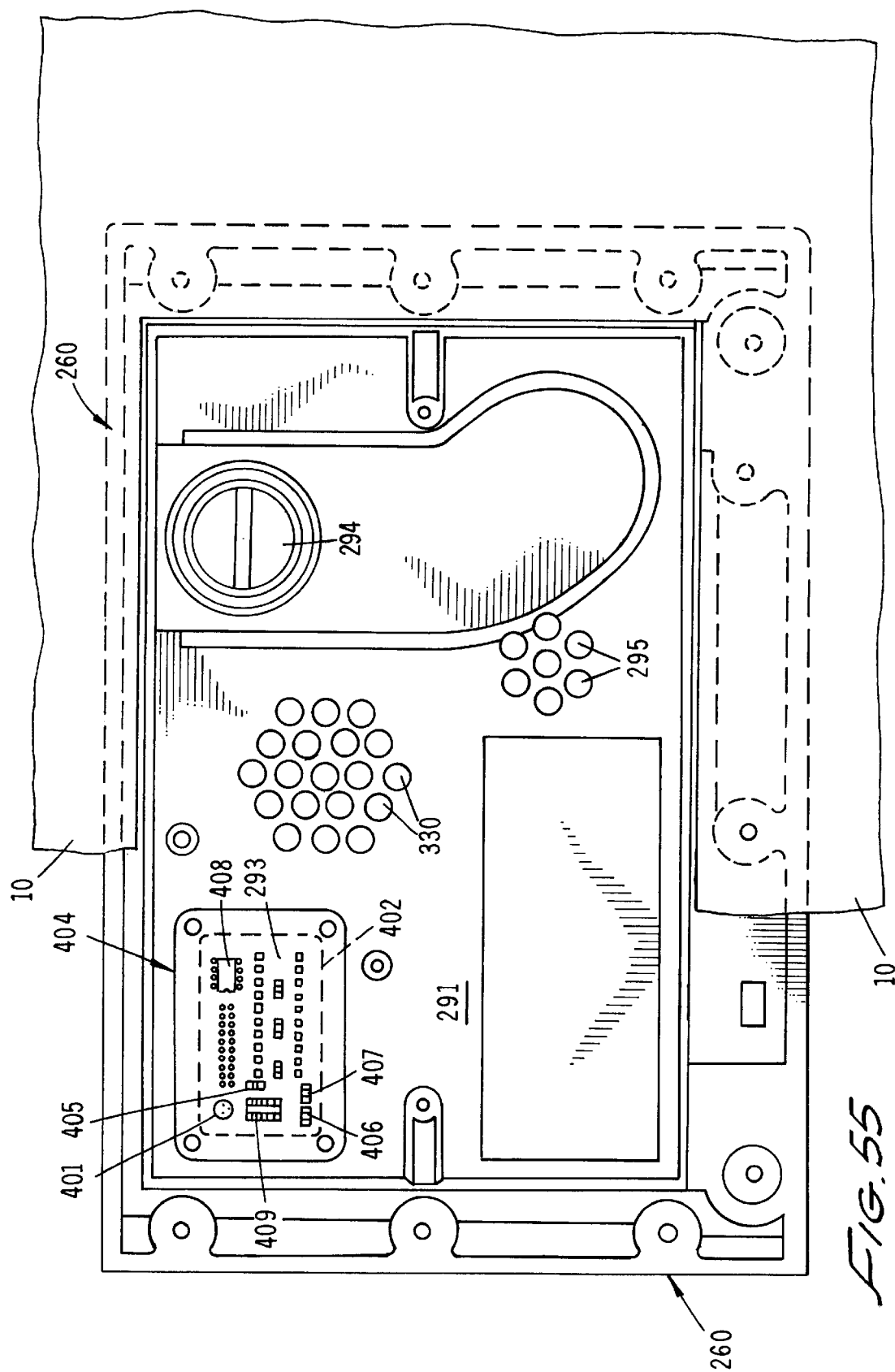
FIG. 55 shows a rear elevation view of the security container shown in FIGS. 50–54.

FIG. 55 shows a rear elevation view of security container 260. Rear panel 291 includes opening 293 for electrical connections, opening 294 for connection of gas passage hose 12 (FIG. 1), and opening 295 for inflow of outside air into container 1. Container atmosphere exits the container through opening 294. Container atmosphere passes through the wall of security container 260, through opening 295, and passes through openings 296 and 296a (see FIGS. 56 and 57) into the monitor-control system 300.

Temperature sensor 401, and related temperature calibration EEPROM 408, permit accurate measurement of the temperature inside container 16. Board 404, carrying sensor 401, power type configuration jumpers 405, 406 and 407, EEPROM 408, and serial bus extension device 409, is secured to the rear panel of container 260 through gas-tight o-ring seal 402.

Figure 56:
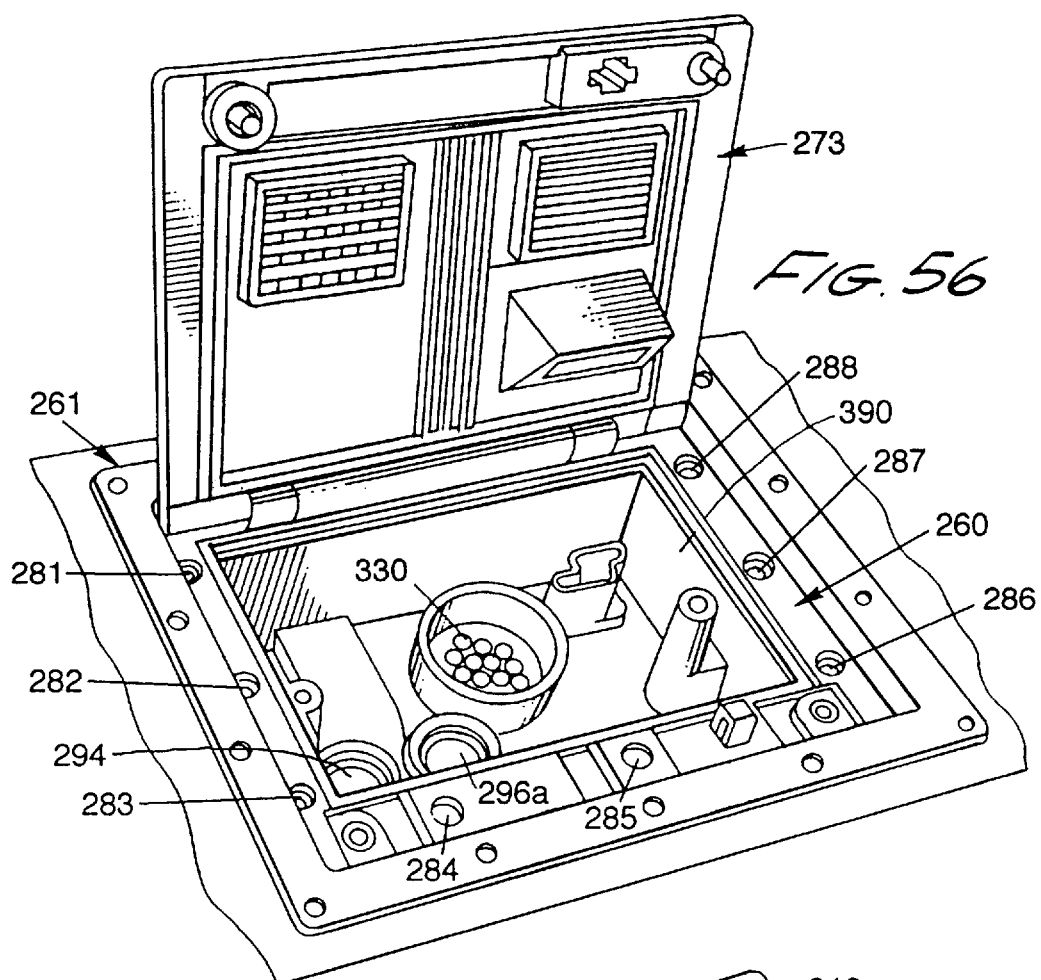
FIG. 56 shows a perspective view of the security container shown in FIGS. 50–53 with the front cover open to expose the interior of the container.

FIG. 56 shows security container 260 with cover 273 open to expose interior space 390 of the container. The security container is attached to the flange 261 by screws inserted through openings 281, 282, 283, 284, 285, 286, 287 and 288.

Figure 58:
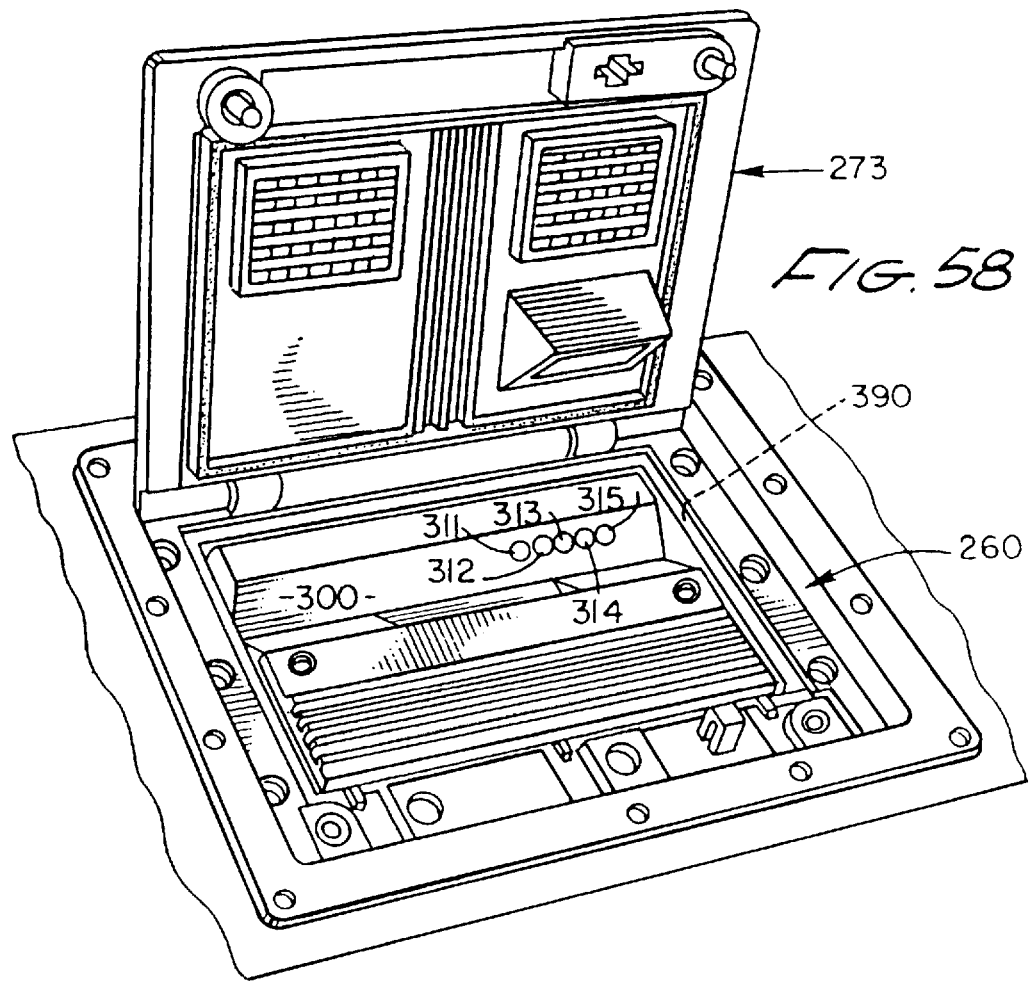
FIG. 58 shows a perspective view of the alternative preferred embodiment of the security container shown in FIGS. 50–57 with the alternative preferred embodiment of the monitor-control system in place inside the security container.

FIG. 58 shows the same view of security container 260 as FIG. 56, with monitor-control system 300 inserted in container space 390. When monitor-control system 300 is absent from container 260, insulator plug 301 (see FIG. 61) may be inserted into container 260 in its place. Plug 301 is a block of insulating foam having substantially the same size and shape as system 300, and acts to seal all openings between container 260 and container space 16.

Figure 57:
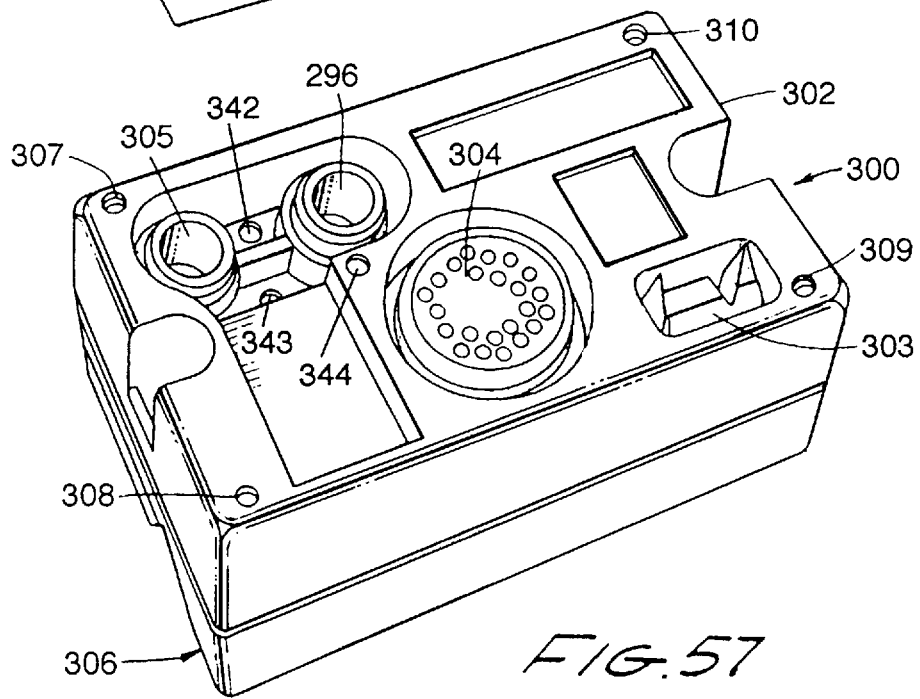
FIG. 57 provides a perspective view of the rear panel of the alternative preferred embodiment of the monitor-control system of this invention shown in FIGS. 50–56.

FIGS. 57 and 59 show the rear and front panels of monitor-control system 300, respectively. Rear panel 302 includes opening 303 for electrical cable connections, and openings 304, 305, and 296 to permit gases to pass into and through system 300. Rear panel 302 is held to front panel 306 of system 300 by means of screws 307, 308, 309, 310, 342, 343 and 344.

Front panel 306 of system 300 includes LED openings 311, 312, 313, 314, and 315. Panel 306 is tilted outwardly and downwardly around openings 311–315 for easy observation from below system 300. Front panel 306 also includes attached panel 316, which with the indention 306A in panel 306, forms a handle that is used to insert and remove the control system 300 into and out of the security container 260. Fasteners 317 and 318 are used to secure the control system 300 to the security container 260. Panel 316 includes slotted openings 319 to permit passage of gas mixtures into and out of monitor-control system 300.

Figure 60:
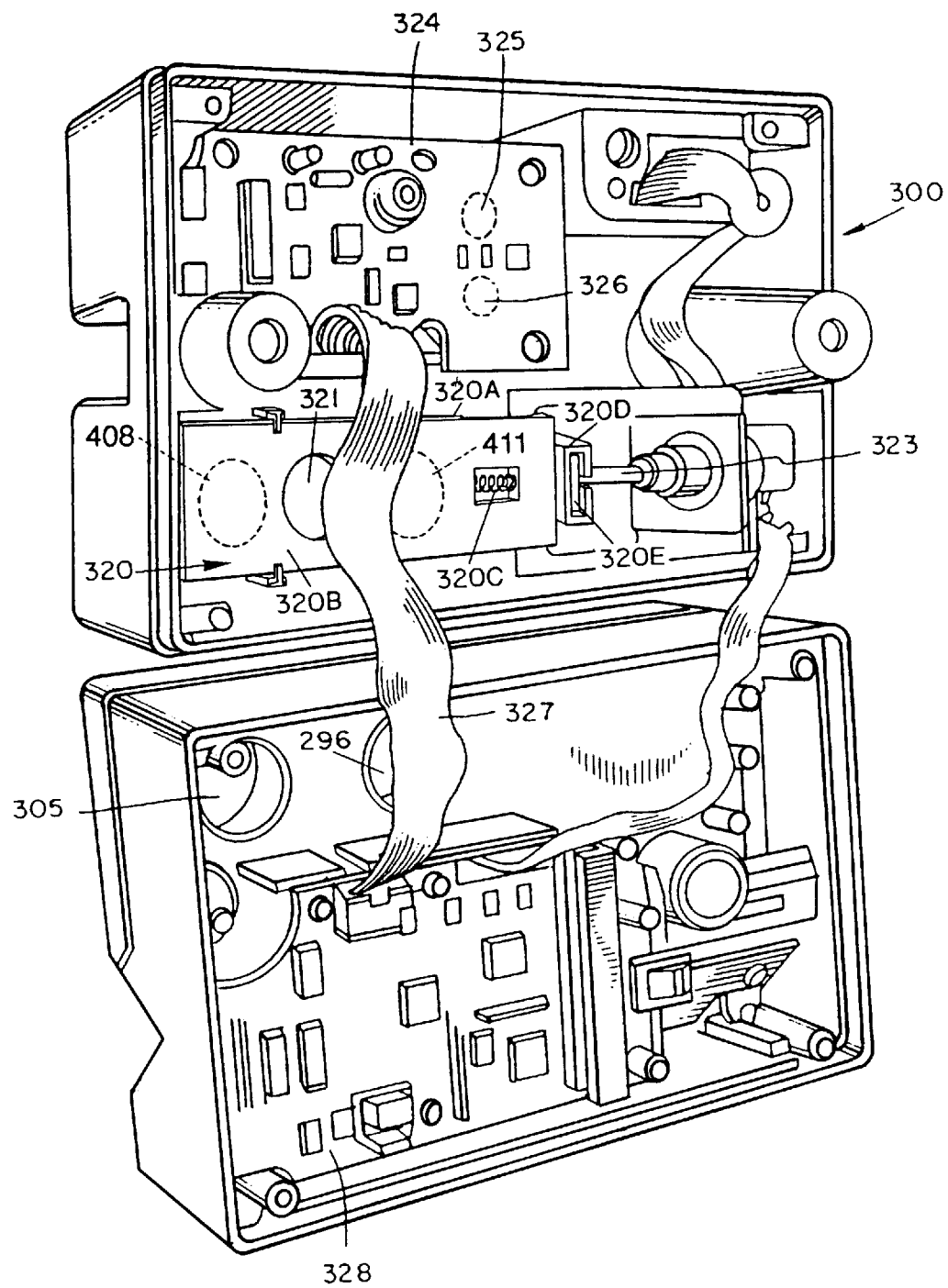
Figure 60A:
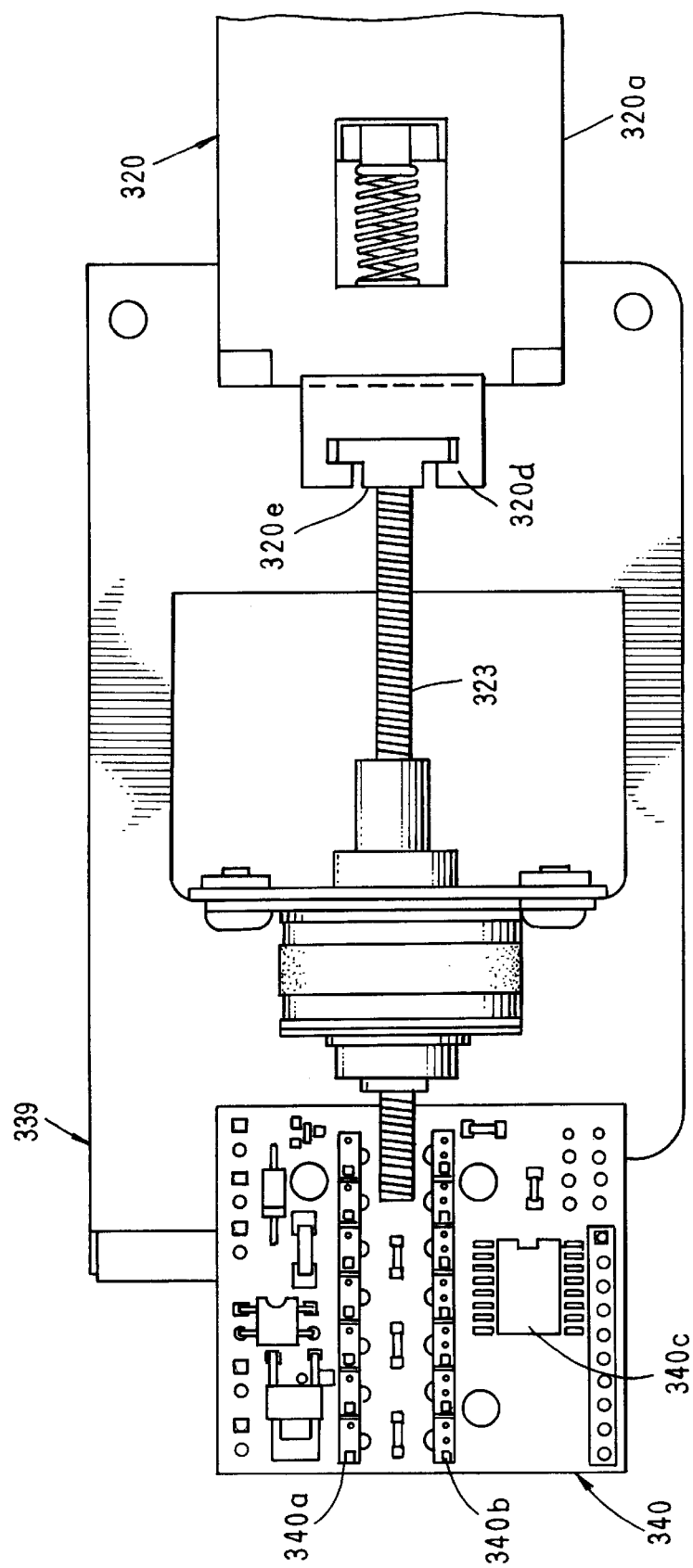

FIG. 60A and 60B show the interior configuration of the alternative preferred embodiment of system 300. Inside system 300 is slider valve assembly 320 which slides to the left to cover, and to the right to uncover openings 408 and 411 to permit gases to pass through system 300, and thus into and out of the interior space 16 of container 1. Slider valve assembly 320 is attached to stepper-motor shaft 323, and is adapted to move left and right from a fully closed position to a fully open position in small incremental steps, depending upon the desired inflow and outflow of air into the container, or gases from the container from the outside. FIGS. 62A through 62D show slider valve assembly 320 in the fully closed to the fully open positions. Assembly 320 includes front plate 320A, rear plate 320B, compression spring 320C and motor shaft coupling comprised of slot plate 320D and T-plate 320E. In the fully closed position, as shown in FIG. 60A, rear plate 320B is stopped by a rib feature in rear case 302 and is forced into o-rings 335 and 339 by the action of the interior ramps, sealing rear case openings 296 and 305. When the stepper motor begins to pull the slider assembly, from the valve cavity formed by the front and rear cases (FIG. 62B), rear plate 320B and front plate 320A are pulled together by the action of spring 320C and the slope of the interior teeth of the plates. As this action continues in FIG. 62C, the end of the slider assembly begins to allow passage of gases through case openings 305 and 408. Likewise, the opening in the center of the slider assembly begins to allow passage of gases through case openings 296 and 411. Finally, in FIG. 62D, the slider assembly is in the fully open position, allowing maximum exhaust of container atmosphere through openings 305 and 408 and maximum intake of outside air through openings 296 and 411.

Sensor board 324, of FIGS. 60A and 60B, includes oxygen sensor 325 and carbon dioxide sensor 326. Sensor board 324 is electrically linked via cable connector 327 to microprocessor board 328. Microprocessor board 328 carries a microprocessor and associated electronics for programming desired carbon dioxide and oxygen concentration set points, and deadband values around these set points; for receiving signals from carbon dioxide sensor 326 and oxygen sensor 325; and for comparing those sensor values with the desired values and generating signals appropriate to maintaining oxygen and carbon dioxide concentrations at desired set points or within desired deadband values around the set points. Openings 408 and 411, when the monitor-control system 300 is assembled, mate with openings 305 and 296. Opening 296 permits outside air to enter container 260 and pass through opening 295. Opening 305 is the duct through which container gases exit the container interior space 16, and connects to opening 294 for this purpose.

Figure 64:
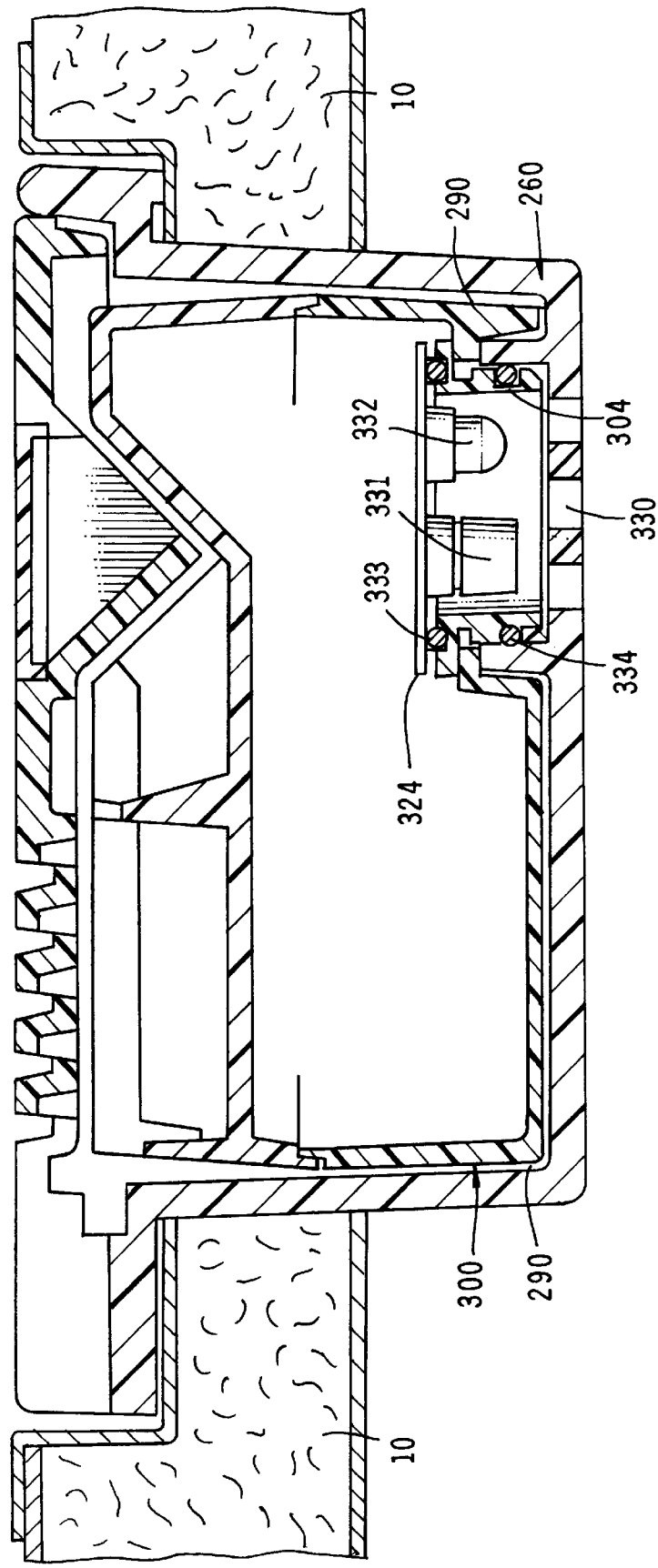
Figure 65:
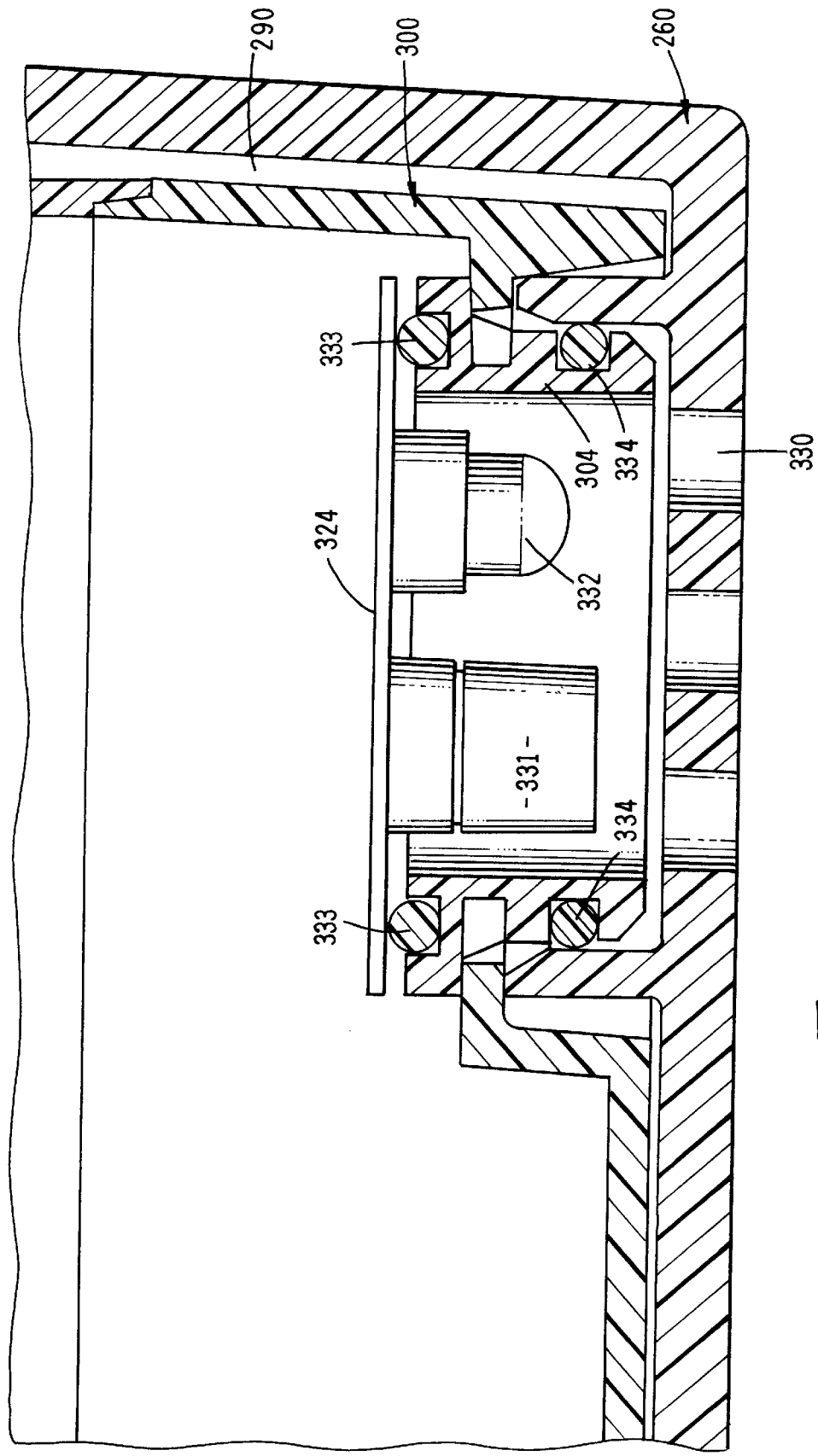
Figure 66A:
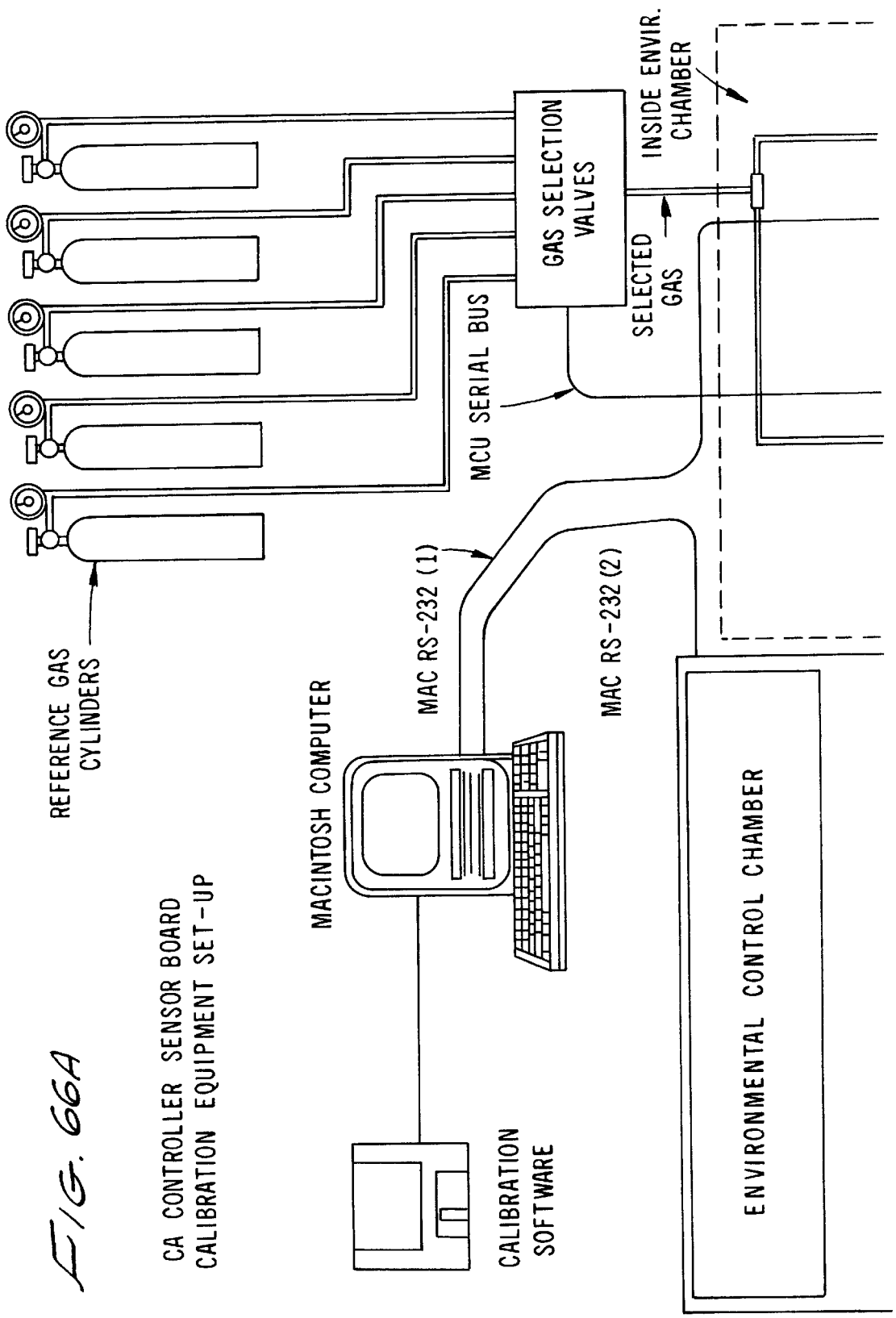
FIG. 66A and 66B show a diagrammatic view of the gas sensor calibration apparatus.
Figure 66B:
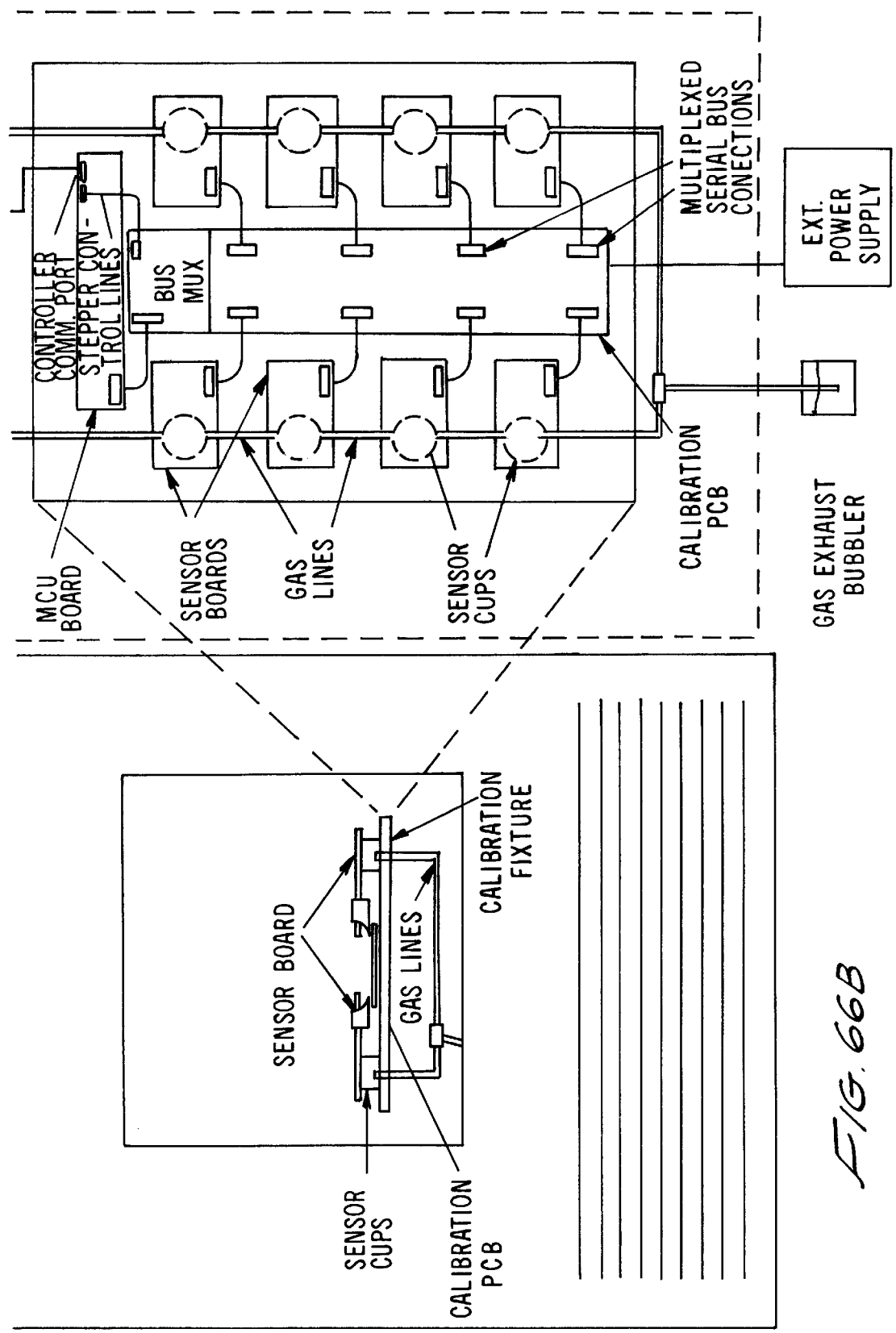

FIGS. 64 and 65 show a top plan view in cross-section of container 260 with system 300 inserted in container 260. Container gases flow through openings 330 (see also FIG. 55) and openings in 304 and come into contact with carbon dioxide sensor 331 and oxygen sensor 332. These sensors correspond to carbon dioxide and oxygen sensors 130 and 131 (see FIG. 32). O-rings 333 and 334 provide gas tight sealing between board 324 (see FIGS. 60A and 60B) carrying the two sensors 331 and 332 and interior space 290 while permitting the free flow of container gases into contact with the two sensors.

Figure 63:
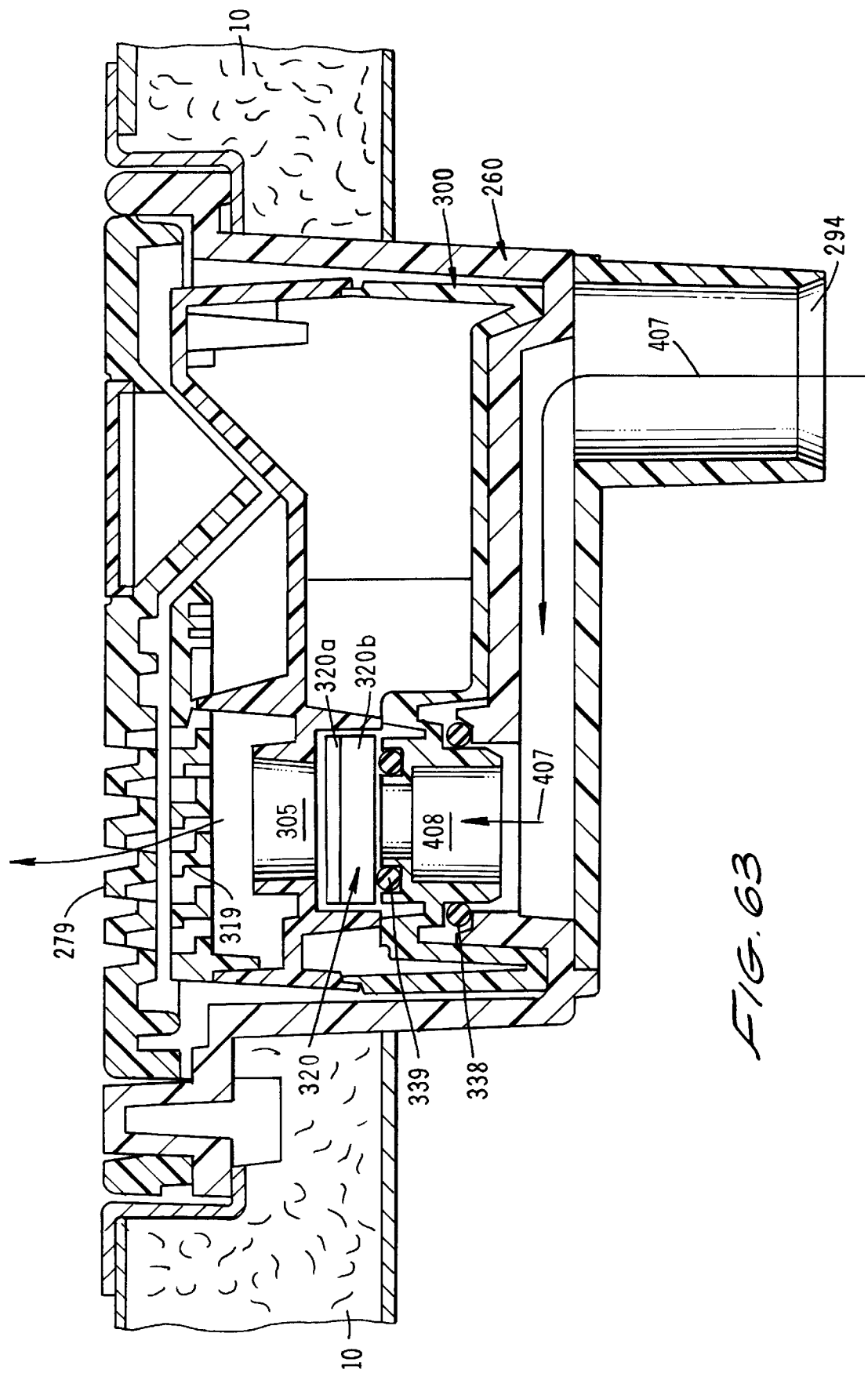
FIGS. 63, 64 and 65 show side elevation views, in cross-section, of the alternative embodiment of the security enclosure, the alternative embodiment of the monitor-control system, and of the carbon dioxide and oxygen sensor in the monitor-control system, together with the means for providing a flow of gases to these sensors.

FIGS. 62 and 63 show top plan, cross-sectional views of security container 260 with monitor-control system 300 inside container 260. These views show the flow of container atmosphere along lines 407 and 408 and outside air along lines 409, 410, 411 and 412 through passages 294 and 306 when slider valve 320 is opened. O-rings 335 and 339 provide gas tight sealing between slide valve assembly 320 and system 300. O-rings 337 and 338 provide further gas tight sealing between security enclosure 260 and system 300, so that gases passing into and out of container 1 are confined to flow through system 300 via passages 294 and 296a of security enclosure 260.

What is claimed is:

1. An apparatus for determining the concentration of carbon dioxide in a gas mixture that includes carbon dioxide, comprising: housing means forming a chamber permeable to gas mixtures and carbon dioxide; mounted within said housing in said chamber, a container having two chambers, with the first of said chambers substantially impermeable to gases entering said space, the second of said chambers having an opening to admit gases entering said chamber; each of said chambers including a thermistor, said thermistors being adapted to be maintained at substantially the same current; and means for detecting signals from said thermistors to determine said carbon dioxide concentration.

2. The apparatus of claim 1 further comprising means for correcting the carbon dioxide concentration value with data from said temperature detecting means.

3. An apparatus for determining the concentration of oxygen in a gas mixture that includes oxygen comprising: a chamber permeable to gas mixtures including oxygen; mounted within said chamber, a hollow container adapted to be incrementally heated, including digital-to-analog conversion controlled power supply means connected to said hollow container and adapted to heat said container incrementally over time, and having an opening to admit inflow of gases including oxygen, and an oxygen-permeable zirconia element having, on each side, electrode means affixed to said zirconia element; and connected to said elements, means for carrying electrical signals representative of the oxygen concentration in the gas mixtures entering said chamber.

4. A system for controlling the oxygen and carbon dioxide concentrations in a refrigerated container for respiring perishables, comprising:

an enclosure means;

a controller suitable for being placed in and removed from said enclosure means, said enclosure means having a size and shape suitable for installation in an exterior wall of said refrigerated container to provide gas access to the refrigerated air stream inside said container and to provide gas access from the exterior of said container, said controller comprising:

means including an oxygen gas sensor for dynamically and continuously monitoring the oxygen gas concentration in said container; and means including a carbon dioxide gas sensor for dynamically and continuously monitoring the carbon dioxide gas concentration in said container, said oxygen and carbon dioxide monitoring means being connected to means programmed to maintain desired levels of oxygen and carbon dioxide in the refrigerated container by activating valve means to admit atmospheric air as a source of oxygen into said container and to expel from said container gases low in oxygen concentration and high in carbon dioxide concentration to thereby dynamically and continuously control the oxygen gas and carbon dioxide gas concentrations in the refrigerated container.

5. The system of claim 4 wherein said enclosure comprises a first gas inlet means and a first gas outlet means connecting the interior of said enclosure means, in use, to the external atmosphere and second gas inlet means and second gas outlet means, in use, with the atmosphere inside the refrigerated container, the controller comprising:

a first gas inlet means and first gas outlet means communicating with said first gas inlet and first gas outlet means of said enclosure means and said second gas inlet and said second gas outlet means communicating with said second gas inlet and said second gas outlet means of said enclosure means, said valve means comprising closure means slidable across said second gas inlet and said second gas outlet means of said controller to open and close said second gas inlet and said second gas outlet means simultaneously to control the flow of air from the external atmosphere into said refrigerated container and the flow of container atmosphere gases from said container to the external atmosphere when the concentration of oxygen inside said container falls below a pre-determined desired value or when the concentration of carbon dioxide rises above a pre-determined desired value.

6. The apparatus of claim 4 or claim 5 in which said refrigerated container includes a fan access panel and said enclosure means is connected in use to and through the fan access panel.

7. The apparatus of claim 4 or claim 5 in which said controller further comprises temperature sensor means, temperature control means and temperature recording means.

8. The apparatus of claim 4 or claim 5 wherein said controller is microprocessor-driven.

9. The apparatus according to claim 4 or claim 5 wherein said gaseous oxygen concentration sensor comprises:

a chamber permeable to gas mixtures including oxygen;

a hollow container mounted within said chamber, including digital-to-analog conversion controlled power supply means connected to said hollow container to heat said container incrementally over time, said hollow container having an opening to admit inflow of gases including oxygen, and an oxygen-permeable element having, on each side, electrode means affixed thereto; and means for carrying electrical signals representative of said oxygen concentration in said gas mixture entering said chamber.

10. The apparatus of claim 4 or claim 5 wherein said gaseous carbon dioxide concentration sensor comprises said enclosure means permeable to gas mixtures including carbon dioxide, said enclosure means including means for detecting the temperature of gases and carbon dioxide therein, the enclosure means housing a container comprising two chambers, the first chamber being substantially impermeable to gases entering the enclosure means, the second chamber having an opening to admit gases, each of the chambers including a thermistor, the thermistors being maintainable at substantially the same current; and means for detecting signals from the thermistors to determine carbon dioxide concentration.

11. The apparatus of claim 4 or claim 5 wherein said controller comprises memory means for storing, separately, limits for said gaseous carbon dioxide concentration and said gaseous oxygen concentration in the gas atmosphere within said refrigerated container.

12. The apparatus of claim 4 or claim 5 further comprising means for setting and for changing the limits of said gaseous carbon dioxide concentration and said gaseous oxygen concentration in said gaseous atmosphere said refrigerated container from a location remote from said controller.

13. The apparatus of claim 4 or claim 5 wherein said controller includes means for averaging each of the monitored gaseous oxygen concentration values and the monitored carbon dioxide concentration values, separately, over a desired time interval.

14. The apparatus of claim 4 or claim 5 wherein said controller includes means for testing said gaseous oxygen concentration sensor and said gaseous carbon dioxide concentration sensor, for detecting malfunction of either sensor, and for adjusting said gas inlet means and said gas outlet means of said controller to desired fixed values upon detection of any malfunction.

15. The apparatus of claim 4 or claim 5 wherein said refrigerated container comprises a carbon dioxide scrubber and means for directing said gaseous atmosphere inside said refrigerated container through said scrubber, and said controller includes means for activating the directing means when said carbon dioxide concentration in said gas atmosphere inside said refrigerated container exceeds a desired limit.

16. The apparatus of claim 4 or claim 5 wherein said controller includes a microprocessor and at least one of: random access memory; read-only memory; multi-protocol serial bus means; real time clock means; input/output communication ports; a plurality of light-emitting diodes; means for reading and recording carbon dioxide concentration values and oxygen concentration values from the gaseous atmosphere inside the refrigerated container; means for sensing and recording temperature within the refrigerated container; means for sensing and recording the temperature of the carbon dioxide concentration sensor; means for checking the availability and voltage level of battery-powered backup; means for monitoring defroster means within said refrigerated container; means for activating the valve means; means for sensing and recording the position of closure means of the valve means; means for controlling carbon dioxide scrubber within said container; means for diagnostic testing of the gaseous carbon dioxide concentration sensor and of the gaseous oxygen concentration sensor; means for monitoring power delivered to the controller; and means for programming the controller to change, as desired, the limits of gaseous carbon dioxide concentration and gaseous oxygen concentration within the refrigerated container.

17. The apparatus of claim 4 or claim 5 wherein said controller includes data communication ports for inputting and outputting said gaseous oxygen concentration, said gaseous carbon dioxide concentration and temperature values for said gaseous atmosphere inside said refrigerated container, said data communication ports including means for communicating with transmitters remote from said controller.

18. The apparatus of claim 4 or claim 5 wherein said closure means comprises a motor-driven, incrementally-slidable member slidable over said controller second gas outlet and said controller second gas inlet means simultaneously.

19. The apparatus according to claim 4 or claim 5 wherein said controller includes means for communicating with remote transmitters of commands and data for storage in memory in said controller, and memory means in said controller for storing said commands and data.

20. The apparatus of claim 4 or claim 5 wherein said controller includes means for displaying a pattern of flash-emitting diodes in response to commands or data from said transmitters remote from said controller.

21. The apparatus of claim 4 or claim 5 wherein said controller includes means for transmitting to remote transmitters/receivers signals identifying said controller or signals specifying limits for said gaseous oxygen concentration and said gaseous carbon dioxide concentration in said gas atmosphere inside said refrigerated container, and means for receiving signals from said remote transmitters/receivers for changing said limits.

22. The apparatus of claim 4 or claim 5 wherein said enclosure means is positioned within the wall of said refrigerated container closes to said refrigeration system.

23. The apparatus of claim 6 in which said controller further comprises temperature sensor means, temperature control means and temperature recording means.

24. The apparatus according to claim 6 wherein said gaseous oxygen concentration sensor comprises:
  a chamber permeable to gas mixtures including oxygen;
  a hollow container mounted within said chamber, including digital-to-analog conversion controlled power supply means connected to said hollow container to heat said container incrementally over time, said hollow container having an opening to admit inflow of gases including oxygen, and an oxygen-permeable element having, on each side, electrode means affix thereto; and
  means for carrying electrical signals representative of said oxygen concentration in said gas mixture entering said chamber.

25. The apparatus of claim 6 wherein said controller is microprocessor-driven.

26. The apparatus according to claim 7 wherein said gaseous oxygen concentration sensor comprises:
  a chamber permeable to gas mixtures including oxygen;
  a hollow container mounted within said chamber, including digital-to-analog conversion controlled power supply means connected to said hollow container to heat said container incrementally over time, said hollow container having an opening to admit inflow of gases including oxygen, and an oxygen-permeable element having, on each side, electrode means affix thereto; and
  means for carrying electrical signals representative of said oxygen concentration in said gas mixture entering said chamber.

27. The apparatus of claim 7 wherein said controller includes memory means for storing detected gaseous oxygen concentration, detected gaseous carbon dioxide concentration, and detected temperature values of the gaseous atmosphere inside said refrigerated container.

* * * * *